United States Patent
Brown et al.

(10) Patent No.: US 11,815,781 B2
(45) Date of Patent: *Nov. 14, 2023

(54) TRANSPARENT WAVEGUIDE DISPLAY

(71) Applicants: Rockwell Collins, Inc., Cedar Rapids, IA (US); DIGILENS INC., Sunnyvale, CA (US)

(72) Inventors: Robert D. Brown, Lake Oswego, OR (US); Alastair John Grant, San Jose, CA (US); Wyatt L. Hendrick, Encinitas, CA (US); Milan Momcilo Popovich, Leicester (GB); James H. Stanley, Palo Alto, CA (US); Jonathan David Waldern, Los Altos Hills, CA (US)

(73) Assignees: Rockwell Collins, Inc., Cedar Rapids, IA (US); Digilens Inc., Sunnyvale, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/736,005

(22) Filed: May 3, 2022

(65) Prior Publication Data

US 2023/0114549 A1    Apr. 13, 2023

Related U.S. Application Data

(63) Continuation of application No. 17/153,588, filed on Jan. 20, 2021, now Pat. No. 11,448,937, which is a
(Continued)

(51) Int. Cl.
*G02F 1/29* (2006.01)
*G02B 5/18* (2006.01)
(Continued)

(52) U.S. Cl.
CPC ............ *G02F 1/29* (2013.01); *G02B 5/1814* (2013.01); *G02B 27/0172* (2013.01);
(Continued)

(58) Field of Classification Search
CPC ..... G02F 1/29; G02B 5/1814; G02B 27/0172; G02B 27/4272; G02B 6/0013; G02B 2027/0118; G03H 2260/34
See application file for complete search history.

(56) References Cited

U.S. PATENT DOCUMENTS 1,043,938 A * 11/1912 Huttenlocher ............ F23N 5/02
431/77
2,141,884 A    12/1938 August
(Continued)

OTHER PUBLICATIONS

U.S. Appl. No. 61/344,748, filed Sep. 28, 2010.
(Continued)

*Primary Examiner* — Andrew Jordan
(74) *Attorney, Agent, or Firm* — Suiter Swantz pc llo

(57) ABSTRACT

One embodiment provides an apparatus for displaying an image comprising: a first optical substrate comprising at least one waveguide layer configured to propagate light in a first direction, wherein the at least one waveguide layer of the first optical substrate comprises at least one grating lamina configured to extract the light from the first substrate along the first direction; and a second optical substrate comprising at least one waveguide layer configured to propagate the light in a second direction, wherein the at least one waveguide layer of the second optical substrate comprises at least one grating lumina configured to extract light from the second substrate along the second direction, wherein the at least one grating lamina of at least one of the first and second optical substrates comprises an SBG in a passive mode.

20 Claims, 57 Drawing Sheets

Related U.S. Application Data continuation of application No. 15/943,590, filed on Apr. 2, 2018, now abandoned, which is a continuation of application No. 14/044,676, filed on Oct. 2, 2013, now Pat. No. 9,933,684, which is a continuation-in-part of application No. 13/844,456, filed on Mar. 15, 2013, now Pat. No. 11,320,571.

(60) Provisional application No. 61/849,853, filed on Feb. 4, 2013, provisional application No. 61/796,632, filed on Nov. 16, 2012.

(51) Int. Cl.
  *G02B 27/42* (2006.01)
  *G02B 27/01* (2006.01)
  *F21V 8/00* (2006.01)

(52) U.S. Cl.
  CPC ........ *G02B 27/4272* (2013.01); *G02B 6/0013* (2013.01); *G02B 2027/0118* (2013.01); *G03H 2260/34* (2013.01)

(56) References Cited

U.S. PATENT DOCUMENTS

| | | | | |
|---|---|---|---|---|
| 3,482,498 | A | * | 12/1969 | Becker ............... G06V 40/1324 359/833 |
| 3,620,601 | A | | 11/1971 | Waghorn et al. |
| 3,741,716 | A | * | 6/1973 | Johne ................... D01D 5/084 432/59 |
| 3,804,496 | A | * | 4/1974 | Crane .................... A61B 3/113 250/221 |
| 3,843,231 | A | * | 10/1974 | Borel ..................... G02F 1/31 359/559 |
| 3,851,303 | A | | 11/1974 | Muller |
| 3,885,095 | A | | 5/1975 | Wolfson et al. |
| 3,940,204 | A | | 2/1976 | Withrington |
| 3,965,029 | A | * | 6/1976 | Arora ................... C09K 19/22 252/299.5 |
| 3,975,711 | A | * | 8/1976 | McMahon ......... G06V 40/1324 382/126 |
| 4,028,725 | A | * | 6/1977 | Lewis .................... G09B 9/307 340/980 |
| 4,035,068 | A | * | 7/1977 | Rawson ................ G02B 27/48 353/122 |
| 4,066,334 | A | * | 1/1978 | Fray ..................... G02F 1/139 349/200 |
| 4,082,432 | A | | 4/1978 | Kirschner |
| 4,099,841 | A | | 7/1978 | Ellis |
| 4,133,152 | A | * | 1/1979 | Penrose .................. B44F 5/00 D25/138 |
| 4,178,074 | A | | 12/1979 | Heller |
| 4,218,111 | A | | 8/1980 | Withrington et al. |
| 4,232,943 | A | | 11/1980 | Rogers |
| 4,248,093 | A | * | 2/1981 | Andersson ............ G01H 9/002 73/656 |
| 4,251,137 | A | * | 2/1981 | Knop ................ G02F 1/133371 349/201 |
| 4,309,070 | A | | 1/1982 | Searle |
| 4,322,163 | A | * | 3/1982 | Schiller ............. G06V 40/1324 356/71 |
| 4,386,361 | A | * | 5/1983 | Simmonds ............. H10N 60/10 327/528 |
| 4,389,612 | A | * | 6/1983 | Simmonds ......... G01R 33/0356 505/846 |
| 4,403,189 | A | * | 9/1983 | Simmonds ......... G01R 33/0358 327/528 |
| 4,418,993 | A | * | 12/1983 | Lipton ................... G03B 35/08 352/62 |
| 4,472,037 | A | * | 9/1984 | Lipton ................... G03B 35/00 352/41 |
| 4,523,226 | A | * | 6/1985 | Lipton ................. H04N 13/339 348/42 |
| 4,544,267 | A | * | 10/1985 | Schiller ................ A61B 5/1172 356/71 |
| 4,562,463 | A | * | 12/1985 | Lipton ................. H04N 13/368 348/E13.043 |
| 4,566,758 | A | * | 1/1986 | Bos ...................... G02F 1/1395 349/136 |
| 4,583,117 | A | * | 4/1986 | Lipton ................. H04N 13/341 348/207.99 |
| 4,643,515 | A | * | 2/1987 | Upatnieks ............ G03H 1/0408 359/10 |
| 4,647,967 | A | | 3/1987 | Kirschner et al. |
| 4,688,900 | A | * | 8/1987 | Doane .................. C09K 19/544 349/94 |
| 4,711,512 | A | | 12/1987 | Upatnieks |
| 4,714,320 | A | | 12/1987 | Banbury |
| 4,728,547 | A | * | 3/1988 | Vaz ....................... G02F 1/1334 600/549 |
| 4,729,640 | A | * | 3/1988 | Sakata ............. G02F 1/133371 359/569 |
| 4,743,083 | A | | 5/1988 | Schimpe |
| 4,749,256 | A | | 6/1988 | Bell et al. |
| 4,765,703 | A | * | 8/1988 | Suzuki ................... G02F 1/3137 385/33 |
| 4,775,218 | A | | 10/1988 | Wood et al. |
| 4,791,788 | A | * | 12/1988 | Simmonds ............ F17C 13/026 62/50.1 |
| 4,792,850 | A | * | 12/1988 | Liptoh ................. H04N 13/337 348/57 |
| 4,799,765 | A | | 1/1989 | Ferrer |
| 4,811,414 | A | * | 3/1989 | Fishbine .................. G06T 5/20 348/615 |
| 4,848,093 | A | * | 7/1989 | Simmonds ................ F17C 6/00 62/51.1 |
| 4,852,988 | A | * | 8/1989 | Velez ..................... A61B 3/113 351/158 |
| 4,854,688 | A | | 8/1989 | Hayford et al. |
| 4,860,294 | A | | 8/1989 | Winzer et al. |
| 4,884,876 | A | * | 12/1989 | Lipton ................... G02F 1/1393 349/98 |
| 4,890,902 | A | * | 1/1990 | Doane ................... G02F 1/1334 349/94 |
| 4,928,301 | A | | 5/1990 | Smoot |
| 4,933,976 | A | * | 6/1990 | Fishbine ............ G06V 40/1335 382/127 |
| 4,938,568 | A | * | 7/1990 | Margerum ............ G02F 1/1334 427/213.3 |
| 4,946,245 | A | | 8/1990 | Chamberlin et al. |
| 4,960,311 | A | * | 10/1990 | Moss ....................... G03H 1/20 359/9 |
| 4,964,701 | A | * | 10/1990 | Dorschner ............. G02F 1/292 349/139 |
| 4,967,268 | A | * | 10/1990 | Lipton ................. H04N 13/398 398/154 |
| 4,970,129 | A | * | 11/1990 | Ingwall ................... G03F 7/001 430/1 |
| 4,971,719 | A | * | 11/1990 | Vaz ....................... C09K 19/544 252/299.5 |
| 4,994,204 | A | * | 2/1991 | Doane .................. C09K 19/544 252/299.5 |
| 5,004,323 | A | * | 4/1991 | West ..................... C09K 19/544 349/92 |
| 5,007,711 | A | | 4/1991 | Wood et al. |
| 5,009,483 | A | * | 4/1991 | Rockwell, III ...... G02B 6/0065 385/116 |
| 5,011,624 | A | * | 4/1991 | Yamagishi ............ C09K 19/544 252/299.5 |
| 5,016,953 | A | * | 5/1991 | Moss ....................... G03H 1/20 359/9 |
| 5,033,814 | A | * | 7/1991 | Brown ................. H04N 5/7416 385/119 |
| 5,035,734 | A | | 7/1991 | Honkanen et al. |
| 5,053,834 | A | * | 10/1991 | Simmonds ......... G01R 33/0358 505/828 |
| 5,063,441 | A | * | 11/1991 | Lipton ................. H04N 13/239 348/E13.043 |
| 5,076,664 | A | | 12/1991 | Migozzi |

(56) References Cited

U.S. PATENT DOCUMENTS

| | | | |
|---|---|---|---|
| 5,079,416 A | 1/1992 | Filipovich | |
| 5,096,282 A * | 3/1992 | Margerum | G02F 1/1334 349/86 |
| 5,099,343 A * | 3/1992 | Margerum | G02F 1/1334 362/613 |
| 5,109,465 A * | 4/1992 | Klopotek | G02B 27/0994 250/503.1 |
| 5,110,034 A * | 5/1992 | Simmonds | H10N 60/80 228/208 |
| 5,117,285 A | 5/1992 | Melson et al. | |
| 5,117,302 A * | 5/1992 | Lipton | G02F 1/1309 359/227 |
| 5,119,454 A * | 6/1992 | McMahon | G02B 6/4246 359/290 |
| 5,124,821 A | 6/1992 | Antier et al. | |
| 5,138,687 A * | 8/1992 | Horie | G02B 6/1221 385/129 |
| 5,139,192 A * | 8/1992 | Simmonds | H10N 60/80 228/208 |
| 5,142,357 A * | 8/1992 | Lipton | H04N 13/296 348/E13.043 |
| 5,142,644 A * | 8/1992 | VanSteenkiste | G02F 1/13452 349/86 |
| 5,148,302 A | 9/1992 | Nagano et al. | |
| 5,150,234 A * | 9/1992 | Takahashi | G02F 1/29 349/1 |
| 5,151,958 A | 9/1992 | Honkanen | |
| 5,153,751 A | 10/1992 | Ishikawa et al. | |
| 5,159,445 A | 10/1992 | Gitlin et al. | |
| 5,160,523 A | 11/1992 | Honkanen et al. | |
| 5,181,133 A * | 1/1993 | Lipton | H04N 13/341 345/94 |
| 5,183,545 A | 2/1993 | Branca et al. | |
| 5,187,597 A | 2/1993 | Kato et al. | |
| 5,193,000 A * | 3/1993 | Lipton | H04N 19/597 348/E13.058 |
| 5,198,912 A * | 3/1993 | Ingwall | G02F 1/13342 430/1 |
| 5,198,914 A * | 3/1993 | Arns | G03H 1/04 359/8 |
| 5,200,861 A * | 4/1993 | Moskovich | G02B 13/22 359/740 |
| 5,210,624 A | 5/1993 | Matsumoto et al. | |
| 5,210,801 A * | 5/1993 | Fournier | G02B 6/124 385/132 |
| 5,218,360 A | 6/1993 | Goetz et al. | |
| 5,218,480 A * | 6/1993 | Moskovich | G02B 13/04 359/713 |
| 5,224,198 A * | 6/1993 | Jachimowicz | G02C 9/00 359/13 |
| 5,225,918 A * | 7/1993 | Taniguchi | G03H 1/20 359/30 |
| 5,239,372 A * | 8/1993 | Lipton | H04N 13/398 348/E13.058 |
| 5,240,636 A * | 8/1993 | Doane | C09K 19/544 359/251 |
| 5,241,337 A * | 8/1993 | Betensky | G03B 13/12 396/377 |
| 5,242,476 A * | 9/1993 | Bartel | C03B 37/027 65/412 |
| 5,243,413 A | 9/1993 | Gitlin et al. | |
| 5,251,048 A * | 10/1993 | Doane | G02F 1/1334 345/87 |
| 5,264,950 A * | 11/1993 | West | G02F 1/1334 349/87 |
| 5,268,792 A * | 12/1993 | Kreitzer | G02B 15/144511 359/689 |
| 5,284,499 A * | 2/1994 | Harvey | C03B 37/029 65/435 |
| 5,289,315 A | 2/1994 | Makita et al. | |
| 5,295,208 A | 3/1994 | Caulfield et al. | |
| 5,296,967 A * | 3/1994 | Moskovich | G02B 13/24 359/713 |
| 5,299,289 A * | 3/1994 | Omae | G02F 1/133371 349/5 |
| 5,303,085 A | 4/1994 | Rallison | |
| 5,306,923 A | 4/1994 | Kazmierski et al. | |
| 5,309,283 A * | 5/1994 | Kreitzer | H04N 9/31 359/648 |
| 5,313,330 A * | 5/1994 | Betensky | G02B 15/143105 359/740 |
| 5,315,324 A * | 5/1994 | Kubelik | B41J 2/415 347/120 |
| 5,315,419 A * | 5/1994 | Saupe | G02F 1/141 349/131 |
| 5,315,440 A * | 5/1994 | Betensky | G02B 15/16 359/676 |
| 5,317,405 A | 5/1994 | Kuriki et al. | |
| 5,327,269 A * | 7/1994 | Tilton | G02F 1/1396 349/33 |
| 5,329,363 A * | 7/1994 | Moskovich | G02B 27/0025 348/781 |
| 5,341,230 A | 8/1994 | Smith | |
| 5,343,147 A * | 8/1994 | Sager | G01R 33/326 327/527 |
| 5,351,151 A | 9/1994 | Levy | |
| 5,359,362 A | 10/1994 | Lewis et al. | |
| 5,363,220 A | 11/1994 | Kuwayama et al. | |
| 5,368,770 A * | 11/1994 | Saupe | C09K 19/542 252/299.5 |
| 5,369,511 A | 11/1994 | Amos | |
| 5,371,626 A * | 12/1994 | Betensky | G02B 23/00 359/422 |
| 5,400,069 A | 3/1995 | Braun et al. | |
| 5,408,346 A | 4/1995 | Frissel et al. | |
| 5,410,370 A * | 4/1995 | Janssen | G02B 26/108 359/211.2 |
| 5,410,376 A * | 4/1995 | Cornsweet | G06V 40/19 351/209 |
| 5,416,510 A * | 5/1995 | Lipton | H04N 19/597 348/E13.058 |
| 5,416,514 A * | 5/1995 | Janssen | G09G 3/342 348/742 |
| 5,418,584 A | 5/1995 | Larson | |
| 5,418,871 A * | 5/1995 | Revelli, Jr. | H04N 1/036 385/44 |
| 5,428,480 A * | 6/1995 | Betensky | G02B 15/1421 359/708 |
| 5,437,811 A * | 8/1995 | Doane | C09K 19/542 349/86 |
| 5,438,357 A | 8/1995 | McNelley | |
| 5,452,385 A * | 9/1995 | Izumi | G02F 1/133615 349/196 |
| 5,453,863 A * | 9/1995 | West | C09K 19/0208 349/35 |
| 5,455,693 A | 10/1995 | Wreede et al. | |
| 5,455,713 A * | 10/1995 | Kreitzer | G02B 7/028 359/649 |
| 5,462,700 A * | 10/1995 | Beeson | G03B 21/625 264/2.6 |
| 5,463,428 A * | 10/1995 | Lipton | G02C 7/101 351/158 |
| 5,465,311 A * | 11/1995 | Caulfield | G02B 6/34 385/27 |
| 5,471,326 A | 11/1995 | Hall et al. | |
| 5,473,222 A | 12/1995 | Thoeny et al. | |
| 5,476,611 A * | 12/1995 | Nolan | C09K 19/544 252/299.61 |
| 5,481,321 A * | 1/1996 | Lipton | H04N 13/337 348/E13.058 |
| 5,481,385 A * | 1/1996 | Zimmerman | G02F 1/133524 349/62 |
| 5,485,313 A * | 1/1996 | Betensky | G02B 15/143503 359/740 |
| 5,493,430 A * | 2/1996 | Lu | G02F 1/13718 349/185 |

(56) References Cited

U.S. PATENT DOCUMENTS

| | | | |
|---|---|---|---|
| 5,493,448 A * | 2/1996 | Betensky | G02B 15/16 359/691 |
| 5,496,621 A | 3/1996 | Makita et al. | |
| 5,499,140 A * | 3/1996 | Betensky | G02B 15/14 359/795 |
| 5,500,671 A | 3/1996 | Andersson et al. | |
| 5,500,769 A * | 3/1996 | Betensky | G02B 23/00 359/422 |
| 5,510,913 A | 4/1996 | Hashimoto et al. | |
| 5,515,184 A | 5/1996 | Caulfield et al. | |
| 5,516,455 A * | 5/1996 | Jacobine | C08G 75/045 252/299.61 |
| 5,524,272 A | 6/1996 | Podowski et al. | |
| 5,528,720 A * | 6/1996 | Winston | G02F 1/133615 385/129 |
| 5,530,566 A * | 6/1996 | Kumar | G02F 1/1334 349/86 |
| 5,532,736 A | 7/1996 | Kuriki et al. | |
| 5,532,875 A * | 7/1996 | Betensky | G02B 23/00 359/399 |
| 5,537,232 A | 7/1996 | Biles | |
| RE35,310 E * | 8/1996 | Moskovich | G02B 13/18 359/650 |
| 5,543,950 A * | 8/1996 | Lavrentovich | G02F 1/139 349/149 |
| 5,559,637 A * | 9/1996 | Moskovich | G02B 27/0025 359/662 |
| 5,572,248 A | 11/1996 | Allen et al. | |
| 5,572,250 A * | 11/1996 | Lipton | H04N 13/161 348/E13.059 |
| 5,576,888 A * | 11/1996 | Betensky | G02B 15/14 359/676 |
| 5,579,026 A | 11/1996 | Tabata | |
| 5,583,795 A | 12/1996 | Smyth | |
| 5,585,035 A * | 12/1996 | Nerad | C09K 19/544 252/299.5 |
| 5,593,615 A * | 1/1997 | Nerad | C09K 19/544 252/299.01 |
| 5,604,611 A | 2/1997 | Saburi et al. | |
| 5,606,433 A | 2/1997 | Yin et al. | |
| 5,612,733 A | 3/1997 | Flohr | |
| 5,612,734 A | 3/1997 | Nelson et al. | |
| 5,619,254 A | 4/1997 | McNelley | |
| 5,619,586 A * | 4/1997 | Sibbald | G06V 40/1324 356/71 |
| 5,621,529 A * | 4/1997 | Gordon | G02B 27/48 250/237 G |
| 5,621,552 A * | 4/1997 | Coates | C09K 19/544 349/86 |
| 5,625,495 A * | 4/1997 | Moskovich | G02B 13/22 359/663 |
| 5,629,259 A | 5/1997 | Akada et al. | |
| 5,631,107 A | 5/1997 | Tarumi et al. | |
| 5,633,100 A | 5/1997 | Mickish et al. | |
| 5,646,785 A | 7/1997 | Gilboa et al. | |
| 5,648,857 A | 7/1997 | Ando et al. | |
| 5,661,577 A | 8/1997 | Jenkins et al. | |
| 5,661,603 A | 8/1997 | Hanano et al. | |
| 5,665,494 A | 9/1997 | Kawabata et al. | |
| 5,668,614 A * | 9/1997 | Chien | G02F 1/13718 349/115 |
| 5,668,907 A | 9/1997 | Veligdan | |
| 5,677,797 A * | 10/1997 | Betensky | G02B 13/18 359/708 |
| 5,680,231 A * | 10/1997 | Grinberg | G02B 3/005 359/22 |
| 5,680,411 A | 10/1997 | Ramdane et al. | |
| 5,682,255 A | 10/1997 | Friesem et al. | |
| 5,686,931 A * | 11/1997 | Funfschilling | G02F 1/13473 349/97 |
| 5,686,975 A * | 11/1997 | Lipton | G02B 30/25 359/465 |
| 5,691,795 A * | 11/1997 | Doane | C09K 19/586 349/169 |
| 5,694,230 A | 12/1997 | Welch | |
| 5,695,682 A * | 12/1997 | Doane | C09K 19/544 349/169 |
| 5,701,132 A | 12/1997 | Kollin et al. | |
| 5,706,108 A | 1/1998 | Ando et al. | |
| 5,706,136 A * | 1/1998 | Okuyama | G02B 13/22 359/633 |
| 5,707,925 A | 1/1998 | Akada et al. | |
| 5,710,645 A * | 1/1998 | Phillips | G03H 1/0408 359/34 |
| 5,724,189 A | 3/1998 | Ferrante | |
| 5,724,463 A * | 3/1998 | Deacon | G02F 1/2955 385/47 |
| 5,726,782 A | 3/1998 | Kato et al. | |
| 5,727,098 A | 3/1998 | Jacobson | |
| 5,729,242 A | 3/1998 | Margerum et al. | |
| 5,731,060 A | 3/1998 | Hirukawa et al. | |
| 5,731,853 A | 3/1998 | Taketomi et al. | |
| 5,742,262 A | 4/1998 | Tabata et al. | |
| 5,745,266 A * | 4/1998 | Smith | B60Q 1/30 359/13 |
| 5,745,301 A * | 4/1998 | Betensky | G02B 13/0035 359/689 |
| 5,748,272 A * | 5/1998 | Tanaka | G02F 1/13342 349/86 |
| 5,748,277 A * | 5/1998 | Huang | G09G 3/3629 349/169 |
| 5,751,452 A | 5/1998 | Tanaka et al. | |
| 5,757,546 A * | 5/1998 | Lipton | H04N 13/279 359/464 |
| 5,760,931 A | 6/1998 | Saburi et al. | |
| 5,760,960 A * | 6/1998 | Lin | G02B 6/124 359/569 |
| 5,764,414 A | 6/1998 | King et al. | |
| 5,771,320 A * | 6/1998 | Stone | G02F 1/3523 385/16 |
| 5,790,288 A | 8/1998 | Jager et al. | |
| 5,790,314 A * | 8/1998 | Duck | G02B 6/2937 385/33 |
| 5,798,641 A * | 8/1998 | Spagna | G01N 27/72 324/228 |
| 5,804,609 A * | 9/1998 | Ohnishi | C09K 19/3001 522/74 |
| 5,808,804 A * | 9/1998 | Moskovich | H04N 5/74 359/713 |
| 5,812,608 A | 9/1998 | Valimaki et al. | |
| 5,822,089 A * | 10/1998 | Phillips | G03H 1/0408 359/34 |
| 5,822,127 A | 10/1998 | Chen et al. | |
| 5,825,448 A * | 10/1998 | Bos | G02F 1/1396 349/128 |
| 5,831,700 A * | 11/1998 | Li | G02F 1/133753 349/134 |
| 5,835,661 A | 11/1998 | Tai et al. | |
| 5,841,507 A | 11/1998 | Barnes | |
| 5,841,587 A * | 11/1998 | Moskovich | G02B 13/18 359/662 |
| 5,847,787 A * | 12/1998 | Fredley | B82Y 20/00 349/86 |
| 5,856,842 A | 1/1999 | Tedesco | |
| 5,857,043 A * | 1/1999 | Cook | G02B 6/02142 385/37 |
| 5,867,238 A * | 2/1999 | Miller | G02F 1/1333 349/86 |
| 5,867,618 A * | 2/1999 | Ito | G02B 6/02138 385/128 |
| 5,868,951 A | 2/1999 | Schuck, III et al. | |
| 5,870,228 A * | 2/1999 | Kreitzer | G02B 9/12 359/649 |
| 5,875,012 A * | 2/1999 | Crawford | G02F 1/13473 349/86 |
| 5,877,826 A * | 3/1999 | Yang | C09K 19/0208 349/170 |
| 5,886,822 A | 3/1999 | Spitzer | |
| 5,892,598 A | 4/1999 | Asakawa et al. | |

(56) References Cited

U.S. PATENT DOCUMENTS

| | | | | |
|---|---|---|---|---|
| 5,892,599 A * | 4/1999 | Bahuguna | G06V 40/1324 | 359/15 |
| 5,898,511 A | 4/1999 | Mizutani et al. | | |
| 5,900,987 A * | 5/1999 | Kreitzer | G02B 15/1425 | 359/689 |
| 5,900,989 A * | 5/1999 | Kreitzer | G02B 15/144113 | 359/708 |
| 5,903,395 A | 5/1999 | Rallison et al. | | |
| 5,903,396 A | 5/1999 | Rallison | | |
| 5,907,416 A | 5/1999 | Hegg et al. | | |
| 5,907,436 A | 5/1999 | Perry et al. | | |
| 5,917,459 A | 6/1999 | Son et al. | | |
| 5,926,147 A | 7/1999 | Sehm et al. | | |
| 5,929,946 A | 7/1999 | Sharp et al. | | |
| 5,929,960 A * | 7/1999 | West | G02F 1/13394 | 349/155 |
| 5,930,433 A * | 7/1999 | Williamson | G02B 6/06 | 385/119 |
| 5,936,776 A * | 8/1999 | Kreitzer | G02B 13/16 | 359/708 |
| 5,937,115 A | 8/1999 | Domash | | |
| 5,942,157 A | 8/1999 | Sutherland et al. | | |
| 5,945,893 A | 8/1999 | Plessky et al. | | |
| 5,949,302 A | 9/1999 | Sarkka | | |
| 5,949,508 A * | 9/1999 | Kumar | G02F 1/141 | 349/122 |
| 5,956,113 A * | 9/1999 | Crawford | C09K 19/52 | 349/185 |
| 5,962,147 A | 10/1999 | Shalub et al. | | |
| 5,963,375 A * | 10/1999 | Kreitzer | G02B 7/028 | 359/650 |
| 5,966,223 A | 10/1999 | Friesem et al. | | |
| 5,969,874 A * | 10/1999 | Moskovich | G02B 9/12 | 359/716 |
| 5,969,876 A * | 10/1999 | Kreitzer | G02B 13/18 | 359/716 |
| 5,973,727 A * | 10/1999 | McGrew | G02B 27/017 | 348/51 |
| 5,974,162 A * | 10/1999 | Metz | G06V 40/1324 | 382/125 |
| 5,985,422 A | 11/1999 | Krauter | | |
| 5,986,746 A * | 11/1999 | Metz | A61B 5/1172 | 356/71 |
| 5,991,087 A | 11/1999 | Rallison | | |
| 5,999,089 A * | 12/1999 | Carlson | G08B 1/08 | 367/197 |
| 5,999,282 A * | 12/1999 | Suzuki | G02F 1/133621 | 349/5 |
| 5,999,314 A | 12/1999 | Asakura et al. | | |
| 6,014,187 A * | 1/2000 | Taketomi | G03H 1/0248 | 349/86 |
| 6,023,375 A * | 2/2000 | Kreitzer | G02B 15/143103 | 359/713 |
| 6,042,947 A | 3/2000 | Asakura et al. | | |
| 6,043,585 A | 3/2000 | Plessky et al. | | |
| 6,046,585 A * | 4/2000 | Simmonds | G01N 27/745 | 436/526 |
| 6,052,540 A * | 4/2000 | Koyama | G03B 17/20 | 396/296 |
| 6,061,107 A * | 5/2000 | Yang | G02F 1/13718 | 349/35 |
| 6,061,463 A * | 5/2000 | Metz | G06V 40/1324 | 382/126 |
| 6,069,728 A * | 5/2000 | Huignard | H04N 5/7441 | 359/254 |
| 6,075,626 A | 6/2000 | Mizutani et al. | | |
| 6,078,427 A | 6/2000 | Fontaine et al. | | |
| 6,084,998 A * | 7/2000 | Straayer | G02B 6/02138 | 430/290 |
| 6,094,311 A * | 7/2000 | Moskovich | G02B 9/08 | 359/740 |
| 6,097,551 A * | 8/2000 | Kreitzer | G02B 9/04 | 359/717 |
| 6,104,448 A * | 8/2000 | Doane | C09K 19/586 | 349/169 |
| 6,107,943 A | 8/2000 | Schroeder | | |
| 6,115,152 A | 9/2000 | Popovich et al. | | |
| 6,118,908 A * | 9/2000 | Bischel | G09F 9/305 | 385/39 |
| 6,121,899 A | 9/2000 | Theriault | | |
| 6,127,066 A | 10/2000 | Ueda et al. | | |
| 6,128,058 A * | 10/2000 | Walton | G02F 1/133753 | 349/127 |
| 6,133,971 A * | 10/2000 | Silverstein | G02F 1/13718 | 349/131 |
| 6,133,975 A * | 10/2000 | Li | G02F 1/1391 | 349/134 |
| 6,137,630 A | 10/2000 | Tsou et al. | | |
| 6,141,074 A * | 10/2000 | Bos | G02F 1/133753 | 349/179 |
| 6,141,154 A * | 10/2000 | Kreitzer | G02B 13/02 | 359/651 |
| 6,151,142 A * | 11/2000 | Phillips | G02B 6/0033 | 359/3 |
| 6,154,190 A * | 11/2000 | Yang | G09G 3/3629 | 345/94 |
| 6,156,243 A | 12/2000 | Kosuga et al. | | |
| 6,167,169 A * | 12/2000 | Brinkman | G02F 1/011 | 385/16 |
| 6,169,513 B1 | 1/2001 | Cohen | | |
| 6,169,594 B1 * | 1/2001 | Aye | G02B 5/045 | 349/196 |
| 6,169,613 B1 * | 1/2001 | Amitai | G02B 6/34 | 359/33 |
| 6,169,636 B1 * | 1/2001 | Kreitzer | G02B 13/22 | 359/689 |
| 6,172,792 B1 * | 1/2001 | Jepsen | G02B 5/1828 | 359/254 |
| 6,176,837 B1 | 1/2001 | Foxlin | | |
| 6,185,015 B1 * | 2/2001 | Reinhorn | G02B 6/43 | 359/34 |
| 6,185,016 B1 | 2/2001 | Popovich | | |
| 6,188,462 B1 * | 2/2001 | Lavrentovich | G02F 1/13718 | 349/201 |
| 6,191,887 B1 * | 2/2001 | Michaloski | G02B 27/145 | 372/98 |
| 6,195,206 B1 | 2/2001 | Yona et al. | | |
| 6,195,209 B1 * | 2/2001 | Kreitzer | G02B 13/22 | 359/650 |
| 6,204,835 B1 * | 3/2001 | Yang | G09G 3/3629 | 345/94 |
| 6,211,976 B1 * | 4/2001 | Popovich | G02B 5/32 | 359/24 |
| 6,222,297 B1 | 4/2001 | Perdue | | |
| 6,222,675 B1 | 4/2001 | Mall et al. | | |
| 6,222,971 B1 | 4/2001 | Veligdan et al. | | |
| 6,249,386 B1 | 6/2001 | Yona et al. | | |
| 6,259,423 B1 | 7/2001 | Tokito et al. | | |
| 6,259,559 B1 | 7/2001 | Kobayashi et al. | | |
| 6,266,166 B1 * | 7/2001 | Katsumata | G03H 1/0256 | 156/244.27 |
| 6,268,839 B1 * | 7/2001 | Yang | G09G 3/3629 | 349/169 |
| 6,269,203 B1 * | 7/2001 | Davies | G02B 6/29329 | 385/24 |
| 6,275,031 B1 * | 8/2001 | Simmonds | B82Y 15/00 | 436/526 |
| 6,278,429 B1 * | 8/2001 | Ruth | G09G 3/3629 | 345/94 |
| 6,285,813 B1 | 9/2001 | Schultz et al. | | |
| 6,297,860 B1 * | 10/2001 | Moskovich | G02B 13/16 | 359/650 |
| 6,301,056 B1 * | 10/2001 | Kreitzer | G02B 13/04 | 359/650 |
| 6,301,057 B1 * | 10/2001 | Kreitzer | G02B 13/16 | 359/714 |
| 6,317,083 B1 | 11/2001 | Johnson et al. | | |
| 6,317,227 B1 | 11/2001 | Mizutani et al. | | |
| 6,317,228 B2 * | 11/2001 | Popovich | G02B 5/32 | 359/24 |

(56) References Cited

U.S. PATENT DOCUMENTS

| | | | |
|---|---|---|---|
| 6,317,528 B1* | 11/2001 | Gadkaree | G02B 6/124 385/132 |
| 6,320,563 B1* | 11/2001 | Yang | G09G 3/3629 345/94 |
| 6,321,069 B1 | 11/2001 | Piirainen | |
| 6,323,970 B1* | 11/2001 | Popovich | G02F 1/13342 349/201 |
| 6,323,989 B1* | 11/2001 | Jacobson | B82Y 20/00 345/107 |
| 6,324,014 B1* | 11/2001 | Moskovich | G02B 13/18 359/716 |
| 6,327,089 B1 | 12/2001 | Hosaki et al. | |
| 6,330,109 B1* | 12/2001 | Ishii | G02B 5/1866 359/569 |
| 6,333,819 B1 | 12/2001 | Svedenkrans | |
| 6,339,486 B1* | 1/2002 | Popovich | G02F 1/133621 348/832 |
| 6,340,540 B1 | 1/2002 | Ueda et al. | |
| 6,351,273 B1* | 2/2002 | Lemelson | G06F 3/013 704/271 |
| 6,351,333 B2 | 2/2002 | Araki et al. | |
| 6,356,172 B1 | 3/2002 | Koivisto et al. | |
| 6,356,674 B1 | 3/2002 | Davis et al. | |
| 6,359,730 B2 | 3/2002 | Tervonen | |
| 6,359,737 B1 | 3/2002 | Stringfellow | |
| 6,366,281 B1* | 4/2002 | Lipton | H04N 13/282 348/E13.021 |
| 6,366,369 B2* | 4/2002 | Ichikawa | G02B 5/203 359/12 |
| 6,366,378 B1 | 4/2002 | Tervonen et al. | |
| 6,377,238 B1* | 4/2002 | McPheters | G03H 1/22 359/33 |
| 6,377,321 B1* | 4/2002 | Khan | G02F 1/13718 349/35 |
| 6,388,797 B1* | 5/2002 | Lipton | G02C 7/101 348/E13.059 |
| 6,392,812 B1 | 5/2002 | Howard | |
| 6,407,724 B2* | 6/2002 | Waldern | G02B 27/0093 345/7 |
| 6,409,687 B1 | 6/2002 | Foxlin | |
| 6,411,444 B1* | 6/2002 | Moskovich | G02B 5/22 359/722 |
| 6,414,760 B1* | 7/2002 | Lopez | H04N 1/0281 385/115 |
| 6,417,971 B1* | 7/2002 | Moskovich | G02B 15/1425 359/676 |
| 6,437,563 B1* | 8/2002 | Simmonds | B82Y 15/00 436/526 |
| 6,445,512 B1* | 9/2002 | Moskovich | G02B 13/16 359/713 |
| 6,449,095 B1* | 9/2002 | Ohtaki | G11B 7/127 359/566 |
| 6,456,584 B1* | 9/2002 | Nagata | G11B 7/26 369/283 |
| 6,470,132 B1 | 10/2002 | Nousiainen et al. | |
| 6,473,209 B1* | 10/2002 | Popovich | G02B 30/24 349/1 |
| 6,476,974 B1* | 11/2002 | Kreitzer | G02B 13/04 359/752 |
| 6,483,303 B2* | 11/2002 | Simmonds | G01R 33/12 436/526 |
| 6,486,997 B1 | 11/2002 | Bruzzone et al. | |
| 6,504,518 B1 | 1/2003 | Kuwayama et al. | |
| 6,504,629 B1* | 1/2003 | Popovich | G02B 5/32 349/201 |
| 6,509,937 B1* | 1/2003 | Moskovich | G02B 9/60 359/650 |
| 6,510,263 B1* | 1/2003 | Maisenholder | G02B 6/12007 385/37 |
| 6,518,747 B2* | 2/2003 | Sager | G01R 33/1215 436/526 |
| 6,519,088 B1* | 2/2003 | Lipton | H04N 13/327 348/E13.058 |
| 6,522,794 B1* | 2/2003 | Bischel | G09F 9/305 385/12 |
| 6,522,795 B1 | 2/2003 | Jordan et al. | |
| 6,524,771 B2 | 2/2003 | Maeda et al. | |
| 6,529,336 B1* | 3/2003 | Kreitzer | G02B 27/4216 359/708 |
| 6,534,977 B1* | 3/2003 | Duncan | G01R 15/246 359/280 |
| 6,545,778 B2 | 4/2003 | Ono et al. | |
| 6,550,949 B1 | 4/2003 | Bauer et al. | |
| 6,552,789 B1 | 4/2003 | Modro | |
| 6,557,413 B2 | 5/2003 | Nieminen et al. | |
| 6,559,813 B1* | 5/2003 | DeLuca | G09G 5/14 348/E13.058 |
| 6,560,019 B2 | 5/2003 | Nakai | |
| 6,563,648 B2 | 5/2003 | Gleckman et al. | |
| 6,563,650 B2* | 5/2003 | Moskovich | G02B 13/22 359/663 |
| 6,567,014 B1 | 5/2003 | Hansen et al. | |
| 6,567,573 B1* | 5/2003 | Domash | G02F 1/011 385/24 |
| 6,577,411 B1* | 6/2003 | David | G02B 27/02 351/159.41 |
| 6,577,429 B1* | 6/2003 | Kurtz | G02B 27/48 348/E9.026 |
| 6,580,529 B1 | 6/2003 | Amitai et al. | |
| 6,583,838 B1* | 6/2003 | Hoke | G02F 1/1391 349/134 |
| 6,583,873 B1 | 6/2003 | Goncharov et al. | |
| 6,587,619 B1 | 7/2003 | Kinoshita | |
| 6,594,090 B2* | 7/2003 | Kruschwitz | G02B 27/0927 348/E9.026 |
| 6,596,193 B2* | 7/2003 | Coates | C09K 19/12 546/342 |
| 6,597,176 B2* | 7/2003 | Simmonds | B82Y 25/00 436/526 |
| 6,597,475 B1* | 7/2003 | Shirakura | G03H 1/202 359/23 |
| 6,598,987 B1 | 7/2003 | Parikka | |
| 6,600,590 B2* | 7/2003 | Roddy | H04N 9/3105 359/312 |
| 6,608,720 B1 | 8/2003 | Freeman | |
| 6,611,253 B1 | 8/2003 | Cohen | |
| 6,618,104 B1* | 9/2003 | Date | G02F 1/1393 349/86 |
| 6,624,943 B2 | 9/2003 | Nakai et al. | |
| 6,625,381 B2* | 9/2003 | Roddy | H01S 5/06209 348/E9.026 |
| 6,646,772 B1* | 11/2003 | Popovich | G02F 1/133621 353/30 |
| 6,646,810 B2 | 11/2003 | Harter, Jr. et al. | |
| 6,661,578 B2 | 12/2003 | Hedrick | |
| 6,667,134 B1* | 12/2003 | Sutehrland | G03F 7/031 430/1 |
| 6,674,578 B2 | 1/2004 | Sugiyama et al. | |
| 6,677,086 B1* | 1/2004 | Sutehrland | G02F 1/13342 430/1 |
| 6,686,815 B1 | 2/2004 | Mirshekarl-Syahkal et al. | |
| 6,690,516 B2 | 2/2004 | Aritake et al. | |
| 6,692,666 B2* | 2/2004 | Sutherland | G03F 7/001 252/299.1 |
| 6,699,407 B1* | 3/2004 | Sutehrland | C09K 19/544 252/582 |
| 6,706,086 B2* | 3/2004 | Emig | B01D 39/163 15/352 |
| 6,706,451 B1* | 3/2004 | Sutherland | G02F 1/13342 430/1 |
| 6,721,096 B2 | 4/2004 | Bruzzone et al. | |
| 6,730,442 B1* | 5/2004 | Sutherland | G03H 1/0248 430/1 |
| 6,731,434 B1* | 5/2004 | Hua | G02B 27/0172 359/686 |
| 6,738,105 B1* | 5/2004 | Hannah | H04N 9/3129 348/E9.026 |
| 6,741,189 B1 | 5/2004 | Gibbons et al. | |

(56) References Cited

U.S. PATENT DOCUMENTS

| | | | |
|---|---|---|---|
| 6,744,478 B1 | 6/2004 | Asakura et al. | |
| 6,747,781 B2* | 6/2004 | Trisnadi | G02B 27/48 |
| | | | 359/279 |
| 6,748,342 B1 | 6/2004 | Dickhaus | |
| 6,750,941 B2 | 6/2004 | Satoh et al. | |
| 6,750,995 B2 | 6/2004 | Dickson | |
| 6,750,996 B2* | 6/2004 | Jagt | G02B 6/0056 |
| | | | 359/34 |
| 6,757,105 B2 | 6/2004 | Niv et al. | |
| 6,771,403 B1 | 8/2004 | Endo et al. | |
| 6,776,339 B2 | 8/2004 | Piikivi | |
| 6,781,701 B1 | 8/2004 | Sweetser et al. | |
| 6,791,629 B2* | 9/2004 | Moskovich | H04N 9/28 |
| | | | 359/650 |
| 6,791,739 B2* | 9/2004 | Ramanujan | G02B 27/48 |
| | | | 359/279 |
| 6,804,066 B1* | 10/2004 | Ha | G02B 5/1814 |
| | | | 359/683 |
| 6,805,490 B2 | 10/2004 | Levola | |
| 6,821,457 B1* | 11/2004 | Natarajan | G02F 1/13342 |
| | | | 252/582 |
| 6,822,713 B1* | 11/2004 | Yaroshchuk | G02F 1/13363 |
| | | | 349/117 |
| 6,825,987 B2 | 11/2004 | Repetto et al. | |
| 6,829,095 B2 | 12/2004 | Amitai | |
| 6,830,789 B2* | 12/2004 | Doane | C07D 317/20 |
| | | | 549/453 |
| 6,833,955 B2 | 12/2004 | Niv | |
| 6,836,369 B2 | 12/2004 | Fujikawa et al. | |
| 6,842,563 B2* | 1/2005 | Zhang | G02B 6/3508 |
| | | | 385/24 |
| 6,844,212 B2 | 1/2005 | Bond et al. | |
| 6,844,980 B2 | 1/2005 | He et al. | |
| 6,844,989 B1* | 1/2005 | Jo | G02B 13/0035 |
| | | | 359/716 |
| 6,847,274 B2 | 1/2005 | Salmela et al. | |
| 6,847,488 B2 | 1/2005 | Travis | |
| 6,850,210 B1* | 2/2005 | Lipton | G02B 30/27 |
| | | | 348/51 |
| 6,853,491 B1 | 2/2005 | Ruhle et al. | |
| 6,853,493 B2* | 2/2005 | Kreitzer | G02B 13/22 |
| | | | 353/77 |
| 6,861,107 B2* | 3/2005 | Klasen-Memmer | C09K 19/44 |
| | | | 252/299.66 |
| 6,864,861 B2 | 3/2005 | Schehrer et al. | |
| 6,864,927 B1 | 3/2005 | Cathey | |
| 6,864,931 B1* | 3/2005 | Kumar | G02F 1/133377 |
| | | | 349/201 |
| 6,867,888 B2* | 3/2005 | Sutherland | G03H 1/02 |
| | | | 430/1 |
| 6,873,443 B1* | 3/2005 | Joubert | G03H 1/2249 |
| | | | 359/2 |
| 6,876,791 B2* | 4/2005 | Murashima | G02B 6/12007 |
| | | | 385/37 |
| 6,878,494 B2* | 4/2005 | Sutehrland | G02F 1/13342 |
| | | | 430/1 |
| 6,885,483 B2 | 4/2005 | Takada | |
| 6,903,872 B2 | 6/2005 | Schrader | |
| 6,909,345 B1 | 6/2005 | Salmela et al. | |
| 6,917,375 B2 | 7/2005 | Akada et al. | |
| 6,919,003 B2* | 7/2005 | Ikeda | G02F 1/167 |
| | | | 427/435 |
| 6,922,267 B2 | 7/2005 | Endo et al. | |
| 6,926,429 B2 | 8/2005 | Barlow et al. | |
| 6,927,570 B2* | 8/2005 | Simmonds | B82Y 25/00 |
| | | | 436/526 |
| 6,927,694 B1* | 8/2005 | Smith | B60K 28/066 |
| | | | 340/576 |
| 6,940,361 B1 | 9/2005 | Jokio et al. | |
| 6,943,788 B2* | 9/2005 | Tomono | G02B 30/27 |
| | | | 348/E13.058 |
| 6,950,173 B1 | 9/2005 | Sutherland et al. | |
| 6,950,227 B2 | 9/2005 | Schrader | |
| 6,951,393 B2 | 10/2005 | Koide | |
| 6,952,312 B2 | 10/2005 | Weber et al. | |
| 6,952,435 B2* | 10/2005 | Lai | G02B 27/48 |
| | | | 372/15 |
| 6,958,662 B1 | 10/2005 | Salmela et al. | |
| 6,958,868 B1* | 10/2005 | Pender | F24S 23/10 |
| | | | 136/246 |
| 6,963,454 B1* | 11/2005 | Martins | G02B 13/16 |
| | | | 359/636 |
| 6,972,788 B1 | 12/2005 | Robertson et al. | |
| 6,975,345 B1* | 12/2005 | Lipton | H04N 13/341 |
| | | | 348/42 |
| 6,980,365 B2* | 12/2005 | Moskovich | G02B 27/4216 |
| | | | 359/558 |
| 6,985,296 B2* | 1/2006 | Lipton | G02B 30/27 |
| | | | 359/623 |
| 6,987,908 B2 | 1/2006 | Bond et al. | |
| 6,999,239 B1* | 2/2006 | Martins | G02B 27/1086 |
| | | | 359/630 |
| 7,002,618 B2* | 2/2006 | Lipton | H04N 13/398 |
| | | | 348/E13.058 |
| 7,002,753 B2* | 2/2006 | Moskovich | G02B 13/16 |
| | | | 359/651 |
| 7,003,075 B2 | 2/2006 | Miyake et al. | |
| 7,003,187 B2 | 2/2006 | Frick et al. | |
| 7,006,732 B2* | 2/2006 | Gunn, III | G02B 6/1228 |
| | | | 385/37 |
| 7,009,773 B2* | 3/2006 | Chaoulov | G02B 3/0062 |
| | | | 359/630 |
| 7,018,563 B1* | 3/2006 | Sutherland | C09K 19/544 |
| | | | 252/299.5 |
| 7,018,686 B2* | 3/2006 | Sutehrland | G03F 7/031 |
| | | | 349/196 |
| 7,018,744 B2 | 3/2006 | Otaki et al. | |
| 7,019,793 B2* | 3/2006 | Moskovich | G02B 13/16 |
| | | | 359/650 |
| 7,021,777 B2 | 4/2006 | Amitai | |
| 7,026,892 B2 | 4/2006 | Kajiya | |
| 7,027,671 B2 | 4/2006 | Huck et al. | |
| 7,034,748 B2 | 4/2006 | Kajiya | |
| 7,046,439 B2* | 5/2006 | Kaminsky | G02B 1/041 |
| | | | 359/452 |
| 7,050,674 B2* | 5/2006 | Lee | G02B 6/124 |
| | | | 264/1.24 |
| 7,053,735 B2 | 5/2006 | Salmela et al. | |
| 7,053,991 B2* | 5/2006 | Sandusky | G01J 3/02 |
| | | | 356/369 |
| 7,054,045 B2* | 5/2006 | McPheters | G03H 1/26 |
| | | | 341/23 |
| 7,058,434 B2 | 6/2006 | Wang et al. | |
| 7,068,405 B2* | 6/2006 | Sutherland | G03H 1/02 |
| | | | 349/201 |
| 7,068,898 B2* | 6/2006 | Buretea | C03C 14/006 |
| | | | 257/40 |
| 7,072,020 B1* | 7/2006 | Sutherland | G02F 1/13342 |
| | | | 349/86 |
| 7,075,273 B2* | 7/2006 | O'Gorman | H02J 1/14 |
| | | | 290/40 C |
| 7,077,984 B1* | 7/2006 | Natarajan | G03H 1/0005 |
| | | | 359/254 |
| 7,081,215 B2* | 7/2006 | Natarajan | G02B 6/29311 |
| | | | 359/569 |
| 7,088,457 B1* | 8/2006 | Zou | G01M 11/0257 |
| | | | 356/124 |
| 7,088,515 B2* | 8/2006 | Lipton | G02B 30/27 |
| | | | 359/619 |
| 7,095,562 B1 | 8/2006 | Peng et al. | |
| 7,099,080 B2* | 8/2006 | Lipton | H04N 13/305 |
| | | | 359/464 |
| 7,101,048 B2 | 9/2006 | Travis | |
| 7,108,383 B1* | 9/2006 | Mitchell | G03B 21/14 |
| | | | 359/359 |
| 7,110,184 B1 | 9/2006 | Yona et al. | |
| 7,119,965 B1* | 10/2006 | Rolland | G02B 27/0172 |
| | | | 359/630 |
| 7,123,418 B2 | 10/2006 | Weber et al. | |

(56) References Cited

U.S. PATENT DOCUMENTS

| | | | |
|---|---|---|---|
| 7,123,421 B1 * | 10/2006 | Moskovich | G02B 13/18 |
| | | | 359/689 |
| 7,126,418 B2 | 10/2006 | Hunton et al. | |
| 7,126,583 B1 | 10/2006 | Breed | |
| 7,132,200 B1 | 11/2006 | Ueda et al. | |
| 7,133,084 B2 * | 11/2006 | Moskovich | H04N 9/28 |
| | | | 359/650 |
| 7,139,109 B2 * | 11/2006 | Mukawa | G02B 5/32 |
| | | | 359/22 |
| RE39,424 E * | 12/2006 | Moskovich | G02B 13/22 |
| | | | 359/663 |
| 7,145,729 B2 * | 12/2006 | Kreitzer | G02B 13/16 |
| | | | 359/708 |
| 7,149,385 B2 | 12/2006 | Parikka et al. | |
| 7,151,246 B2 | 12/2006 | Fein et al. | |
| 7,158,095 B2 | 1/2007 | Jenson et al. | |
| 7,167,286 B2 * | 1/2007 | Anderson | G11B 7/00772 |
| 7,167,616 B2 * | 1/2007 | Ling | G02B 6/125 |
| | | | 385/37 |
| 7,175,780 B1 * | 2/2007 | Sutherland | C09K 19/544 |
| | | | 252/299.1 |
| 7,181,105 B2 | 2/2007 | Teramura et al. | |
| 7,181,108 B2 | 2/2007 | Levola | |
| 7,184,002 B2 * | 2/2007 | Lipton | H04N 13/161 |
| | | | 348/55 |
| 7,184,615 B2 | 2/2007 | Levola | |
| 7,186,567 B1 * | 3/2007 | Sutherland | G01N 33/54366 |
| | | | 252/582 |
| 7,190,849 B2 | 3/2007 | Katase | |
| 7,198,737 B2 * | 4/2007 | Natarajan | G02B 6/29395 |
| | | | 359/569 |
| 7,199,934 B2 | 4/2007 | Yamasaki | |
| 7,205,960 B2 | 4/2007 | David | |
| 7,205,964 B1 | 4/2007 | Yokoyama et al. | |
| 7,206,107 B2 | 4/2007 | Levola | |
| 7,212,175 B1 | 5/2007 | Magee et al. | |
| 7,218,817 B2 * | 5/2007 | Magnusson | G02F 1/377 |
| | | | 385/37 |
| 7,230,767 B2 | 6/2007 | Walck et al. | |
| 7,230,770 B2 * | 6/2007 | Kreitzer | G02B 13/16 |
| | | | 359/708 |
| 7,242,527 B2 | 7/2007 | Spitzer et al. | |
| 7,248,128 B2 | 7/2007 | Mattila et al. | |
| 7,248,765 B2 * | 7/2007 | Lee | G02B 6/1221 |
| | | | 385/37 |
| 7,256,915 B2 * | 8/2007 | Sutherland | G02F 1/1326 |
| | | | 430/1 |
| 7,259,906 B1 | 8/2007 | Islam | |
| 7,265,882 B2 * | 9/2007 | Sutherland | G02F 1/13342 |
| | | | 349/201 |
| 7,265,903 B2 * | 9/2007 | Sutherland | C09K 19/544 |
| | | | 359/489.08 |
| 7,268,946 B2 | 9/2007 | Wang | |
| 7,285,903 B2 | 10/2007 | Cull et al. | |
| 7,286,272 B2 | 10/2007 | Mukawa | |
| 7,289,069 B2 | 10/2007 | Ranta | |
| RE39,911 E * | 11/2007 | Moskovich | G02B 13/06 |
| | | | 359/716 |
| 7,299,983 B2 | 11/2007 | Piikivi | |
| 7,301,601 B2 * | 11/2007 | Lin | G02F 1/13342 |
| | | | 349/114 |
| 7,312,906 B2 * | 12/2007 | Sutherland | G03H 1/02 |
| | | | 349/86 |
| 7,313,291 B2 | 12/2007 | Okhotnikov et al. | |
| D559,250 S * | 1/2008 | Pombo | D16/330 |
| 7,319,573 B2 | 1/2008 | Nishiyama | |
| 7,320,534 B2 | 1/2008 | Sugikawa et al. | |
| 7,323,275 B2 | 1/2008 | Otaki et al. | |
| 7,333,685 B2 * | 2/2008 | Stone | G02B 6/272 |
| | | | 359/489.08 |
| 7,336,271 B2 | 2/2008 | Ozeki et al. | |
| 7,339,737 B2 | 3/2008 | Urey et al. | |
| 7,339,742 B2 | 3/2008 | Amitai et al. | |
| 7,349,612 B2 * | 3/2008 | Nishii | G02B 6/2938 |
| | | | 385/129 |
| 7,356,218 B2 * | 4/2008 | Kato | B82Y 20/00 |
| | | | 385/24 |
| 7,356,224 B2 * | 4/2008 | Levner | G02F 1/0955 |
| | | | 385/37 |
| 7,369,911 B1 | 5/2008 | Volant et al. | |
| 7,375,870 B2 | 5/2008 | Schorpp | |
| 7,375,886 B2 * | 5/2008 | Lipton | G02B 30/27 |
| | | | 359/462 |
| 7,376,068 B1 * | 5/2008 | Khoury | G11B 7/1353 |
| 7,376,307 B2 | 5/2008 | Singh et al. | |
| 7,391,573 B2 | 6/2008 | Amitai | |
| 7,394,865 B2 | 7/2008 | Borran et al. | |
| 7,394,961 B2 * | 7/2008 | Kornilovich | B82Y 20/00 |
| | | | 385/129 |
| 7,395,181 B2 | 7/2008 | Foxlin | |
| 7,397,606 B1 | 7/2008 | Peng et al. | |
| 7,401,920 B1 | 7/2008 | Kranz et al. | |
| 7,404,644 B2 | 7/2008 | Evans et al. | |
| 7,410,286 B2 | 8/2008 | Travis | |
| 7,411,637 B2 | 8/2008 | Weiss | |
| 7,413,678 B1 * | 8/2008 | Natarajan | G02F 1/13342 |
| | | | 252/299.01 |
| 7,413,679 B1 * | 8/2008 | Sutherland | C09K 19/544 |
| | | | 252/299.1 |
| 7,415,173 B2 | 8/2008 | Kassamakov et al. | |
| 7,416,818 B2 * | 8/2008 | Sutherland | G02F 1/13342 |
| | | | 252/299.01 |
| 7,418,170 B2 | 8/2008 | Mukawa et al. | |
| 7,420,733 B1 * | 9/2008 | Natarajan | G02B 6/2713 |
| | | | 359/569 |
| 7,433,116 B1 | 10/2008 | Islam | |
| 7,436,568 B1 | 10/2008 | Kuykendall, Jr. | |
| D581,447 S * | 11/2008 | Yee | D16/335 |
| 7,447,967 B2 | 11/2008 | Onggosanusi et al. | |
| 7,453,612 B2 * | 11/2008 | Mukawa | G02B 27/0081 |
| | | | 359/34 |
| 7,454,103 B2 | 11/2008 | Parriaux | |
| 7,457,040 B2 | 11/2008 | Amitai | |
| 7,466,994 B2 | 12/2008 | Pihlaja et al. | |
| 7,477,206 B2 * | 1/2009 | Cowan | H04N 13/363 |
| | | | 348/E13.058 |
| 7,479,354 B2 | 1/2009 | Ueda et al. | |
| 7,480,215 B2 | 1/2009 | Mäkelä et al. | |
| 7,482,996 B2 | 1/2009 | Larson et al. | |
| 7,483,604 B2 | 1/2009 | Levola | |
| 7,492,512 B2 | 2/2009 | Niv et al. | |
| 7,496,293 B2 | 2/2009 | Shamir et al. | |
| 7,499,217 B2 * | 3/2009 | Cakmakci | G02B 27/0172 |
| | | | 359/630 |
| 7,500,104 B2 | 3/2009 | Goland | |
| 7,511,891 B2 * | 3/2009 | Messerschmidt | G02B 23/2407 |
| | | | 359/652 |
| 7,513,668 B1 | 4/2009 | Peng et al. | |
| 7,522,344 B1 * | 4/2009 | Curatu | G02B 27/0093 |
| | | | 359/634 |
| 7,525,448 B1 | 4/2009 | Wilson et al. | |
| 7,528,385 B2 | 5/2009 | Volodin et al. | |
| 7,542,210 B2 * | 6/2009 | Chirieleison, Sr. | G02B 27/0172 |
| | | | 359/630 |
| 7,545,429 B2 | 6/2009 | Travis | |
| 7,550,234 B2 | 6/2009 | Otaki et al. | |
| 7,558,446 B2 * | 7/2009 | Wimberger-Friedl | G01N 21/7703 |
| | | | 385/12 |
| 7,567,372 B2 | 7/2009 | Schorpp | |
| 7,570,322 B1 * | 8/2009 | Sutherland | G03H 1/22 |
| | | | 430/1 |
| 7,570,405 B1 * | 8/2009 | Sutherland | G02F 1/13342 |
| | | | 349/201 |
| 7,570,429 B2 | 8/2009 | Maliah et al. | |
| 7,572,555 B2 | 8/2009 | Takizawa et al. | |
| 7,573,640 B2 | 8/2009 | Nivon et al. | |
| 7,576,916 B2 | 8/2009 | Amitai | |
| 7,577,326 B2 | 8/2009 | Amitai | |

(56) References Cited

U.S. PATENT DOCUMENTS

| | | | |
|---|---|---|---|
| 7,579,119 B2 | 8/2009 | Ueda et al. | |
| 7,583,423 B2 * | 9/2009 | Sutherland | G02F 1/1326 349/86 |
| 7,587,110 B2 | 9/2009 | Singh et al. | |
| 7,588,863 B2 | 9/2009 | Takizawa et al. | |
| 7,589,900 B1 | 9/2009 | Powell | |
| 7,589,901 B2 | 9/2009 | DeJong et al. | |
| 7,592,988 B2 | 9/2009 | Katase | |
| 7,593,575 B2 | 9/2009 | Houle et al. | |
| 7,597,447 B2 | 10/2009 | Larson et al. | |
| 7,599,012 B2 | 10/2009 | Nakamura et al. | |
| 7,600,893 B2 | 10/2009 | Laino et al. | |
| 7,602,552 B1 | 10/2009 | Blumenfeld | |
| 7,605,719 B1 | 10/2009 | Wenger et al. | |
| 7,605,774 B1 | 10/2009 | Brandt et al. | |
| 7,605,882 B1 * | 10/2009 | Sutherland | G03H 1/22 349/86 |
| 7,616,270 B2 | 11/2009 | Hirabayashi et al. | |
| 7,617,022 B1 | 11/2009 | Wood et al. | |
| 7,618,750 B2 | 11/2009 | Ueda et al. | |
| 7,619,739 B1 * | 11/2009 | Sutherland | G01N 21/774 436/535 |
| 7,619,825 B1 | 11/2009 | Peng et al. | |
| 7,629,086 B2 | 12/2009 | Otaki et al. | |
| 7,639,208 B1 * | 12/2009 | Ha | G02B 27/0172 345/9 |
| 7,639,911 B2 | 12/2009 | Lee et al. | |
| 7,643,214 B2 | 1/2010 | Amitai | |
| 7,643,225 B1 * | 1/2010 | Tsai | G02B 13/004 359/772 |
| 7,656,585 B1 * | 2/2010 | Powell | G02B 5/1861 349/11 |
| 7,660,047 B1 | 2/2010 | Travis et al. | |
| 7,672,055 B2 | 3/2010 | Amitai | |
| 7,672,549 B2 * | 3/2010 | Ghosh | F24S 23/12 126/684 |
| 7,675,684 B1 * | 3/2010 | Weissman | G02B 27/0172 359/633 |
| 7,691,248 B2 * | 4/2010 | Ikeda | G02F 1/167 204/625 |
| 7,710,622 B2 * | 5/2010 | Takabayashi | G03H 1/24 359/24 |
| 7,710,654 B2 | 5/2010 | Ashkenazi et al. | |
| 7,711,228 B2 * | 5/2010 | Noda | G02B 6/1225 385/129 |
| 7,724,441 B2 | 5/2010 | Amitai | |
| 7,724,442 B2 | 5/2010 | Amitai | |
| 7,724,443 B2 | 5/2010 | Amitai | |
| 7,733,571 B1 | 6/2010 | Li | |
| 7,733,572 B1 | 6/2010 | Brown et al. | |
| 7,740,387 B2 * | 6/2010 | Schultz | G02B 6/0055 362/330 |
| 7,747,113 B2 | 6/2010 | Mukawa et al. | |
| 7,751,122 B2 | 7/2010 | Amitai | |
| 7,751,662 B2 * | 7/2010 | Kleemann | G02B 27/0172 385/37 |
| 7,764,413 B2 | 7/2010 | Levola | |
| 7,777,819 B2 | 8/2010 | Simmonds | |
| 7,778,305 B2 | 8/2010 | Parriaux et al. | |
| 7,778,508 B2 | 8/2010 | Hirayama | |
| 7,843,642 B2 * | 11/2010 | Shaoulov | G03B 21/006 359/834 |
| 7,847,235 B2 | 12/2010 | Krupkin et al. | |
| 7,864,427 B2 | 1/2011 | Korenaga et al. | |
| 7,865,080 B2 | 1/2011 | Hecker et al. | |
| 7,866,869 B2 * | 1/2011 | Karakawa | G02B 27/48 362/613 |
| 7,872,707 B1 * | 1/2011 | Sutherland | G02F 1/13342 349/86 |
| 7,872,804 B2 | 1/2011 | Moon et al. | |
| 7,884,593 B2 * | 2/2011 | Simmonds | H03F 3/45475 323/312 |
| 7,884,985 B2 | 2/2011 | Amitai et al. | |
| 7,887,186 B2 | 2/2011 | Watanabe | |
| 7,903,921 B2 | 3/2011 | Östergard | |
| 7,907,342 B2 | 3/2011 | Simmonds et al. | |
| 7,920,787 B2 | 4/2011 | Gentner et al. | |
| 7,928,862 B1 | 4/2011 | Matthews | |
| 7,936,513 B2 * | 5/2011 | Wu | G02B 6/13 359/569 |
| 7,936,519 B2 * | 5/2011 | Mukawa | G02B 27/0176 359/633 |
| 7,944,428 B2 | 5/2011 | Travis | |
| 7,944,616 B2 * | 5/2011 | Mukawa | G02B 27/0172 359/633 |
| 7,949,214 B2 * | 5/2011 | DeJong | G02B 27/0081 385/37 |
| D640,310 S * | 6/2011 | Suzuki | D16/325 |
| 7,961,117 B1 | 6/2011 | Zimmerman et al. | |
| 7,969,644 B2 | 6/2011 | Tilleman et al. | |
| 7,969,657 B2 * | 6/2011 | Cakmakci | G02B 27/102 359/631 |
| 7,970,246 B2 | 6/2011 | Travis et al. | |
| 7,976,208 B2 | 7/2011 | Travis | |
| 7,984,884 B1 * | 7/2011 | Iliev | A47G 33/12 248/527 |
| 7,999,982 B2 | 8/2011 | Endo et al. | |
| 8,000,020 B2 * | 8/2011 | Amitai | G02B 27/0172 359/638 |
| 8,000,491 B2 | 8/2011 | Brodkin et al. | |
| 8,004,765 B2 | 8/2011 | Amitai | |
| 8,014,050 B2 * | 9/2011 | McGrew | G02B 5/1828 359/279 |
| 8,016,475 B2 | 9/2011 | Travis | |
| 8,018,579 B1 * | 9/2011 | Krah | G06F 3/017 356/5.01 |
| 8,022,942 B2 | 9/2011 | Bathiche et al. | |
| 8,023,783 B2 * | 9/2011 | Mukawa | G02B 27/0081 359/566 |
| RE42,992 E | 12/2011 | David | |
| 8,073,296 B2 * | 12/2011 | Mukawa | G02B 6/0033 359/33 |
| 8,077,274 B2 * | 12/2011 | Sutherland | G03H 1/22 349/86 |
| 8,079,713 B2 | 12/2011 | Ashkenazi | |
| 8,082,222 B2 | 12/2011 | Rangarajan et al. | |
| 8,086,030 B2 | 12/2011 | Gordon et al. | |
| 8,089,568 B1 | 1/2012 | Brown et al. | |
| 8,093,451 B2 * | 1/2012 | Spangenberg | C12N 9/0093 800/278 |
| 8,098,439 B2 * | 1/2012 | Amitai | G02B 27/0081 362/624 |
| 8,107,023 B2 | 1/2012 | Simmonds et al. | |
| 8,107,780 B2 | 1/2012 | Simmonds | |
| 8,120,548 B1 | 2/2012 | Barber | |
| 8,120,848 B2 * | 2/2012 | Isano | G02B 5/1809 359/485.05 |
| 8,132,948 B2 | 3/2012 | Owen et al. | |
| 8,132,976 B2 | 3/2012 | Odell et al. | |
| 8,134,434 B2 * | 3/2012 | Diederichs | H01F 6/008 335/216 |
| 8,136,690 B2 | 3/2012 | Fang et al. | |
| 8,137,981 B2 | 3/2012 | Andrew et al. | |
| 8,142,016 B2 * | 3/2012 | Legerton | G02C 7/04 264/1.32 |
| 8,149,086 B2 | 4/2012 | Klein et al. | |
| 8,152,315 B2 | 4/2012 | Travis et al. | |
| 8,152,353 B2 * | 4/2012 | Yang | G02B 6/0036 362/625 |
| 8,155,489 B2 | 4/2012 | Saarikko et al. | |
| 8,159,752 B2 | 4/2012 | Wertheim et al. | |
| 8,160,409 B2 | 4/2012 | Large | |
| 8,160,411 B2 | 4/2012 | Levola et al. | |
| D659,137 S * | 5/2012 | Matsumoto | D16/330 |
| 8,167,173 B1 * | 5/2012 | Simmonds | B67D 1/1438 222/144.5 |
| 8,186,874 B2 | 5/2012 | Sinbar et al. | |
| 8,188,925 B2 | 5/2012 | DeJean | |
| 8,189,263 B1 | 5/2012 | Wang et al. | |
| 8,189,973 B2 | 5/2012 | Travis et al. | |

(56) References Cited

U.S. PATENT DOCUMENTS

| | | | |
|---|---|---|---|
| D661,334 S * | 6/2012 | Cho | D16/326 |
| D661,335 S * | 6/2012 | Jeon | D16/315 |
| 8,194,325 B2 * | 6/2012 | Levola | G02B 27/0101 359/569 |
| 8,199,803 B2 | 6/2012 | Hauske et al. | |
| 8,213,065 B2 | 7/2012 | Mukawa | |
| 8,213,755 B2 * | 7/2012 | Mukawa | G02B 17/004 359/33 |
| 8,220,966 B2 * | 7/2012 | Mukawa | G02B 27/149 362/268 |
| 8,224,133 B2 | 7/2012 | Popovich et al. | |
| 8,233,204 B1 | 7/2012 | Robbins et al. | |
| 8,253,914 B2 | 8/2012 | Kajiya et al. | |
| 8,254,031 B2 | 8/2012 | Levola | |
| 8,264,498 B1 | 9/2012 | VanderKamp et al. | |
| 8,294,749 B2 * | 10/2012 | Cable | G03H 1/2294 348/40 |
| 8,295,710 B2 | 10/2012 | Marcus | |
| 8,301,031 B2 | 10/2012 | Gentner et al. | |
| 8,305,577 B2 | 11/2012 | Kivioja et al. | |
| 8,306,423 B2 | 11/2012 | Gottwald et al. | |
| 8,310,327 B2 * | 11/2012 | Willers | H01F 27/06 336/200 |
| 8,314,819 B2 | 11/2012 | Kimmel et al. | |
| 8,314,993 B2 * | 11/2012 | Levola | G02B 27/0081 359/569 |
| 8,320,032 B2 * | 11/2012 | Levola | G02B 27/0081 359/13 |
| 8,321,810 B2 | 11/2012 | Heintze | |
| 8,325,166 B2 * | 12/2012 | Akutsu | G02B 27/0081 345/204 |
| 8,329,773 B2 * | 12/2012 | Facke | G03F 7/027 522/90 |
| 8,335,040 B2 | 12/2012 | Mukawa et al. | |
| 8,335,414 B2 * | 12/2012 | Zinoviev | G01N 21/8422 385/37 |
| D673,996 S * | 1/2013 | Kim | D16/315 |
| 8,351,744 B2 | 1/2013 | Travis et al. | |
| 8,354,640 B2 * | 1/2013 | Hamre | H01L 27/14625 385/10 |
| 8,354,806 B2 | 1/2013 | Travis et al. | |
| 8,355,610 B2 | 1/2013 | Simmonds | |
| 8,369,019 B2 | 2/2013 | Baker et al. | |
| 8,376,548 B2 * | 2/2013 | Schultz | G02B 27/0101 359/479 |
| 8,382,293 B2 * | 2/2013 | Phillips, III | G03B 21/2033 353/102 |
| 8,384,504 B2 * | 2/2013 | Diederichs | H10N 60/355 335/216 |
| 8,384,694 B2 | 2/2013 | Powell et al. | |
| 8,384,730 B1 | 2/2013 | VanDerKamp et al. | |
| 8,396,339 B2 * | 3/2013 | Mukawa | G02B 27/017 385/37 |
| 8,396,341 B2 * | 3/2013 | Lee | G02B 6/12007 385/37 |
| 8,398,242 B2 | 3/2013 | Yamamoto et al. | |
| 8,403,490 B2 | 3/2013 | Sugiyama et al. | |
| 8,422,840 B2 | 4/2013 | Large | |
| 8,427,439 B2 | 4/2013 | Larsen et al. | |
| 8,432,363 B2 | 4/2013 | Saarikko et al. | |
| 8,432,372 B2 | 4/2013 | Butler et al. | |
| 8,432,614 B2 * | 4/2013 | Amitai | G02B 6/0056 359/633 |
| 8,441,731 B2 * | 5/2013 | Sprague | G02B 27/0172 359/630 |
| 8,447,365 B1 | 5/2013 | Imanuel | |
| 8,466,953 B2 * | 6/2013 | Levola | G02B 27/0081 348/51 |
| 8,472,119 B1 | 6/2013 | Kelly | |
| 8,472,120 B2 | 6/2013 | Border et al. | |
| 8,477,261 B2 | 7/2013 | Travis et al. | |
| 8,481,130 B2 * | 7/2013 | Harding | G02F 1/133711 349/123 |
| 8,482,858 B2 * | 7/2013 | Sprague | G02B 27/0172 359/630 |
| 8,488,246 B2 * | 7/2013 | Border | G06Q 30/02 359/13 |
| 8,491,121 B2 | 7/2013 | Tilleman et al. | |
| 8,491,136 B2 | 7/2013 | Travis et al. | |
| 8,493,366 B2 | 7/2013 | Bathiche et al. | |
| 8,493,562 B2 * | 7/2013 | Kopp | G02B 6/12002 356/364 |
| 8,493,662 B2 | 7/2013 | Noui | |
| 8,494,229 B2 * | 7/2013 | Jarvenpaa | A61B 3/113 382/117 |
| 8,508,848 B2 | 8/2013 | Saarikko | |
| 8,520,309 B2 * | 8/2013 | Sprague | G02C 7/12 359/630 |
| D691,192 S * | 10/2013 | Stanley | D16/315 |
| 8,547,638 B2 | 10/2013 | Levola | |
| 8,548,290 B2 * | 10/2013 | Travers | G02B 27/01 359/569 |
| 8,565,560 B2 | 10/2013 | Popovich et al. | |
| D694,310 S * | 11/2013 | Cho | D16/309 |
| D694,311 S * | 11/2013 | Cho | D16/309 |
| 8,578,038 B2 | 11/2013 | Kaikuranta et al. | |
| 8,581,831 B2 | 11/2013 | Travis | |
| 8,582,206 B2 | 11/2013 | Travis | |
| 8,593,734 B2 | 11/2013 | Laakkonen | |
| 8,611,014 B2 | 12/2013 | Valera et al. | |
| 8,619,062 B2 | 12/2013 | Powell et al. | |
| D697,130 S * | 1/2014 | Lovgren | D16/312 |
| 8,633,786 B2 | 1/2014 | Ermolov et al. | |
| 8,634,120 B2 | 1/2014 | Popovich et al. | |
| 8,634,139 B1 | 1/2014 | Brown et al. | |
| 8,639,072 B2 | 1/2014 | Popovich et al. | |
| 8,643,691 B2 | 2/2014 | Rosenfeld et al. | |
| 8,643,948 B2 * | 2/2014 | Amitai | G02B 27/0025 359/489.09 |
| 8,649,099 B2 | 2/2014 | Schultz et al. | |
| 8,654,420 B2 | 2/2014 | Simmonds | |
| 8,659,826 B1 | 2/2014 | Brown et al. | |
| D701,206 S * | 3/2014 | Luckey | D14/372 |
| 8,670,029 B2 | 3/2014 | McEldowney | |
| 8,693,087 B2 | 4/2014 | Nowatzyk et al. | |
| 8,698,705 B2 * | 4/2014 | Burke | G02B 27/0101 345/7 |
| 8,731,350 B1 * | 5/2014 | Lin | G02B 6/136 385/129 |
| 8,736,802 B2 | 5/2014 | Kajiya et al. | |
| 8,736,963 B2 | 5/2014 | Robbins et al. | |
| 8,742,952 B1 | 6/2014 | Bold | |
| 8,746,008 B1 * | 6/2014 | Mauritsen | G01C 1/10 62/51.1 |
| 8,749,886 B2 | 6/2014 | Gupta | |
| 8,749,890 B1 | 6/2014 | Wood et al. | |
| 8,767,294 B2 | 7/2014 | Chen et al. | |
| 8,786,923 B2 * | 7/2014 | Chuang | G03H 1/20 359/22 |
| 8,810,600 B2 | 8/2014 | Bohn et al. | |
| 8,810,913 B2 * | 8/2014 | Simmonds | G02B 27/0172 359/631 |
| 8,810,914 B2 * | 8/2014 | Amitai | G02B 27/106 385/36 |
| 8,814,691 B2 | 8/2014 | Haddick et al. | |
| 8,816,578 B1 | 8/2014 | Peng et al. | |
| 8,817,350 B1 | 8/2014 | Robbins et al. | |
| 8,824,836 B2 * | 9/2014 | Sugiyama | G02F 1/3137 385/32 |
| 8,830,143 B1 | 9/2014 | Pitchford et al. | |
| 8,830,584 B2 | 9/2014 | Saarikko et al. | |
| 8,830,588 B1 | 9/2014 | Brown et al. | |
| 8,842,368 B2 * | 9/2014 | Simmonds | G02B 27/0172 359/631 |
| 8,859,412 B2 * | 10/2014 | Jain | H01L 33/18 438/603 |
| 8,872,435 B2 * | 10/2014 | Kreitzer | F21V 23/04 315/291 |
| 8,873,149 B2 * | 10/2014 | Bohn | G02B 27/0172 359/633 |

(56) References Cited

U.S. PATENT DOCUMENTS

| | | | |
|---|---|---|---|
| 8,873,150 B2 * | 10/2014 | Amitai | G02B 6/003 359/638 |
| D718,304 S * | 11/2014 | Heinrich | D14/372 |
| D718,366 S * | 11/2014 | Mehin | D16/300 |
| 8,885,112 B2 | 11/2014 | Popovich et al. | |
| 8,885,997 B2 * | 11/2014 | Nguyen | G02B 27/0172 385/37 |
| 8,903,207 B1 | 12/2014 | Brown et al. | |
| 8,906,088 B2 * | 12/2014 | Pugh | B29D 11/00817 623/6.22 |
| 8,913,324 B2 | 12/2014 | Schrader | |
| 8,913,865 B1 * | 12/2014 | Bennett | G02B 6/0035 385/129 |
| 8,917,453 B2 * | 12/2014 | Bohn | G02B 27/0172 359/630 |
| 8,929,589 B2 * | 1/2015 | Publicover | H04N 23/90 382/103 |
| 8,933,144 B2 * | 1/2015 | Enomoto | C09D 11/101 522/67 |
| 8,934,743 B2 * | 1/2015 | Nishiwaki | G02B 5/0252 428/46 |
| 8,937,771 B2 * | 1/2015 | Robbins | G02B 27/0172 359/630 |
| 8,937,772 B1 | 1/2015 | Burns et al. | |
| 8,938,141 B2 | 1/2015 | Magnusson | |
| 8,950,867 B2 * | 2/2015 | Macnamara | G02B 27/0101 348/42 |
| 8,964,298 B2 | 2/2015 | Haddick et al. | |
| 8,965,152 B2 * | 2/2015 | Simmonds | G02B 27/145 385/27 |
| D725,102 S * | 3/2015 | Lee | D14/372 |
| 8,985,803 B2 * | 3/2015 | Bohn | G02F 1/292 362/104 |
| 8,989,535 B2 * | 3/2015 | Robbins | G02B 27/283 385/11 |
| D726,180 S * | 4/2015 | Roat | D14/372 |
| 9,019,595 B2 * | 4/2015 | Jain | H01S 3/0092 359/344 |
| 9,025,253 B2 * | 5/2015 | Hadad | G02B 5/04 362/626 |
| 9,035,344 B2 * | 5/2015 | Jain | C09K 11/88 438/27 |
| D733,709 S * | 7/2015 | Kawai | D14/372 |
| 9,075,184 B2 * | 7/2015 | Popovich | H04N 9/315 |
| 9,081,178 B2 * | 7/2015 | Simmonds | G02B 6/0028 |
| 9,097,890 B2 | 8/2015 | Miller et al. | |
| 9,103,978 B2 * | 8/2015 | Nishiwaki | H01L 31/0543 |
| 9,122,015 B2 * | 9/2015 | Shimizu | G02B 6/12002 |
| 9,128,226 B2 * | 9/2015 | Fattal | G02B 6/005 |
| 9,129,295 B2 * | 9/2015 | Border | G02B 5/23 |
| 9,146,324 B2 | 9/2015 | Lee et al. | |
| 9,164,290 B2 * | 10/2015 | Robbins | G02B 27/0172 |
| 9,176,324 B1 * | 11/2015 | Scherer | G06T 19/006 |
| 9,188,717 B2 * | 11/2015 | Nishiwaki | F21V 5/02 |
| 9,201,270 B2 * | 12/2015 | Fattal | G02B 6/0011 |
| 9,215,293 B2 * | 12/2015 | Miller | G06F 3/016 |
| D746,896 S * | 1/2016 | Markovitz | D16/315 |
| 9,239,507 B2 * | 1/2016 | Chen | G02B 6/124 |
| 9,244,275 B1 | 1/2016 | Li | |
| 9,244,280 B1 | 1/2016 | Tiana et al. | |
| 9,244,281 B1 | 1/2016 | Zimmerman et al. | |
| D749,074 S * | 2/2016 | Cazalet | D14/372 |
| 9,253,359 B2 * | 2/2016 | Takahashi | H04N 1/02835 |
| 9,269,854 B2 * | 2/2016 | Jain | H01L 33/06 |
| D751,551 S * | 3/2016 | Ho | D14/372 |
| D752,129 S * | 3/2016 | Lee | D16/325 |
| 9,274,338 B2 * | 3/2016 | Robbins | G02B 27/0172 |
| 9,274,339 B1 | 3/2016 | Brown et al. | |
| 9,274,349 B2 * | 3/2016 | Popovich | G02B 5/32 |
| D754,782 S * | 4/2016 | Kokinakis | D16/309 |
| 9,310,566 B2 * | 4/2016 | Valera | G02B 6/34 |
| 9,316,786 B2 * | 4/2016 | Nishiwaki | H01L 31/0543 |
| 9,320,534 B2 | 4/2016 | Vezzu | |
| 9,329,325 B2 * | 5/2016 | Simmonds | G02B 6/0061 |
| 9,335,548 B1 * | 5/2016 | Cakmakci | G02B 27/0172 |
| 9,335,604 B2 | 5/2016 | Popovich et al. | |
| 9,341,846 B2 | 5/2016 | Popovich et al. | |
| 9,354,366 B2 * | 5/2016 | Jain | G02B 5/20 |
| 9,366,862 B2 * | 6/2016 | Haddick | G06F 3/011 |
| 9,366,864 B1 | 6/2016 | Brown et al. | |
| 9,372,347 B1 * | 6/2016 | Levola | G02B 5/1842 |
| 9,377,623 B2 * | 6/2016 | Robbins | G02B 27/0172 |
| 9,377,852 B1 | 6/2016 | Shapiro et al. | |
| 9,389,415 B2 * | 7/2016 | Fattal | G02B 26/0808 |
| 9,400,395 B2 * | 7/2016 | Travers | G02B 27/0081 |
| 9,423,360 B1 * | 8/2016 | Kostamo | G01M 11/0264 |
| 9,429,692 B1 * | 8/2016 | Saarikko | G02B 5/1857 |
| 9,431,794 B2 * | 8/2016 | Jain | H01S 5/347 |
| 9,435,961 B2 * | 9/2016 | Jiang | G02B 6/124 |
| 9,456,744 B2 | 10/2016 | Popovich et al. | |
| 9,459,451 B2 * | 10/2016 | Saarikko | G02B 27/0093 |
| 9,464,779 B2 | 10/2016 | Popovich et al. | |
| 9,465,213 B2 * | 10/2016 | Simmonds | G02B 27/0172 |
| 9,465,227 B2 | 10/2016 | Popovich et al. | |
| 9,484,482 B2 * | 11/2016 | Hsu | H01L 31/18 |
| 9,494,799 B2 * | 11/2016 | Robbins | G02B 27/0093 |
| 9,507,150 B1 | 11/2016 | Stratton et al. | |
| 9,513,480 B2 * | 12/2016 | Saarikko | G02B 6/0033 |
| 9,516,193 B2 * | 12/2016 | Aramaki | H04N 1/02895 |
| 9,519,089 B1 | 12/2016 | Brown et al. | |
| 9,519,115 B2 * | 12/2016 | Yashiki | G02B 6/4207 |
| 9,523,852 B1 | 12/2016 | Brown et al. | |
| 9,535,253 B2 * | 1/2017 | Levola | G02B 27/0081 |
| 9,541,383 B2 * | 1/2017 | Abovitz | G06F 3/005 |
| 9,541,763 B1 | 1/2017 | Heberlein et al. | |
| 9,547,174 B2 * | 1/2017 | Gao | G02B 13/06 |
| 9,551,468 B2 * | 1/2017 | Jones | F21K 9/64 |
| 9,551,874 B2 * | 1/2017 | Amitai | G02B 27/145 |
| 9,551,880 B2 * | 1/2017 | Amitai | G02B 5/3083 |
| 9,599,813 B1 | 3/2017 | Stratton et al. | |
| 9,612,403 B2 * | 4/2017 | Abovitz | G02B 6/34 |
| 9,632,226 B2 | 4/2017 | Waldern et al. | |
| 9,635,352 B1 | 4/2017 | Henry et al. | |
| 9,648,313 B1 | 5/2017 | Henry et al. | |
| 9,651,368 B2 * | 5/2017 | Abovitz | G06F 3/011 |
| 9,664,824 B2 * | 5/2017 | Simmonds | G02B 27/4211 |
| 9,664,910 B2 * | 5/2017 | Mansharof | G02B 27/0101 |
| 9,671,612 B2 * | 6/2017 | Kress | G02B 3/14 |
| 9,674,413 B1 | 6/2017 | Tiana et al. | |
| 9,678,345 B1 | 6/2017 | Melzer et al. | |
| 9,679,367 B1 | 6/2017 | Wald et al. | |
| 9,715,067 B1 | 7/2017 | Brown et al. | |
| 9,715,110 B1 | 7/2017 | Brown et al. | |
| D793,468 S * | 8/2017 | Yu | D16/309 |
| D795,865 S * | 8/2017 | Porter | D14/372 |
| D795,866 S * | 8/2017 | Porter | D14/372 |
| 9,726,540 B2 * | 8/2017 | Popovich | G02B 5/32 |
| 9,727,772 B2 * | 8/2017 | Popovich | G02B 5/1828 |
| 9,733,475 B1 | 8/2017 | Brown et al. | |
| 9,739,950 B2 * | 8/2017 | Sqalli | B29D 11/00692 |
| 9,746,688 B2 | 8/2017 | Popovich et al. | |
| 9,754,507 B1 | 9/2017 | Wenger et al. | |
| 9,762,895 B1 | 9/2017 | Henry et al. | |
| 9,766,465 B1 | 9/2017 | Tiana et al. | |
| 9,785,231 B1 | 10/2017 | Zimmerman et al. | |
| 9,791,694 B1 | 10/2017 | Haverkamp et al. | |
| 9,791,696 B2 * | 10/2017 | Woltman | G02B 27/0081 |
| 9,804,316 B2 * | 10/2017 | Drolet | G02B 6/0035 |
| 9,804,389 B2 | 10/2017 | Popovich et al. | |
| 9,823,423 B2 | 11/2017 | Waldern et al. | |
| 9,857,605 B2 * | 1/2018 | Popovich | G03B 21/2033 |
| 9,874,931 B1 | 1/2018 | Koenck et al. | |
| 9,899,800 B2 * | 2/2018 | Ferrotti | H01S 5/1206 |
| 9,915,825 B2 * | 3/2018 | Robbins | G02B 6/0035 |
| 9,933,684 B2 | 4/2018 | Brown et al. | |
| 9,939,577 B2 * | 4/2018 | Inoue | G02B 6/29334 |
| 9,939,628 B2 * | 4/2018 | Basset | G02B 23/2423 |
| 9,977,247 B1 | 5/2018 | Brown et al. | |
| D827,641 S * | 9/2018 | Morisawa | D14/372 |
| 10,088,686 B2 * | 10/2018 | Robbins | G02B 26/0833 |
| 10,089,516 B2 * | 10/2018 | Popovich | G02B 6/0026 |
| 10,107,966 B1 * | 10/2018 | Horibe | G02B 6/122 |

(56) References Cited

U.S. PATENT DOCUMENTS

| | | | |
|---|---|---|---|
| 10,114,220 B2* | 10/2018 | Grey | G02B 27/0081 |
| 10,156,681 B2* | 12/2018 | Waldern | G02B 5/1823 |
| 10,162,181 B2* | 12/2018 | Webster | G02B 5/1842 |
| 10,185,154 B2* | 1/2019 | Popovich | G03B 21/208 |
| D840,454 S * | 2/2019 | Han | D16/130 |
| 10,197,804 B2* | 2/2019 | Stenberg | G02B 6/0076 |
| 10,209,517 B2* | 2/2019 | Popovich | G02B 27/017 |
| 10,216,061 B2* | 2/2019 | Popovich | H01L 27/14625 |
| 10,234,696 B2* | 3/2019 | Popovich | G02F 1/133606 |
| 10,241,330 B2* | 3/2019 | Popovich | G02B 6/0035 |
| 10,241,332 B2* | 3/2019 | Vallius | G02B 6/34 |
| 10,281,725 B2* | 5/2019 | Yokoyama | G02B 6/124 |
| 10,330,777 B2* | 6/2019 | Popovich | G02B 27/0093 |
| 10,345,519 B1* | 7/2019 | Miller | H04Q 11/0005 |
| 10,359,736 B2* | 7/2019 | Popovich | G03H 1/0244 |
| D855,687 S * | 8/2019 | Villalpando | D16/314 |
| D859,510 S * | 9/2019 | Harmon | D16/326 |
| 10,409,144 B2* | 9/2019 | Popovich | G03F 7/70316 |
| 10,423,222 B2* | 9/2019 | Popovich | G02F 1/2955 |
| 10,423,813 B2* | 9/2019 | Popovich | G06V 40/1324 |
| 10,437,051 B2* | 10/2019 | Popovich | G02B 27/017 |
| 10,437,064 B2* | 10/2019 | Popovich | G02B 6/0016 |
| 10,444,510 B1* | 10/2019 | Lee | G02B 27/0172 |
| 10,459,311 B2* | 10/2019 | Popovich | G02F 1/13342 |
| D871,494 S * | 12/2019 | Yamada | D16/326 |
| D872,170 S * | 1/2020 | Evans | D16/325 |
| D872,794 S * | 1/2020 | Wilkins | D16/326 |
| 10,527,797 B2* | 1/2020 | Waldern | G02B 5/1819 |
| 10,532,594 B2* | 1/2020 | Akahane | B41J 2/1752 |
| 10,545,346 B2* | 1/2020 | Waldern | G02B 27/0093 |
| D880,575 S * | 4/2020 | Thixton | D16/315 |
| 10,642,058 B2* | 5/2020 | Popovich | G02B 27/4227 |
| 10,670,876 B2* | 6/2020 | Popovich | G02B 6/0038 |
| 10,678,053 B2* | 6/2020 | Waldern | G02B 27/48 |
| 10,690,915 B2* | 6/2020 | Popovich | G02B 27/0172 |
| 10,690,916 B2* | 6/2020 | Popovich | G02B 6/0035 |
| 10,705,281 B2* | 7/2020 | Fattal | G02B 5/0252 |
| 10,725,312 B2* | 7/2020 | Popovich | G02F 1/0136 |
| 10,732,569 B2* | 8/2020 | Waldern | G03H 1/0248 |
| 10,859,768 B2* | 12/2020 | Popovich | G02B 6/34 |
| 10,890,707 B2* | 1/2021 | Waldern | G02B 26/0808 |
| 10,942,430 B2* | 3/2021 | Waldern | G02B 27/0172 |
| 11,106,048 B2* | 8/2021 | Popovich | G02B 6/0016 |
| 11,175,512 B2* | 11/2021 | Waldern | G02B 26/105 |
| 11,194,098 B2* | 12/2021 | Waldern | G02B 27/4261 |
| 11,194,162 B2* | 12/2021 | Waldern | G02B 27/0093 |
| 11,204,540 B2* | 12/2021 | Popovich | G02F 1/292 |
| 11,231,544 B2* | 1/2022 | Lin | G02B 6/00 |
| 11,281,013 B2* | 3/2022 | Popovich | G02B 6/0016 |
| 2001/0024177 A1 | 9/2001 | Popovich | |
| 2001/0033400 A1* | 10/2001 | Sutherland | G02F 1/1326 430/1 |
| 2001/0036012 A1 | 11/2001 | Nakai et al. | |
| 2001/0043163 A1* | 11/2001 | Waldern | G06F 3/013 345/7 |
| 2001/0046142 A1* | 11/2001 | Van Santen | G02B 6/0038 362/559 |
| 2001/0050756 A1* | 12/2001 | Lipton | H04N 13/275 353/15 |
| 2002/0003509 A1* | 1/2002 | Lipton | G02F 1/1395 345/7 |
| 2002/0009299 A1* | 1/2002 | Lipton | H04N 13/10 348/E13.058 |
| 2002/0011969 A1* | 1/2002 | Lipton | H04N 13/305 348/E13.043 |
| 2002/0012064 A1* | 1/2002 | Yamaguchi | H04N 23/75 348/E5.04 |
| 2002/0018040 A1* | 2/2002 | Aye | G02F 1/1335 345/102 |
| 2002/0021407 A1* | 2/2002 | Elliott | G02C 11/00 351/158 |
| 2002/0021461 A1 | 2/2002 | Ono et al. | |
| 2002/0036825 A1* | 3/2002 | Lipton | H04N 13/305 359/462 |
| 2002/0047837 A1* | 4/2002 | Suyama | H04N 13/398 348/E13.032 |
| 2002/0075240 A1* | 6/2002 | Lieberman | G06F 3/011 345/170 |
| 2002/0093701 A1* | 7/2002 | Zhang | G02C 7/043 359/15 |
| 2002/0110077 A1* | 8/2002 | Drobot | G11B 7/124 |
| 2002/0126332 A1* | 9/2002 | Popovich | G02F 1/13342 359/15 |
| 2002/0127497 A1 | 9/2002 | Brown et al. | |
| 2002/0131175 A1 | 9/2002 | Yagi et al. | |
| 2002/0150032 A1* | 10/2002 | Nishiuchi | B29C 66/8322 369/53.22 |
| 2002/0150337 A1* | 10/2002 | Fujimaki | G02B 6/124 385/10 |
| 2002/0167462 A1* | 11/2002 | Lewis | G02B 27/0093 345/7 |
| 2002/0196332 A1* | 12/2002 | Lipton | H04N 13/398 348/E13.058 |
| 2003/0007070 A1* | 1/2003 | Lipton | H04N 13/161 348/43 |
| 2003/0025881 A1* | 2/2003 | Hwang | G02F 1/133621 353/31 |
| 2003/0030912 A1 | 2/2003 | Gleckman et al. | |
| 2003/0038912 A1* | 2/2003 | Broer | G02F 1/133377 349/122 |
| 2003/0039442 A1 | 2/2003 | Bond et al. | |
| 2003/0063042 A1 | 4/2003 | Friesem et al. | |
| 2003/0063884 A1* | 4/2003 | Smith | H01S 3/063 385/129 |
| 2003/0067685 A1* | 4/2003 | Niv | G02B 27/0081 359/566 |
| 2003/0076590 A1* | 4/2003 | Kramer | G03F 7/40 359/561 |
| 2003/0086670 A1* | 5/2003 | Moridaira | G02B 6/03666 385/124 |
| 2003/0107809 A1* | 6/2003 | Chen | G02B 27/288 353/20 |
| 2003/0149346 A1 | 8/2003 | Arnone et al. | |
| 2003/0175004 A1* | 9/2003 | Garito | G02B 1/046 385/143 |
| 2003/0197154 A1* | 10/2003 | Manabe | C09K 19/12 252/299.66 |
| 2003/0197157 A1* | 10/2003 | Sutherland | G03F 7/031 252/582 |
| 2003/0202247 A1* | 10/2003 | Niv | G02B 5/1847 359/569 |
| 2003/0206329 A1* | 11/2003 | Ikeda | G02F 1/1679 359/290 |
| 2003/0228019 A1 | 12/2003 | Eichler et al. | |
| 2004/0004767 A1* | 1/2004 | Song | G02B 27/0081 359/566 |
| 2004/0012833 A1* | 1/2004 | Newswanger | G03H 1/0476 359/35 |
| 2004/0047938 A1 | 3/2004 | Kosuga et al. | |
| 2004/0057138 A1* | 3/2004 | Tanijiri | G02B 27/0172 359/868 |
| 2004/0075830 A1 | 4/2004 | Miyake et al. | |
| 2004/0089842 A1 | 5/2004 | Sutehrland et al. | |
| 2004/0108971 A1* | 6/2004 | Waldern | G02B 27/017 345/8 |
| 2004/0109234 A1* | 6/2004 | Levola | G02B 26/0808 359/566 |
| 2004/0112862 A1* | 6/2004 | Willson | B82Y 10/00 216/66 |
| 2004/0125454 A1* | 7/2004 | Kawasaki | G02B 5/1866 359/569 |
| 2004/0130797 A1 | 7/2004 | Travis | |
| 2004/0141217 A1* | 7/2004 | Endo | G02B 27/0172 359/13 |
| 2004/0156008 A1* | 8/2004 | Reznikov | C09K 19/0225 349/163 |
| 2004/0174348 A1 | 9/2004 | David | |
| 2004/0175627 A1* | 9/2004 | Sutherland | G02F 1/13342 430/1 |

(56) References Cited

U.S. PATENT DOCUMENTS

| | | | |
|---|---|---|---|
| 2004/0179764 A1* | 9/2004 | Melikechi | G02B 6/125 385/39 |
| 2004/0184156 A1* | 9/2004 | Gunn, III | G02B 6/126 359/629 |
| 2004/0188617 A1 | 9/2004 | Devitt et al. | |
| 2004/0208446 A1 | 10/2004 | Bond et al. | |
| 2004/0208466 A1 | 10/2004 | Mossberg et al. | |
| 2004/0225025 A1* | 11/2004 | Sullivan | G02F 1/1339 528/405 |
| 2004/0263969 A1* | 12/2004 | Lipton | G02B 30/27 359/463 |
| 2004/0263971 A1* | 12/2004 | Lipton | G02B 30/27 359/463 |
| 2005/0018304 A1* | 1/2005 | Lipton | G02B 30/27 359/618 |
| 2005/0047705 A1* | 3/2005 | Domash | G02F 1/011 385/10 |
| 2005/0079663 A1* | 4/2005 | Masutani | C09K 19/544 438/200 |
| 2005/0083564 A1* | 4/2005 | Mallya | G02F 1/13718 359/238 |
| 2005/0105909 A1* | 5/2005 | Stone | G02B 6/29311 398/87 |
| 2005/0122395 A1* | 6/2005 | Lipton | H04N 13/305 348/51 |
| 2005/0134404 A1* | 6/2005 | Kajiya | H01Q 25/004 333/156 |
| 2005/0135747 A1 | 6/2005 | Greiner et al. | |
| 2005/0136260 A1 | 6/2005 | Garcia | |
| 2005/0141066 A1* | 6/2005 | Ouchi | G02B 27/1086 348/E5.145 |
| 2005/0141811 A1* | 6/2005 | Yang | G02B 6/124 385/37 |
| 2005/0174321 A1* | 8/2005 | Ikeda | G02F 1/1679 430/35 |
| 2005/0180687 A1* | 8/2005 | Amitai | G02B 27/0172 385/31 |
| 2005/0195276 A1* | 9/2005 | Lipton | H04N 13/324 348/51 |
| 2005/0218377 A1* | 10/2005 | Lawandy | C09K 19/52 252/299.01 |
| 2005/0231774 A1* | 10/2005 | Hayashi | G06K 19/06046 359/10 |
| 2005/0232530 A1* | 10/2005 | Kekas | G02F 1/133504 385/11 |
| 2005/0254752 A1* | 11/2005 | Domash | G02F 1/313 385/37 |
| 2005/0259217 A1* | 11/2005 | Lin | G02F 1/13342 349/196 |
| 2005/0259302 A9 | 11/2005 | Metz et al. | |
| 2005/0259944 A1* | 11/2005 | Anderson | G02B 6/02304 385/147 |
| 2005/0265585 A1* | 12/2005 | Rowe | G06V 40/1324 382/191 |
| 2005/0269481 A1 | 12/2005 | David et al. | |
| 2005/0271258 A1* | 12/2005 | Rowe | G06V 40/1324 382/191 |
| 2005/0286133 A1* | 12/2005 | Lipton | G02B 30/27 359/619 |
| 2006/0002274 A1* | 1/2006 | Kihara | G11B 7/26 369/103 |
| 2006/0012878 A1* | 1/2006 | Lipton | G02B 30/27 351/201 |
| 2006/0013977 A1* | 1/2006 | Duke | F41H 5/04 428/218 |
| 2006/0043938 A1* | 3/2006 | O'Gorman | H02P 9/105 322/8 |
| 2006/0055993 A1* | 3/2006 | Kobayashi | G11B 7/1353 |
| 2006/0093012 A1 | 5/2006 | Singh et al. | |
| 2006/0093793 A1 | 5/2006 | Miyakawa et al. | |
| 2006/0114564 A1 | 6/2006 | Sutherland et al. | |
| 2006/0119837 A1* | 6/2006 | Raguin | G06V 40/1324 356/71 |
| 2006/0119916 A1 | 6/2006 | Sutherland et al. | |
| 2006/0126179 A1 | 6/2006 | Levola | |
| 2006/0132914 A1 | 6/2006 | Weiss et al. | |
| 2006/0142455 A1* | 6/2006 | Agarwal | C08L 101/00 524/451 |
| 2006/0146422 A1* | 7/2006 | Koike | G02B 5/188 |
| 2006/0159864 A1* | 7/2006 | Natarajan | G02B 5/32 385/16 |
| 2006/0164593 A1* | 7/2006 | Peyghambarian | G02F 1/29 349/200 |
| 2006/0171647 A1* | 8/2006 | Ye | G01N 21/645 385/123 |
| 2006/0177180 A1* | 8/2006 | Tazawa | G02B 6/12016 385/47 |
| 2006/0181683 A1* | 8/2006 | Bhowmik | G09G 3/007 353/30 |
| 2006/0191293 A1* | 8/2006 | Kuczma | C03B 37/029 65/435 |
| 2006/0215244 A1* | 9/2006 | Yosha | G02B 27/0101 359/15 |
| 2006/0215976 A1 | 9/2006 | Singh et al. | |
| 2006/0221063 A1* | 10/2006 | Ishihara | G06F 3/03545 348/E9.026 |
| 2006/0221448 A1 | 10/2006 | Nivon et al. | |
| 2006/0228073 A1 | 10/2006 | Mukawa et al. | |
| 2006/0268104 A1* | 11/2006 | Cowan | H04N 13/106 348/42 |
| 2006/0268412 A1* | 11/2006 | Downing | G02B 5/32 359/569 |
| 2006/0279662 A1 | 12/2006 | Kapellner et al. | |
| 2006/0284974 A1* | 12/2006 | Lipton | H04N 13/317 348/51 |
| 2006/0285205 A1* | 12/2006 | Lipton | G02B 30/29 359/463 |
| 2006/0291021 A1 | 12/2006 | Mukawa | |
| 2006/0291052 A1* | 12/2006 | Lipton | G02B 30/29 359/463 |
| 2006/0292493 A1* | 12/2006 | Shinotsuka | G11B 7/24079 430/270.13 |
| 2007/0012777 A1* | 1/2007 | Tsikos | G06K 7/146 235/454 |
| 2007/0019152 A1 | 1/2007 | Caputo et al. | |
| 2007/0019297 A1 | 1/2007 | Stewart et al. | |
| 2007/0041684 A1 | 2/2007 | Popovich et al. | |
| 2007/0045596 A1 | 3/2007 | King et al. | |
| 2007/0052929 A1 | 3/2007 | Allman et al. | |
| 2007/0053032 A1* | 3/2007 | Popovich | G02B 27/286 359/15 |
| 2007/0070476 A1* | 3/2007 | Yamada | G02B 3/0056 359/9 |
| 2007/0070504 A1* | 3/2007 | Akutsu | G02B 5/32 359/566 |
| 2007/0070859 A1* | 3/2007 | Hirayama | G02B 27/0172 369/112.04 |
| 2007/0089625 A1 | 4/2007 | Grinberg et al. | |
| 2007/0097502 A1* | 5/2007 | Lipton | G02B 7/028 359/463 |
| 2007/0109400 A1* | 5/2007 | Woodgate | G02B 30/25 348/47 |
| 2007/0109401 A1* | 5/2007 | Lipton | H04N 13/317 348/E13.033 |
| 2007/0115553 A1* | 5/2007 | Chang-Hasnain | G02B 5/1861 359/572 |
| 2007/0116409 A1* | 5/2007 | Bryan | G02B 6/1245 385/33 |
| 2007/0127348 A1* | 6/2007 | Ooi | G11B 7/1369 369/112.02 |
| 2007/0133089 A1* | 6/2007 | Lipton | G03B 21/56 359/451 |
| 2007/0133920 A1 | 6/2007 | Lee et al. | |
| 2007/0133983 A1 | 6/2007 | Traff | |
| 2007/0146624 A1* | 6/2007 | Duston | H01L 31/0543 349/193 |

(56) References Cited

U.S. PATENT DOCUMENTS

| | | | |
|---|---|---|---|
| 2007/0146625 A1* | 6/2007 | Ooi | G02B 3/08 349/200 |
| 2007/0154153 A1* | 7/2007 | Fomitchov | G02B 6/06 385/115 |
| 2007/0160325 A1* | 7/2007 | Son | G01J 3/1804 372/102 |
| 2007/0177007 A1* | 8/2007 | Lipton | H04N 13/305 348/51 |
| 2007/0182915 A1* | 8/2007 | Osawa | G11B 7/1378 |
| 2007/0183650 A1* | 8/2007 | Lipton | H04N 13/139 348/E13.02 |
| 2007/0188602 A1* | 8/2007 | Cowan | G09G 3/003 348/E13.067 |
| 2007/0188837 A1 | 8/2007 | Shimizu et al. | |
| 2007/0195409 A1* | 8/2007 | Yun | G02B 30/29 359/462 |
| 2007/0206155 A1* | 9/2007 | Lipton | H04N 13/337 348/E13.058 |
| 2007/0211164 A1 | 9/2007 | Olsen et al. | |
| 2007/0236560 A1* | 10/2007 | Lipton | H04N 13/10 348/E13.064 |
| 2007/0237456 A1* | 10/2007 | Blauvelt | G02B 6/3636 385/34 |
| 2007/0247687 A1* | 10/2007 | Handschy | G03H 1/02 359/35 |
| 2007/0258138 A1* | 11/2007 | Cowan | H04N 13/363 348/E13.058 |
| 2007/0263169 A1* | 11/2007 | Lipton | G02C 7/12 351/159.56 |
| 2008/0001909 A1* | 1/2008 | Lim | G09G 3/3406 345/102 |
| 2008/0018851 A1* | 1/2008 | Lipton | G02B 30/34 351/74 |
| 2008/0024598 A1* | 1/2008 | Perlin | H04N 13/324 348/E13.001 |
| 2008/0043334 A1 | 2/2008 | Itzkovitch et al. | |
| 2008/0049100 A1* | 2/2008 | Lipton | H04N 13/144 348/43 |
| 2008/0062259 A1* | 3/2008 | Lipton | H04N 13/337 348/58 |
| 2008/0089073 A1* | 4/2008 | Hikmet | G03H 1/22 204/157.4 |
| 2008/0106775 A1 | 5/2008 | Amitai et al. | |
| 2008/0106779 A1* | 5/2008 | Peterson | H04N 9/3161 359/259 |
| 2008/0117289 A1* | 5/2008 | Schowengerdt | G02B 26/005 348/E13.032 |
| 2008/0136916 A1* | 6/2008 | Wolff | G06F 3/012 348/169 |
| 2008/0136923 A1 | 6/2008 | Inbar et al. | |
| 2008/0138013 A1* | 6/2008 | Parriaux | G02B 5/32 385/37 |
| 2008/0143964 A1* | 6/2008 | Cowan | H04N 13/144 353/7 |
| 2008/0143965 A1* | 6/2008 | Cowan | G03B 21/28 353/8 |
| 2008/0149517 A1* | 6/2008 | Lipton | B65F 1/1615 206/459.5 |
| 2008/0151370 A1* | 6/2008 | Cook | G02C 13/006 359/464 |
| 2008/0151379 A1 | 6/2008 | Amitai | |
| 2008/0186573 A1* | 8/2008 | Lipton | G02B 3/0012 359/462 |
| 2008/0186574 A1* | 8/2008 | Robinson | G02B 30/27 359/463 |
| 2008/0186604 A1 | 8/2008 | Amitai | |
| 2008/0193085 A1 | 8/2008 | Singh et al. | |
| 2008/0198471 A1 | 8/2008 | Amitai | |
| 2008/0225187 A1* | 9/2008 | Yamanaka | H04N 9/3167 349/181 |
| 2008/0226281 A1* | 9/2008 | Lipton | G02B 30/27 396/324 |
| 2008/0239067 A1* | 10/2008 | Lipton | H04N 13/334 348/54 |
| 2008/0239068 A1* | 10/2008 | Lipton | H04N 13/334 348/60 |
| 2008/0273081 A1* | 11/2008 | Lipton | G03B 35/00 348/E13.001 |
| 2008/0278812 A1 | 11/2008 | Amitai | |
| 2008/0285137 A1* | 11/2008 | Simmonds | G03B 21/606 362/606 |
| 2008/0285140 A1 | 11/2008 | Amitai | |
| 2008/0297731 A1* | 12/2008 | Powell | G03B 21/28 353/37 |
| 2008/0297807 A1* | 12/2008 | Feldman | G01V 1/16 356/500 |
| 2008/0298649 A1* | 12/2008 | Ennis | G06V 40/45 382/125 |
| 2008/0298740 A1* | 12/2008 | Hlousek | G01N 21/7743 385/12 |
| 2008/0303895 A1* | 12/2008 | Akka | H04N 13/161 348/E15.001 |
| 2008/0303896 A1* | 12/2008 | Lipton | H04N 13/139 359/464 |
| 2008/0304111 A1* | 12/2008 | Queenan | G06K 7/0008 358/302 |
| 2008/0309586 A1 | 12/2008 | Vitale | |
| 2008/0316303 A1* | 12/2008 | Chiu | H04N 13/398 348/E13.001 |
| 2008/0316375 A1* | 12/2008 | Lipton | G03B 35/26 349/99 |
| 2009/0010135 A1 | 1/2009 | Ushiro et al. | |
| 2009/0017424 A1 | 1/2009 | Yoeli et al. | |
| 2009/0019222 A1 | 1/2009 | Verma et al. | |
| 2009/0052017 A1 | 2/2009 | Sasaki | |
| 2009/0052046 A1 | 2/2009 | Amitai | |
| 2009/0052047 A1 | 2/2009 | Amitai | |
| 2009/0067774 A1 | 3/2009 | Magnusson | |
| 2009/0074356 A1* | 3/2009 | Sanchez | G02B 6/1221 430/2 |
| 2009/0097122 A1 | 4/2009 | Niv | |
| 2009/0097127 A1 | 4/2009 | Amitai | |
| 2009/0121301 A1 | 5/2009 | Chang | |
| 2009/0122413 A1 | 5/2009 | Hoffman et al. | |
| 2009/0122414 A1 | 5/2009 | Amitai | |
| 2009/0128495 A1* | 5/2009 | Kong | G02B 6/0033 250/227.16 |
| 2009/0128781 A1* | 5/2009 | Li | G02B 27/0994 362/555 |
| 2009/0128902 A1 | 5/2009 | Niv et al. | |
| 2009/0128911 A1 | 5/2009 | Itzkovitch et al. | |
| 2009/0136246 A1 | 5/2009 | Murakami | |
| 2009/0141324 A1* | 6/2009 | Mukawa | G02B 5/1814 359/13 |
| 2009/0153437 A1 | 6/2009 | Aharoni | |
| 2009/0169152 A1* | 7/2009 | Ostergard | G02B 6/122 156/219 |
| 2009/0190222 A1 | 7/2009 | Simmonds et al. | |
| 2009/0213208 A1 | 8/2009 | Glatt | |
| 2009/0237804 A1 | 9/2009 | Amitai et al. | |
| 2009/0242021 A1* | 10/2009 | Petkie | H01L 31/02168 136/256 |
| 2009/0296218 A1* | 12/2009 | Ryytty | G02B 5/1828 359/573 |
| 2009/0303599 A1 | 12/2009 | Levola | |
| 2009/0316246 A1 | 12/2009 | Asai et al. | |
| 2010/0014312 A1* | 1/2010 | Travis | G02B 6/0053 359/627 |
| 2010/0039796 A1 | 2/2010 | Mukawa | |
| 2010/0053565 A1* | 3/2010 | Mizushima | G03B 21/2033 353/38 |
| 2010/0060551 A1 | 3/2010 | Sugiyama et al. | |
| 2010/0060990 A1 | 3/2010 | Wertheim et al. | |
| 2010/0065726 A1* | 3/2010 | Zhong | G01N 21/7703 250/227.24 |
| 2010/0079841 A1* | 4/2010 | Levola | G02B 6/0056 385/11 |
| 2010/0079865 A1 | 4/2010 | Saarikko et al. | |

(56) References Cited

U.S. PATENT DOCUMENTS

| | | |
|---|---|---|
| 2010/0084261 A1* | 4/2010 | Lee .................. G02B 6/124 204/192.26 |
| 2010/0086256 A1* | 4/2010 | Ben Bakir .......... G02B 6/1228 977/932 |
| 2010/0092124 A1 | 4/2010 | Magnusson et al. |
| 2010/0096562 A1 | 4/2010 | Klunder et al. |
| 2010/0097674 A1* | 4/2010 | Kasazumi ............ H04N 9/315 359/566 |
| 2010/0097820 A1* | 4/2010 | Owen .................. G02B 6/0008 362/555 |
| 2010/0103078 A1 | 4/2010 | Mukawa et al. |
| 2010/0134534 A1* | 6/2010 | Seesselberg .......... G02B 6/0038 345/690 |
| 2010/0135615 A1* | 6/2010 | Ho ...................... G02B 6/0281 385/33 |
| 2010/0136319 A1 | 6/2010 | Imai et al. |
| 2010/0141555 A1 | 6/2010 | Rorberg et al. |
| 2010/0141905 A1* | 6/2010 | Burke .................. G09G 3/003 353/121 |
| 2010/0149073 A1* | 6/2010 | Chaum ................ G02B 27/017 345/8 |
| 2010/0165465 A1 | 7/2010 | Levola |
| 2010/0165660 A1* | 7/2010 | Weber ................ G02F 1/13362 362/613 |
| 2010/0171680 A1 | 7/2010 | Lapidot et al. |
| 2010/0177388 A1 | 7/2010 | Cohen et al. |
| 2010/0202725 A1 | 8/2010 | Popovich et al. |
| 2010/0214659 A1 | 8/2010 | Levola |
| 2010/0220293 A1* | 9/2010 | Mizushima .......... H04N 9/3105 353/34 |
| 2010/0225834 A1* | 9/2010 | Li .................... G02F 1/133526 349/13 |
| 2010/0225876 A1* | 9/2010 | Escuti ................ G02B 5/3083 359/485.05 |
| 2010/0231532 A1* | 9/2010 | Nho .................... G06F 3/0423 345/173 |
| 2010/0231693 A1 | 9/2010 | Levola |
| 2010/0231705 A1 | 9/2010 | Yahav et al. |
| 2010/0232003 A1 | 9/2010 | Baldy et al. |
| 2010/0232016 A1* | 9/2010 | Landa .................. G02B 5/1814 359/466 |
| 2010/0245756 A1* | 9/2010 | Sugihara ............ G02B 27/0172 351/158 |
| 2010/0245757 A1* | 9/2010 | Sugihara ............ G02B 27/0172 351/158 |
| 2010/0246003 A1 | 9/2010 | Simmonds et al. |
| 2010/0246004 A1 | 9/2010 | Simmonds |
| 2010/0246993 A1 | 9/2010 | Rieger et al. |
| 2010/0253987 A1* | 10/2010 | Leopold .................. G03H 1/20 359/11 |
| 2010/0265117 A1 | 10/2010 | Weiss |
| 2010/0277803 A1 | 11/2010 | Pockett et al. |
| 2010/0284085 A1 | 11/2010 | Laakkonen |
| 2010/0284090 A1* | 11/2010 | Simmonds .......... G02B 27/0081 359/630 |
| 2010/0284180 A1 | 11/2010 | Popovich et al. |
| 2010/0296163 A1 | 11/2010 | Saarikko |
| 2010/0299814 A1* | 12/2010 | Celona .................. A42B 3/04 2/422 |
| 2010/0315719 A1 | 12/2010 | Saarikko et al. |
| 2010/0321781 A1 | 12/2010 | Levola et al. |
| 2010/0322555 A1* | 12/2010 | Vermeulen .............. G02B 6/34 385/28 |
| 2011/0001895 A1* | 1/2011 | Dahl .................... G02F 1/31 349/18 |
| 2011/0002143 A1 | 1/2011 | Saarikko et al. |
| 2011/0013423 A1 | 1/2011 | Selbrede et al. |
| 2011/0019250 A1 | 1/2011 | Aiki et al. |
| 2011/0019874 A1 | 1/2011 | Järvenpää et al. |
| 2011/0026128 A1 | 2/2011 | Baker et al. |
| 2011/0026774 A1 | 2/2011 | Flohr et al. |
| 2011/0032602 A1* | 2/2011 | Rothenberg ........ G02B 6/02042 359/341.1 |
| 2011/0032618 A1* | 2/2011 | Handerek ............ B32B 37/12 156/275.5 |
| 2011/0032706 A1* | 2/2011 | Mukawa .............. G02B 3/0056 362/268 |
| 2011/0038024 A1 | 2/2011 | Wang et al. |
| 2011/0050548 A1 | 3/2011 | Blumenfeld et al. |
| 2011/0063604 A1* | 3/2011 | Hamre ................ G06V 40/1318 250/330 |
| 2011/0096401 A1 | 4/2011 | Levola |
| 2011/0102711 A1* | 5/2011 | Sutherland .......... G02F 1/13342 349/86 |
| 2011/0109880 A1* | 5/2011 | Nummela ................ G06F 3/013 351/210 |
| 2011/0157707 A1 | 6/2011 | Tilleman et al. |
| 2011/0164221 A1 | 7/2011 | Tilleman et al. |
| 2011/0187293 A1* | 8/2011 | Travis .................. G02B 6/0031 315/313 |
| 2011/0211239 A1 | 9/2011 | Mukawa et al. |
| 2011/0216255 A1* | 9/2011 | Miyauchi ................ G02B 5/18 349/201 |
| 2011/0221656 A1* | 9/2011 | Haddick .................. H04N 5/44 345/156 |
| 2011/0232211 A1 | 9/2011 | Farahi |
| 2011/0235179 A1 | 9/2011 | Simmonds |
| 2011/0235365 A1 | 9/2011 | McCollum et al. |
| 2011/0236803 A1* | 9/2011 | Weiser .................... G03F 7/031 430/2 |
| 2011/0238399 A1 | 9/2011 | Ophir et al. |
| 2011/0242349 A1 | 10/2011 | Izuha et al. |
| 2011/0242661 A1 | 10/2011 | Simmonds |
| 2011/0242670 A1 | 10/2011 | Simmonds |
| 2011/0249309 A1* | 10/2011 | McPheters .......... G03H 1/2286 359/12 |
| 2011/0274435 A1* | 11/2011 | Fini ...................... H04J 14/025 398/139 |
| 2011/0299075 A1 | 12/2011 | Meade et al. |
| 2011/0310356 A1 | 12/2011 | Vallius |
| 2012/0007979 A1 | 1/2012 | Schneider et al. |
| 2012/0027347 A1* | 2/2012 | Mathal ................ G02B 6/4214 385/37 |
| 2012/0033306 A1 | 2/2012 | Valera et al. |
| 2012/0044572 A1 | 2/2012 | Simmonds et al. |
| 2012/0044573 A1 | 2/2012 | Simmonds et al. |
| 2012/0062850 A1 | 3/2012 | Travis |
| 2012/0062998 A1* | 3/2012 | Schultz ............ B29D 11/00663 156/60 |
| 2012/0075168 A1* | 3/2012 | Osterhout ................ G06F 3/017 345/8 |
| 2012/0081789 A1* | 4/2012 | Mukawa .................. G02B 5/18 359/567 |
| 2012/0092632 A1* | 4/2012 | McLeod .................. G03F 7/095 522/28 |
| 2012/0099203 A1 | 4/2012 | Boubis et al. |
| 2012/0105634 A1 | 5/2012 | Meidan et al. |
| 2012/0105740 A1* | 5/2012 | Jannard ................ G06F 3/16 351/158 |
| 2012/0120493 A1 | 5/2012 | Simmonds et al. |
| 2012/0127577 A1 | 5/2012 | Desserouer |
| 2012/0162549 A1* | 6/2012 | Gao .................... G02B 27/283 359/651 |
| 2012/0162764 A1* | 6/2012 | Shimizu ............ G02B 27/0176 359/473 |
| 2012/0176665 A1* | 7/2012 | Song ...................... G02B 30/36 359/558 |
| 2012/0183888 A1* | 7/2012 | Oliveira .................. G03F 7/029 430/2 |
| 2012/0194420 A1* | 8/2012 | Osterhout .............. G06F 3/013 345/156 |
| 2012/0200532 A1* | 8/2012 | Powell ................ G06F 3/04144 345/175 |
| 2012/0206811 A1* | 8/2012 | Mukawa .................. G02B 5/18 359/567 |
| 2012/0206937 A1* | 8/2012 | Travis .................. G02B 6/0055 362/602 |
| 2012/0207432 A1* | 8/2012 | Travis .................. G03B 21/28 385/31 |

(56) References Cited

U.S. PATENT DOCUMENTS

| | | | |
|---|---|---|---|
| 2012/0207434 A1* | 8/2012 | Large | G02B 6/0046 385/36 |
| 2012/0214089 A1* | 8/2012 | Honel | G11B 7/24044 430/2 |
| 2012/0214090 A1* | 8/2012 | Weiser | C08G 18/776 430/2 |
| 2012/0218481 A1 | 8/2012 | Popovich et al. | |
| 2012/0224062 A1 | 9/2012 | Lacoste et al. | |
| 2012/0235884 A1 | 9/2012 | Miller et al. | |
| 2012/0235886 A1* | 9/2012 | Border | G06F 3/013 345/8 |
| 2012/0235900 A1 | 9/2012 | Border et al. | |
| 2012/0242661 A1 | 9/2012 | Takagi et al. | |
| 2012/0280956 A1 | 11/2012 | Yamamoto et al. | |
| 2012/0281943 A1 | 11/2012 | Popovich et al. | |
| 2012/0290973 A1* | 11/2012 | Robertson | G06F 3/0481 715/801 |
| 2012/0294037 A1 | 11/2012 | Holman et al. | |
| 2012/0300311 A1 | 11/2012 | Simmonds et al. | |
| 2012/0320460 A1 | 12/2012 | Levola | |
| 2012/0326950 A1* | 12/2012 | Park | G09G 3/3607 345/55 |
| 2012/0328234 A1* | 12/2012 | Lu | G02B 6/1228 385/14 |
| 2013/0016324 A1* | 1/2013 | Travis | G03B 21/28 359/290 |
| 2013/0016362 A1* | 1/2013 | Gong | G01B 11/2527 356/610 |
| 2013/0021392 A1* | 1/2013 | Travis | G02B 27/0172 345/694 |
| 2013/0021586 A1* | 1/2013 | Lippey | G02B 27/48 353/69 |
| 2013/0027006 A1* | 1/2013 | Holloway | H02M 3/158 323/293 |
| 2013/0033485 A1* | 2/2013 | Kollin | G06F 3/0484 345/660 |
| 2013/0039619 A1* | 2/2013 | Laughlin | G02B 6/32 385/139 |
| 2013/0044376 A1* | 2/2013 | Valera | G02B 27/0172 359/567 |
| 2013/0051730 A1* | 2/2013 | Travers | G02B 27/4272 385/37 |
| 2013/0059233 A1* | 3/2013 | Askham | G03F 7/001 430/2 |
| 2013/0069850 A1 | 3/2013 | Mukawa et al. | |
| 2013/0077049 A1* | 3/2013 | Bohn | G02B 27/0093 351/210 |
| 2013/0088637 A1* | 4/2013 | Duparre | H04N 23/45 348/360 |
| 2013/0093893 A1* | 4/2013 | Schofield | G08G 1/167 348/148 |
| 2013/0101253 A1 | 4/2013 | Popovich et al. | |
| 2013/0107186 A1* | 5/2013 | Ando | G02C 7/083 349/153 |
| 2013/0117377 A1* | 5/2013 | Miller | G06F 16/954 709/205 |
| 2013/0125027 A1* | 5/2013 | Abovitz | G06F 3/011 715/757 |
| 2013/0128230 A1* | 5/2013 | Macnamara | G02B 5/1876 353/7 |
| 2013/0138275 A1 | 5/2013 | Nauman et al. | |
| 2013/0141937 A1 | 6/2013 | Katsuta et al. | |
| 2013/0143336 A1* | 6/2013 | Jain | H01L 33/06 438/22 |
| 2013/0163089 A1* | 6/2013 | Bohn | G02B 27/0172 156/60 |
| 2013/0163928 A1* | 6/2013 | Wang | G02B 6/1221 427/163.2 |
| 2013/0170031 A1 | 7/2013 | Bohn et al. | |
| 2013/0176704 A1* | 7/2013 | Lanman | H04N 13/32 362/19 |
| 2013/0184904 A1* | 7/2013 | Gadzinski | G08G 5/0021 701/16 |
| 2013/0200710 A1 | 8/2013 | Robbins | |
| 2013/0207887 A1* | 8/2013 | Raffle | G02B 27/0176 345/156 |
| 2013/0224634 A1* | 8/2013 | Berneth | C09B 11/12 546/264 |
| 2013/0229717 A1* | 9/2013 | Amitai | G02B 27/0176 359/633 |
| 2013/0249895 A1 | 9/2013 | Westerinen et al. | |
| 2013/0250207 A1 | 9/2013 | Bohn | |
| 2013/0250380 A1* | 9/2013 | Fujikawa | G02B 27/0103 359/13 |
| 2013/0250430 A1* | 9/2013 | Robbins | G02B 27/017 359/633 |
| 2013/0250431 A1* | 9/2013 | Robbins | G02B 27/0172 359/633 |
| 2013/0257848 A1 | 10/2013 | Westerinen et al. | |
| 2013/0258701 A1 | 10/2013 | Westerinen et al. | |
| 2013/0267309 A1* | 10/2013 | Robbins | A63F 9/24 463/31 |
| 2013/0271731 A1* | 10/2013 | Popovich | G01J 3/1895 353/31 |
| 2013/0277890 A1* | 10/2013 | Bowman | A61L 27/50 525/445 |
| 2013/0286053 A1* | 10/2013 | Fleck | G09G 3/3208 345/82 |
| 2013/0300997 A1* | 11/2013 | Popovich | G02B 27/1086 359/489.08 |
| 2013/0301014 A1* | 11/2013 | DeJong | G02B 5/18 385/31 |
| 2013/0305437 A1* | 11/2013 | Weller | G02B 27/0179 2/422 |
| 2013/0308185 A1* | 11/2013 | Robinson | F21V 13/12 359/465 |
| 2013/0312811 A1* | 11/2013 | Aspnes | H01L 31/0547 136/246 |
| 2013/0314789 A1* | 11/2013 | Saarikko | G02B 27/42 359/558 |
| 2013/0314793 A1 | 11/2013 | Robbins et al. | |
| 2013/0322810 A1 | 12/2013 | Robbins | |
| 2013/0328948 A1 | 12/2013 | Kunkel et al. | |
| 2013/0342525 A1* | 12/2013 | Benko | H04N 13/398 345/419 |
| 2014/0002514 A1* | 1/2014 | Richards | G03B 21/005 345/691 |
| 2014/0003762 A1* | 1/2014 | Macnamara | G02B 6/262 385/39 |
| 2014/0009809 A1* | 1/2014 | Pyun | G03H 1/30 359/25 |
| 2014/0022616 A1* | 1/2014 | Popovich | G02F 1/13342 359/15 |
| 2014/0024159 A1* | 1/2014 | Jain | H01L 31/0296 438/46 |
| 2014/0027006 A1* | 1/2014 | Foley | B65D 51/24 141/1 |
| 2014/0037242 A1 | 2/2014 | Popovich et al. | |
| 2014/0043672 A1* | 2/2014 | Clarke | G02F 1/1313 359/315 |
| 2014/0043689 A1* | 2/2014 | Mason | G02B 6/4298 359/630 |
| 2014/0055845 A1* | 2/2014 | Jain | H01L 31/02327 359/344 |
| 2014/0063055 A1* | 3/2014 | Osterhout | G02B 27/017 345/633 |
| 2014/0064655 A1* | 3/2014 | Nguyen | G02B 27/0172 385/11 |
| 2014/0071538 A1* | 3/2014 | Muller | G02B 3/005 359/619 |
| 2014/0098010 A1* | 4/2014 | Travis | G02B 27/0093 345/32 |
| 2014/0104665 A1 | 4/2014 | Popovich et al. | |
| 2014/0104685 A1 | 4/2014 | Bohn et al. | |
| 2014/0118647 A1* | 5/2014 | Momonoi | G02F 1/134309 349/33 |

(56) References Cited

U.S. PATENT DOCUMENTS

| | | | |
|---|---|---|---|
| 2014/0126029 A1* | 5/2014 | Fuetterer | G02B 5/32 359/3 |
| 2014/0126175 A1* | 5/2014 | Amitai | G02B 6/34 362/19 |
| 2014/0130132 A1* | 5/2014 | Cahill | G06Q 10/10 709/205 |
| 2014/0140653 A1 | 5/2014 | Brown et al. | |
| 2014/0140654 A1 | 5/2014 | Brown et al. | |
| 2014/0146394 A1 | 5/2014 | Tout et al. | |
| 2014/0152778 A1 | 6/2014 | Ihlenburg et al. | |
| 2014/0154614 A1* | 6/2014 | Xie | G03H 1/24 430/2 |
| 2014/0160576 A1* | 6/2014 | Robbins | G02B 27/0172 359/630 |
| 2014/0168055 A1 | 6/2014 | Smith | |
| 2014/0168260 A1 | 6/2014 | O'Brien et al. | |
| 2014/0168735 A1 | 6/2014 | Yuan et al. | |
| 2014/0168783 A1* | 6/2014 | Luebke | G02B 27/01 359/630 |
| 2014/0172296 A1 | 6/2014 | Shtukater | |
| 2014/0176528 A1 | 6/2014 | Robbins | |
| 2014/0177023 A1* | 6/2014 | Gao | G02B 25/001 359/238 |
| 2014/0185286 A1 | 7/2014 | Popovich et al. | |
| 2014/0198128 A1* | 7/2014 | Hong | G02B 26/106 345/619 |
| 2014/0198896 A1* | 7/2014 | Hemmendorff | A61B 6/025 378/37 |
| 2014/0204455 A1 | 7/2014 | Popovich et al. | |
| 2014/0211322 A1 | 7/2014 | Bohn et al. | |
| 2014/0218468 A1* | 8/2014 | Gao | G02B 27/1066 348/36 |
| 2014/0218801 A1 | 8/2014 | Simmonds et al. | |
| 2014/0232759 A1* | 8/2014 | Simmonds | G09G 3/3406 345/87 |
| 2014/0240834 A1* | 8/2014 | Mason | G02B 27/0081 385/37 |
| 2014/0240842 A1* | 8/2014 | Nguyen | G02B 6/0076 359/630 |
| 2014/0255662 A1* | 9/2014 | Enomoto | C09D 11/38 522/79 |
| 2014/0267420 A1* | 9/2014 | Schowengerdt | G06F 3/013 345/633 |
| 2014/0268017 A1* | 9/2014 | Sweis | G02C 11/10 351/158 |
| 2014/0268353 A1* | 9/2014 | Fujimura | G02B 27/0101 359/630 |
| 2014/0300947 A1* | 10/2014 | Fattal | G02B 26/0808 359/298 |
| 2014/0300960 A1* | 10/2014 | Santori | G02B 6/005 359/462 |
| 2014/0300966 A1 | 10/2014 | Travers et al. | |
| 2014/0327970 A1* | 11/2014 | Bohn | G02B 27/0172 385/37 |
| 2014/0330159 A1* | 11/2014 | Costa | A61B 5/16 600/595 |
| 2014/0367719 A1* | 12/2014 | Jain | C09K 11/88 438/27 |
| 2014/0375542 A1* | 12/2014 | Robbins | G06T 19/006 345/156 |
| 2014/0375789 A1* | 12/2014 | Lou | G06F 3/013 348/78 |
| 2014/0375790 A1* | 12/2014 | Robbins | G02B 27/017 348/78 |
| 2015/0001677 A1* | 1/2015 | Palumbo | H01L 29/405 257/536 |
| 2015/0003796 A1* | 1/2015 | Bennett | G02B 6/0065 385/129 |
| 2015/0010265 A1 | 1/2015 | Popovich et al. | |
| 2015/0015946 A1* | 1/2015 | Muller | G02B 30/29 359/463 |
| 2015/0016777 A1* | 1/2015 | Abovitz | G02B 27/0093 385/37 |
| 2015/0035744 A1* | 2/2015 | Robbins | G02B 27/0093 345/156 |
| 2015/0036068 A1* | 2/2015 | Fattal | G02F 1/133615 362/606 |
| 2015/0058791 A1* | 2/2015 | Robertson | G06F 3/0481 715/850 |
| 2015/0062675 A1* | 3/2015 | Ayres | G03H 1/2645 359/22 |
| 2015/0062707 A1* | 3/2015 | Simmonds | G02B 27/44 359/567 |
| 2015/0086163 A1* | 3/2015 | Valera | G02B 6/34 427/163.2 |
| 2015/0086907 A1* | 3/2015 | Mizuta | G03H 1/0248 430/2 |
| 2015/0107671 A1* | 4/2015 | Bodan | H01L 31/0549 136/259 |
| 2015/0109763 A1* | 4/2015 | Shinkai | G02F 1/1336 362/276 |
| 2015/0125109 A1* | 5/2015 | Robbins | G02B 27/0172 385/10 |
| 2015/0148728 A1* | 5/2015 | Sallum | A61F 5/013 602/22 |
| 2015/0160529 A1 | 6/2015 | Popovich et al. | |
| 2015/0167868 A1 | 6/2015 | Boncha | |
| 2015/0177443 A1* | 6/2015 | Faecke | G02B 6/0035 362/607 |
| 2015/0177686 A1* | 6/2015 | Lee | G03H 1/0476 359/9 |
| 2015/0177688 A1 | 6/2015 | Popovich et al. | |
| 2015/0185475 A1* | 7/2015 | Saarikko | G02B 6/02085 382/117 |
| 2015/0211960 A1* | 7/2015 | Shimizu | G01M 11/33 356/73.1 |
| 2015/0219834 A1* | 8/2015 | Nichol | G02B 6/0028 445/24 |
| 2015/0235447 A1* | 8/2015 | Abovitz | G16H 40/67 345/633 |
| 2015/0235448 A1* | 8/2015 | Schowengerdt | G02F 1/292 345/633 |
| 2015/0243068 A1* | 8/2015 | Solomon | G02B 27/017 345/419 |
| 2015/0247975 A1* | 9/2015 | Abovitz | G06F 16/7837 385/37 |
| 2015/0260994 A1* | 9/2015 | Akutsu | G02B 27/4205 385/37 |
| 2015/0262424 A1* | 9/2015 | Tabaka | G02B 27/0075 345/633 |
| 2015/0268399 A1* | 9/2015 | Futterer | G02B 6/0031 362/606 |
| 2015/0268415 A1* | 9/2015 | Schowengerdt | G02B 6/08 385/119 |
| 2015/0277375 A1 | 10/2015 | Large et al. | |
| 2015/0285682 A1* | 10/2015 | Popovich | G02F 1/13342 250/349 |
| 2015/0288129 A1* | 10/2015 | Jain | H01S 3/06754 438/31 |
| 2015/0289762 A1 | 10/2015 | Popovich et al. | |
| 2015/0309264 A1* | 10/2015 | Abovitz | G02B 6/32 385/33 |
| 2015/0316768 A1 | 11/2015 | Simmonds | |
| 2015/0338689 A1* | 11/2015 | Min | G02F 1/13 349/88 |
| 2015/0346490 A1* | 12/2015 | Tekolste | G02B 5/1871 359/566 |
| 2015/0346495 A1* | 12/2015 | Welch | G02B 27/017 345/8 |
| 2015/0355394 A1* | 12/2015 | Valera | G02B 5/1857 359/571 |
| 2016/0003847 A1* | 1/2016 | Ryan | G01N 33/566 530/387.3 |
| 2016/0004090 A1 | 1/2016 | Popovich et al. | |
| 2016/0018673 A1* | 1/2016 | Wang | G02C 11/00 351/158 |

(56) References Cited

U.S. PATENT DOCUMENTS

| | | | |
|---|---|---|---|
| 2016/0026253 A1* | 1/2016 | Bradski | H04N 13/128 345/8 |
| 2016/0033705 A1* | 2/2016 | Fattal | G02B 6/0031 359/462 |
| 2016/0033706 A1* | 2/2016 | Fattal | G02B 30/27 349/62 |
| 2016/0038992 A1* | 2/2016 | Arthur | B67B 7/403 413/56 |
| 2016/0041387 A1* | 2/2016 | Valera | G02B 6/0055 385/36 |
| 2016/0055822 A1* | 2/2016 | Bell | G02B 27/017 345/207 |
| 2016/0077338 A1* | 3/2016 | Robbins | G02B 27/4205 359/489.08 |
| 2016/0085300 A1* | 3/2016 | Robbins | G02B 27/0172 345/633 |
| 2016/0097959 A1* | 4/2016 | Bruizeman | G02F 1/1533 359/275 |
| 2016/0116739 A1* | 4/2016 | TeKolste | G02B 6/0076 385/36 |
| 2016/0124223 A1* | 5/2016 | Shinbo | G02B 27/0101 385/37 |
| 2016/0124241 A1* | 5/2016 | Popovich | G02B 5/1828 349/5 |
| 2016/0132025 A1* | 5/2016 | Taff | G02B 30/36 368/239 |
| 2016/0170226 A1* | 6/2016 | Popovich | G03B 21/008 362/277 |
| 2016/0178901 A1 | 6/2016 | Ishikawa | |
| 2016/0195664 A1* | 7/2016 | Fattal | G02F 1/133615 362/606 |
| 2016/0209648 A1* | 7/2016 | Haddick | G04G 21/025 |
| 2016/0209657 A1 | 7/2016 | Popovich et al. | |
| 2016/0231568 A1* | 8/2016 | Saarikko | G02B 5/1866 |
| 2016/0231570 A1* | 8/2016 | Levola | G02B 6/0035 |
| 2016/0238772 A1* | 8/2016 | Waldern et al. | |
| 2016/0266398 A1* | 9/2016 | Poon | G02B 27/0172 |
| 2016/0274356 A1* | 9/2016 | Mason | G02B 6/0046 |
| 2016/0274362 A1* | 9/2016 | Tinch | G02B 27/0172 |
| 2016/0283773 A1* | 9/2016 | Popovich | G02B 27/4277 |
| 2016/0291328 A1 | 10/2016 | Popovich et al. | |
| 2016/0299344 A1* | 10/2016 | Dobschal | G02B 27/0172 |
| 2016/0320536 A1* | 11/2016 | Simmonds | G02B 5/1823 |
| 2016/0327705 A1* | 11/2016 | Simmonds | G02B 27/0172 |
| 2016/0336033 A1* | 11/2016 | Tanaka | G11B 7/1353 |
| 2016/0341964 A1* | 11/2016 | Amitai | G06F 3/16 |
| 2016/0363840 A1* | 12/2016 | Mizoguchi | G09G 3/002 |
| 2016/0377879 A1* | 12/2016 | Popovich | G02B 6/0023 362/19 |
| 2017/0003505 A1* | 1/2017 | Vallius | G02B 27/4205 |
| 2017/0010466 A1* | 1/2017 | Klug | G02F 1/326 |
| 2017/0010488 A1* | 1/2017 | Klug | G02B 27/0081 |
| 2017/0030550 A1 | 2/2017 | Popovich et al. | |
| 2017/0031160 A1 | 2/2017 | Popovich et al. | |
| 2017/0031171 A1* | 2/2017 | Vallius | G02B 5/1819 |
| 2017/0032166 A1* | 2/2017 | Raguin | G06F 1/1684 |
| 2017/0034435 A1* | 2/2017 | Vallius | G02B 27/4272 |
| 2017/0038579 A1* | 2/2017 | Yeoh | G02B 26/103 |
| 2017/0052374 A1 | 2/2017 | Waldern et al. | |
| 2017/0052376 A1* | 2/2017 | Amitai | G02B 6/34 |
| 2017/0059759 A1* | 3/2017 | Ayres | G02B 27/0172 |
| 2017/0059775 A1* | 3/2017 | Coles | H01S 3/1686 |
| 2017/0102543 A1* | 4/2017 | Vallius | G06T 19/006 |
| 2017/0115487 A1* | 4/2017 | Travis | G03H 1/0256 |
| 2017/0123208 A1* | 5/2017 | Vallius | G02B 27/4272 |
| 2017/0131460 A1* | 5/2017 | Lin | G02B 6/00 |
| 2017/0131545 A1* | 5/2017 | Wall | G02B 27/4205 |
| 2017/0131546 A1* | 5/2017 | Woltman | G02B 27/0103 |
| 2017/0131551 A1* | 5/2017 | Robbins | G02F 1/13439 |
| 2017/0138789 A1* | 5/2017 | Ivanov | G02B 6/305 |
| 2017/0160546 A1 | 6/2017 | Bull et al. | |
| 2017/0180404 A1* | 6/2017 | Bersch | H04L 63/1433 |
| 2017/0180408 A1* | 6/2017 | Yu | H04L 63/1433 |
| 2017/0192246 A9* | 7/2017 | Popovich | G02B 27/48 |
| 2017/0199333 A1 | 7/2017 | Waldern et al. | |
| 2017/0212295 A1* | 7/2017 | Vasylyev | G02B 6/0065 |
| 2017/0219841 A1* | 8/2017 | Popovich | G02B 6/0016 |
| 2017/0236463 A1* | 8/2017 | Chi | G02B 27/141 345/694 |
| 2017/0255257 A1 | 9/2017 | Tiana et al. | |
| 2017/0270637 A1* | 9/2017 | Perreault | G02B 27/0172 |
| 2017/0276940 A1 | 9/2017 | Popovich et al. | |
| 2017/0299793 A1* | 10/2017 | Fattal | G02B 6/0036 |
| 2017/0299794 A1* | 10/2017 | Fattal | G02B 30/33 |
| 2017/0299860 A1* | 10/2017 | Wall | G02B 3/04 |
| 2017/0307800 A1* | 10/2017 | Fattal | G02B 6/0038 |
| 2017/0322426 A1* | 11/2017 | Tervo | G02B 27/4272 |
| 2017/0356801 A1* | 12/2017 | Popovich | G02F 1/292 |
| 2017/0357841 A1* | 12/2017 | Popovich | G06V 40/1324 |
| 2018/0011324 A1 | 1/2018 | Popovich et al. | |
| 2018/0052277 A1 | 2/2018 | Schowengerdt et al. | |
| 2018/0059305 A1* | 3/2018 | Popovich | G02B 27/0101 |
| 2018/0067251 A1* | 3/2018 | Baldwin | G02B 6/0073 |
| 2018/0074265 A1 | 3/2018 | Waldern et al. | |
| 2018/0074352 A1 | 3/2018 | Popovich et al. | |
| 2018/0081190 A1* | 3/2018 | Lee | G02F 1/13362 |
| 2018/0107011 A1* | 4/2018 | Lu | G09G 3/003 |
| 2018/0113303 A1 | 4/2018 | Popovich et al. | |
| 2018/0120669 A1* | 5/2018 | Popovich | H01L 27/14625 |
| 2018/0129060 A1* | 5/2018 | Lee | G02B 6/0036 |
| 2018/0143438 A1* | 5/2018 | Oh | G02B 6/0076 |
| 2018/0143449 A1* | 5/2018 | Popovich | G03B 21/2033 |
| 2018/0172995 A1* | 6/2018 | Lee | G02B 6/0016 |
| 2018/0188542 A1 | 7/2018 | Waldern et al. | |
| 2018/0188691 A1* | 7/2018 | Fattal | G02B 6/12 |
| 2018/0210198 A1 | 7/2018 | Brown et al. | |
| 2018/0210396 A1* | 7/2018 | Popovich | G03H 1/0248 |
| 2018/0232048 A1 | 8/2018 | Popovich et al. | |
| 2018/0246354 A1 | 8/2018 | Popovich et al. | |
| 2018/0252869 A1* | 9/2018 | Ayres | G02B 27/0081 |
| 2018/0275350 A1* | 9/2018 | Oh | G02B 27/0093 |
| 2018/0275402 A1* | 9/2018 | Popovich | G02B 6/0035 |
| 2018/0275410 A1* | 9/2018 | Yeoh | G06F 3/013 |
| 2018/0284440 A1 | 10/2018 | Popovich et al. | |
| 2018/0348524 A1* | 12/2018 | Blum | G02B 27/0176 |
| 2018/0373115 A1 | 12/2018 | Brown et al. | |
| 2019/0041634 A1 | 2/2019 | Popovich et al. | |
| 2019/0042827 A1* | 2/2019 | Popovich | G02B 6/34 |
| 2019/0064526 A1* | 2/2019 | Connor | G02B 6/0073 |
| 2019/0064735 A1* | 2/2019 | Waldern | G03H 1/0248 |
| 2019/0072723 A1* | 3/2019 | Waldern | G02B 27/4261 |
| 2019/0094548 A1* | 3/2019 | Nicholson | G02B 27/0172 |
| 2019/0113751 A9* | 4/2019 | Waldern | G02B 27/48 |
| 2019/0113829 A1* | 4/2019 | Waldern | G02B 6/122 |
| 2019/0114484 A1* | 4/2019 | Keech | G02B 6/1221 |
| 2019/0121027 A1 | 4/2019 | Popovich et al. | |
| 2019/0129085 A1 | 5/2019 | Waldern | G02B 27/425 |
| 2019/0162962 A1* | 5/2019 | Leighton | G02B 6/0065 |
| 2019/0162963 A1* | 5/2019 | Leighton | G02B 27/0172 |
| 2019/0171031 A1* | 6/2019 | Popovich | G02F 1/13342 |
| 2019/0179153 A1* | 6/2019 | Popovich | A61B 3/113 |
| 2019/0187538 A1* | 6/2019 | Popovich | G02F 1/13342 |
| 2019/0188471 A1* | 6/2019 | Osterhout | G06F 3/012 |
| 2019/0212195 A9* | 7/2019 | Popovich | G02B 27/4205 |
| 2019/0212557 A1* | 7/2019 | Waldern | G02B 27/0101 |
| 2019/0212573 A1* | 7/2019 | Popovich | G02F 1/13731 |
| 2019/0212588 A1* | 7/2019 | Waldern | B29D 11/00769 |
| 2019/0212589 A1* | 7/2019 | Waldern | G02B 27/0101 |
| 2019/0212596 A1* | 7/2019 | Waldern | G02B 1/04 |
| 2019/0212597 A1* | 7/2019 | Waldern | G03F 7/027 |
| 2019/0212698 A1* | 7/2019 | Waldern | G02B 6/138 |
| 2019/0212699 A1 | 7/2019 | Waldern et al. | |
| 2019/0219822 A1* | 7/2019 | Popovich | G02B 27/0103 |
| 2019/0243142 A1* | 8/2019 | TeKolste | G02B 6/0025 |
| 2019/0265486 A1* | 8/2019 | Hansotte | G02B 6/0016 |
| 2019/0278224 A1* | 9/2019 | Schlottau | G03H 1/0402 |
| 2019/0285796 A1* | 9/2019 | Waldern | G02B 27/0081 |
| 2019/0293880 A1* | 9/2019 | Nishiwaki | G02B 6/00 |
| 2019/0319426 A1 | 10/2019 | Lu et al. | |
| 2019/0339558 A1* | 11/2019 | Waldern | G02F 1/1347 |
| 2020/0026074 A1 | 1/2020 | Waldern et al. | |
| 2020/0033190 A1* | 1/2020 | Popovich | H01L 33/10 |

(56) References Cited

U.S. PATENT DOCUMENTS

| | | | |
|---|---|---|---|
| 2020/0033801 A1* | 1/2020 | Waldern | B05D 1/005 |
| 2020/0033802 A1* | 1/2020 | Popovich | G03H 1/0244 |
| 2020/0057353 A1* | 2/2020 | Popovich | G02F 1/225 |
| 2020/0064637 A1* | 2/2020 | Popovich | G02B 27/0172 |
| 2020/0081317 A1* | 3/2020 | Popovich | G02F 1/13342 |
| 2020/0089319 A1 | 3/2020 | Popovich et al. | |
| 2020/0103661 A1* | 4/2020 | Kamakura | G02B 27/0176 |
| 2020/0142131 A1* | 5/2020 | Waldern | G02B 6/124 |
| 2020/0159023 A1* | 5/2020 | Bhargava | G02B 27/4272 |
| 2020/0159026 A1* | 5/2020 | Waldern | G06F 3/0436 |
| 2020/0183163 A1* | 6/2020 | Waldern | G02B 27/0103 |
| 2020/0201042 A1* | 6/2020 | Wang | G06F 3/147 |
| 2020/0201051 A1* | 6/2020 | Popovich | G02B 5/1866 |
| 2020/0225471 A1* | 7/2020 | Waldern | G02B 5/32 |
| 2020/0241304 A1* | 7/2020 | Popovich | G02B 6/0035 |
| 2020/0249484 A1* | 8/2020 | Waldern | G02B 26/105 |
| 2020/0249491 A1* | 8/2020 | Popovich | G02F 1/292 |
| 2020/0264378 A1* | 8/2020 | Grant | G02B 6/34 |
| 2020/0271973 A1* | 8/2020 | Waldern | G02F 1/13342 |
| 2020/0292745 A1* | 9/2020 | Waldern | G02B 6/0035 |
| 2020/0292840 A1* | 9/2020 | Popovich | G02B 27/48 |
| 2020/0341194 A1* | 10/2020 | Waldern | G02F 1/13342 |
| 2020/0348519 A1* | 11/2020 | Waldern | G02B 27/017 |
| 2020/0348531 A1* | 11/2020 | Popovich | G02F 1/133553 |
| 2020/0363771 A1* | 11/2020 | Waldern | G03H 1/0248 |
| 2020/0386947 A1* | 12/2020 | Waldern | G02B 6/00 |
| 2021/0026297 A1* | 1/2021 | Waldern | G03H 1/0465 |
| 2021/0033857 A1* | 2/2021 | Waldern | G02B 6/005 |
| 2021/0055551 A1* | 2/2021 | Chi | G02B 6/0016 |
| 2021/0063634 A1* | 3/2021 | Waldern | G02B 6/34 |
| 2021/0216040 A1* | 7/2021 | Waldern | G03H 1/20 |
| 2021/0223585 A1* | 7/2021 | Waldern | G02B 5/1828 |
| 2021/0231874 A1* | 7/2021 | Popovich | G02B 6/34 |
| 2021/0231955 A1* | 7/2021 | Waldern | G02B 27/0172 |
| 2021/0239984 A1* | 8/2021 | Popovich | G02B 5/1866 |
| 2021/0247560 A1* | 8/2021 | Waldern | G02B 6/0068 |
| 2021/0247620 A1* | 8/2021 | Popovich | G03B 21/208 |
| 2021/0247719 A1* | 8/2021 | Waldern | G03H 1/0402 |
| 2021/0349328 A1* | 11/2021 | Popovich | G02F 1/292 |
| 2021/0405299 A1* | 12/2021 | Grant | G02B 27/0103 |
| 2021/0405514 A1* | 12/2021 | Waldern | G06F 3/013 |
| 2022/0075196 A1* | 3/2022 | Waldern | G02B 6/34 |

OTHER PUBLICATIONS

U.S. Appl. No. 61/457,835, filed Jun. 16, 2011.
U.S. Appl. No. 61/573,066, filed Aug. 24, 2012.
U.S. Appl. No. 61/573,082, filed Aug. 29, 2011.
U.S. Appl. No. 61/573,121, filed Sep. 7, 2011.
U.S. Appl. No. 61/573,156, filed Sep. 16, 2011.
U.S. Appl. No. 61/573,175, filed Sep. 19, 2011.
U.S. Appl. No. 61/573,176, filed Sep. 19, 2011.
U.S. Appl. No. 61/573,196, filed Sep. 25, 2011.
U.S. Appl. No. 61/627,202, filed Oct. 7, 2011.
U.S. Appl. No. 61/687,436, filed Apr. 25, 2012.
U.S. Appl. No. 61/689,907, filed Apr. 25, 2012.
U.S. Appl. No. 61/796,795, filed Nov. 20, 2012.
U.S. Appl. No. 61/850,856, filed Feb. 25, 2013.
U.S. Appl. No. 13/250,858, filed Sep. 30, 2011, Brown et al.
U.S. Appl. No. 13/250,940, filed Sep. 30, 2011, Stahl et al.
U.S. Appl. No. 13/432,662, filed Mar. 28, 2012, Brown et al.
U.S. Appl. No. 14/497,280, filed Sep. 25, 2014, Stanley et al.
U.S. Appl. No. 14/715,332, filed May 18, 2015, Brown et al.
U.S. Appl. No. 14/814,020, filed Jul. 30, 2015, Brown et al.

* cited by examiner

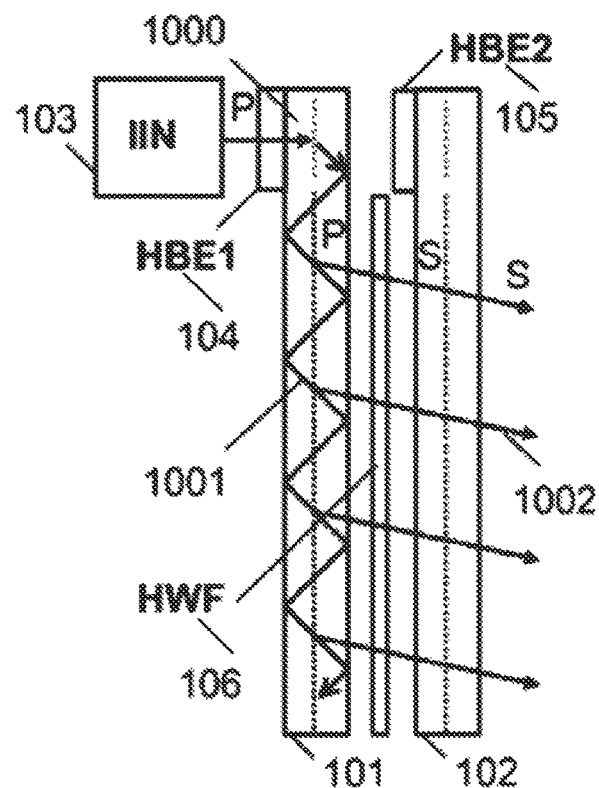 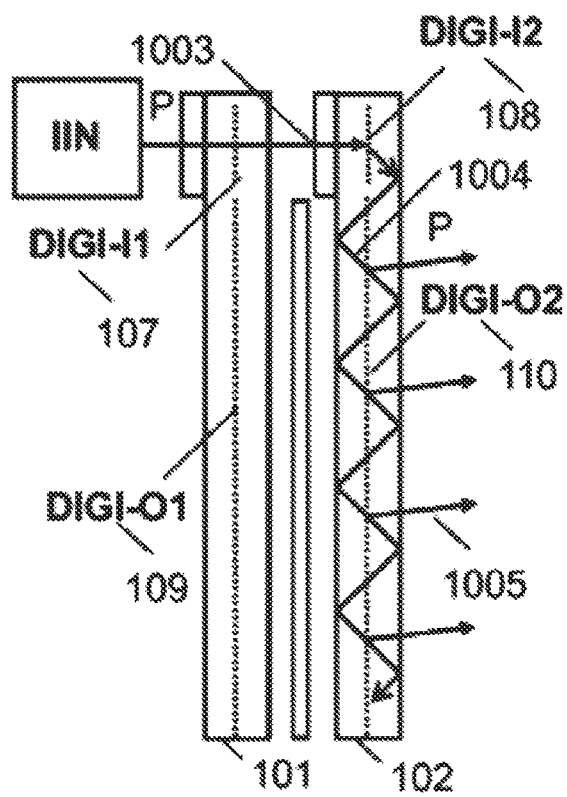
FIG. 2A  FIG. 2B
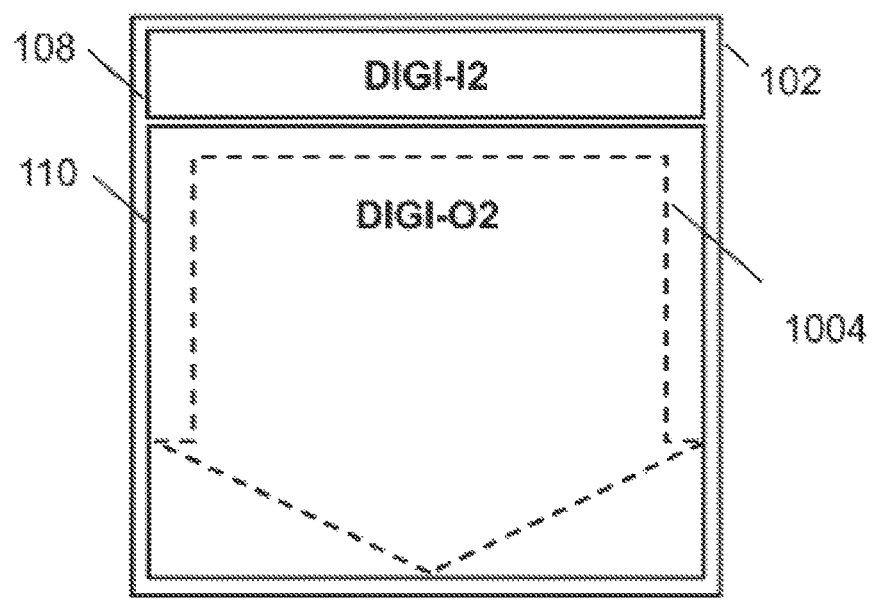
FIG. 2C

| Grating Type | Thickness | Diffraction Efficiency | Angular Bandwidth (FWHM) |
|---|---|---|---|
| Thin | 1.8 micron | ~ 30% | 15° |
| Thick | 3 micron | ~ 87% | 8.5° |

FIG. 11

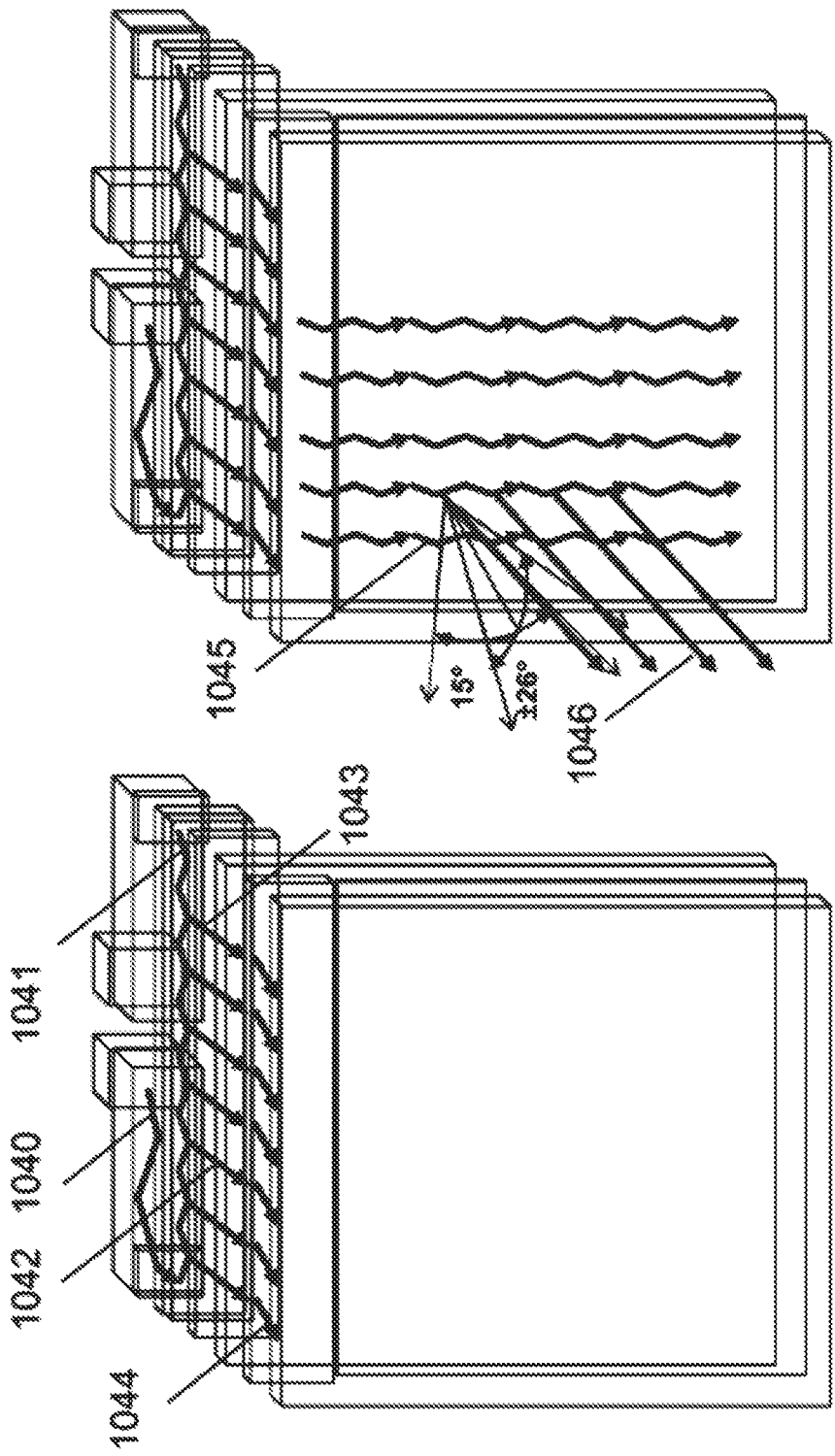

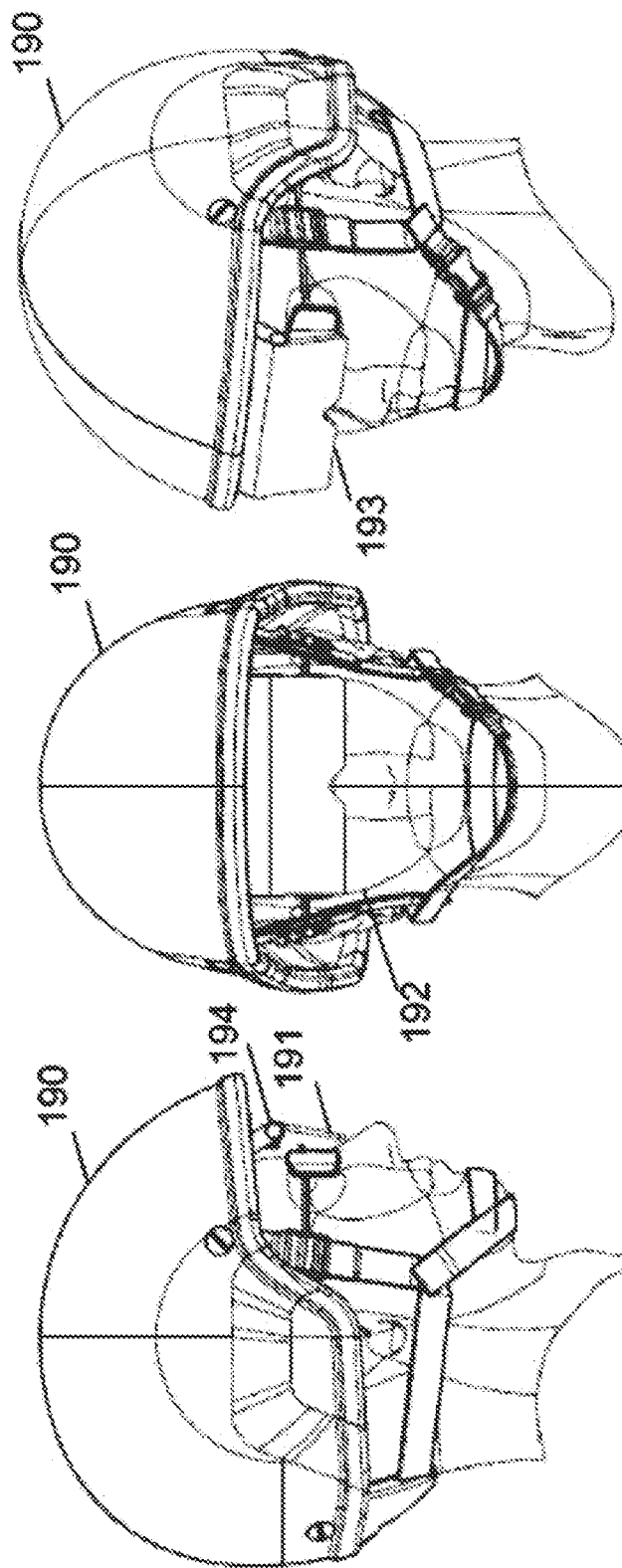

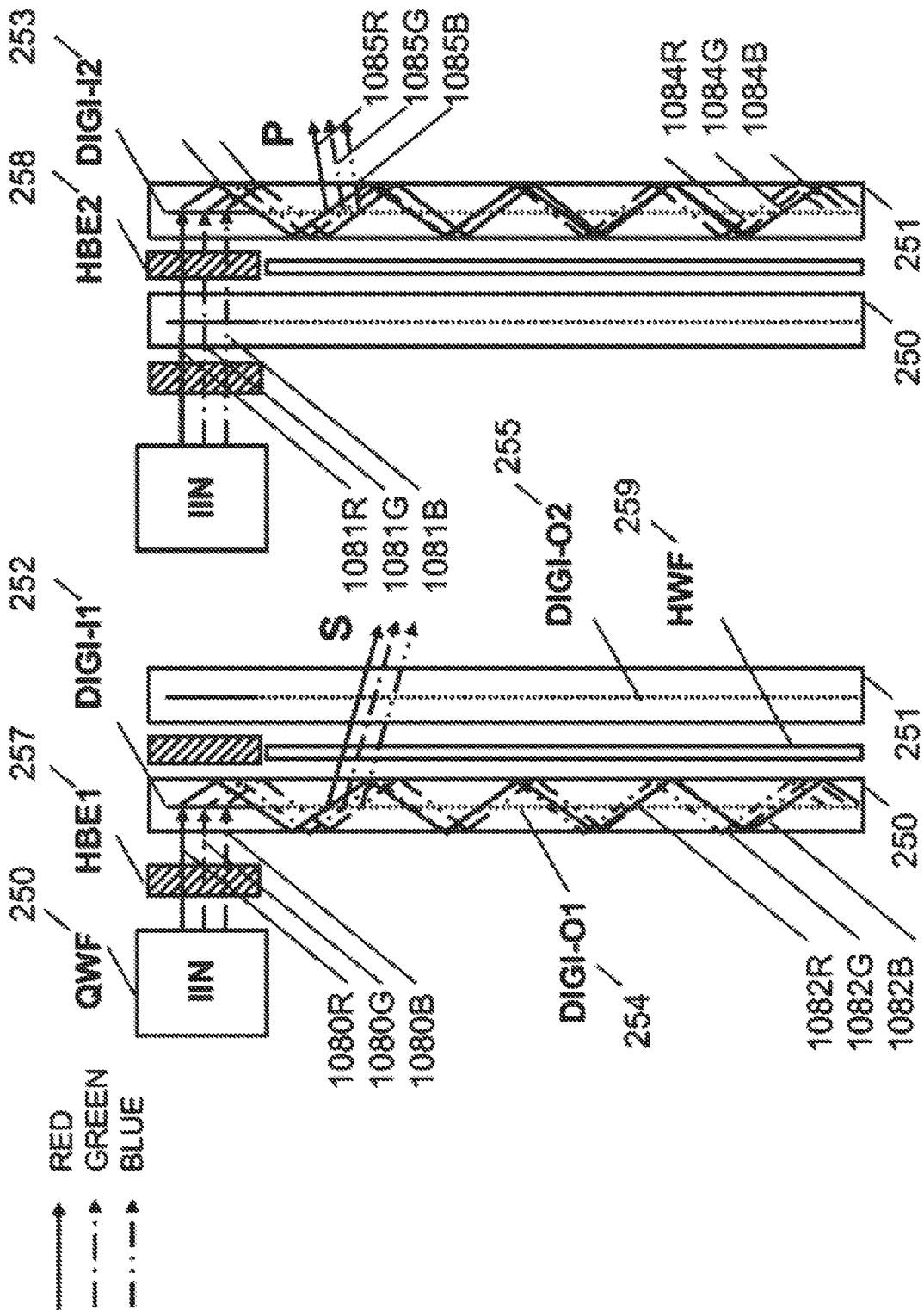

| LED Peak Wavelength (nm.) | SBG Wavelength Shift (nm.) |
|---|---|
| 634 | -5 |
| 639 | 0 |
| 644 | +5 |

| Waveguide | Gratings | Multiplexed |
|---|---|---|
| W | 1A, 3A | 1A & 3A |
| X | 1B, 3B | 1B & 3B |
| Y | 2A, 4A | 2A & 4A |
| Z | 2B, 4B | 2B & 4B |

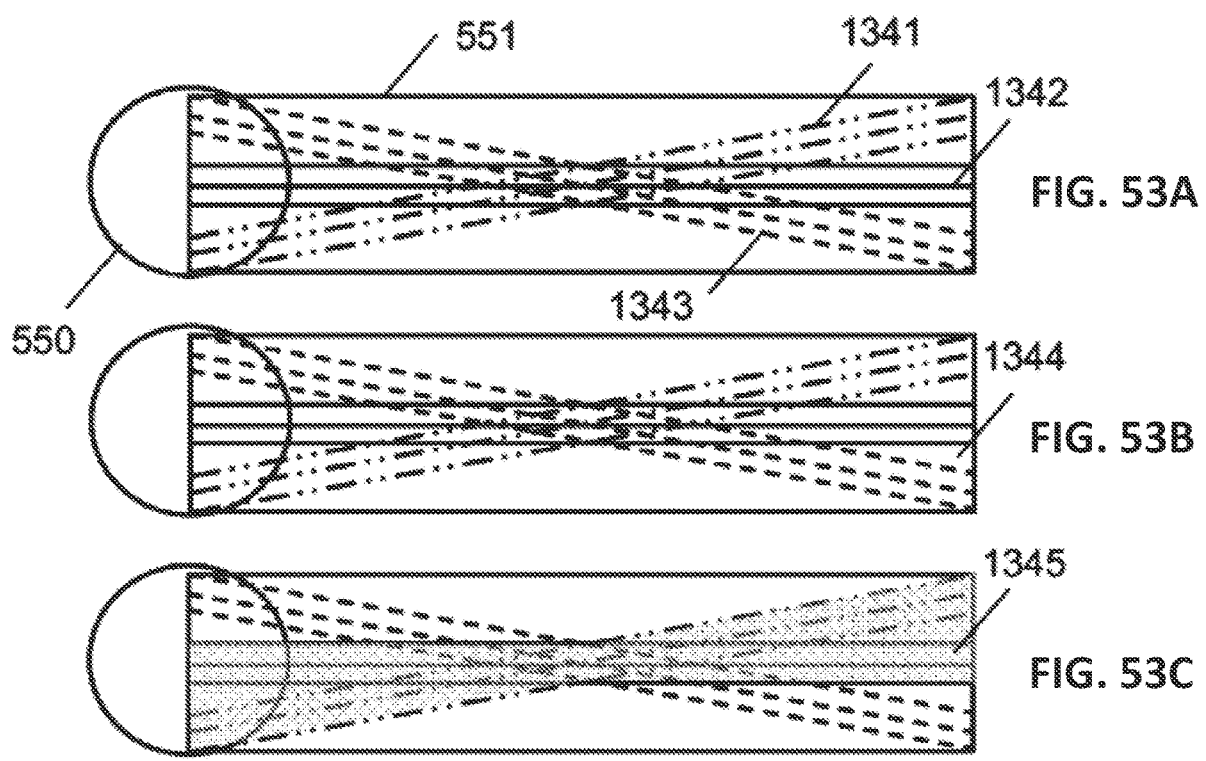

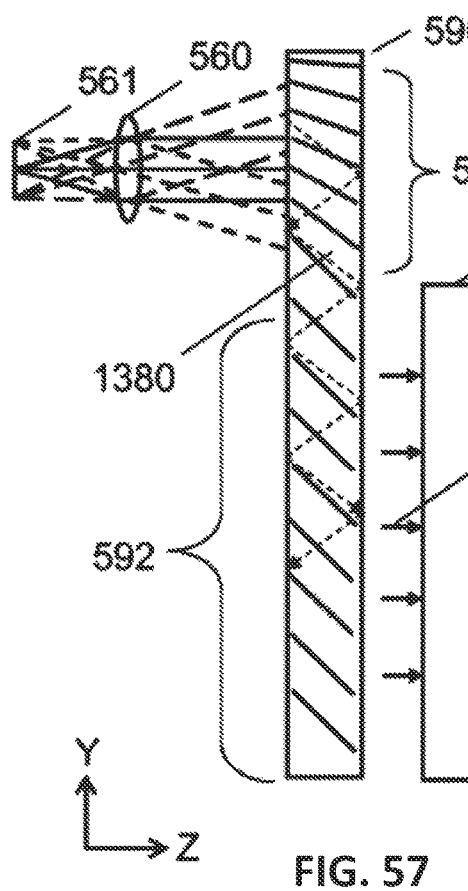
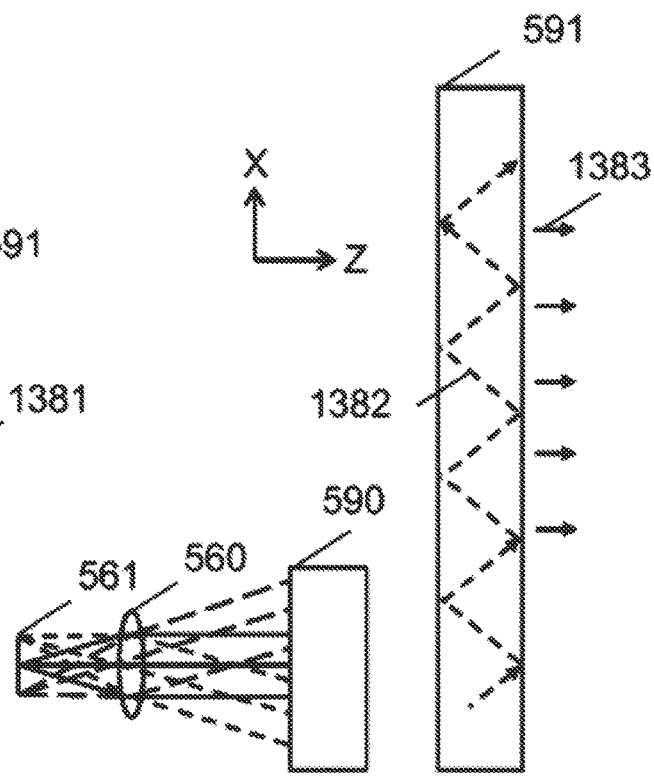
FIG. 57
FIG. 58
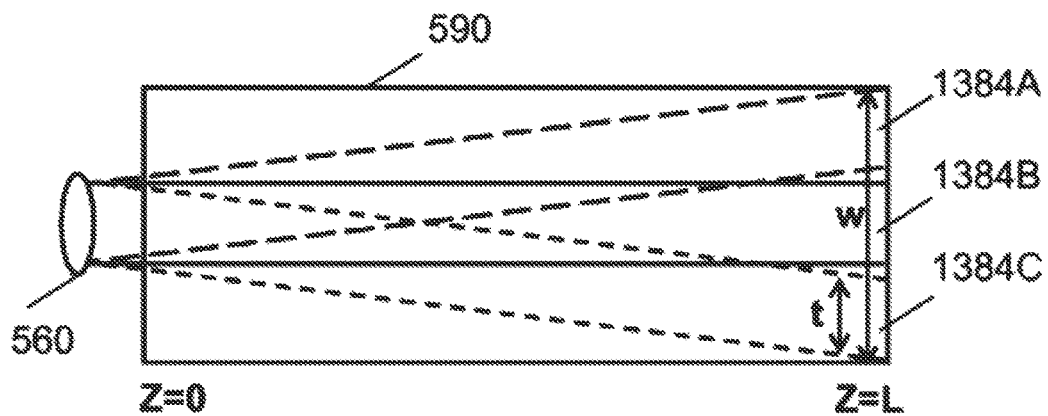
FIG. 59

In-line design showing the projected pupil

TRANSPARENT WAVEGUIDE DISPLAY

RELATED APPLICATIONS

This application is a continuation of U.S. patent application Ser. No. 17/153,588, filed Jan. 20, 2021, which is a continuation of U.S. patent application Ser. No. 15/943,590, filed Apr. 2, 2018, which is a continuation of U.S. patent application Ser. No. 14/044,676, filed Oct. 2, 2013, which is a continuation-in-part application of U.S. patent application Ser. No. 13/844,456, filed Mar. 15, 2013, which claims priority to U.S. Provisional Patent Application No. 61/796,632, filed Nov. 16, 2012, and 61/849,853, filed Feb. 4, 2013, the disclosures of which are hereby incorporated by reference in their entireties.

There is a need for a compact transparent data display capable of displaying image content ranging from symbols and alphanumeric arrays to high-resolution pixelated images. Examples of transparent displays include HMDs, HUDs, HDDs and others. One important factor in each case is that the display should be highly transparent and the displayed image content should be clearly visible when superimposed over a bright background scene. The display should provide full color with an enhanced color gamut for optimal data visibility and impact—although monochrome will suffice in many applications. One important factor for Helmet Mounted Displays is that the display should be easy to attach to standard helmets or replicas thereof designed for training. The eye relief and pupil should be big enough to avoid image loss during head movement even for demanding military and sports activities. The image generator should be compact, solid state and have low power consumption. In automotive applications the ergonomic demands are equally challenging and aesthetic considerations make yet further demands on the form factor of the display, which ideally should be capable of being hidden within a dashboard when not in use. There is a growing need for more compact, cheaper and more efficient designs in many other application areas. The inventors note the growing demand for HUDs in airliners and small aircraft. Car manufactures are also looking to provide HUDs and HDDs in their future models. The systems described herein may be applicable to a helmet mounted head worn display for use in Augmented Immersive Team Training (AITT), essentially a live simulated training system for observer training that augments or replaces indirect fires and aircraft sorties needed to certify or sustain observer skills.

The above goals are not achieved by current technology. Current designs only manage to deliver see-through, adequate pupils, eye relief and field of view and high brightness simultaneously at the expense of cumbersome form factors. In many helmet-mounted display designs, weight is distributed in the worst possible place, in front of the eye. The most common approach to providing see-through displays relies on reflective or diffractive visors illuminated by off axis light. Microdisplays, which provide high-resolution image generators in tiny flat panels, do not necessarily help with miniaturization because the need for very high magnifications inevitably results in large diameter optics. The ideal transparent display is one that: firstly, preserves situational awareness by offering a panoramic see-through view with high transparency; and secondly, provides high-resolution, wide-field-of-view imagery. Such a system should also be unobtrusive; that is, compact, light-weight, and comfortable, where comfort comes from having a generous exit pupil and eye motion box/exit pupil (>15 mm), adequate eye relief ($\geq$25 mm), ergonomic center of mass, focus at infinity, and compatibility with protective head gear. Current and future conventional refractive optics cannot satisfy this suite of demands. Other important discriminators include: full color capability, field of view, pixel resolution, see-throughness (transparency), luminance, dynamic grayscale and power consumption levels. Even after years of highly competitive development, head-mounted displays based on refractive optics exhibit limited fields of view and are not adequately compact, light-weight, or comfortable.

Displays based on waveguide technology substrate guided displays have demonstrated the capability of meeting many of these basic demands. The concept has been around for well over a decade. Of particular relevance is a U.S. Pat. No. 5,856,842 awarded to Kaiser Optical Systems Inc. in 1999 which teaches how light can be coupled into a waveguide by employing a diffractive element at the input and coupled out of the same waveguide by employing a second diffractive element at the output. According to U.S. Pat. No. 5,856,842, the light incident on the waveguide needs to be collimated in order to maintain its image content as it propagates along the waveguide. That is, the light must be collimated before it enters the waveguide. This can be accomplished in a variety of ways and is not a concern here. With this design approach, light leaving the waveguide will be naturally collimated, which is the condition needed to make the imagery appear focused at infinity. Light propagates along a waveguide only over a limited range of internal angles. Light propagating parallel to the surface will (by definition) travel along the waveguide without bouncing. Light not propagating parallel to the surface will travel along the waveguide bouncing back and forth between the surfaces, provided the angle of incidence with respect to the surface normal is greater than some critical angle. For BK-7 glass, this critical angle is approximately 42 degrees. This can be lowered slightly by using a reflective coating (but this unfortunately diminishes the see-through performance of the substrate) or by using a higher-index material. Regardless, the range of internal angles over which light will propagate along the waveguide does not vary significantly. Thus, for glass, the maximum range of internal angles is $\leq$50 degrees. This translates into a range of angles exiting the waveguide (i.e., angles in air) smaller than 40 degrees and generally loss, when other design factors are taken into account. To date, Substrate Guided Optics (SGO) technology has not gained wide-spread acceptance. This is largely due to the fact that waveguide optics can be used to expand the exit pupil but they cannot be used to expand the field of view or improve the digital resolution. That is, the underlying physics, which constrains the range of internal angles that can undergo TIR within the waveguide, limits the achievable field of view with waveguide optics to at most 40° and the achievable digital resolution to that of the associated imager. Nevertheless, the lure of a compact, light-weight HMD based on waveguide optics continues to inspire interest. One way to create a much larger field of view is to parse it into a set of smaller fields of view (each compatible with the optical limitations of the waveguide) and to time sequentially display them rapidly enough that the eye perceives them as a unified wide-angle display. One way to do this is with holographic elements that can be sequentially switched on and off very rapidly such as a Switchable Bragg Grating (SBG).

The optical design benefits of diffractive optical elements (DOEs) are well known including unique and efficient form factors and the ability to encode complex optical functions such as optical power and diffusion into thin layers. Bragg gratings (also commonly termed volume phase grating or holograms), which offer the highest diffraction efficiencies, have been widely used in devices such as Head Up Displays (HUDs). An important class of Bragg grating devices is known as a Switchable Bragg Grating (SBG). An SBG is a diffractive device formed by recording a volume phase grating, or hologram, in a polymer dispersed liquid crystal (PDLC) mixture. Typically, SBG devices are fabricated by first placing a thin film of a mixture of photopolymerizable monomers and liquid crystal material between parallel glass plates or substrates. Technique, for making and filling glass cells are well known in the liquid crystal display industry. One or both glass substrates support electrodes, typically transparent indium tin oxide films, for applying an electric field across the PDLC layer. Other types of transparent conductive coating may also be used. A volume phase grating is then recorded by illuminating the liquid material with two mutually coherent laser beams, which interfere to form the desired grating structure. During the recording process, the monomers polymerize and the holographic polymer-dispersed liquid crystals (HPDLC) mixture undergoes a phase separation, creating regions densely populated by liquid crystal micro-droplets, interspersed with regions of clear polymer. The alternating liquid crystal-rich and liquid crystal-depleted regions form the fringe planes of the grating. The resulting volume phase grating can exhibit very high diffraction efficiency, which may be controlled by the magnitude of the electric field applied across the PDLC layer. When an electric field is applied to the hologram (e.g., a suitably optimized hologram) via transparent electrodes, the natural orientation of the LC droplets is changed causing the refractive index modulation of the fringes to reduce and the hologram diffraction efficiency to drop to very low levels. Note that the diffraction efficiency of the device can be adjusted, by means of the applied voltage, over a continuous range from near 100% efficiency with no voltage applied to almost zero efficiency with a sufficiently high voltage applied. SBGs may be used to provide transmission or reflection gratings for free space applications. SBGs may be implemented as waveguide devices in which the HPDLC forms either the waveguide core or an evanescently coupled layer in proximity to the waveguide. In one particular configuration to be referred to here as Substrate Guided Optics (SGO), the parallel glass plates used to form the HPDLC cell provide a total internal reflection (TIR) light guiding structure. Light is "coupled" out of the SBG when the switchable grating diffracts the light at an angle beyond the TIR condition. SGOs are currently of interest in a range of display and sensor applications. Although much of the earlier work on HPDLC has been directed at reflection holograms, transmission devices are proving to be much more versatile as optical system building blocks.

Typically, the HPDLC used in SBGs comprise liquid crystal (LC), monomers, photoinitiator dyes, and coinitiators. The mixture frequently includes a surfactant. The patent and scientific literature contains many examples of material systems and processes that may be used to fabricate SBGs. Two fundamental patents are: U.S. Pat. No. 5,942,157 by Sutherland, and U.S. Pat. No. 5,751,452 by Tanaka et al. Both filings describe monomer and liquid crystal material combinations suitable for fabricating SBG devices.

One of the known attributes of transmission SBGs is that the LC molecules tend to align normal to the grating fringe planes. The effect of the LC molecule alignment is that transmission SBGs efficiently diffract P polarized light (i.e., light with the polarization vector in the plane of incidence), but have nearly zero diffraction efficiency for S polarized light (i.e., light with the polarization vector normal to the plane of incidence. Transmission SBGs may not be used at near-grazing incidence as the diffraction efficiency of any grating for P polarization falls to zero when the included angle between the incident and reflected light is small. A glass light guide in air will propagate light by total internal reflection if the internal incidence angle is greater than about 42 degrees. Thus the invention may be implemented using transmission SBGs if the internal incidence angles are in the range of 42 to about 70 degrees, in which case the light extracted from the light guide by the gratings will be predominantly p-polarized. Normally SBGs diffract when no voltage is applied and are switching into their optically passive state when a voltage is applied at other times. However, SBGs can be designed to operate in reverse mode such that they diffract when a voltage is applied and remain optically passive at all other times. Methods for fabricating reverse mode SBGs are disclosed in U.S. Provisional Patent Application No. 61/573,066, with filing date 24 Aug. 2012, by the present inventors entitled IMPROVEMENTS TO HOLOGRAPHIC POLYMER DISPERSED LIQUID CRYSTAL MATERIALS AND DEVICES. The same reference also discloses how SBGs may be fabricated using flexible plastic substrates to provide the benefits of improved ruggedness, reduced weight and safety in near eye applications.

In a prior filing the inventors have disclosed a waveguide (SGO) display that produces a large field of view by parsing it into a set of smaller fields of view (each compatible with the optical limitations of the waveguide) and to time sequentially display them so fast that the eye perceives them as a unified image. This process is sometimes referred to as field of view tiling. One way to do this is with holographic elements that can be sequentially switched on and off very rapidly. In an earlier PCT Application No.: PCT/GB2010/000835, with International Filing date 26 Apr. 2010, by the present inventors entitled COMPACT HOLOGRAPHIC EDGE ILLUMINATED EYEGLASS DISPLAY which is incorporated by reference herein in its entirety, the inventors have shown how multiple SBGs can be stacked together in the same waveguide and activated in rapid succession to time-sequentially tile a high-resolution, ultra-wide-field of view. Moreover, each subfield of view has the full digital resolution of the associated imager, allowing the formation of images that approach or even exceed the visual acuity limit of the human eye. While the tiling disclosed in this earlier filing overcomes the twin deficiencies of standard guided-wave architectures: limited field of view and limited pixel resolution, it has limitations when it is necessary to tile vertically and horizontally over large fields of view. For monochrome displays with modest FOV and expansion in only one direction, tiling can be accomplished by simply stacking the grating planes. However, when the field of view is expanded in both directions and color is added, the number of layers needed with this approach quickly becomes impractical. Each subfield of view is limited by the diffraction efficiency and angular bandwidth of the SBG. SBG grating devices typically have angular bandwidths in air of approximately ±5° (subject to material properties, index modulation beam geometry and thickness). The inventors have found that larger angles can be achieved in practice by using thinner SBGs, typically smaller than 3 microns. The increased bandwidth resulting from thinner SBGs will result in lower peak diffraction efficiency. Therefore it is usually necessary to increase the refractive index modulation. One way to avoid the need for separate RGB SBGs is to use multiplexed SBGs, in which the illumination is provided from opposite ends of the light guide as R and B/G illumination, compromising the color gamut some what. However, multiplexed gratings raise issues of fabrication complexity and cross talk.

An elegant solution to the tiling problem disclosed in United States Provisional Patent with a filing date of 25 Apr. 2012 by the present inventors entitled WIDE ANGLE COLOR HEAD MOUNTED DISPLAY, is to compress the stack by interlacing or tessellating the SBGs, as opposed to simply stacking the gratings. The display disclosed in Application No. 61/687,436 comprises two elements: firstly, a multilayer waveguide device comprises layers of tessellated SBG arrays referred to as the DigiLens and, secondly, an optical system for providing input image data from one or more microdisplays referred to as an Input Image Node (IIN) which, in addition to the microdisplays, contains laser illumination modules, collimation and relay optics waveguide links and grating devices. The same terminology will be retained for the purposes of describing the present invention. In very basic terms the DigiLens provides the eyepiece while the IIN provides a compact image generation module that will typically be located above or to the side of the DigiLens according to the ergonomic constraints of the application. In Application No. 61/687,436, all SBG elements sharing a given prescription are activated simultaneously such that they diffract collimated wave guided image light into a predetermined FOV tile. The number of images that can be tiled is only limited by the input display refresh rate. The SBG elements would typically be a few millimeters in size. While this approach achieves significant economy in terms of layers, it suffers from the problems of illumination ripple owing to tessellated grating pattern used in the DigiLens), scatter from electrodes, and general optical and electrical complexity.

The motivation behind the present disclosure is to reduce the need for tessellating the DigiLens. A further problem of the prior art is that coupling the IIN output image into the waveguides is very inefficient, thus resulting in thick waveguides. A more efficient way of sampling the input image field is needed overcome this problem.

SUMMARY

In view of the foregoing, the Inventors have recognized and appreciated the advantages of a display and more particularly to a transparent display that combines Substrate Guided Optics (SGO) and Switchable Bragg Gratings (SBGs).

Accordingly, provided in one aspect of some embodiments is an apparatus for displaying an image, the apparatus comprising: a first optical substrate comprising at least one waveguide layer configured to propagate light in a first direction, wherein the at least one waveguide layer of the first optical substrate comprises at least one grating lamina configured to extract the light from the first substrate along the first direction; and a second optical substrate comprising at least one waveguide layer configured to propagate the light it in a second direction, wherein the at least one waveguide layer of the second optical substrate comprises at least one grating lamina configured to extract light from the second substrate along the second direction. The at least one grating lamina of at least one of the first and second optical substrates may comprise an SBG in a passive mode.

In one embodiment, the at least one waveguide of at least one of the first and second optical substrates comprises a plurality of grating laminas, at least two of the plurality having the same surface grating frequency.

In one embodiment, the at least one grating lamina of at least one of the first and second optical substrates comprises non-switching Bragg grating recorded in a HPDLC material in at least one of forward and reverse modes. While the grating lamina may be an SBG in some instances, it need not be. Other types of suitable materials may also be used.

In one embodiment, the first and second optical substrates comprise an SBG in a passive mode.

In one embodiment, at least one of the first and second optical substrates comprises a plurality of waveguide layers, and each of the pluralities of waveguide layers is configured to propagate at least one of red, green, blue, blue/green mixed light, and one of a multiplicity of sub Field of Views (FOVs). In one instance, at least one of the first and second optical substrates comprises a plurality of waveguide layers, and when the plurality comprises three waveguide layers, the three waveguide layers are configured to propagate red, green, and blue light. Alternatively, when the plurality comprises two waveguide layers, the three waveguide layers are configured to propagate red light and mixed blue and green light.

In one embodiment, the at least one waveguide layer of the at least one of the first and second optical substrates comprises holograms with superimposed different color prescriptions.

In one embodiment, the at least one waveguide layer in at least one of the first and second optical substrates is lossy.

In one embodiment, the at least one grating lamina of at least one of the first and second optical substrates has a thickness that is less than about 3 microns. For example, the thickness may be less than about 2.5 microns, 2 microns, 1.5 microns, 1.2 microns, 1 micron, 0.5 micron, or even smaller.

In one embodiment, the at least one grating lamina of at least one of the first and second optical substrates has a varying thickness along the respective direction of light propagation.

In one embodiment, the apparatus described herein is a part of a device, wherein the device is a part of at least one of HMD, HUD, and HDD.

Provided in another aspect of some embodiments is an apparatus for displaying an image comprising: an input image node for providing image modulated light; a first optical substrate comprising at least one waveguide layer configured to propagate the modulated light in a first direction, wherein the at least one waveguide layer of the first optical substrate comprises at least one grating lamina configured to extract the modulated light from the first substrate along the first direction; a second optical substrate comprising at least one waveguide layer configured to propagate the modulated light in a second direction, wherein the at least one waveguide layer of the second optical substrate comprises at least one grating lamina configured to extract the modulated light from the second substrate along the second direction. The at least one grating lamina of the first optical substrate may be configured to couple the modulated light into the first substrate. The at least one grating lamina of the second optical substrate may be configured to couple the modulated light extracted from the first substrate into the second substrate. The at least one grating lamina of at least one of the first and second optical substrates may have a k-vector that varies along the respective direction of light propagation.

In one embodiment, the input image node comprises at least one of microdisplay, laser, and collimating optics. A microdisplay may be any type of microdisplay commonly used, including, for example, an emissive microdisplay. An emissive microdisplay may be an OLED, a QPI, and the like.

In one embodiment, the at least one grating lamina of at least one of the first and second optical substrates has a varying thickness. For example, the thickness may increase in a direction that is at least one of (i) parallel to a direction of the light propagation and (ii) orthogonal to the light propagation. Alternatively, the thickness may increase and then decrease (or vice versa) along the aforedescribed direction. The geometry is not limited.

In one embodiment, the at least one grating lamina of at least one of the first and second optical substrates comprises an SBG that is in a switching mode or in a passive mode.

In one embodiment, the at least one grating lamina in at least one of the first and second substrates comprises multiplex gratings of at least two different monochromatic prescriptions.

In one embodiment, the apparatus comprises multiple grating laminas having the same surface grating frequency but different k-vectors, wherein the multiple grating laminas are configured to divide the input image field of view into multiple angular intervals.

In one embodiment, at least one of the first and second optical substrates is curved in at least one orthogonal plane.

In one embodiment, the light extracted from the first and second optical substrates provides uniform illumination in any field of view direction.

Provided in another aspect of some embodiments is a method of displaying an image, the method comprising: coupling a modulated light from an input image into a first optical substrate; extracting the light from the first substrate; and coupling the extracted light from the first substrate into the second substrate. The first optical substrate may comprise at least one waveguide layer configured to propagate light in a first direction, wherein the at least one waveguide layer of the first optical substrate comprises at least one grating lamina configured to extract light from the first substrate along the first direction. The second optical substrate may comprise at least one waveguide layer configured to propagate light in a second direction, wherein the at least one waveguide layer of the second optical substrate comprises at least one grating lamina configured to extract light from the second substrate along the second direction. The at least one grating lamina of at least one of the first and second optical substrates may comprise an SBG in a passive mode.

In one embodiment, the method further comprises sampling the input image into a plurality of angular intervals, each of the plurality of angular intervals having an effective exit pupil that is a fraction of the size of the full pupil. In one stance, this surprisingly provides an advantage that the thickness of the first waveguide can be much smaller in comparison to pre-existing devices. Accordingly, the size and placement of the input gratings may be advantageously affected.

In one embodiment, the method further comprising improving the displaying of the image by modifying at least one of the following of the at least one grating lamina of at least one of the first and second optical substrates: grating thickness, refractive index modulation, k-vector roll profile, surface grating period, and hologram-substrate index difference.

Provided in another embodiment is an apparatus for displaying an image comprising: an input image node for providing image modulated light; first and second optical waveguiding substrates; a first optical means for coupling image modulated light into said first substrate; and a second optical means for coupling light extracted from the first substrate into the second substrate. The first optical substrate comprises at least one waveguiding layer that propagates light in a first direction. Each waveguiding layer contains at least one grating lamina operative to extract light from the first substrate, the light extraction taking place along the first direction. The second optical substrate comprises at least one waveguiding layer. Each waveguiding layer propagates light in a second direction. Each waveguiding layer contains at least one grating lamina operative to extract light for display from the second substrate, the light extraction taking place along the second direction. In one embodiment the first optical substrate selectively samples portions of the image modulated light, each portion being characterized by either angular field or spatial field.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

FIG. 2A is a schematic side elevation view showing a first operational state in one embodiment.

FIG. 2B is a schematic side elevation view showing a second operational state in one embodiment.

FIG. 2C is a schematic front elevation view of one embodiment.

FIG. 11 is a table provide diffraction efficiency characteristic of SBGs used in one embodiment.

FIG. 13A is a schematic three dimensional view showing a third operational state of one embodiment.

FIG. 13B is a schematic three dimensional view showing a fourth operational state of one embodiment.

FIG. 14A is an artist's impression of a first aspect of a HMD implement of the invention.

FIG. 14B is an artist's impression of a second aspect of a HMD implement of the invention.

FIG. 14C is an artist's impression of a third aspect of a HMD implement of the invention.

FIG. 19A is a schematic side elevation view showing a first operational state of one embodiment.

FIG. 19B is a schematic side elevation view showing a second operational state of one embodiment.

FIG. 53A is a schematic illustration of a first operational state of the HBE in one embodiment.

FIG. 53B is a schematic illustration of a second operational state of the HBE in one embodiment.

FIG. 53C is a schematic illustration of a third operational state of the HBE in one embodiment.

FIG. 57 shows a plan view showing the HBE 590 and the VBE 591 in one embodiment.

FIG. 58 shows a schematic side elevation view of the HBE and the VBE in one embodiment.

FIG. 59 shows an unfolded view of the HBE showing the beam propagation inside the waveguide in one embodiment.

DETAILED DESCRIPTION

Following below are more detailed descriptions of various concepts related to, and embodiments of, inventive a transparent display. It should be appreciated that various concepts introduced above and discussed in greater detail below may be implemented in any of numerous ways, as the disclosed concepts are not limited to any particular manner of implementation. Examples of specific implementations and applications are provided primarily for illustrative purposes.

The invention will now be further described by way of example only with reference to the accompanying drawings. It will apparent to those skilled in the art that the present invention may be practiced with some or all of the present invention as disclosed in the following description. For the purposes of explaining the invention well-known features of optical technology known to those skilled in the art of optical design and visual displays have been omitted or simplified in order not to obscure the basic principles of the invention. Unless otherwise stated the term "on-axis" in relation to a ray or a beam direction refers to propagation parallel to an axis normal to the surfaces of the optical components described in relation to the invention. In the following description the terms light, ray, beam and direction may be used interchangeably and in association with each other to indicate the direction of propagation of light energy along rectilinear trajectories. Parts of the following description will be presented using terminology commonly employed by those skilled in the art of optical design. It should also be noted that in the following description of the invention repeated usage of the phrase "in one embodiment" does not necessarily refer to the same embodiment.

Figures 1A, 1B:
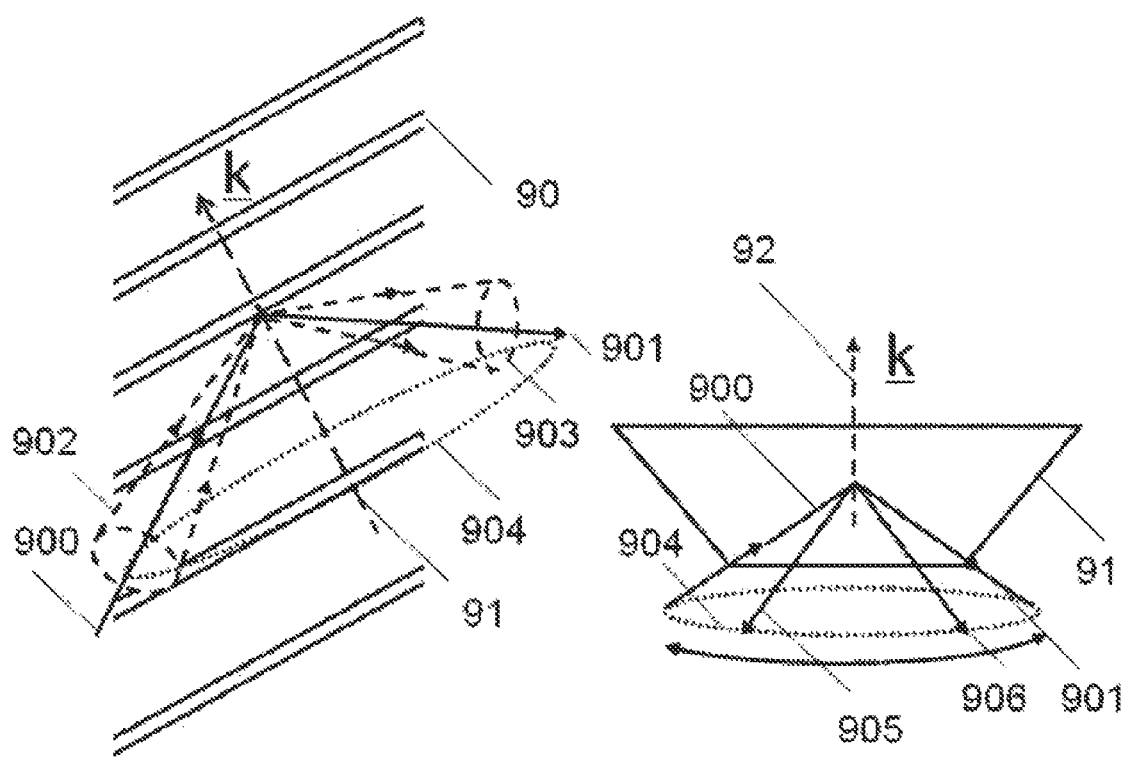
FIG. 1A is a schematic illustration of the optical geometry of a Bragg grating in the tangential plane.
FIG. 1B is a schematic illustration of the optical geometry of a Bragg grating in the sagittal plane.

The present invention is made possible by two fundamental properties of SBGs that have not been exploited to date firstly the relatively wide angular bandwidth of Bragg gratings in the plane orthogonal to the plane of diffraction and secondly the wide angular bandwidths resulting from making SBGs very thin. As a result, the constraints of limiting the size of FOV tiles to around 10°×10° does not apply in this instance, thereby leading to the tessellation approach discussed above. Fewer bigger tiles may now be used as a result. As is shown in the following description the needed FOV may be divided into two tiles with one DigiLens for each. Other numbers of tiles may also be possible. With respect to the optical design this new approach may minimize, if not eliminate entirely, the problem of illumination ripple. By making the DigiLens passive the problems of scatter firm electrodes and the not insignificant problems of wiring up large matrices of tessellation elements may be avoided. A passive SBG is no different from a switching SDBG in terms of its HPDLC formulation and recording process. The only difference is that no electrodes are needed. The diffracting properties of an SBG are normally specified in the tangential plane. In a grating design to diffract light in a plane, the tangential plane is the plane containing the incident and diffracted ray vectors and the grating vector. Following geometrical optical theory the plane orthogonal to the tangential plane is referred to as the sagittal plane. FIG. 1 illustrates the basic geometrical optics of a transmission SBG 90 containing slanted fringes such as 91 with grating vectors K aligned normal to the fringes. In Bragg gratings the a multiplicity of input and output rays will satisfy the Bragg condition provided the angles between the incident rays and the k-vector diffracted rays and the K-vector satisfy the Bragg equation. (Note that in practice, according to the Kogelnik theory of Bragg gratings, reasonably high diffraction will be obtain for off-Bragg angles having a small angular or wavelength deviation from the on-Bragg ray directions). In FIG. 1 these off-Bragg rays are illustrated by the ray cones 902,903 surrounding the on-Bragg (lying in the in-plane of the drawing) rays 900,901. As shown in FIG. 1A the locus of the on-Bragg ray-fringe intercepts is the circle 904. As shown in FIG. 1B rays 905,906 will also be on-Bragg. From consideration of the geometry of FIG. 1A it should be apartment that the Bragg diffraction angular bandwidth in the tangential plane is limited by the projections of the cones 902,903 onto the tangential plane. However, turning to FIG. 1B it should be apparent the effective angular bandwidth ("ABW") in the sagittal plane is much large is it is provided by the projection of cone 904 into the sagittal plane. In practice the sagittal bandwidth is mainly limited by the TIR angle constraints set by the waveguide. As a consequence of the large sagittal plane (i.e. horizontal plane for our purposes) angular bandwidth of Bragg gratings (typically around 4×the tangential bandwidth) current horizontal POV targets may be achieved for most display applications. In practice the bandwidth is only limited only by TIR angle range that can be sustained in the waveguide.

The inventors have already demonstrated that thin SBG gratings provide very wide angular bandwidths. An experimental SBG waveguide made using a low index modulation SBG RMLCM formulation has been shown to have a FWHM bandwidth of 21° with a 1 micron thick SBG layer.

In the following description many references to gratings are made, which should generally be understood to mean a Bragg grating and desirably a SBG. In many cases the SBGs will be operated in their normal switching mode as described above. However, in some cases SBGs will be used in a passive (e.g., completely passive) mode that is they will not be switchable. A non switching SBG is superior to a conventional passive hologram for the reason that the LC component of the HPDLC entangles much higher refractive index modulations than can be achieved in conventional holographic photopolymers. In certain embodiments of the invention the display will use a mixture of switching and non switching SBGs. The DigiLens output gratings will always be passive (non-switching), however. In one particular class of embodiments the displays will use all passive SBGs.

A transparent display according to the principles of the invention is illustrated schematically in FIG. 2. The DigiLens®, which provides a thin highly transparent eye piece (or HUD combiner) comprises two waveguides 101,102 for projecting the upper and lower halves of the field of view into the eye box (not shown). The waveguides each comprise non switchable SBG layers sandwiched between transparent substrates. Each waveguide has a switchable input grating and a non switching (passive) output grating labelled as DIGI-I1, DIGI-O1 and DIGI-I2, DIGI-O2 which are also indicated by the numerals 107,109 and 108,110 respectively. The waveguides are separated by a Half Wave Film (HWF) 106. (Note than in other embodiments to be described below the HWF will be disposed between the DIGI-I gratings and the DIGI-O gratings will be air (or low-index material) separated). An input image node (IIN) 103 which will be discussed later contains the microdisplay, laser module, beam expansion, collimation and relay optics. Schematic side elevation views are provided in FIGS. 2A-28 and a front elevation in FIG. 2C. FIGS. 2A-23 indicate the ray paths from the IIN through the DigiLens layers for the two switched states of the display. In the first state the grating DIGI-I1 is active and diffracts incident P-polarised light 1000 from the IIN 103 into the TIR path 1001. The TIR light is diffracted out of the waveguide along its light as indicated by 1002. The output grating is lossy, that is the diffraction efficiency is significantly less than unity such that a portion of the guide light gets diffracted out at each beam-grating interaction. The remaining light continues to undergo repeated TIR and diffraction until all of the light has been extracted from the waveguide. Uniform illumination across the output aperture is achieved by careful optimisation of diffraction efficiency (which depends on the refractive index modulation, grating thickness and other parameters). In general low diffraction efficiency is needed at the end of the waveguide nearest the IIN and the highest efficiency at the extreme end. Note that due to lossy extraction more peak energy (at 0°) is coupled into the DigiLens than at higher angles. Thus wider angle light is available for extraction at the end of a lossy grating. While the phrase "lossy grating" is employed in some embodiments, the phrase encompasses "lossy waveguide. Not to be bound by any theory, but this is because the "lossy" may be due to a combination not the grating efficiency and waveguiding action that may result in the uniform loss along the wavefuid.

This helps to homogenize peak and edge angular variations, particularly at the thicker end of the waveguide where the DE curve narrows. The diffracted light 1002 has its polarisation rotated through 90 degrees (becoming S-polarised) by the HWF and therefore passes the second waveguide 102 without deviation since SBGs have relative low DE for S-polarised light. Note that one DigiLens® layer emits S-polarized light while the other emits P-polarised light. However, each SBG layer is P-diffracting.

The Horizontal Beam Expander (HBE) indicated by the labels HBE1, HBE2 (also referenced by the numerals (104, 105) is a multilayer SBG waveguide using lossy high ABW gratings to expand the image light across a large pupil. In the above described embodiment the HBE runs along the top edge of the DigiLens. The HBE will be discussed in more detail later. Note that air gap between the front and rear DigiLens® elements. This may be replaced by a suitable low (near unity) index material. Since the output image light is a mixture of P and S polarized light it may be necessary to mount a quarter wave film on the output surface of the DigiLens for compatibility with Polaroid type eye ware which would otherwise result in the loss of half of the field of view.

Although it is referred to an HBE (and a VBE in an earlier filing) the terms horizontal and vertical in this context only have significance for the purposes of illustrating the invention. In practice the invention allows many different configurations of the comments and several different ways of implement the bean steering the beam expansion may be vertical or horizontal. With regard to the term waveguide it should be noted that these may actually comprise multiple isolated waveguides stacked in layers. Finally with regard to grating components it should be understood that each of the three grating components may contain multiple gratings stack in layers, disposed adjacently in a single layer or holographically multiplexed in a single layer. The basic building block of the displays discloses is a waveguide containing a grating, normally a Bragg grating. As will be seen the function can in certain embodiments be accomplished with as few as one waveguide layer. However the number of waveguide layers will depend on the size of field of view and the color needed. The grating may be switchable (SBG) or it may be passive, that is, non switchable. Although in principle, any type of Bragg grating may be used to provide a passive grating. There is a strong advantage in using an SBG with no electrodes. SBG material has the advantage that the mixture of LC and polymer affords higher refractive index modulation than that of conventional holographic polymer materials. In the preferred embodiment of the invention n the output waveguide component uses only non tessellated passive gratings. This minimizes the potential problems of scatter from electrodes and illumination non uniformities. T term grating is employed to refer to a Bragg grating unless otherwise specified. Passive grating means a grating that is not electrically switched.

Figure 3:
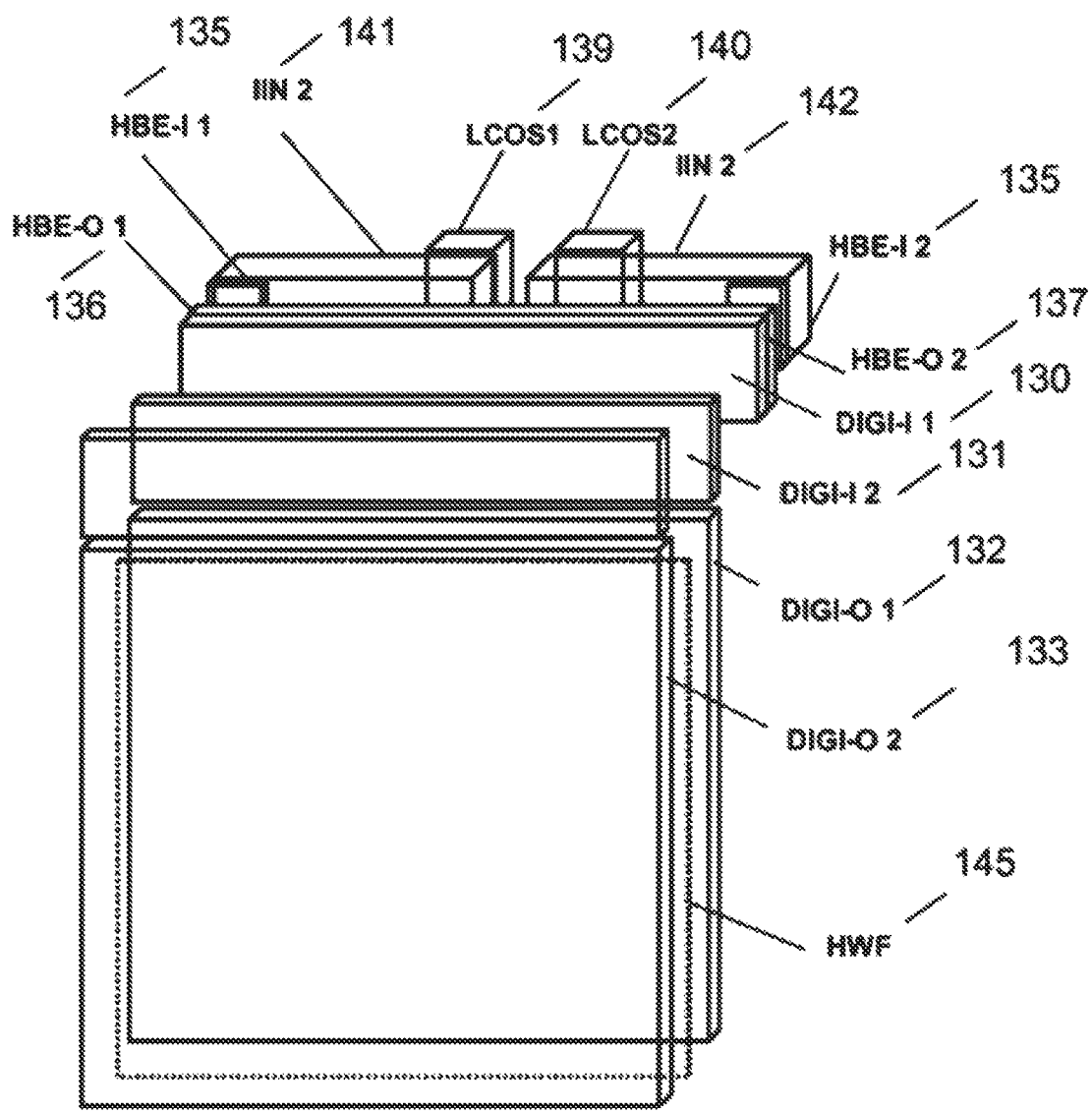
FIG. 3 is a schematic three dimensional view of the components of one embodiment.
Figure 4:
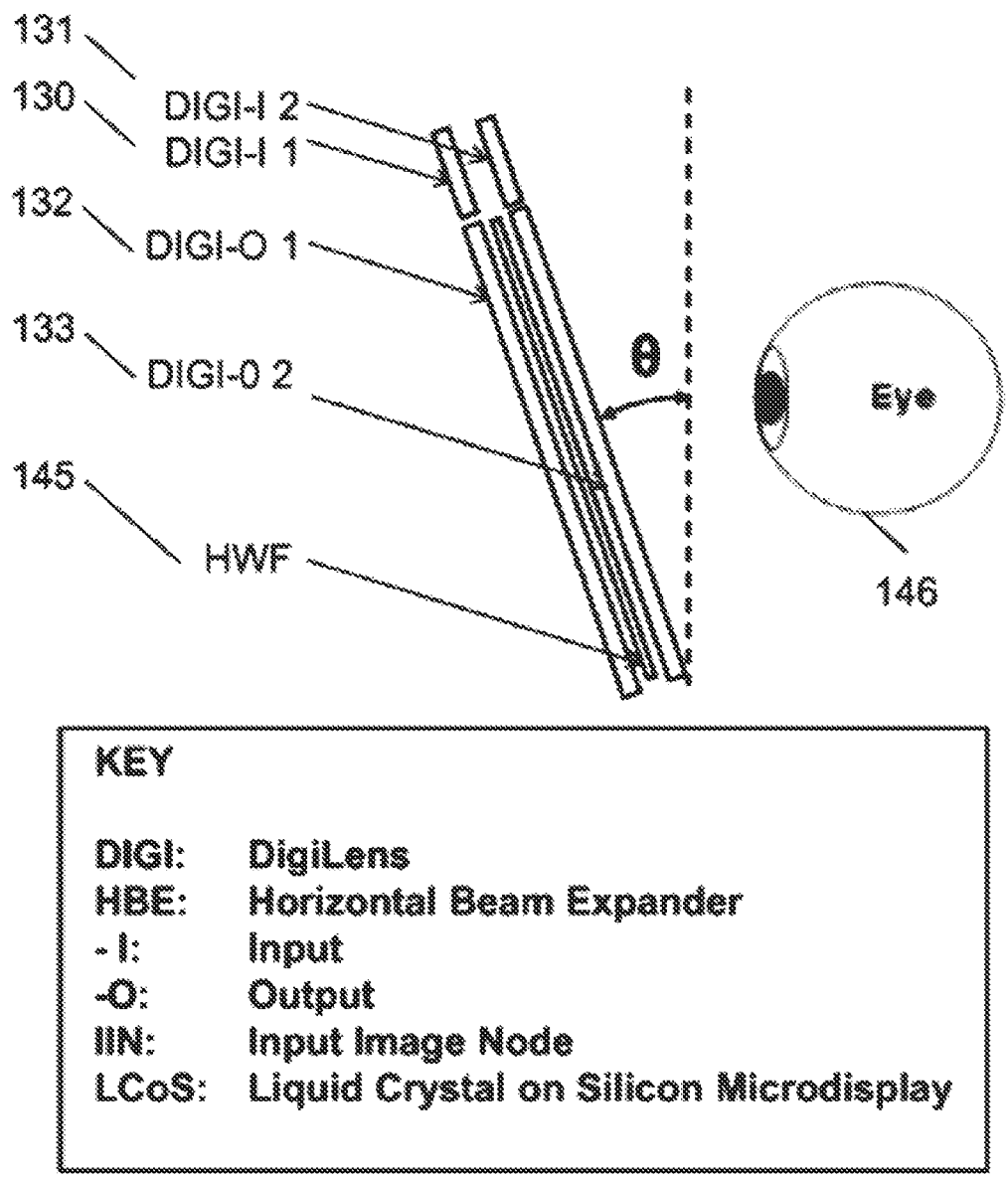
FIG. 4 is a schematic side elevation view of the components of one embodiment.

The display is shown in more detail in FIGS. 3-4. As a further aid to understanding how a collimated display (e.g., HMD) works, the initial focus is on the monochrome version of the design. Architecturally, the monochrome and color implementations of the HWD are very similar. As will be seen, an important difference is that the monochrome architecture can be achieved with fewer waveguiding layers and the possibility of using some passive grating components in the IIN and HBE, while a color implementation needs most components of the IIN and HBE to be switchable owing to the greater difficulty of managing the angular content of red, green and blue optical channels simultaneously. In both cases the DigiLens® remains a passive component.

While the present invention has many applications in the field of transparent visual displays it is first considered one particular application namely a Helmet Mounted Display for Augmented Reality (AR) application. The objective in this case is to meet the 52° H×30° V monocular field of view specification while achieving all of our original goals of high transparency, high resolution, ultra compact (thin) form factor, light weight and generous exit pupil. The target specifications are summarized in Table 1.

TABLE 1

Target HMD Specifications.
Helmet Mounted Display Specification

| Color | Monochrome - Extendable to Full Color |
|---|---|
| Total Field of View (FOV) | 85° H × 30° V |
| Monocular Field of View | 52° H × 30° V |
| Binocular Overlap | 20° |
| Eye Box | 25 mm. × 25 mm. |
| Eye Relief | 25 mm. |
| Resolution | 1080p |
| Form Factor | Ultra compact (thin) |
| DigiLens Active Area | 49.4 mm. × 33.4 mm. |
| Transparency | >95% |

The important components of the display are illustrated in the schematic three dimensional drawing of FIG. 3 and the side elevation view of FIG. 4. The display splits the FOV into upper and lower FOV tiles (referred to by the numerals 1, 2 in the drawing labelling) Note that the waveguide substrates of the DigiLens and HBE components have not been shown in order to simplify the explanation. The display comprises a DigiLens® comprised of two waveguide layers sandwiching a HWF is split into input and output components DIGI-I and DIGI-O. Note that wide sagittal angular bandwidth of SBGs removes the need to tile horizontally. Two Horizontal Beam Expanders HBE each comprising input gratings HBE-I and output gratings HBE-O are provided. The expanded output light from HBE-O1 enters the first DigiLens waveguide via DIGI-I11 and similarly for the second waveguide. Note that the above components are also referenced by numerals 130-145 in FIGS. 3-4. Two IIN are provided: one for the upper FOV and one for the lower FOV. The display panel in each IIN is a 1080p 5 mm×3 mm LCoS devices. One laser module may be used to illuminate both display panels. However, the invention does not place any restriction on the number of microdisplays to be used. A single microdisplay with a fast enough refresh rate and high enough resolution is likely to be sufficient for all but the most demanding display applications.

The DIGI-I is the most challenging grating in the system since it needs high input coupling efficiency at the projected pupil output point from the HBE-O, across the full angular range. The DIGI-I gratings switch, sampling the 52° horizontal×30° vertical field output by the HBE-O into the two DigiLens waveguides. It is desirable that this grating needs a high angular bandwidth and high DE. The DIGI-I comprises 2 SBGs each operating over 8.5° angular bandwidths overlapping to provide at least 15°. DIGI-I uses two 3 micron SBGs of DE approximately 87% with angular bandwidth of 8.5°-9.0° in air. The vertical field from −15° to 0° is switched by DIGI-I1 and the vertical field from 0° to +15° into DIGI-2. Hence DIGI-I1 provides 52° horizontal×−15° vertical and DIGI-I2 provides 52° horizontal×+15° vertical. All gratings in the DIGI-O are passive, and therefore can be thin gratings. One of each pair is for red and the other for blue/green. DIGI-O1 the rear grating providing the lower 15° and the front grating DIGI-O2 providing the upper 15° giving a total 52° horizontal×30° vertical. As shown in FIG. 4 the DigiLens® is tilted at a rake angle of ~8-10°. This is found from ray-tracing analysis to give better DE than simply projecting image light normally into the DigiLens®.

Figure 5:
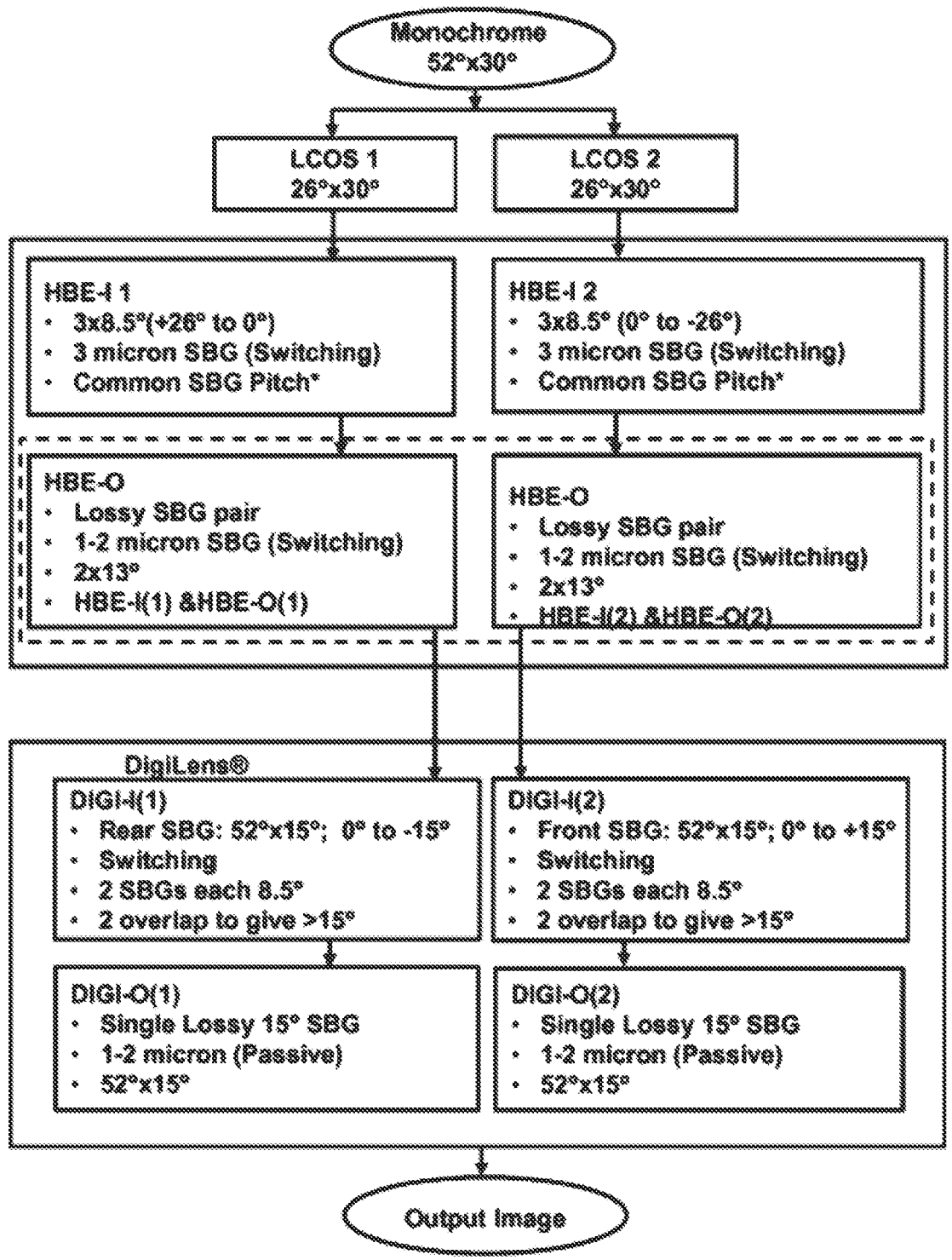
FIG. 5 is a flow chart representing the formation of an image in one embodiment.

A flow chart representing the interaction between the IIN, HBE and DigiLens in the image formation process is provided in FIG. 5. Since diffractive optical elements are dispersive it usually desirable where more than one grating is combined to configured them in a complementary fashion such that the dispersions introduced by the gratings cancel. Complementarily is normally achieved by designing the gratings to have the same grating pitch (that is, the spatial frequencies of the intersections of the Bragg gratings with the substrates are identical). It should be noted that HBE-I2 and HBE-O2 need to be complementary in the embodiment described above. However, HBE-I1 and HBE-I2 do not need to be complementary.

Figure 6:
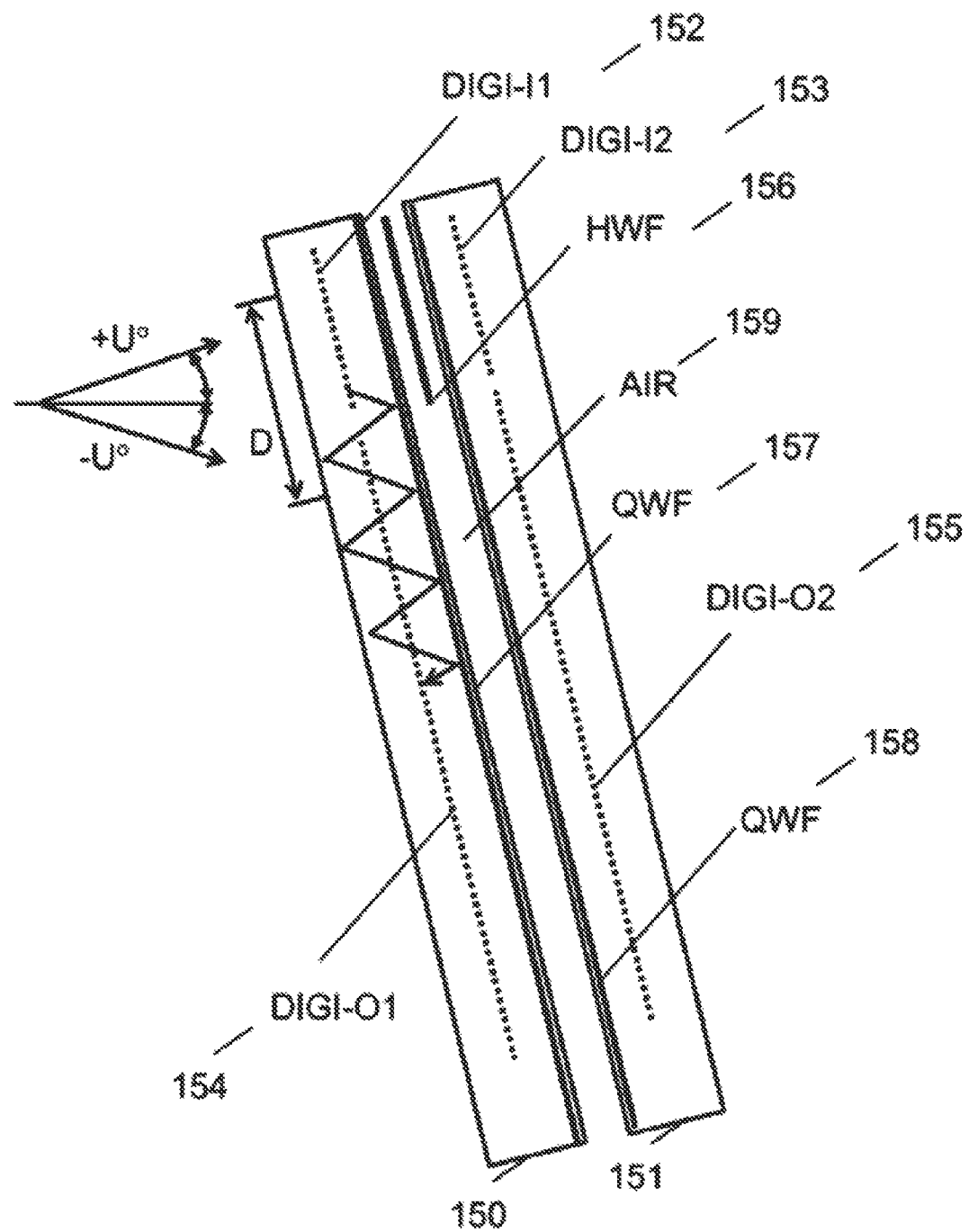
FIG. 6 is a schematic side elevation view of one embodiment.
Figure 7:
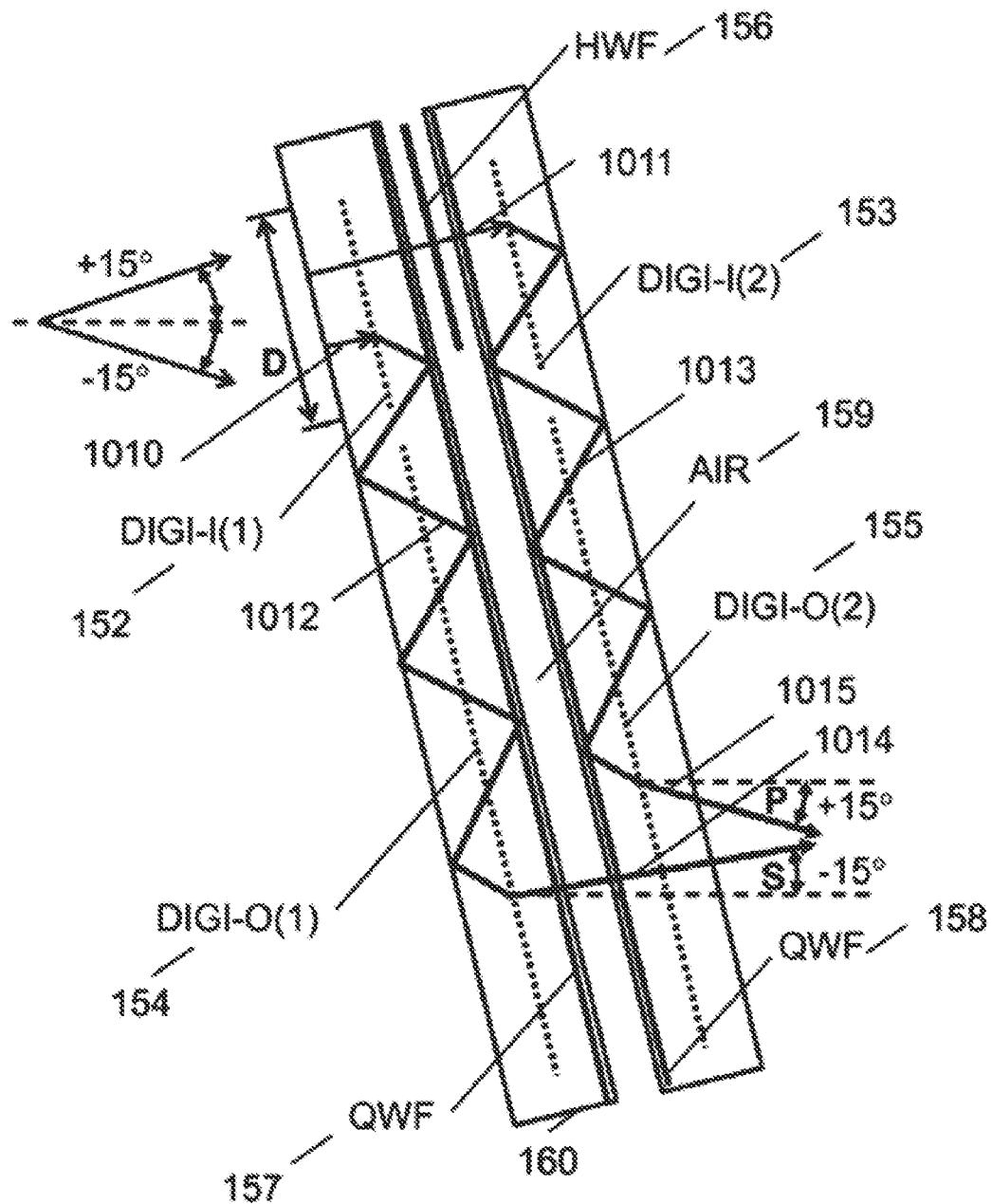
FIG. 7 is a schematic side elevation view of one embodiment.
Figure 8:
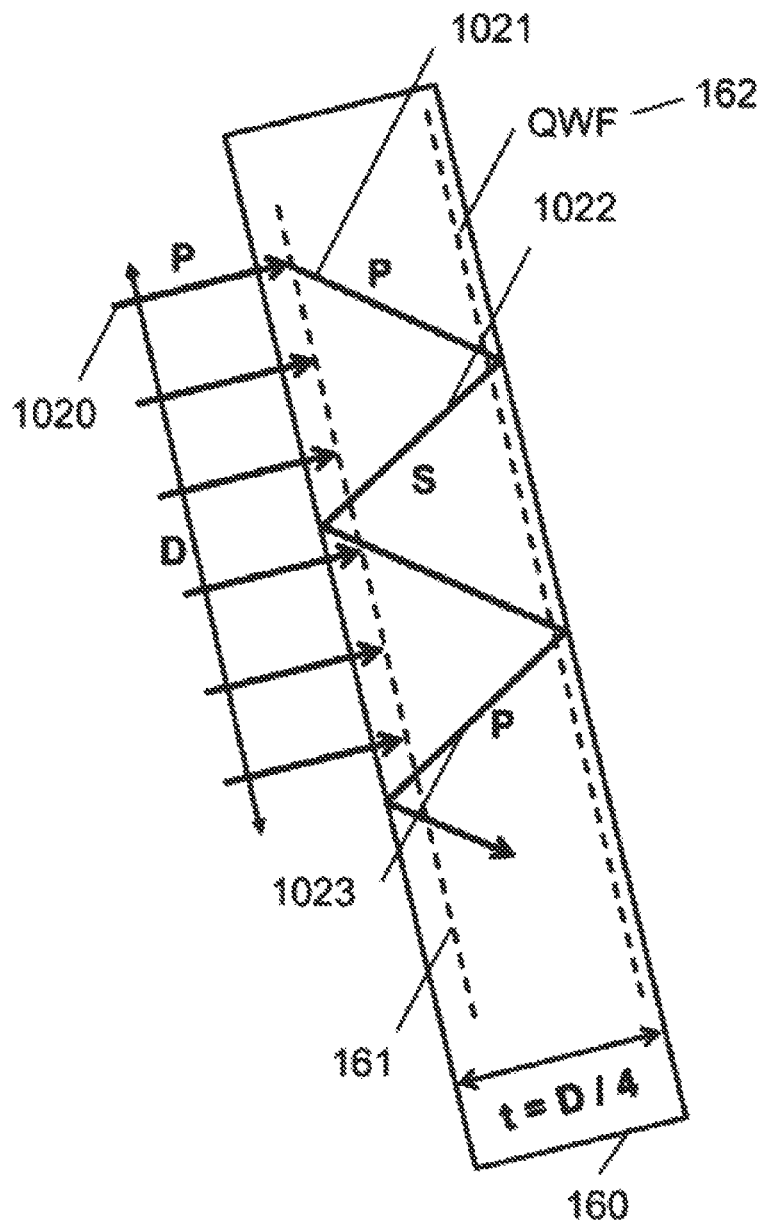
FIG. 8 is a schematic side elevation view of one embodiment.

In one embodiment shown in FIG. 6 the HWF between the DigiLens waveguides (overlapping the DIGI-O gratings) is removed and a HWD is inserted in the spaced between the DigiLens DIGI-I input gratings. The air gap left by the HWP may be filled with a low index nanoporous material. Quarter Wavelength Film (QWF) is applied to opposing faces 157, 158 of the front and rear waveguides with the effect that each TIR bounce results in a 90° polarization rotation allowing an approximately ×4 thinner grating and no interaction between the front and rear DigiLens®. FIG. 7 shows the propagation of upper and lower FOV light in the two DigiLens waveguides as represented by the ray paths 1010, 1012, 1014 in the first waveguide and 1011, 1013, 1015. The components shown in FIGS. 6-7 are also referenced by the numerals 150-159. FIG. 8 is a view of one of the DigiLens waveguides 160 illustrating the function of the QWF layer 162 in more detail. Input light from the HBE 1020 is deflected into the TIR path 1021 by the DIGI-I grating 161. Rays such as 1022 incident on the QWF coating have their polarization converted from P to circularly polarized light of a first sense. On reflection the polarization remains circular but in an opposing sense such that after passing through the QWF the second time the light emerges as S-polarized 1023. The S light is not diffracted by the SBG and therefore continues to undergo TIR. On the next reflection at the QWF film the light is converted to P polarized light 1024, which is off-Bragg with respect to DIGI-I and so does nor get diffracted back towards the HBE. The TIR of the beam then proceeds onto the DIGI-O grating where it is progressively extracted from the waveguide as described above.

Figure 9:
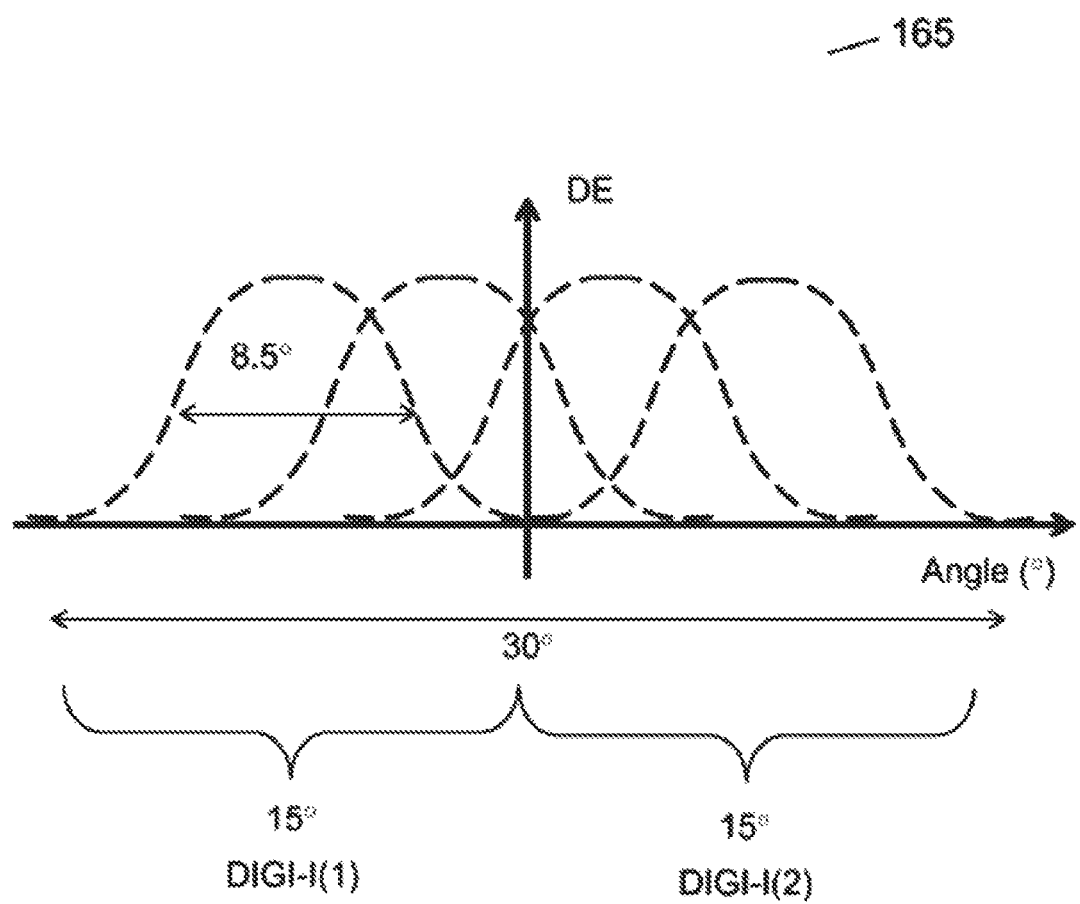
FIG. 9 is a chart showing the diffraction efficiency characteristics of one embodiment.

In one embodiment the two stacked DIGI-I gratings may be provided in each DigiLens waveguide to increase the angular bandwidth. FIG. 9 is a chart showing the effect of combining the individual DE angular bandwidths to create upper and lower FOVs of approximately 15 degrees (FWHM) in air using two gratings of angular bandwidth 8.5 degrees (FWHM) in air. In other embodiments of the invention the DigiLens could comprised more layers, for example 3 DIGI-I layers combined with 2 DIGI-I layers in each waveguide. Note that DIGI-I and DIGI-O gratings do no need to be co-planar. However in fabrication terms it is advantageous to limit the number of grating, substrate, electrode layers and low index material layers to minimize material costs and process steps.

Figure 10:
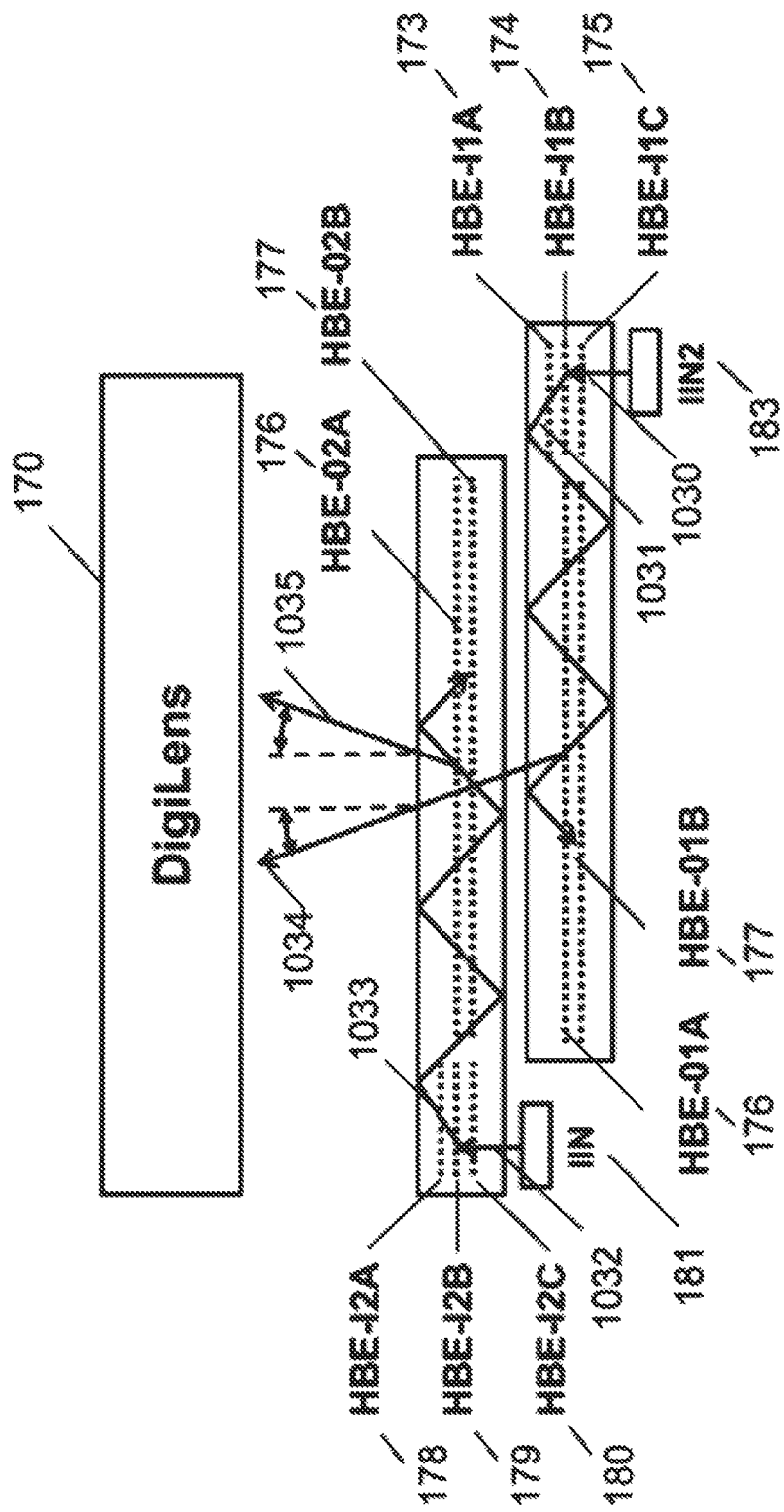
FIG. 10 is a schematic cross sectional view of a horizontal beam expander in one embodiment.

FIG. 10 shows the HBEs in cross section in relation to the DigiLens 170. There are two HBE waveguides 171, 172 each comprising 3 stacked gratings (HBE-I1A-C and HBE-I2A-C) and two lossy output gratings (HBE-O1A-B and HBE-O2A-B). The HBEs are coupled to the DigiLens 170. Two IINs (IIN1 and IIN2) are provided. The paths of light from the IIN to the DigiLens are indicated by rays 1030, 1031,1034 and 1032,1033,1035. Note the components are also reference by numerals 170-183. Each LCoS provides a FOV of 26°H×30° V. Each HBE-I contains three gratings that operate on P-polarized light in 8.5° ABW steps to provide the 26° half horizontal field. The 30° field will couple in its entirety owing to the much increased ABW in the sagittal plane. The HBE-I SBGs are thick gratings allowing high DE but narrow ABW. There are two HBE-I implementation options to be considered: firstly, 26° H sampled by 2 HBE-I gratings, which gives lower DE, higher duty cycle SBGs; or, secondly, 26° H sampled by 3 HBE-I gratings, giving 3×8.5° angular bandwidth. This gives higher DE, lower duty cycle SBGs. The gratings are typically of thickness 1-2 micron and lossy such that light is extracted with uniform efficiency along the length of the grating. Lossy gratings have large ABW and low DE. The gratings of HBE-I1 and HBE-I2 do not need to be complementary (i.e. chromatic dispersion correcting). Gratings of HBE-I1 and HBE-O1 (as well as HBE-I2 and HBE-O2) need to be complementary. In a passive HBE-I a single unswitched grating needs to be thin to achieve higher angular bandwidth. With current materials roughly 30% peak DE with current materials, and 60% is within the range of expected material improvements may be achieved. In the case of a switching HBE-I a thicker grating of reduced angular bandwidth may be afforded. With current material refractive index modulations, the angular bandwidth approximately halves and DE doubles as grating thickness is increased from 1.4 to 2.0 micron. Typical DE and ABW characteristics of thin and thick SBGs are summarized in the table in FIG. 11.

Figures 12A, 12B:
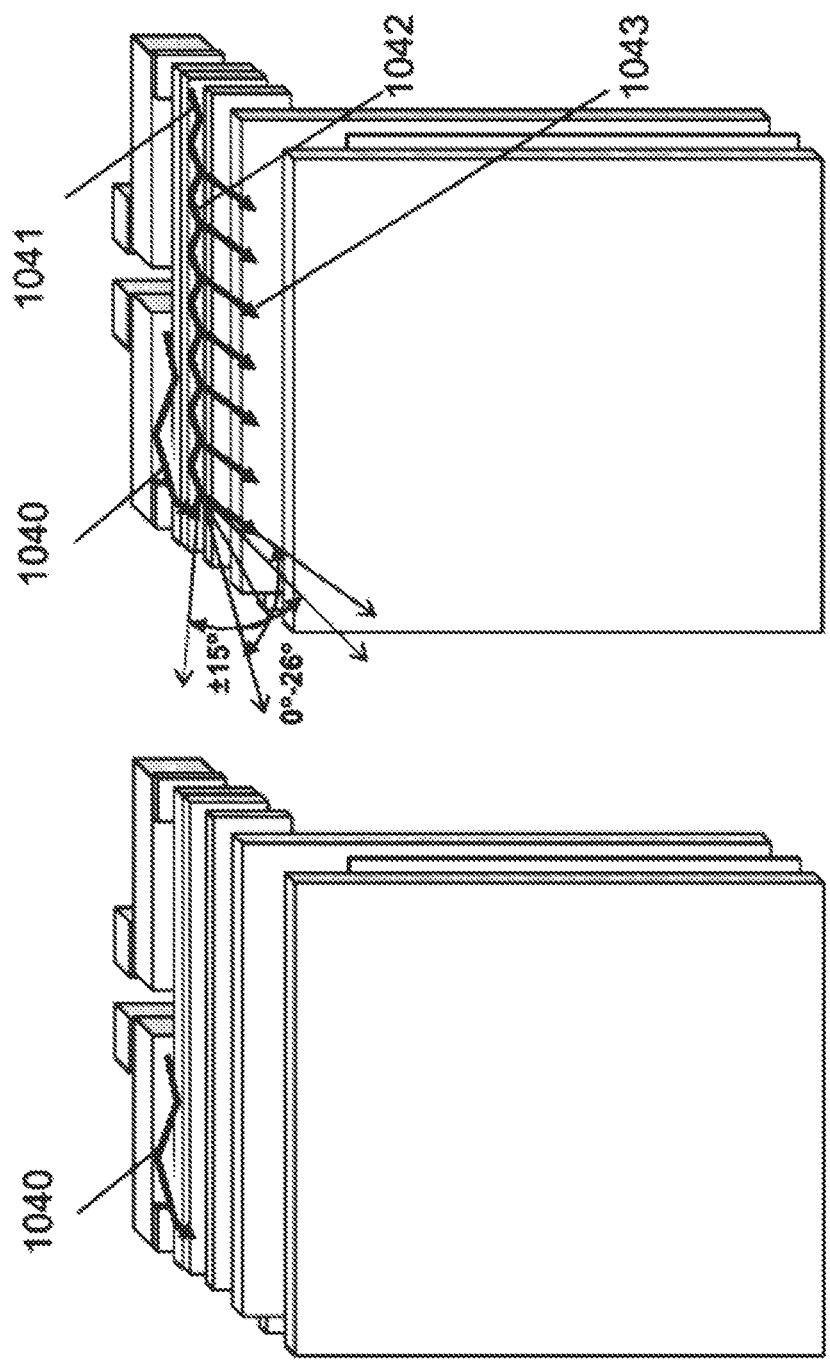
FIG. 12A is a schematic three dimensional view showing a first operational state of one embodiment.
FIG. 12B is a schematic three dimensional view showing a second operational state of one embodiment.

FIGS. 12-13 provide a walkthrough of the process of projecting image light from one (left eye) IIN into the eyebox providing ±5° vertical and 0-26° horizontal field of view. The components are identical to the ones shown in FIGS. 3-4. FIG. 12A illustrates the path 1040 from the LCoS panel to the output of the IIN. FIG. 12B shows the light path through the HBE indicating the TIR path 1042 within one of the waveguides and light extraction 1043 along its length. FIG. 13A shows the coupling of light 1044 extracted from the HBE into the DigiLens (vie DIGI-I). Finally FIG. 13B shows the downward propagation of light 1045 in the DigiLens with the output put image light 1046 providing the lower half of the FOV.

FIGS. 14A-14C shows three 3D views of the above invention implemented in a HMD 190. Threes difference perspectives 191-193 are shown. The display module includes a horizontal hinge 194. In the deployed position, the user will have full panoramic see-through with high transparency. In the stowed position, the user will be free to use range finders, night-vision systems, or other such equipment. As indicated in the drawings spectacle wearers are accommodated and the design will can also accommodate the use of Polaroid eyewear. In an alternative embodiment a simple display retracting mechanism allows the display to be hidden in a compact module under the brow of the helmet when not in use. In yet another embodiment of the invention the display when not in use is retracted vertically into the helmet. The currently preferred implementation uses a custom helmet is linked to a belt pack via an umbilical fiber-optic communications link and power supply connection. In training applications the belt pack would be wirelessly linked to the training center.

Figure 15:
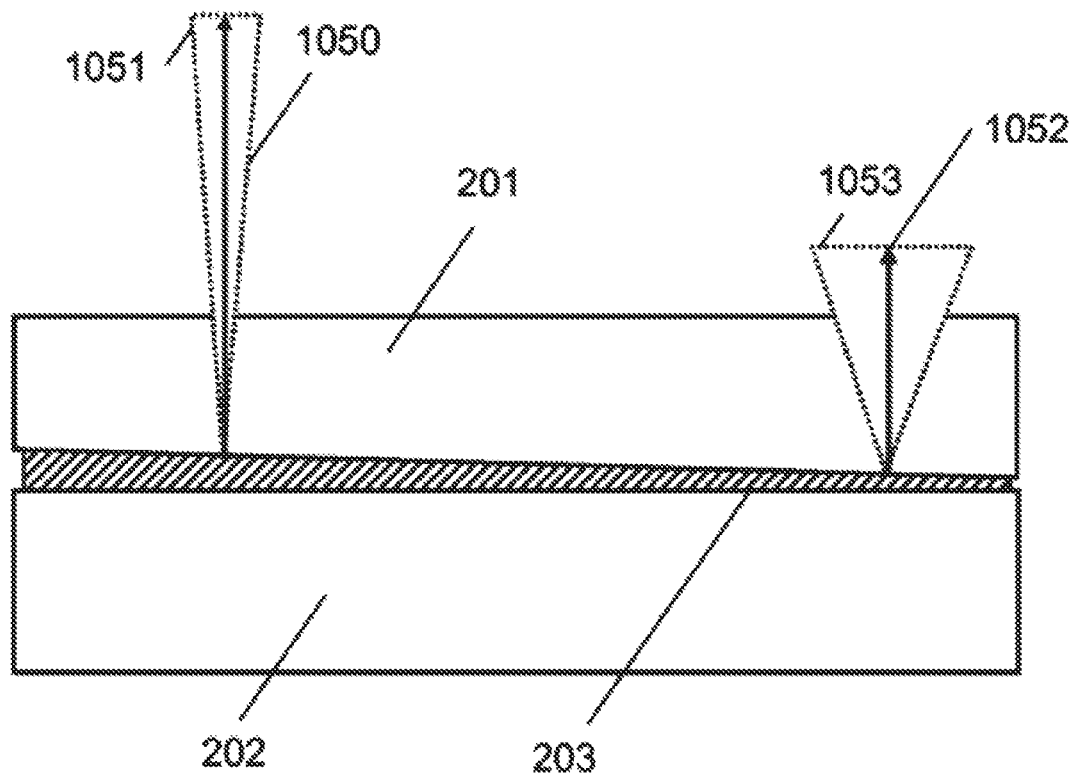
FIG. 15 is a schematic cross section view of a wedged profile waveguide grating used in one embodiment.

An important feature of the optical design is that the gratings used in one or both of the HBE and DigiLens will have a tailored DE profile achieved by varying the thickness of the gratings along the propagation direction as shown in FIG. 15. The wedge grating 203 is provided by including a small wedge in of the grating substrates 201. The second substrate 202 may be rectangular. Other ways of achieving wedge gratings will be apparent to those skilled in the art of optics. Where two stacked gratings are used the DE profiles of the two gratings would run in opposing directions. Desirably, the grating thickness may vary from 1.0-1.2 micron up to 2.8-3.0 micron, the lower thickness producing the largest bandwidth 1052 and lowest DE for a given output direction 1053. The higher thickness produces the lowest bandwidth 1050 and higher DE for a given output direction 1051. Note that the wedge angles are tiny and will have minimal impact on illumination uniformity and image quality.

A refractive index of approximately 1.585 is needed to support waveguide TIR angles typically not greater than 70° with respect to the TIR surface. In general it is desirable to limit the use of higher angles within the waveguide to avoid low numbers of interactions of the ray bundle with outcoupling grating which creates gaps in the waveguide. Higher angles (approximately 85°) can lead to image fold over where gratings are designed to provide very high angular bandwidth. Polycarbonates will enable a TIR angles up to approximately 72°.

Figure 16:
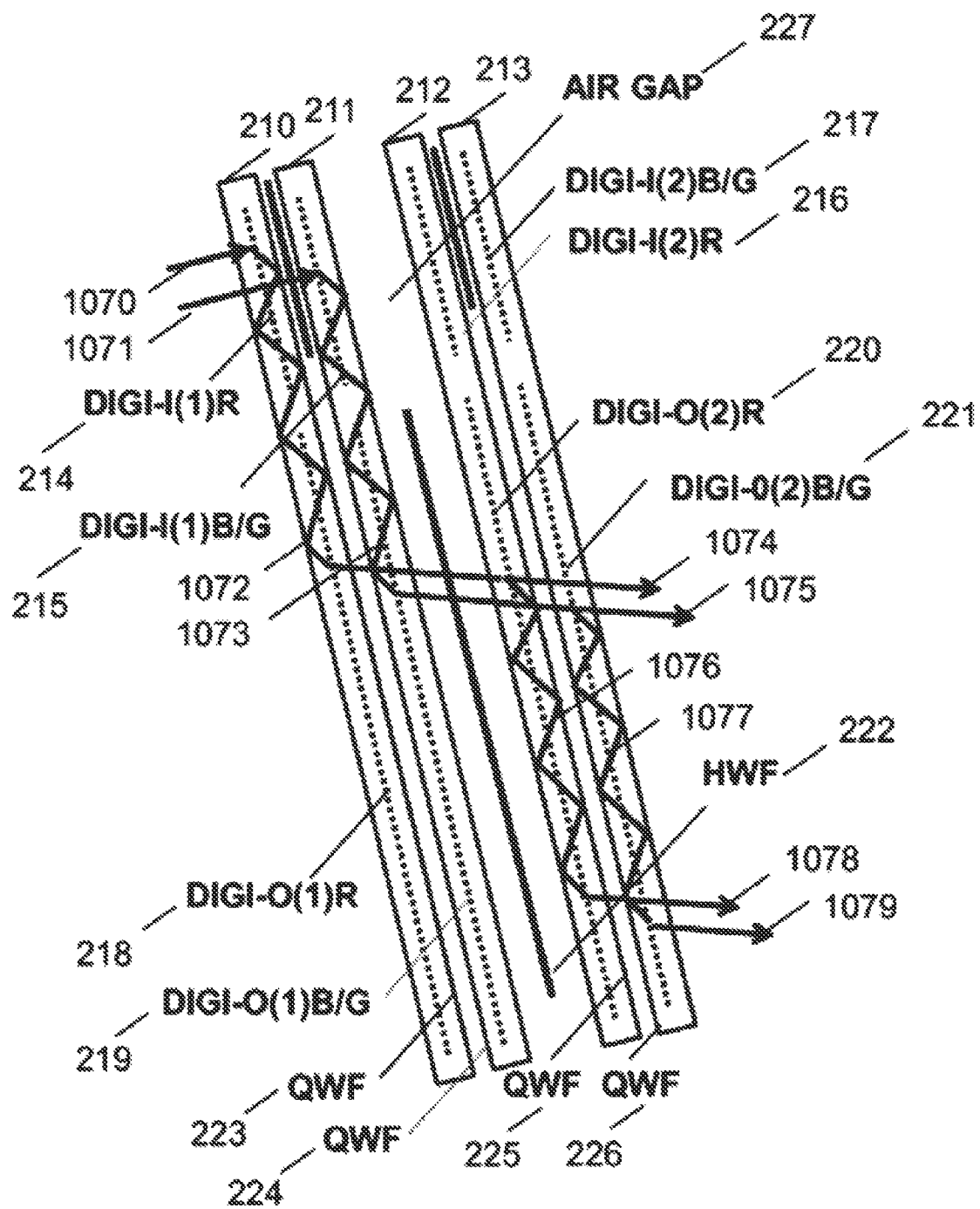
FIG. 16 is a schematic side elevation view of one embodiment.

While a monochrome display can be achieved with mostly passive grating components, in the case of a full color display HBE-I and HBE-O and the DigiLens input gratings DIGI-I are active with the only passive grating being the output grating DIGI-O. A further difference between monochrome and color HMDs is that in the latter separate waveguides are used in the HBE and to cover red and blue/green wavelengths. FIG. 16 illustrates a DigiLens used in an embodiment of the invention for color displays comprising two DigiLens doublet waveguides. Each doublet waveguide is similar to the embodiments of FIGS. 6-7. However, in each DigiLens waveguide doublet one of the waveguides operates on red light and the second one operates on a mixture of blue and green light. Note also that in each doublet, the red grating is placed after the B/G grating, i.e. closer to the eye. The input and output DigiLens gratings are represented by DIGI-IR and DIGI-OR in the case of the red doublet and DIGI-IB/G and DIGI-OB/G in the case of the blue/green doublet. The output grating portions of the waveguides sandwich a HWF. The input grating portions may sandwich an air gap as illustrated or preferably a low index material. QWFs are applied to the opposing face of the waveguides in each doublet. The components are also labelled by numerals 210-227. The red and blue/green waveguides are optically separated by air or a low index (near unity) material such as mesoporous silica which are not illustrated but will be described later. A HWF converts the rear output from P to S. As SBG gratings are P-sensitive, this prevents re-coupling of the light with gratings in front. The rake angle (8-10°) affords higher angular bandwidth, and lower chromatic dispersion enabling shared blue/green gratings. In most cases color imaging may need high index substrates and special coatings for enhancing the blue TIR angular range.

The ray paths for red light are indicated by the rays 1071, 1073, 1075. The ray paths for the blue/green light are indicated by 1070, 1072, 1074. As shown in the drawing, some of this light will couple into the second waveguide doublet, that is the light paths indicated by 1076, 1078 (blue/green) and 1077, 1079 (red). The risk of light diffracted from the rear waveguide interacting with the light on the layer above and coupling back into the waveguide is avoided in our HMD design. The red and blue/green gratings do not cross-couple due to the polarization management. Each color channel can cross couple with itself. However, this is mitigated by TIR occurring in the forward grating and reciprocity ensuring that outcoupling is in the correct output direction. The offset of the front and rear out-coupled beams due the staggered path helps to homogenize the output light. The effects on throughput of light getting re-coupled back into the DigiLens® are negligibly small. To provide immunity from grating coupling a HWP can be introduced at one layer in the passive waveguide stack. A half wave retarder layer converts the rear output light from P to S. The SBG gratings are P-sensitive only, and so this prevents re-coupling of the light with gratings in front. A 10° rake angle alleviates demands on grating prescription affording higher ABW and lower chromatic dispersion. This enables shared blue/green gratings. However, in most embodiments of the invention red may need a separate grating.

Figure 17:
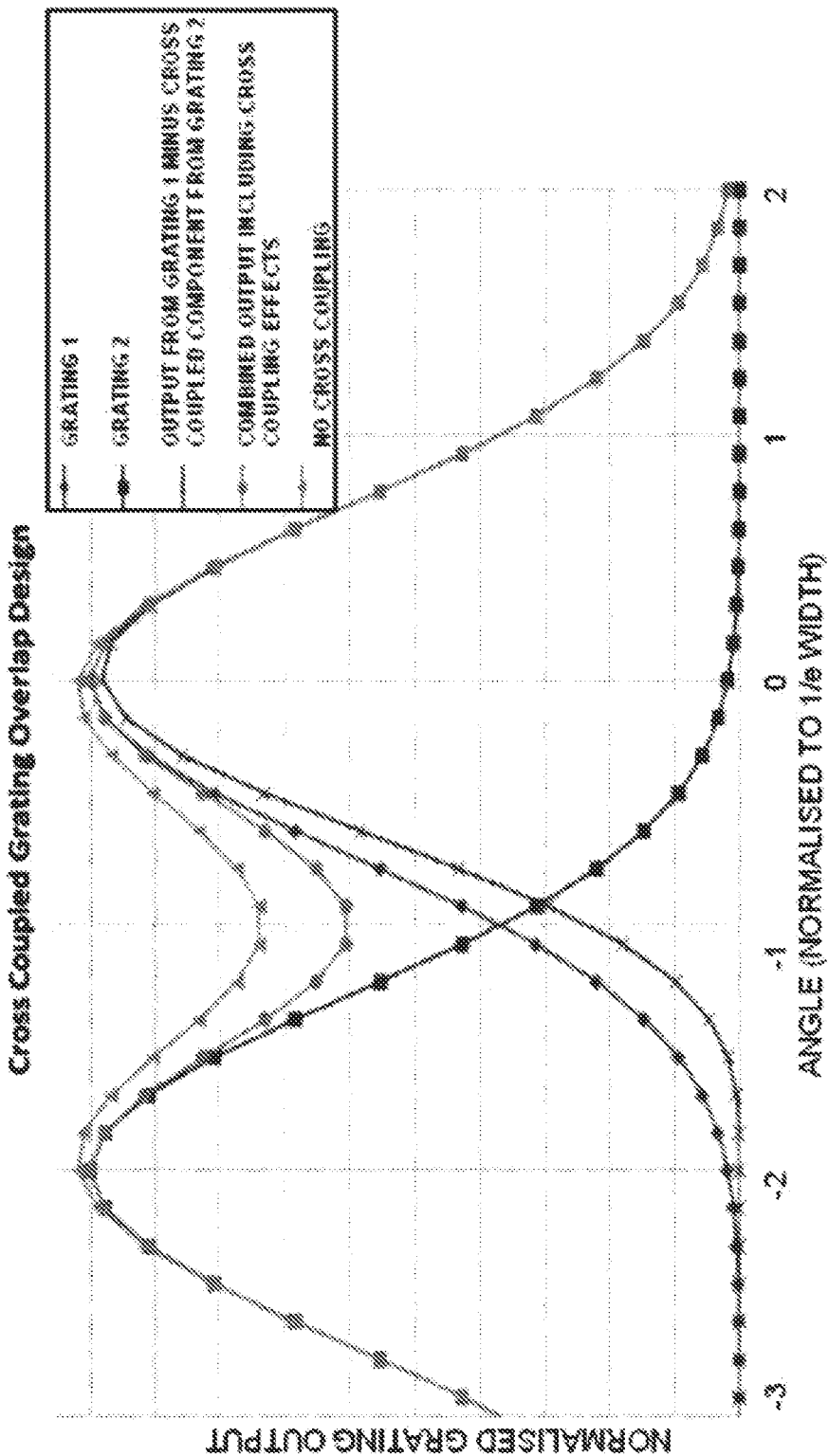
FIG. 17 is chart shown diffraction efficiency versus angle characteristics of one embodiment.

The graph in FIG. 17 shows calculated DE versus angles for each grating and the output DE for the layer minus the light coupled back into TIR. It is assumed that this light is not coupled back out again. The composite output of the gratings including the single interaction coupling loss is represented by circular symbols. Note that with the 2*1/e offset of the peak DE profile, and accounting for re-coupling effects of the rear grating into the front grating, that an effective doubling in the FWHM of a single grating is achieved. With secondary output coupling of re-coupled light, the profile will approach the lossless composite grating profile (triangular symbols).

Figure 18:
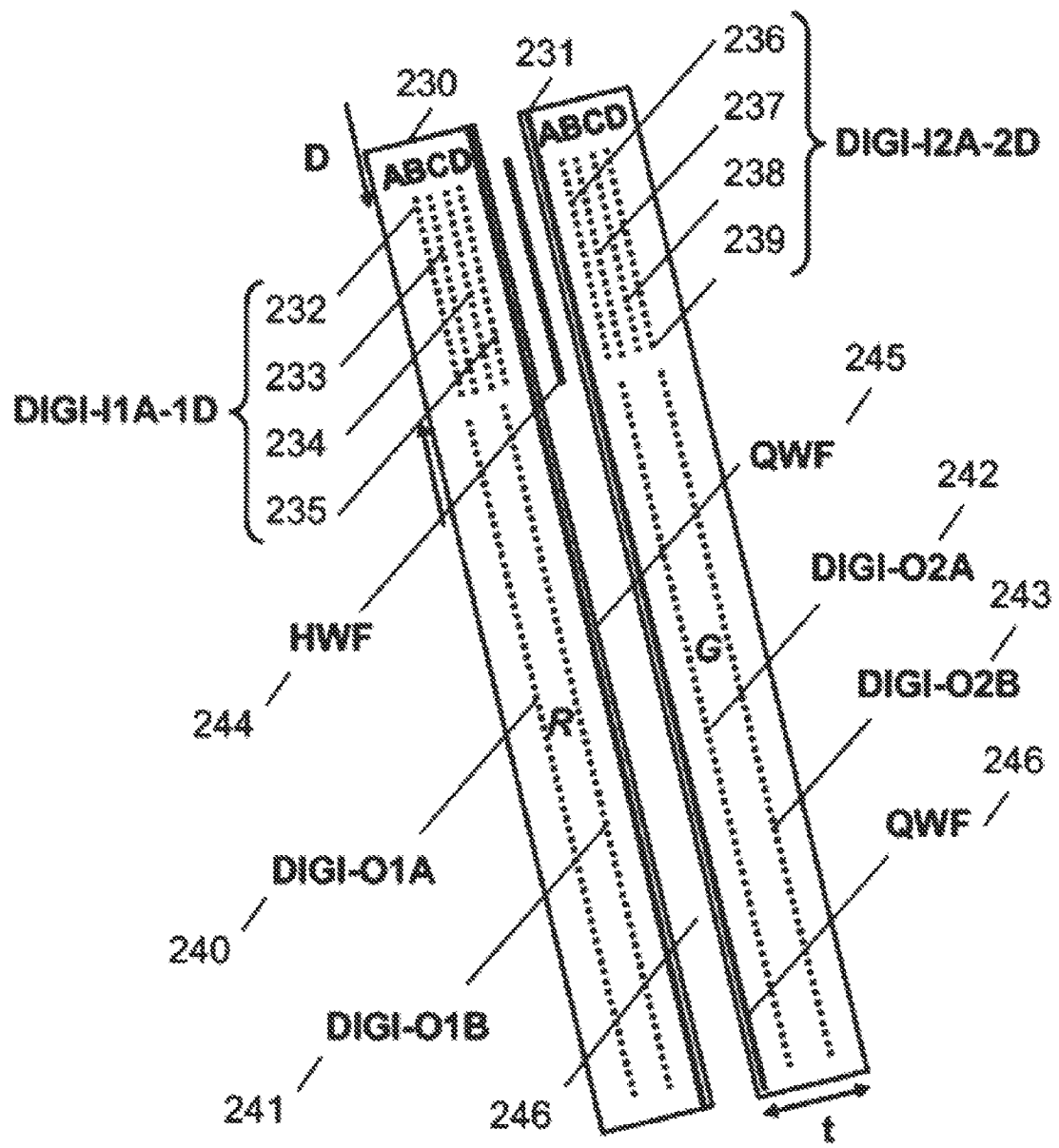
FIG. 18 is a schematic side elevation view of one embodiment.

FIG. 18 shows a further embodiment of the invention for color image. The DigiLens comprises two separated monochromatic doublet waveguides 230,231 one for red (DIGI-O1A,DIGI-O1B and one for blue-green (DIGI-O2A,DIGI-O2B). The input SBGs (DIGI1A-1D, DIGI2A-2D) comprising a stack of four monochromatic red or blue-green gratings indicated by A-D. In all other respects the architecture is very similar to the embodiment of FIG. 16. HWF and QWFs are disposed as in FIG. 16. The doublets may be air separated or may sandwich a low index material. The components are also labelled by the numerals 230-246.

In an alternative embodiment of the invention similar to the one of FIG. 1 shown in FIG. 19 each DigiLens waveguide comprises a single SBG layer that supports red, green and blue TIR. Starring from the IIN the paths are illustrated by numerals 1080,1082,1083 in the first waveguide 250 and 1081,1084,1085 in the second waveguide 251. In each case the red, green and blue paths are referenced by characters R,G,B. The system components are labelled as in FIG. 1 and additionally referenced in FIG. 19 by the numerals 250-258. It should be appreciated that such an implementation of the invention needs careful control of the TIR angles to ensure that the diffracted light paths for the three colors overlap exactly. The inventors have found that additional coatings may be needed to improve the reflection at the blue end of the spectrum. In an alternative embodiment of FIG. 19 the DIGI-O gratings could be implements as a multiplexed grating.

Figure 20A:
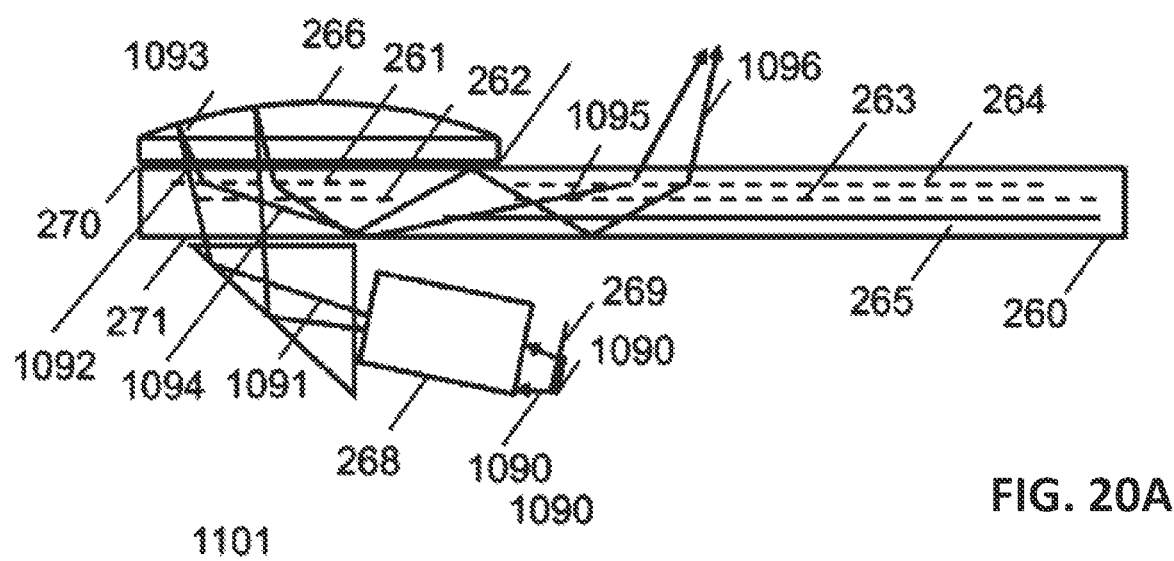
FIG. 20A is a schematic side elevation view showing a first operational state of an input image node in one embodiment.
Figure 20B:
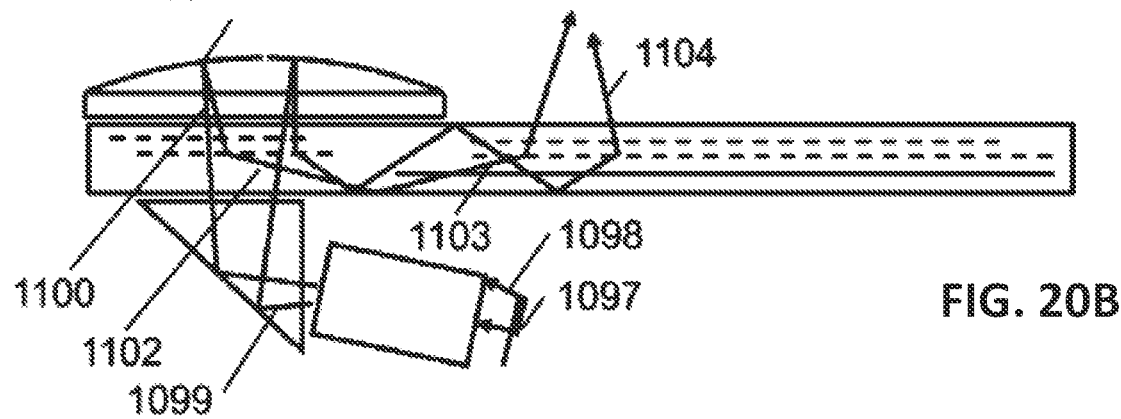
FIG. 20B is a schematic side elevation view showing a second operational state of an input image node in one embodiment.

An IIN design for use with the invention is shown in FIG. 20. The optical system comprises a waveguide 260 containing overlapping SBG elements 261,262, overlapping SBG elements 263,264 a beam splitter layer 265 a curved mirror 266, a prism 267 a projection lens 268 and a microdisplay panel 269. An air gap 270 between the curved mirror elements is provided to enable TIR of reflected light. As illustrated separate SBG input and output gratings are provided for each image field. The waveguide 260 and the gratings 263,264 in particular may provide the input gratings of the HBE. Alternatively it waveguide 260 may be used to couple light into the input grating of the HBE. It should be appreciated that the IIN may be configured in many different ways to satisfy constraints of space, cost and optical efficiency. In the embodiment illustrated half the image from the microdisplay is imaged into the HBE sequentially. Hence in FIG. 20A the gratings 261, 264 are in their active state and the others are inactive. Light from the image portion 1090 is projected into the path 1091 by the projection lens. It is then reflected by the prism into the ray path 1092 reflected at the curved mirror 266 into the path 1093 diffractive by grating 261 into the path 1094 undergoes TIR into the path 1095 and is diffracted out of the waveguide by the grating 264. FIG. 208 illustrate the light paths from the second image field 1097. Now the gratings 261,264 are switched to their inactive states and gratings 262,263 are switched to their active states. The path from the microdisplays is indicated by 1098-1104. In some embodiments of the invention the IIN couples the entire image into the HBE. However, splitting the input image into two enables more optimal coupling of the image into waveguide paths. In the following discussion also consider monochrome implementations only. Initial design calculation by the inventors show that the fundamental approach is sound, meeting near diffraction limited performance across the field in a compact design form while including features such as projected pupil (20 mm, ahead of the grating coupling point), telecentricity, a re-imaged stop and less than 2% geometric distortion. The design wavelength for the monochrome implementation of the IIN is 532 nm. The resolution is matched to 1080p LCoS vertically (LCoS pixel pitch: 2.8 micron; Nyquist frequency 178 lp/mm.). Note that a feature of the design is that IIN/HBE can be located on the same side of the waveguide as the eye without compromising grating reciprocity.

Light is projected from each LCoS at F/2.8(focal length: 5.65 mm.) to provide a FOV of 26° H×30° V. Light enters the HBE-I grating at angles from 0° to +26°. The IIN is inclined at angle of 13°. For a typical 0° (input)/52° (in glass) grating, angular this increases angular bandwidth is increased by approximately 20%. Note that red colored rays in FIG. 13 strike the HBE-I at 0°, and diffract into TIR. The green colored rays strike the SBG at approximately 26°/n where the refractive index n is 1.592 (polycarbonate). Note that S-BAL25 glass which has a very similar refractive index to polycarbonate can be used for prototyping. The design can be extended to two and three colors. Initial results show that the fundamental approach is sound, meeting near diffraction limited performance across the field in a compact design form while including features such as projected pupil (20 mm. ahead of the grating coupling point), telecentricity, a re-imaged stop and less than 2% geometric distortion. The design wavelength is 532 nm. The resolution is matched to 1080p LCoS vertically (LCoS pixel pitch: 2.8 micron; Nyquist frequency 178 lp/mm.). Preliminary specifications for the IIN are provided in Table 2.

TABLE 2

Input Image Node (IIN) Specification.
Input Image Node (IIN) Optical Specification

| | |
|---|---|
| Glass | Polycarbonate (can use S-BAL25 glass for prototyping). |
| Image Format | LCoS aspect ratio of 3:2 in portrait. |
| Pupil Diameter | 2 mm. projected pupil (20 mm. ahead of the grating coupling point) |
| LCoS Projection Lens | FOV of 26° H × 30° V; F/2.8; focal length 5.65 mm. |
| Color | Monochrome 532 nm. (proof-of-design); extendable to color. |
| Resolution | Near diffraction limited across the field; matched to 1080p LCoS vertical pixel pitch: 2.8 micron; Nyquist frequency 178 line pair/mm.). |
| Geometric Distortion | <2%. |
| Telecentricity | Fully telecentric. |

In one embodiment there is no hard physical stop in the projection optics but instead a projected stop is provided. The benefits of a projected stop are decreased waveguide thickness. In one embodiment the stop is projected midway up the HBE to minimize aperture diameter within the waveguides, and hence minimizing the aperture width of the DigiLens waveguide coupler.

In one embodiment a graduated reflection profile underneath the SBG layer is used to control (or assist) with grating DE variation along length of the DigiLens waveguides. This normally achieved in SBG grating using index modulation. This may offer advantages the HBE where a low percentage of light is out coupled in $1^{st}$ bounce, but high percentage is coupled out at the other end of the waveguide.

The volume of the IIN design is currently×20×40 cubic mm. However, it will be clear from consideration of the drawings that there are many different ways to reduce the overall volume of the IIN design. For example the refractive elements of the design such as the bird bath mirror and the projection lens system could be replaced by diffractive optical elements. An SBG waveguide could be introduced in front of the microdisplay to provide a polarizing grating beamsplitter for illuminating the microdisplay and allowing polarization rotated reflected light to proceed through said wave guided towards the curved mirror.

Figure 21:
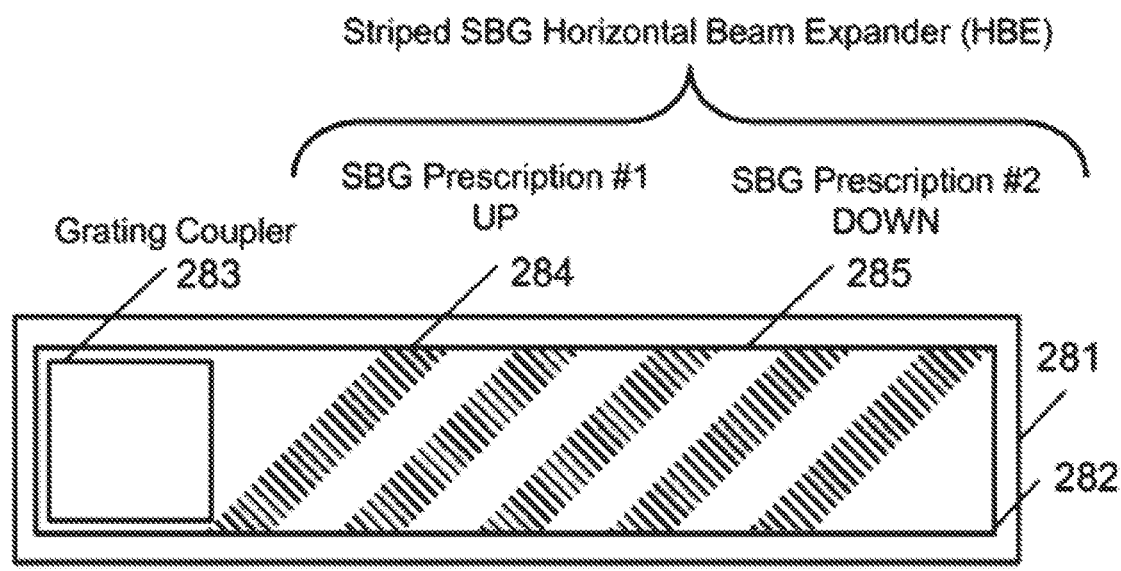
FIG. 21 is a schematic plan view of a HBE containing slanted grating stripes.
Figure 22:
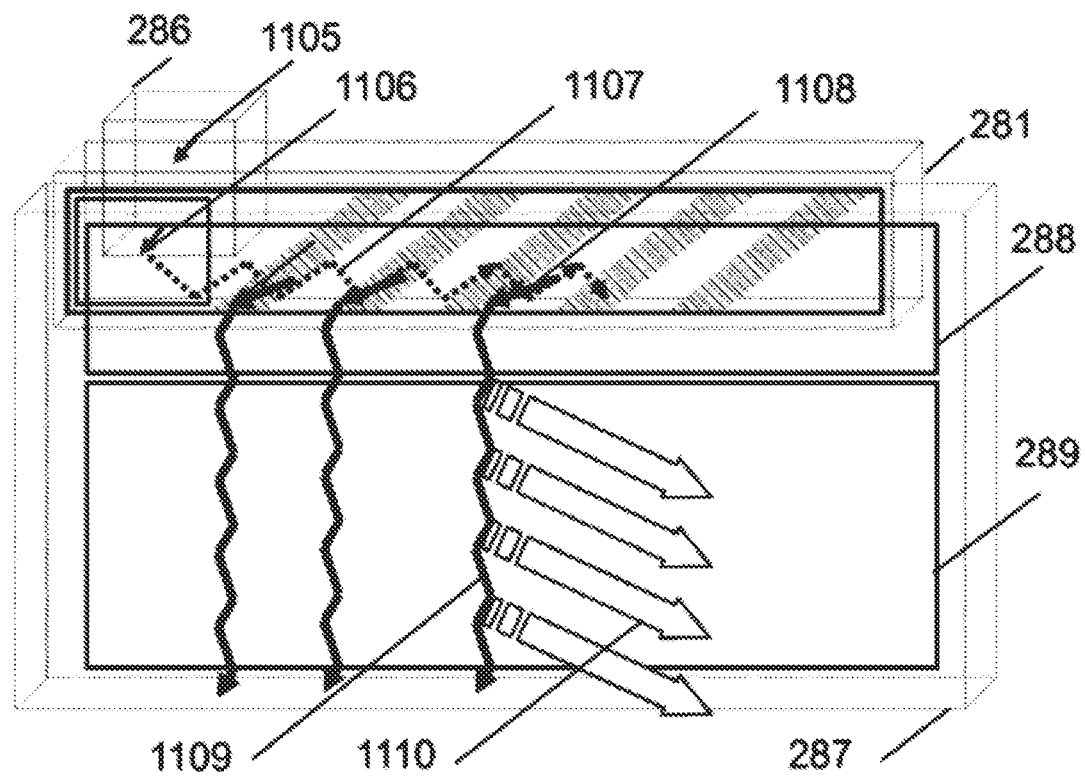
FIG. 22 is a schematic three dimensional view of one embodiment using a HBE containing slanted grating stripes.

In one embodiment illustrated in FIGS. 21-22 a HBE 281 comprises a coupling grating 283 (e.g., the HBE-I of the earlier embodiments) at its input end and an output grating (e.g., the HBE-O) comprising alternating SBG stripes of two different prescription 284, 285 inclined at typically 45 degrees. Although the stripes are shown as equally spaced their size and spacing may be varied for better illumination and image sampling control. However, making the strips too narrow may degrade the system MTF. In general, the stripe geometry may need careful optimisation. FIG. 22 shows the HBE integrated in a display with a DigiLens 287 comprising DIGI-I 288 and DIGI-O 289 and an IIN 286. The ray paths from the IIN are indicated by 1105-1110 where the TIR paths in the HBE and DIGI-O are indicated by 1107,1109. The light coupled output of the HBE into the DigiLens (DIGI-I) is indicated by 1108. The output light from the display from the DIGI-O is indicated by 1110.

Figure 80:
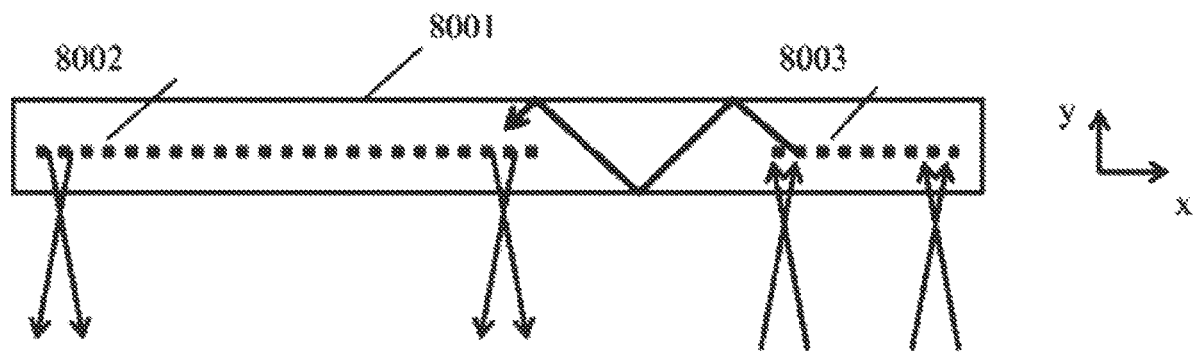
FIG. 80 shows a transparent waveguide display in one embodiment.

FIG. 80 provides a transparent waveguide display in another embodiment. In this embodiment of the waveguide 8001, the amplitude of the refractive index modulation in at least one of the input grating 8003 and output grating 8002 varies by a small amount along the x direction. In this embodiment, the input and output grating pitches should be identical to satisfy the reciprocity requirement. The index modulation may also be varied in the z direction. In one instance, the design of this embodiment may help control the output light homogeneity. The principles illustrated in this embodiment may be applied to the vertical and horizontal beam expanders. In one instance, where switchable gratings are used the index modulation may be time-varied to adapt to temporal variations in the input image content.

In any of the embodiments of the invention efficient waveguiding may need that the TIR beams are confined between low index media. Air gaps are difficult to fabricate and maintain while the refractive indices of currently available low index materials such as Magnesium Fluoride (1.46) and Silicon Dioxide (1.39) are much too high to meet the tight TIR angle constraints needed in full color implementations of the HMD. The proposed solution is to use nanoporous (Mesoporous Silicon) materials. Nanoporous materials (e.g., mesoporous Silicon) are currently being used in many optical applications including anti reflection coatings and planar optical waveguides. Their high porosity enables the fabrication of high-quality low-dielectric constant thin films. Nanoporous materials can be fabricated in thin layers in a single coating step. To achieve very low, near unity, index the porosities need to be very high, approaching 95%. High transparency and low index can be achieved simultaneously with these films. Since they are highly efficient at absorbing water they must be carefully sealed against moisture. The best approach may be to seal the passive gratings, HWP and material together. SBG Labs is also investigating the potential role of nanoporous materials as high refractive index media. This would increase the range of TIR angles that can be sustained in our waveguides with potential for increasing the horizontal FOV from 40° to around 45°. Nanoporous materials are currently being used in many optical applications including anti reflection coatings and planar optical waveguides. It is reasonable to assume therefore that the technology will be accessible for our project. The manufacturing process should be translatable to specification desired. Nanoporous materials can be fabricated in single coating step. Alternatively graded index multi layer architectures can be used. SBG Labs is also investigating the potential role of nanoporous materials as high refractive index media. This would increase the range of TIR angles that can be sustained in our waveguides. In summary the chief benefits are a monolithic structure will provide greater mechanical stability and durability and better beam confinement leading to higher FOV.

Embodiments for Automotive HUDs

As already discussed, the invention may be used in many different applications. Some embodiments of the invention directed specifically at automobile HUDs will be discussed in the following paragraphs.

Figure 23A:
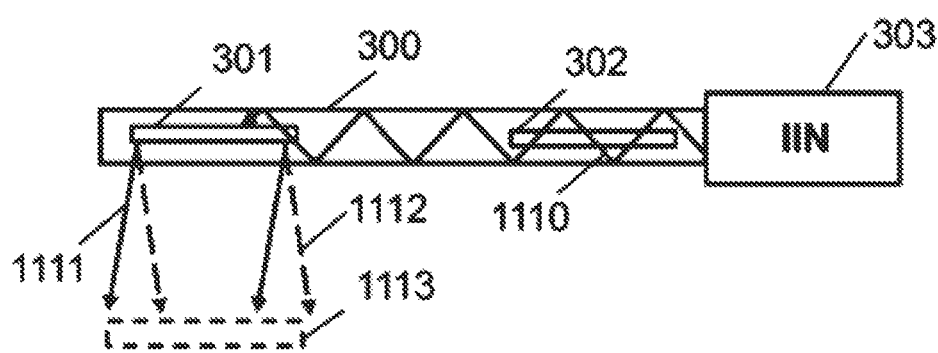
FIG. 23A is a schematic side elevation view showing a first operational state of a HUD provided by one embodiment.
Figure 23B:
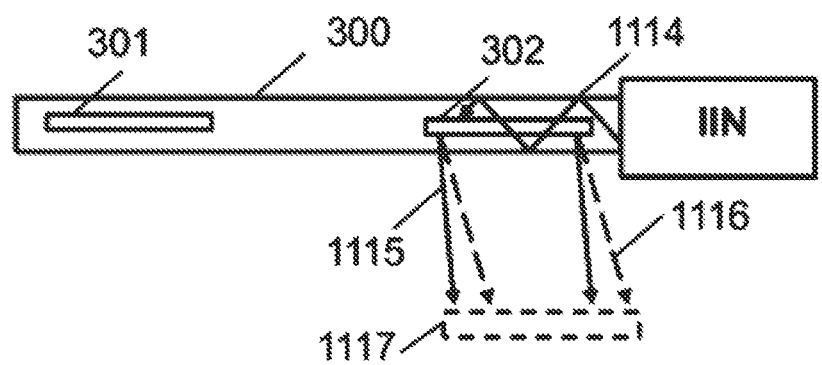
FIG. 23B is a schematic side elevation view showing a second operational state of a HUD provided by one embodiment.
Figure 24:
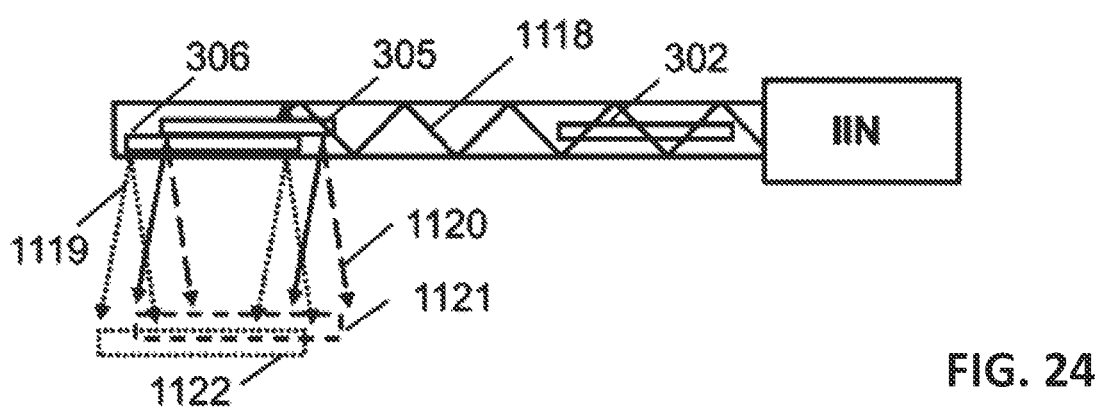
FIG. 24 is a schematic side elevation view of a HUD provided by one embodiment.

FIG. 23 is a is a schematic side elevation view of an in car HUD 300 with more than one exit pupil integrating DigiLens waveguides for the driver 301 and passenger 302. The display may be based on any of the embodiments described above. The DigiLens elements are integrated within a common waveguide structure with the input imagery being produced by an IIN 303 as described above. The ray paths to the driver exit pupil are indicated by the rays 1110-1113 with the pupil indicated by 1113. The ray paths to the passenger exit pupil are indicated by the rays 1114-1116 with the pupil indicated by 1117.

Figure 25:
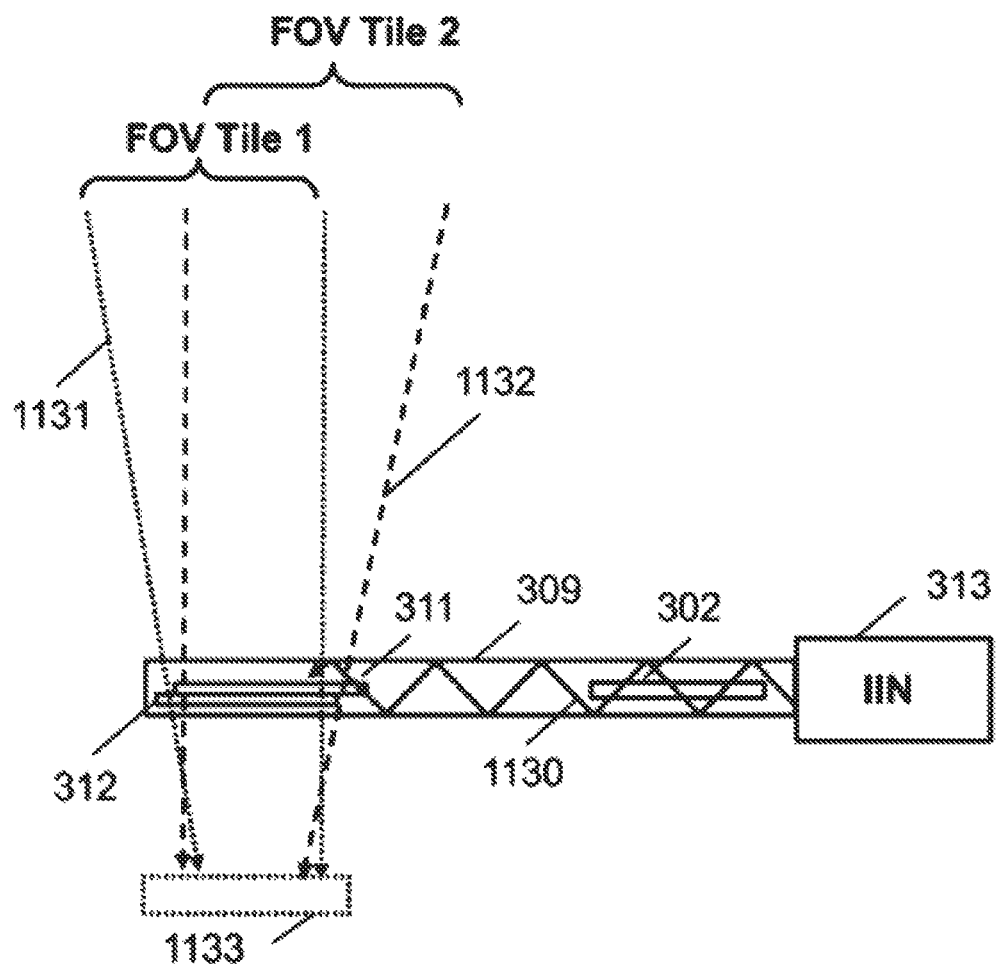
FIG. 25 is a schematic side elevation view of a HUD provided by one embodiment.

FIG. 25 is a schematic side elevation view of a show an embodiment of the invention similar to the one of FIG. 23 the exit pupil of the driver display is tiled using multiple overlapping DigiLens elements 305,306 to provide the abutting exit pupils 1120,1121. Ray paths to the pupil are indicated by 1118-1120.

FIG. 25 is a schematic side elevation view of a further embodiment of the invention based on the one of FIG. 23 in which overlapping DigiLens elements 311,312 are used to tile the FOV as indicated by 1131 with the abutting field of view tiles 1132 while providing a common exit pupil 1133.

In one embodiment waveguide a DigiLens may be used to form a pixelated collimated image. A simple classical analogue of such a display which is shown in the schematic side elevation view of FIG. 26 comprises a pixelated display panel 321 located at the focal surface of a collimating lens 320. A waveguide holographic version of this display is shown in FIG. 27. The input image is provided by a pixelated SBG 323 comprising a two dimensional array of switchable elements such as the one labelled by 324. Each element diffracts incident collimated light into a TIR path within the waveguide. The SBG array is illuminated by collimated light indicated by 1142,1143 from an external source which is not shown. The pixel 324 is illuminated by the collimated light 1145. Advantageously, the SBG pixels will have diffusing characteristics. The DigiLens elements 325,326 are not simple planar gratings such as the ones described so far but have optical power such that light originating at points on the surface of the SBG array is collimated to provide switchable fields of view (FOV tiles) bounded by the rays 1146,1147 for viewing through a pupil 1148. Hence the DigiLens elements provided a diffractive analogue of the lens in FIG. 27A. The DigiLens elements are configure to tile the FOV as in the embodiment of FIG. 25.

Figure 28:
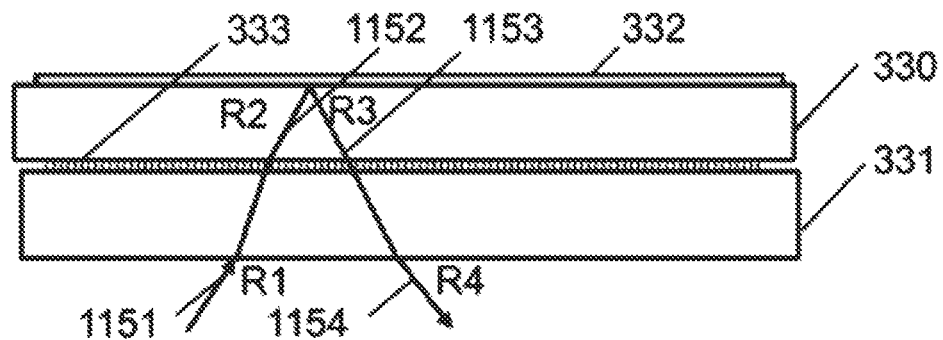
FIG. 28 is a schematic side elevation view of a holographic mirror.

In one embodiment a DigiLens as described above may be configured to provide a mirror. FIG. 28 shows how a rear view mirror for automotive applications can be provided using transmission SBG 333 sandwiched between the substrates 330,331 and a mirror coating 332 overlaying the DigiLens. The SBG diffraction angles are designed such that light incident on the DigiLens following the path labelled by R1,R2 is diffracted by the SBG layer and reflected at the mirror layer while that the reflected path labelled R3,R4 leading to the drivers eyebox is off Bragg or, in other words, falls outside the angular range for diffraction by the SBG. The light paths are also labelled by the numerals 1151-1154. It should be apparent from consideration of FIG. 28 that the DigiLens can be configured to provide a range of different reflection angles by a suitable choice of grating prescription.

Figure 29:
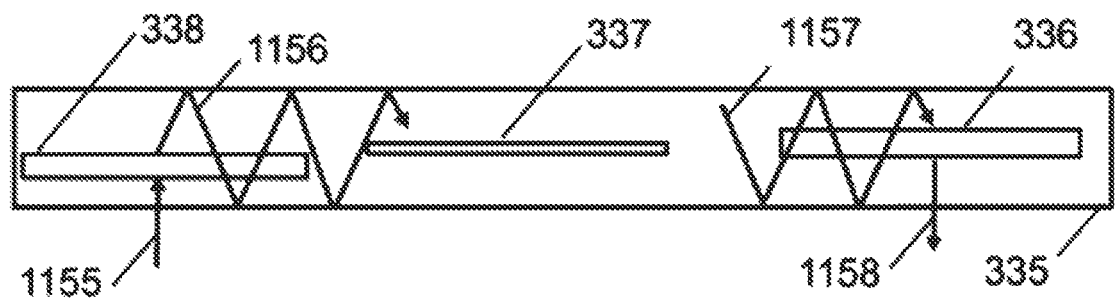
FIG. 29 is a schematic side elevation view of a HUD provided by one embodiment.

FIG. 29 shows a HUD 335 for relaying an external image to a viewing pupil near to the driver. Light 1155 from the external image source enters the waveguide via the DigiLens 338 undergoes TIR as indicated by 1156-1157 and is coupled out of the waveguide towards the viewer as light 1158 by DigiLens 336. This embodiment may be useful for viewing blind spots. The apparatus of FIG. 29 further comprises a beam splitter layer 337 which, by splitting incident TIR light into multiple paths, can improve homogeneity and minimize gaps in the output illumination. This principle may be applied to any of the other embodiments of the invention.

Figure 30:
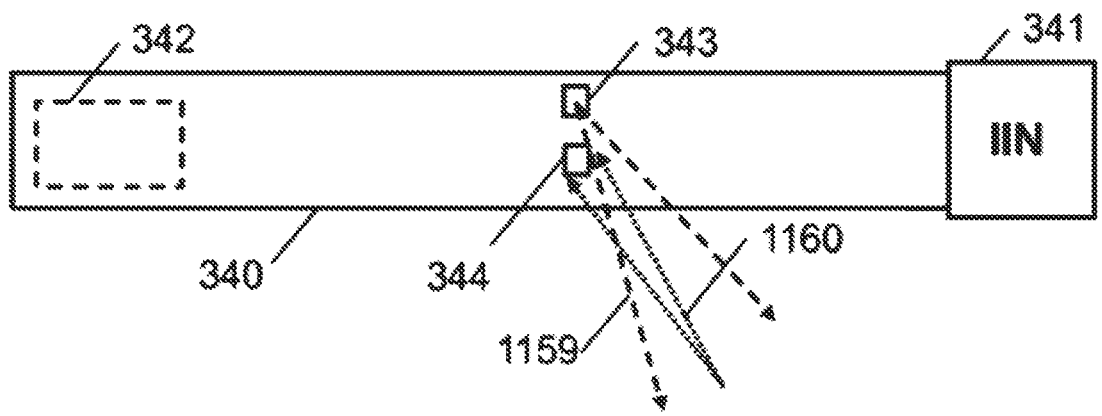
FIG. 30 is a schematic side elevation view of a HUD provided by one embodiment.

FIG. 30 is a front elevation view of a car HUD 340 comprising a IIN 341 and a DigiLens 342 according to the principles of the invention and further comprises a structured light source 343 emitting infrared light 1159 and detector 344 for detecting return infrared light 1159 for sensing driver hand movements for display control.

Figure 26:
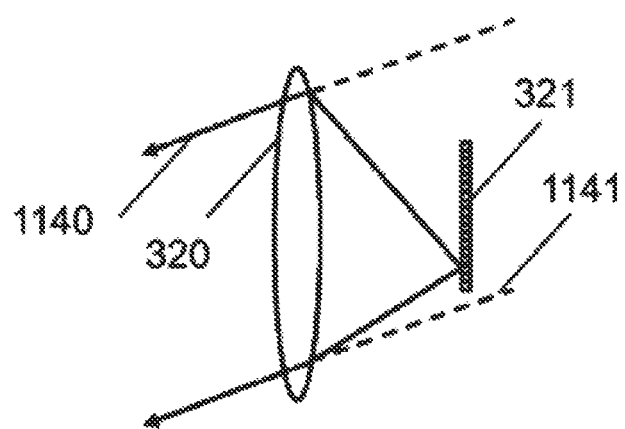
FIG. 26 is a schematic illustration of a prior art collimated image display.
Figure 27:
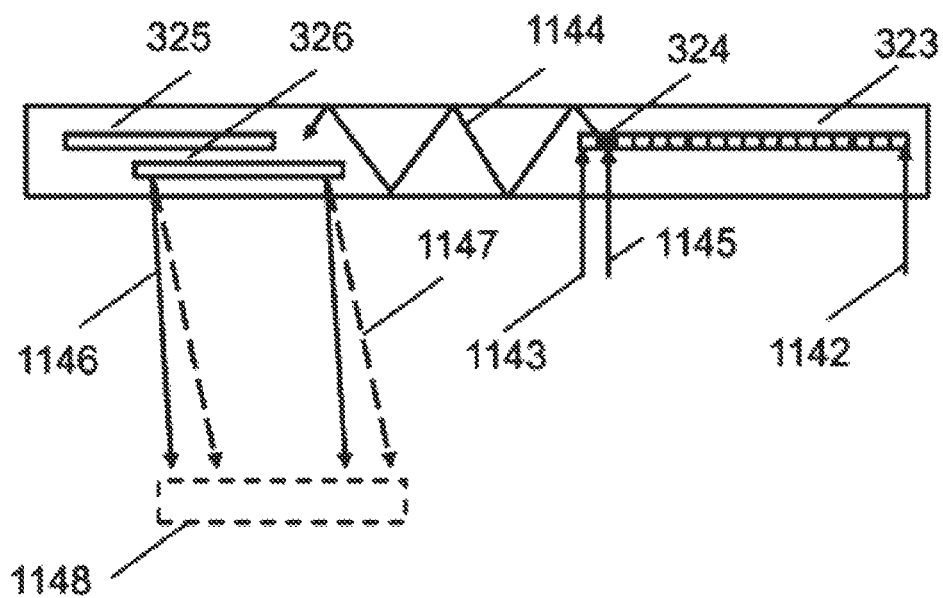
FIG. 27 is a schematic side elevation view of a HUD according to the principles of the invention.
Figure 31:
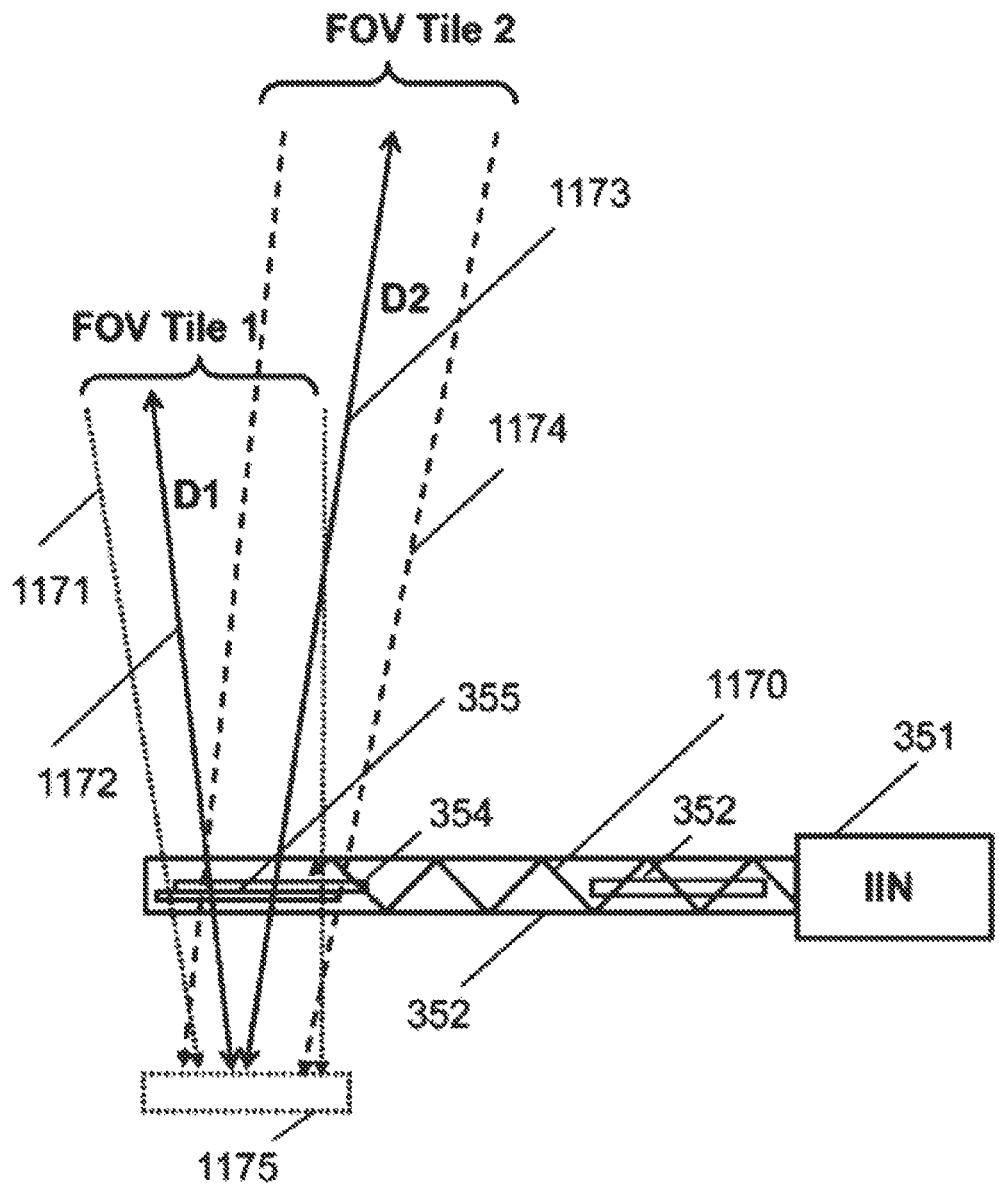
FIG. 31 is a schematic side elevation view of a HUD provided by one embodiment.

FIG. 31 is an embodiment of the invention similar to that of FIG. 26 in which the information contained in the field of view tiles (FOV Tile 1,2) is presented at different ranges indicated by D1,D2. Image light from the TIN 351 is converted into wave guided light 1170. The DigiLens 354 forms an image at range D2 with an FOV of 1174 centered on the direction 1173 and the DigiLens 355 forms an image at D1 with FOV of 1171 centered on the direction 1172. The two FOV tiles are viewed through the pupil 1175.

Figures 32A, 32B, 32C:
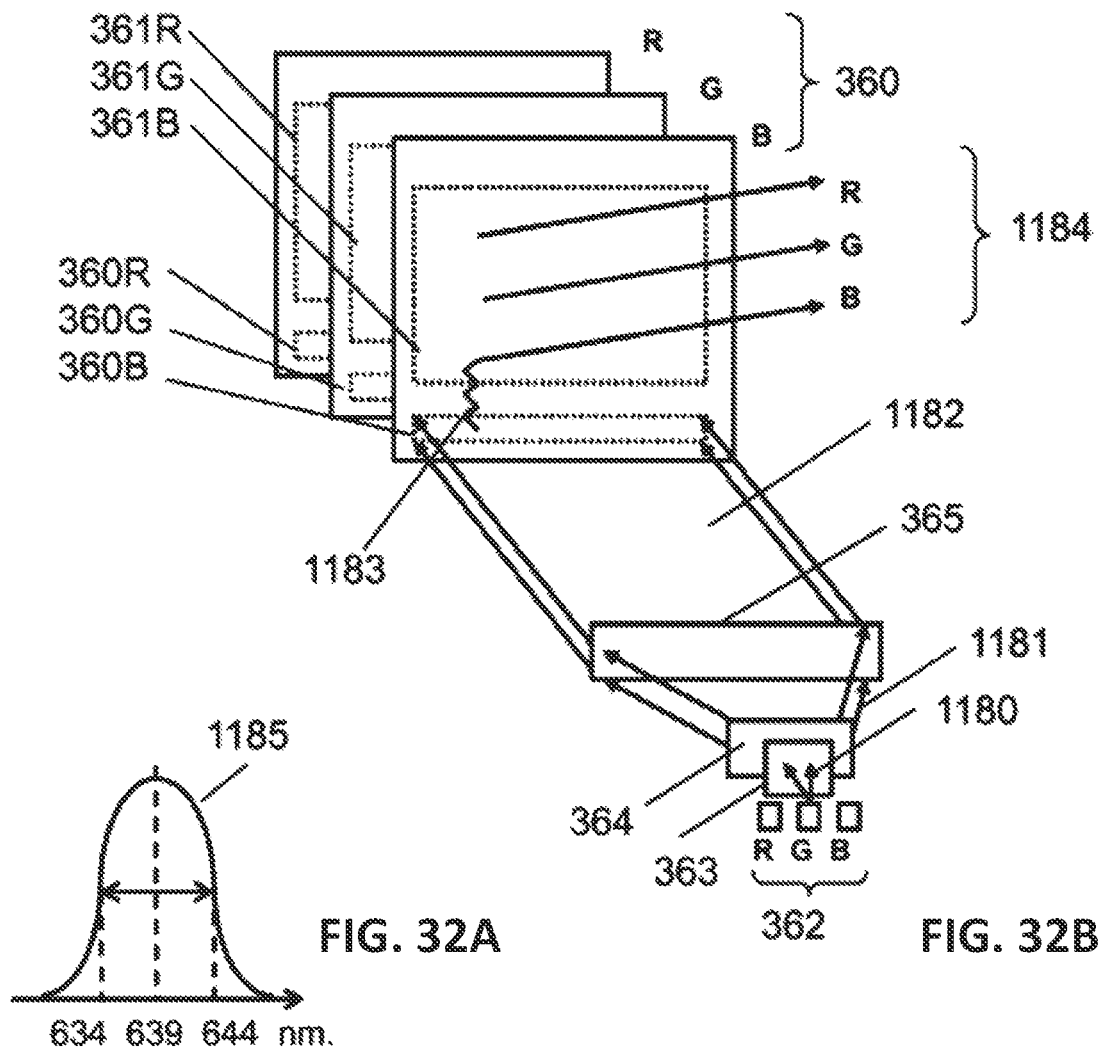
FIG. 32A is a three dimension view of a color display provided by one embodiment.
FIG. 32B is a chart showing the spectral characteristics of a light source used in a color display provided by one embodiment.
FIG. 32C is a table showing the spectral characteristics of a light source used in a color display provided by one embodiment.

In most applications of the invention the preferred light source is a laser particular where tight constraints on collimating and waveguide confinement need to be met. However, the invention may, with some modifications, be applied using LEDs and other relatively narrow band incoherent light source. FIG. 32A illustrates an embodiment of the invention in which SBGs are used to compensate for the spectral bandwidth of RGB LEDs in a color HUD. The red LED illustrated has a peak output at 639 nm. and FWHM bandwidth defined at the wavelengths 634 nm. and 644 nm. as shown in FIG. 32B. The DigiLens comprises a stack of RGB diffracting layers, each layer comprising input and output gratings. In each layer the SBGs are recorded to provide peak diffraction efficiency vs. wavelength characteristics (along the waveguide) shifted by small increments from the peak wavelength as indicated in the Table in FIG. 32C. The techniques for recording at Bragg grating that provides a wavelength shift in play back, which normally involve control of the construction wavelengths and recording angles, are well known to those skilled in the art of holography. The RGB SBG layers are switched sequentially and synchronously with the RGB LEDs. As shown in FIG. 32A the color display 360 comprises red green and blue DigiLens waveguides labelled by the symbols R,G,B and comprise DIGI-I gratings indicated by 360R,360G,360B and DIGI-O gratings indicated by 361R,361G,361B, red, green and blue light sources 362R,362G,362B providing light 1180 a microdisplay 363 a bema expander comprising the diffractive or holographic lenses 364,365 for providing collimated light 1182. After being coupled into the DigiLens elements the light undergoes TIR as described above and represented by 1183 and is diffracted out of the DigiLens as the red, green, blue light 1184R,1184G,1184B.

Figure 33:
FIG. 33 is a cross sectional view of a HUD integrated in a windscreen in one embodiments of the invention.
Figure 34:
FIG. 34 is a cross sectional view of a HUD integrated in a windscreen in one embodiments of the invention.

In one embodiment illustrated in FIGS. 33-34 the DigiLens is combined with a windscreen. A DigiLens is eminently suitably for such an implementation as it can be designed to operate in a curved waveguide and can be built up from very thin layers using substrates as thin as 100 microns sandwiching SBG layers of thickness 1.8-3 microns. The DigiLenses are separated by thin layers of mesoporous materials of the type described above. It should also be noted that typical car windscreens have radii of curvature typically of several thousand mm which does not present a great challenge for maintaining waveguiding.

In one embodiment the DigiLens is formed as a flexible layer 371 that can be bonded onto an existing windscreen 370 to the inner or exterior surfaces as shown in FIG. 33. The IIN 372 would typically be located below the dashboard.

Alternatively, the DigiLens layers can be integrated within a windscreen as part of the screen fabrication process as shown in FIG. 34. Typically, a windscreen comprises an outer toughened glass layer 373; two or more layers of PVB 374,376 for UV blocking and an inner toughened Glass layer 377. The DigiLens 375 would be sandwiched by two of the PVB layers. In one embodiment the windscreen integrated DigiLens fabrication processes includes the steps of spraying RMLCM onto PVB film and sandwiching it with a second PVB film prior to recording an SBG in a holographic recording step.

Figure 35:
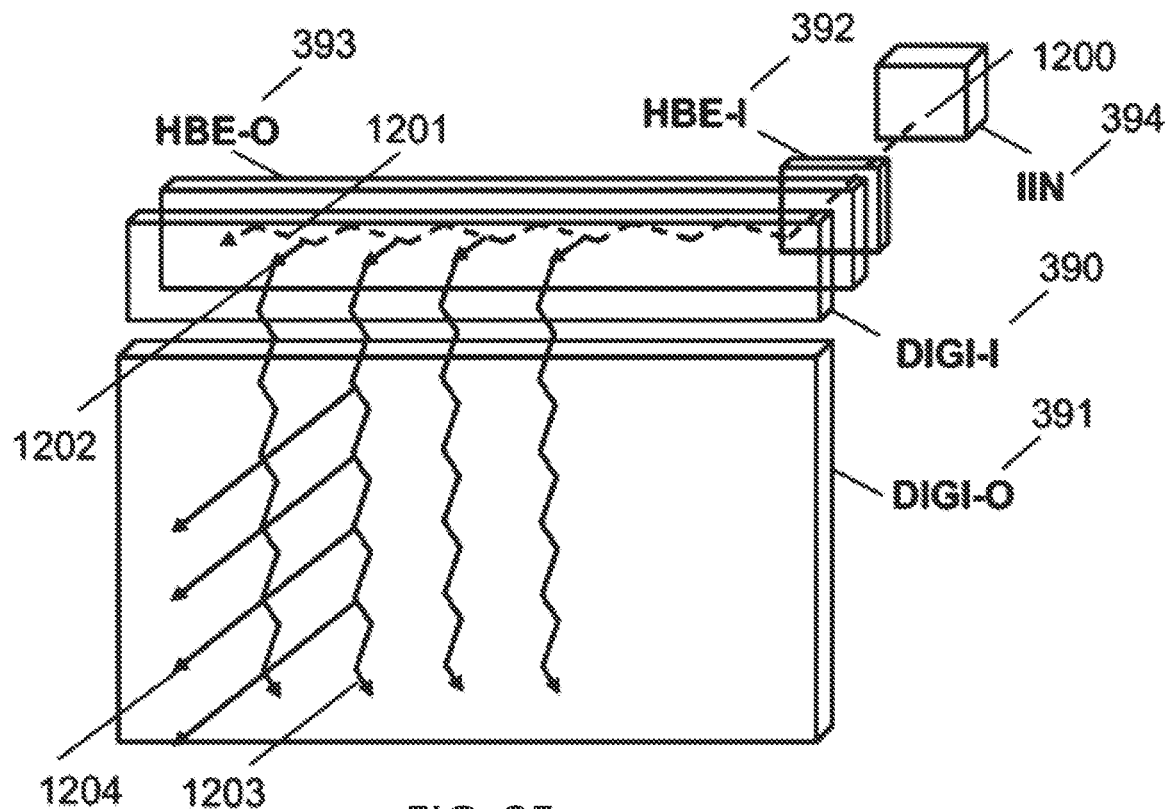
FIG. 35 is a three dimensional view of a display provided by one embodiment.

In one embodiment shown in FIG. 35 there is provided a transparent display comprising the waveguide components DIGI-I. DIGI-O HBE-I, HBE-O and an IIN similar to the ones described above. However in this case each said waveguide component comprises a single SBG layer. Note that only the SBG layers in the above waveguides are illustrated with the substrates and electrodes being omitted. The ray paths from the IIN are indicated by 1200-1203 include the TIR path in the HBE 1201, the extraction of the expanded beam from the HBE 1202, TIR within the DigiLens 1203 and extraction of light for display 1204 from the DigiLens. The components are also reference by the numerals 390-394.

Figure 36:
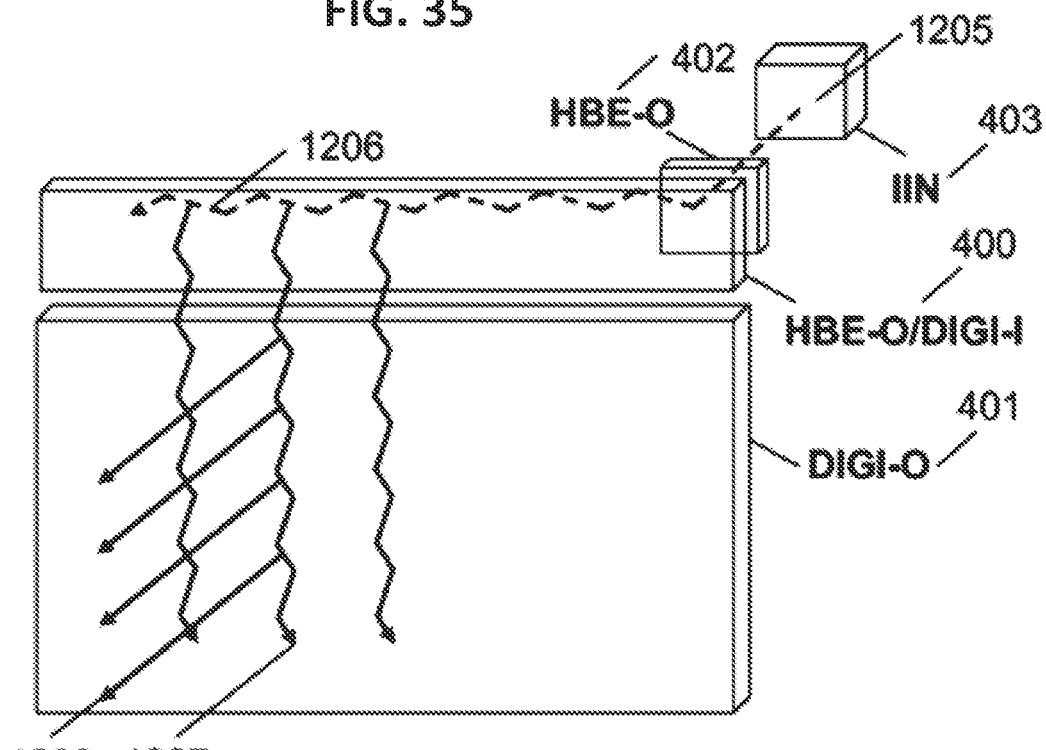
FIG. 36 is a three dimensional view of a display provided by one embodiment.

In one embodiment shown in FIG. 36 them is provided a transparent display DIGI-O, HBE-I and an IIN similar to the ones described above. The two waveguide components HBE-O and DIGI-I are combined into a single waveguide component labelled HBE-O/DIGI-I that performs the dual functions of beams expansion and beam turning. The advantage of this arrangement is the change in beam direction is accomplish without the need to exit and then re-enter the waveguide gratis as tor example in FIG. 35 and most of the other embodiments. This may need that the gratin in the DIGI-I is slanted in the plane of the drawing, in most cases of practical interest at an angle of 45 degrees. Hence within the DIGI-I waveguide the TIR path is rotate though 90 degrees and proceed into the DIGI-O. The ray paths from the IIN are indicated by 1205-1208. The components of the displays are also reference by the numerals 400-403.

It should be apparent from the drawing and early description that in this case and indeed in most of the embodiment of the inventions the HBE-I and HBE-O and the DIGI-I and DIGI-O may be implemented in a single SBG layer. However while this reduce the number of layers overall there is the penalty the overall size of the display will increase. The widths of the HBE and DIGI-O will to a large extend be terminated by the microdisplay dimensions and the field of view needed. While in HUD and HDD applications the space needed to implement the DIGI-O and HBE components are small relative to the size of the DIGI-O, the trade-off becomes more challenging in HMD and near eye applications which will use similar size microdisplays and will have more demanding FOV demand, which will further increase the relative widths of the HBE and DIG-I waveguides.

Figure 37:
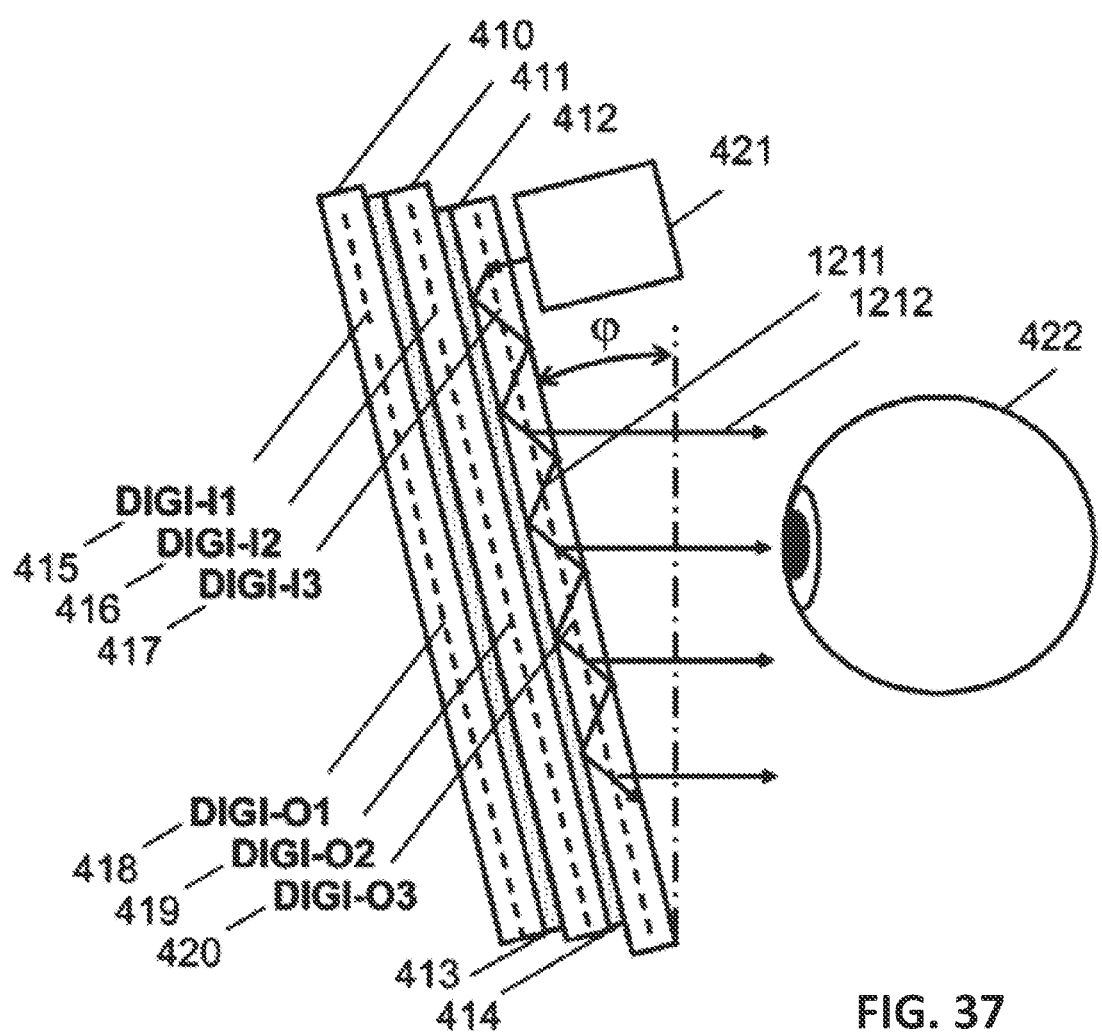
FIG. 37 is a schematic side elevation view of a color display provided by one embodiment.

In a further embodiment of the invention directed at a color display illustrated in FIG. 37 the DigiLens comprises separate red green and blue waveguides. Advantageously the waveguides are optically isolated from each other which may need that they are air separated or separated by a thin layers of low index film. The preferred option is to use nanoporous materials. The DigiLens waveguides are shown in FIG. 37 the layers being referenced by numerals 1-3 in the DIGI-I and DIGI-O labels (the waveguide components also reference by numerals 415-420. The IIN and HBE components are not shown in detail but are simply indicated by 421.

Figure 38:
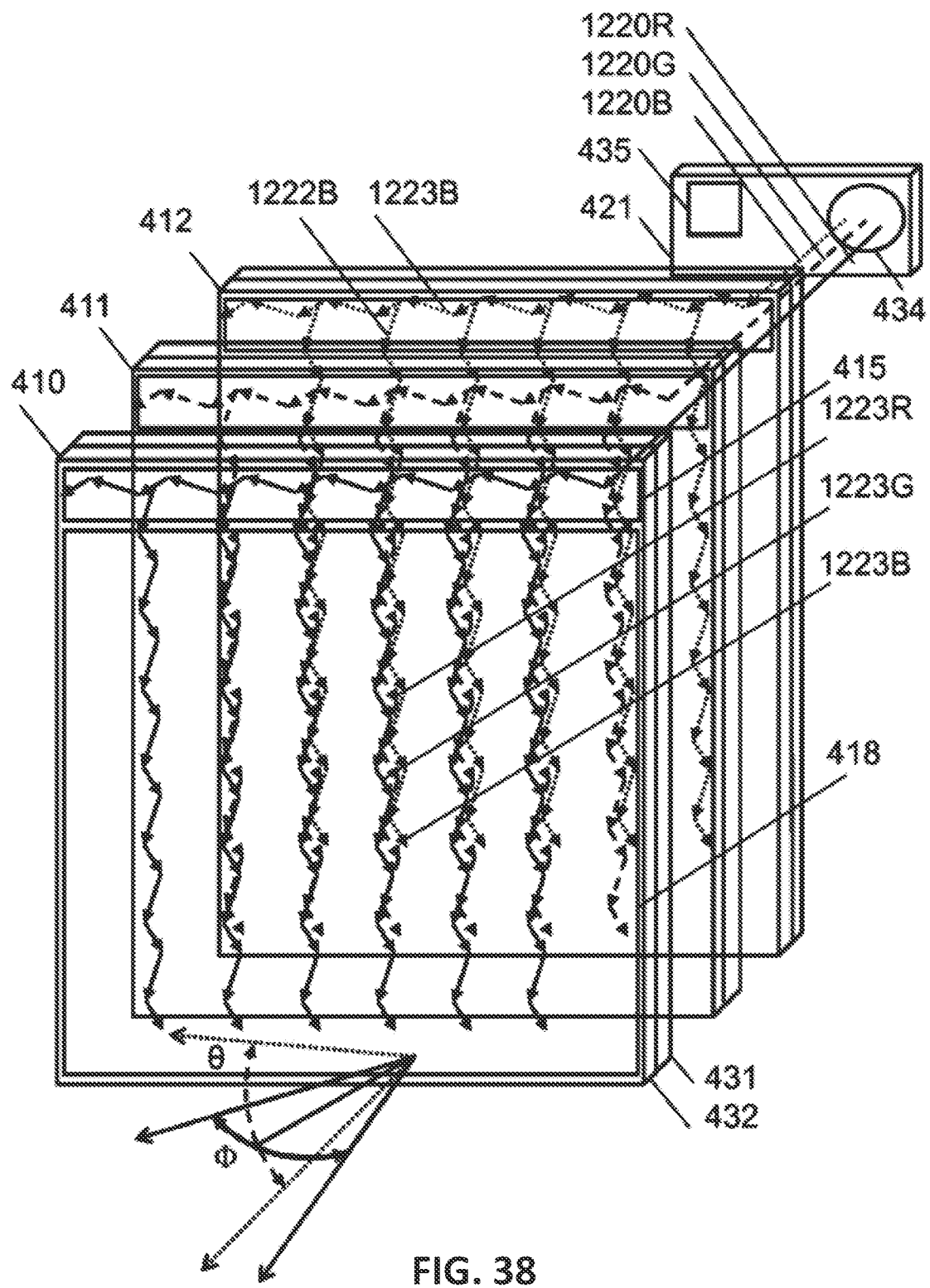
FIG. 38 is a schematic three dimensional view of a color display provided by one embodiment.

Typically the DigiLens will be inclined at a rake angle of around 10° to enable the most favorable diffraction angles within the waveguides as shown in FIG. 1 The IIN and HBE may be on the side of the display nearest the eye 422 as showing in the drawing. However it should be apparent that many other configurations are possible. A ray path to the eye is indicated by the rays 1210-1212. FIG. 3 is a three dimension view of the same display shown the three DigiLens lens FIG. 38 shows a color display based on the embodiment of FIG. 35. This implementation has three DigiLens layers 410-412, one for each color, with the DIGI-I and HBE-I being combined in turning/beam expansion gratings such as the ones indicated by 436 red green and blue ray paths from the IIN are indicated by 1220-1223 with red, green and blue being labeled by the symbols R,G,B. Note that the HBE-I component which is not illustrated will be similar to the one shown in FIG. 35 but with separate layers for red, green a blue.

Figures 39A, 39B:
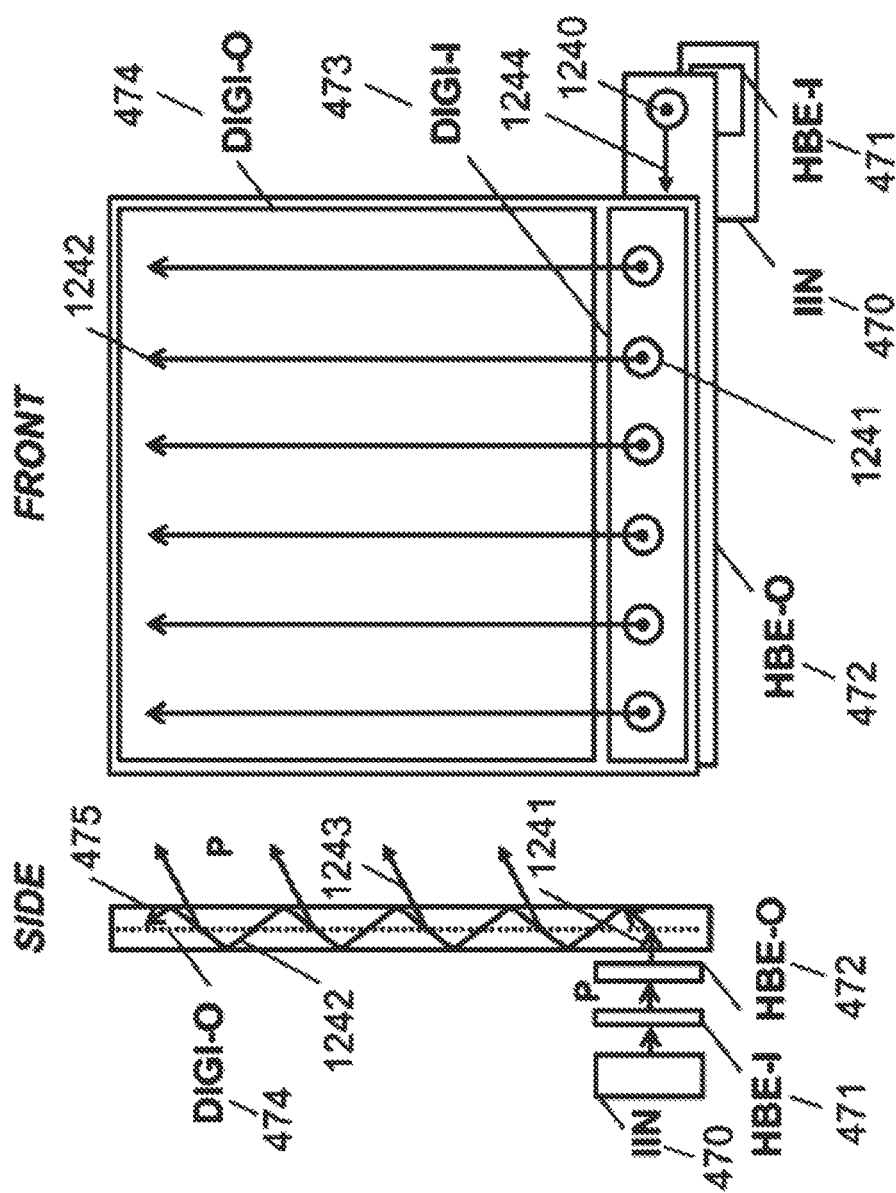
FIG. 39A is a schematic side elevation view of one embodiment.
FIG. 39B is a schematic front elevation view of one embodiment.

In auto HMDs fields of view are relatively modest compared with those of HMDs a field of view of 10 degree vertical by 25 deg. horizontal is considered to be a long term goal. Such angular content can easily be handled by a waveguide using a single layer SBG. However since there is interest in color this will make further demands on the information handling capacity of the waveguides In one embodiment shown in FIG. 39 there is provide a passive single SBG layer DigiLens which waveguides and diffracts at least two colors using holographic multiplexing. Multiplexing is the ability to record multiple Bragg gratings in the same layer. Firstly it can be used to produce improved angular profiles by combining two gratings of similar prescription to extend the diffraction efficiency angular bandwidth and giving better luminance uniformity and color balance across the exit pupil and field of view. Secondly multiplexing may be used to encode two distinct diffraction prescriptions which may be design to project light into distinct field of regions or diffract light of two different wavelengths into a give field of view region. Multiplexing also offers the significant benefit of reducing the number of layers in the waveguiding structure. Care is needed to ensure that there is no competition between gratings during recording leading to unequal Des and cross talk between gratings in playback. Tile apparatus of FIG. 39 is similar to that of FIG. 35 differing mainly in that the DIGI-O component is now a multiplexed grating. The components are also referenced by the numerals 470-474 and ray paths from the IIN through the HBE and DigiLens by numerals 1240-1243. Advantageously, the Horizontal Beam Expander (HBE) would run along bottom edge of the DigiLens® to enable the IIN to be hidden below the dashboard. Typically such a HUD would have an eyebox of 145 mm. horizontal by 80 mm. vertical at an eye relief of 800-900 mm. The target field of view would be 10°-15° vertical×10°-15° horizontal. The windscreen would have a transparency greater than 75%. Typically windscreens have curvature of Horizontal: 3000 mm.; Vertical 9000 mm. The IIN could be accommodated within a volume of 1-2 litres.

Figure 40:
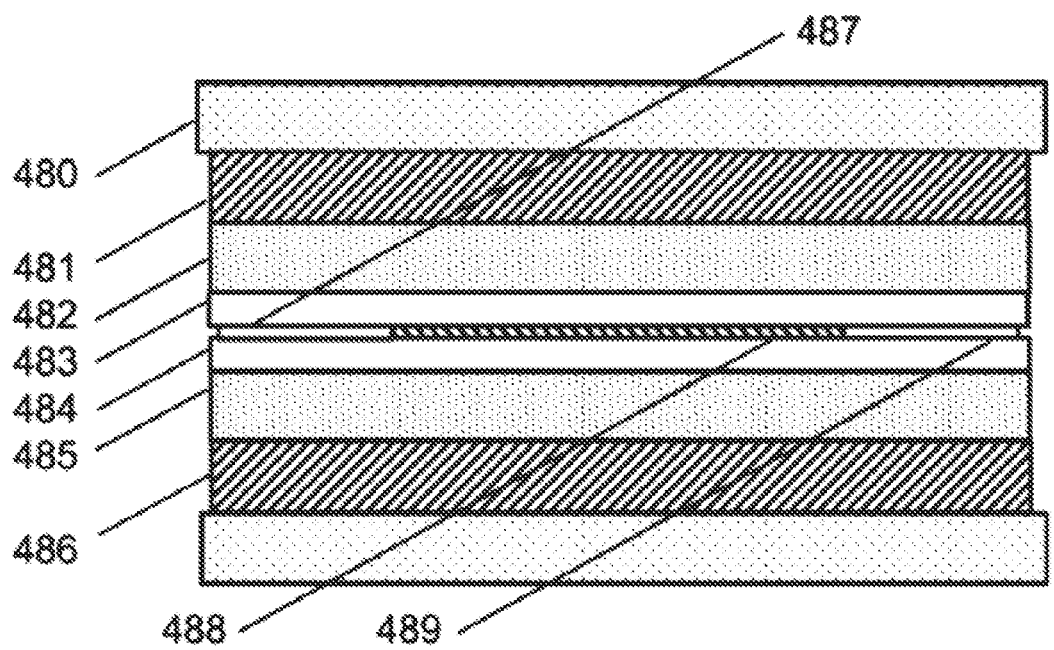
FIG. 40 is a cross sectional view of a HUD integrated in a windscreen in one embodiment.
Figure 41:
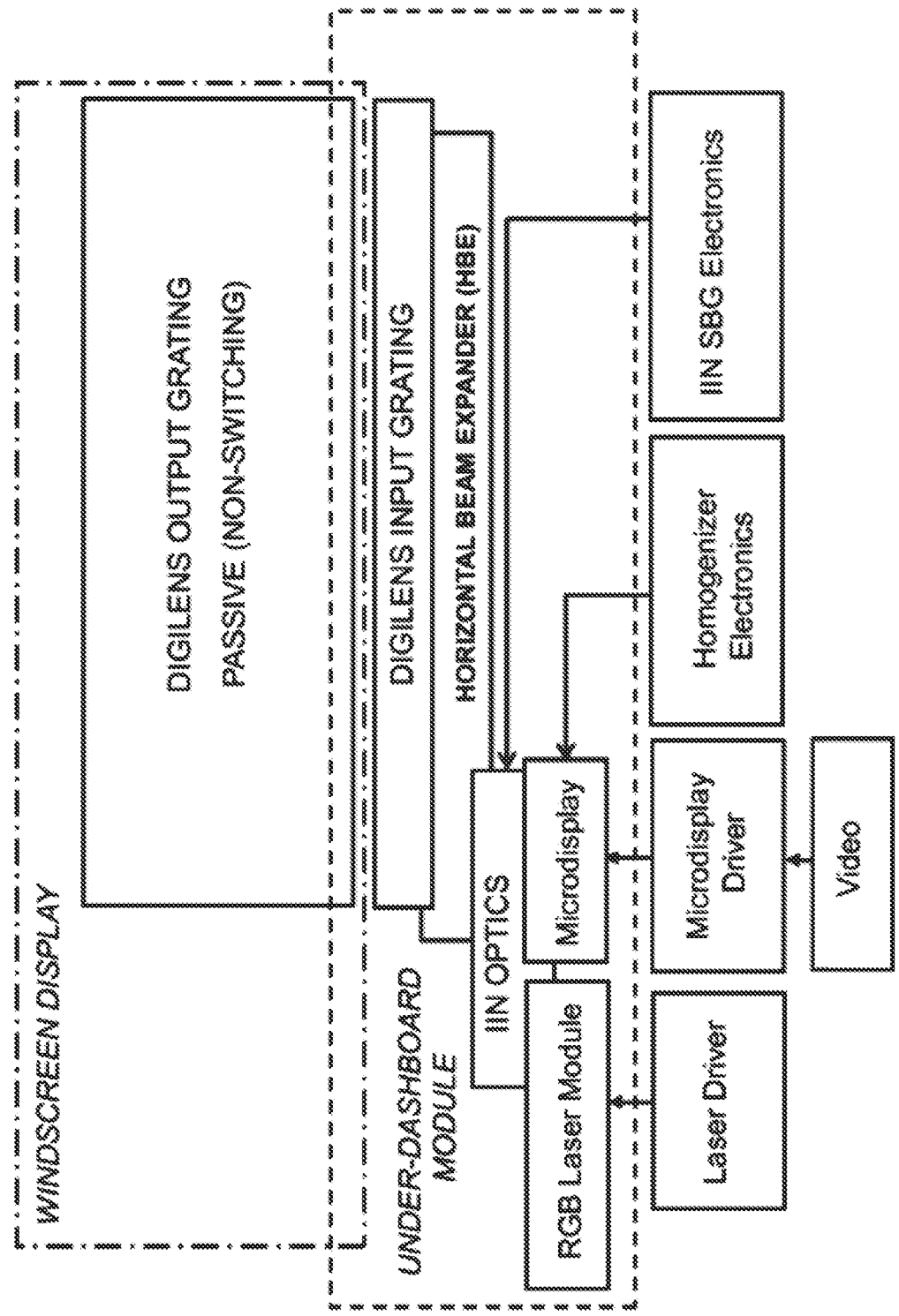
FIG. 41 is a flow chart illustrating image formation in a HUD in one embodiment.

The integration of the DigiLens into the windscreen is shown in FIG. 40. The stack of layers in the windscreen comprises Glass (External) 1.60 mm.: PVB (3 layers): 0.8 mm.; Glass (Internal): 2.0 mm. TOTAL 4.4 mm. The SBG layer would comprise an SBG of 5 microns sandwiched by substrates of 50-100 microns, the SBG cell sandwiched by low index layers of 0.5-2 microns thickness. A UV glue gasket line limits the SBG material fill, bounding the effective area of the display. Gaps between grating areas are filled with clear acrylic and UV-cured for full transparency. This multilayer architecture allows very strong lamination and does not rely at all on the SBG film for lamination strength. FIG. 41 is a flow chart illustrating the implementation of the embodiment of FIG. 39 in an automobile HUD.

Figure 42A:
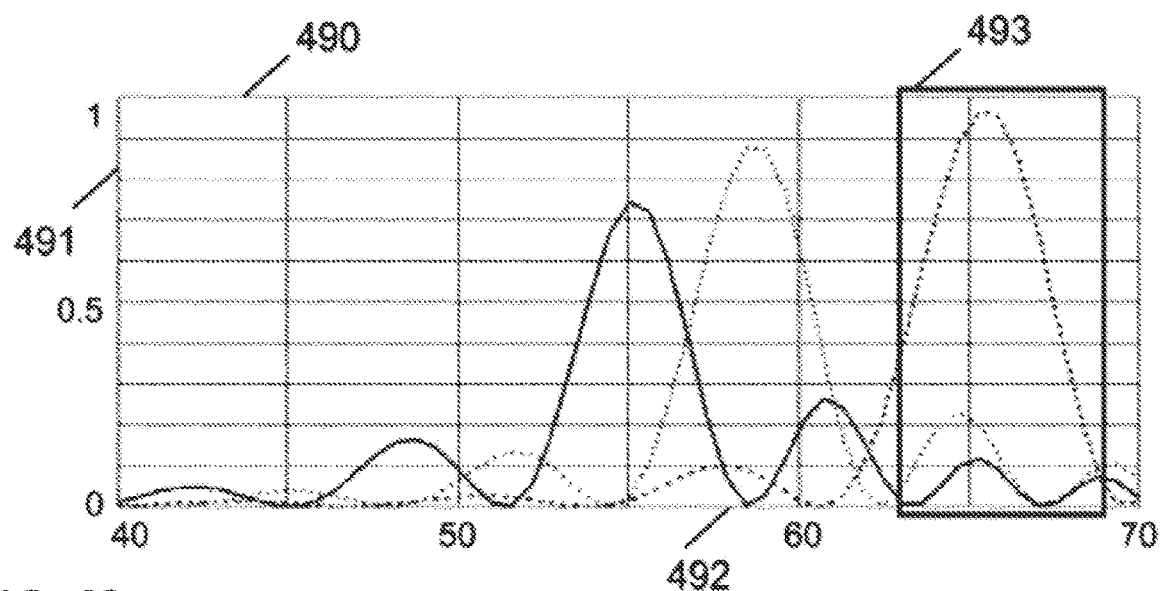
FIG. 42A is a chart show a first diffraction efficiency versus angle characteristic of a multiplexed DigiLens in one embodiment.
Figure 42B:
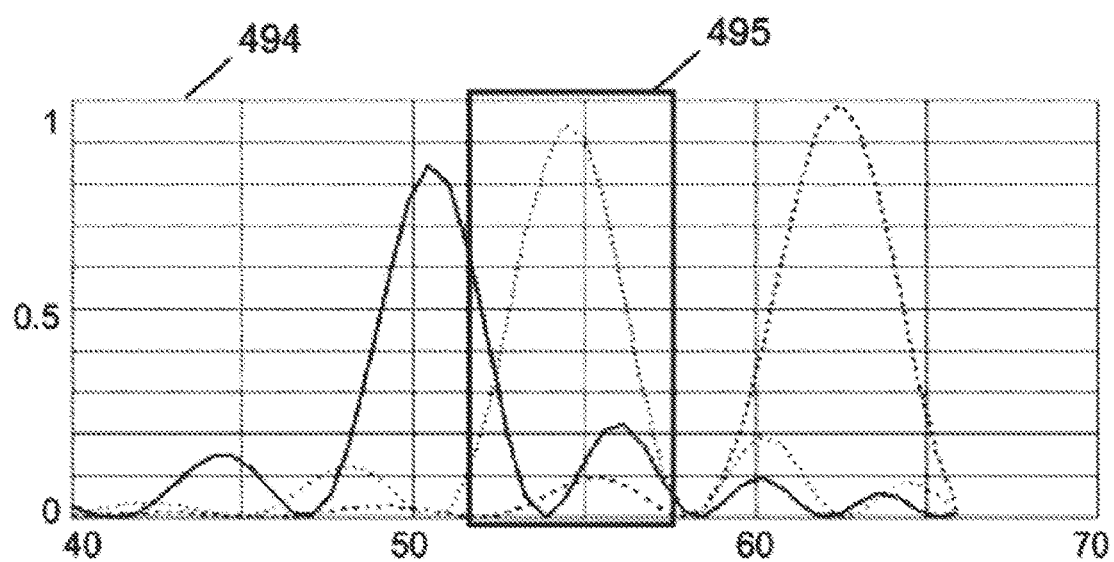
FIG. 42B is a chart show a second diffraction efficiency versus angle characteristic of a multiplexed DigiLens in one embodiment.

The color multiplexing used in the embodiment of FIG. 39 can be provided in two ways: firstly using two multiple gratings: for example, red and blue/green diffracting; or secondly using three multiplexed gratings; i.e. using multiplexed red green and blue gratings. The design problem is to determine the optimal prescription using two or more multiplexed gratings for a vertical (or more precisely tangential plane) field of 10 degrees. The design variables are Bragg wavelengths and TIR angles for each color; DE profiles (i.e., grating thickness and modulation. Since the DigiLens will be bonded to or in some cases embedded with a windscreen the waveguides will be sandwiched by low index material (unless air gaps can be tolerated). A nanoporous material layer refractive index of 1.2 has been assumed. For an SBG index of 1.52 this corresponds to a minimum TIR angle of 52 deg. In designing a multiplexed grating special attention may be needed to achieve the shape of the DE profile is important and, in general, narrower DE profiles are preferred to avoid crosstalk between the colors. The desired DE profiles can be achieved by optimising the thickness and refractive modulation of the gratings. Simulated diffraction efficiency (DE) versus TIR angle profiles based on the Kogelnik diffraction theory for typical red, green and blue diffracting gratings multiplexed in a single SBG layer are shown in FIGS. 42A-42B. The curves represent the DE profiles for each of the three multiplexed gratings. The rectangular regions represent the approximate RGB TIR angle ranges. FIG. 42A shows the case where the multiplexed grating is illuminated with red light. FIG. 42B shows the ease where green or blue light illuminates the grating. Note that the curves shift owing to the angles satisfying the Bragg condition shift as the illumination wavelength changes. Since the TIR range for the blue green band is below the TIR range for red, there is no cross talk between the two color bands.

Figure 43:
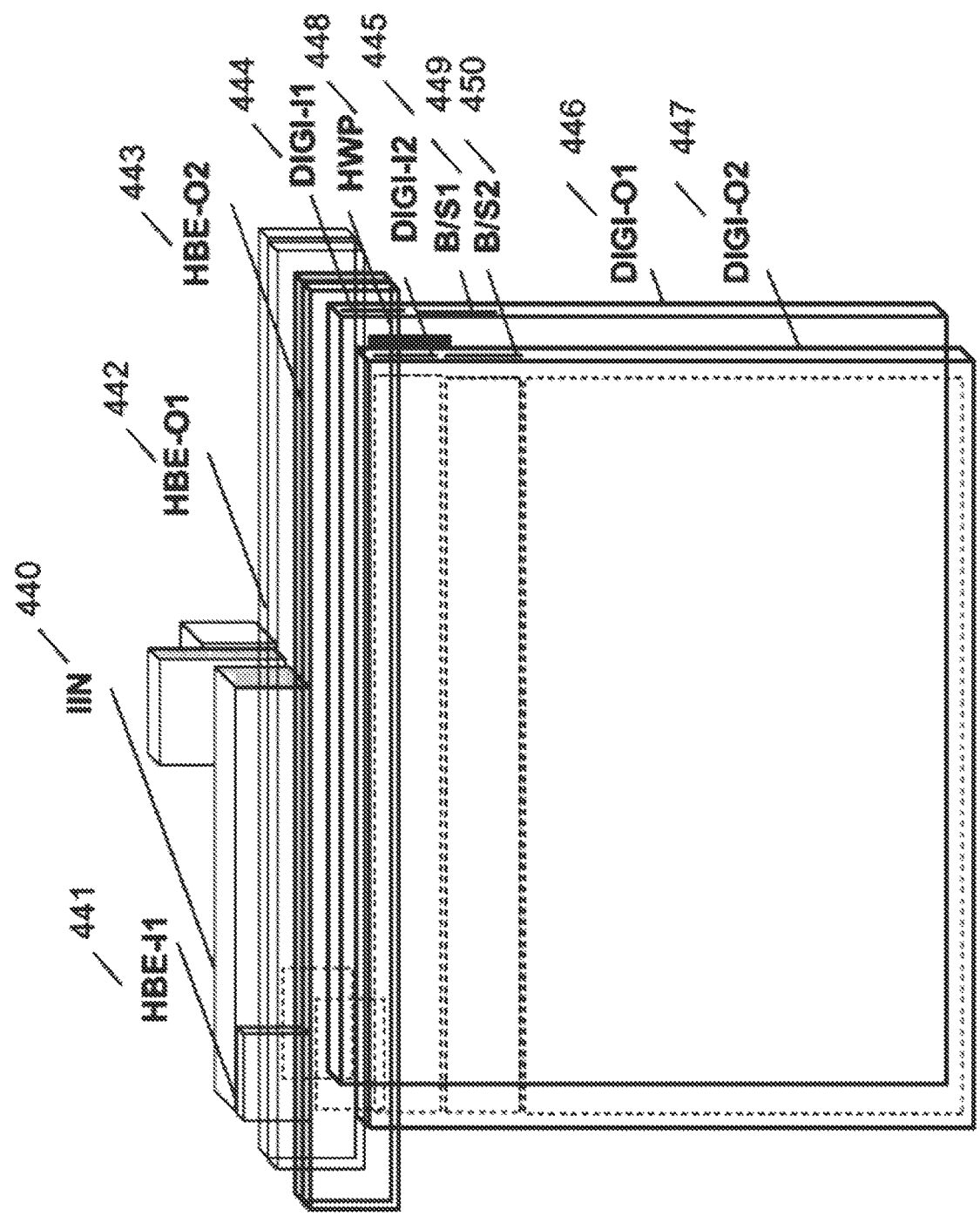
FIG. 43 is a schematic three dimensional view of a color multiplexed display in one embodiment.
Figure 44:
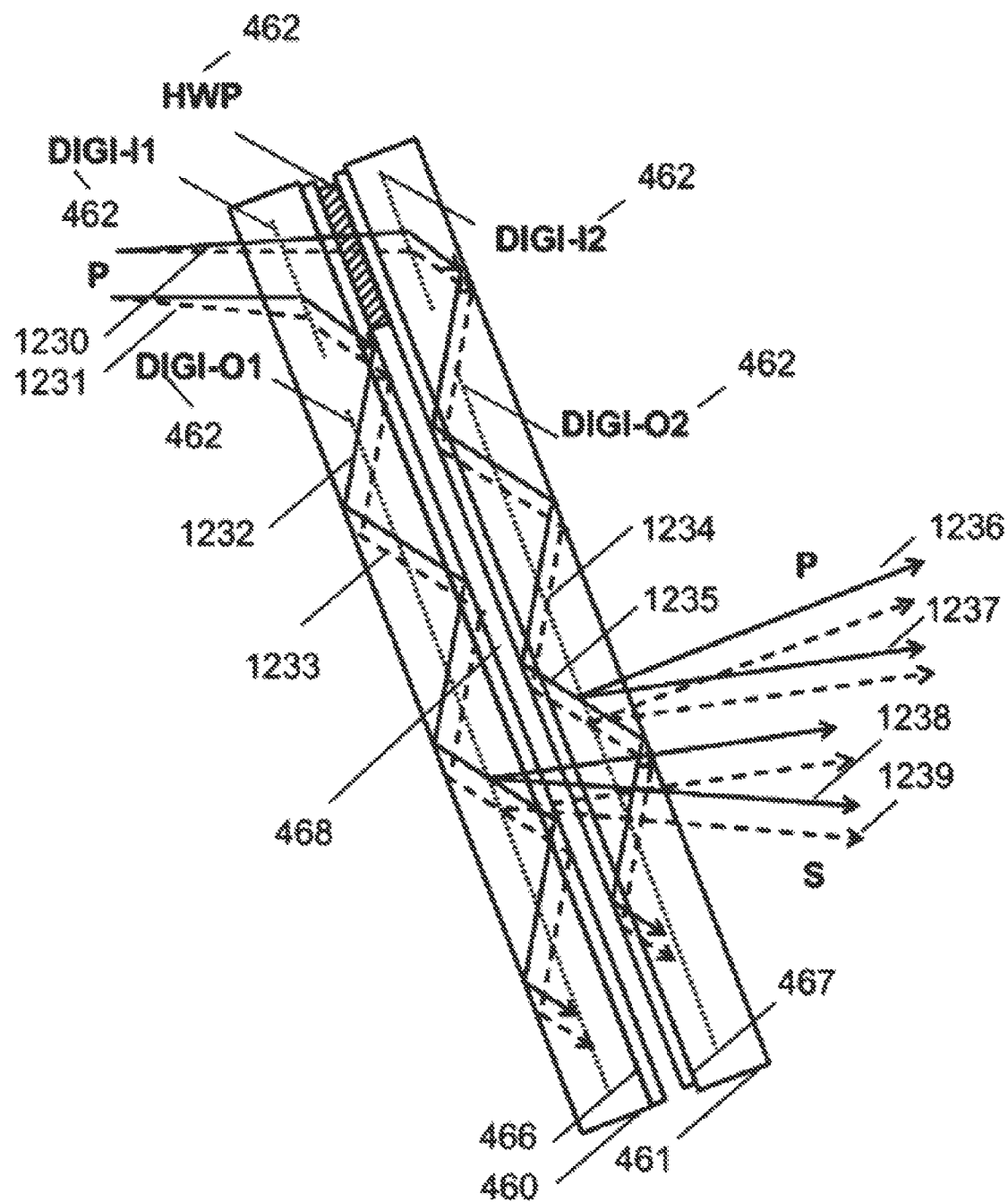
FIG. 44 is a schematic side elevation view of a DigiLens used in a color multiplexed display in one embodiment.

FIGS. 43-44 illustrated a further embodiment of the invention comprising a IIN, two HBE components each comprising a HBE-I and HBE-O; two DigiLens components each comprising a DIGI-I, DIGI-O and beam splitter (B/S) the DIG-I sandwich a half wave film (HWF). FIG. 43 shows a three dimension view. FIG. 44 is a cross sectional view of the DigiLens only showing the ray paths. The HBE-O and DIGI-O gratings multiplex red and blue-green diffracting gratings as indicated by the solid and dashed rays respectively in FIG. 44. The red rays in the rear DigiLens waveguide 460 follow the path 1231,1232,1239. The blue-green rays in the same waveguide follow the ray path 1230,1233, 1239. The ray paths in the forward waveguide are labelled by the numerals 1234-1237. The rear and forward waveguide components are referenced by numeral 1,2 respectively and are also referenced by the numerals 440-447. The HBE comprises two waveguiding element (i.e., two switchable SBG layers separated by suitable substrates) each supporting 20 degrees horizontal×22.5 degrees vertically. The HBEs are switchable. Each HBE waveguide is separated from the other by a low index layer. The IIN would use a HD 1366×768(0.37" diagonal LCoS microdisplay such as the one supplied by Himax Inc. An alterative microdisplay is the Syndiant 720P (0.37" display) supplied by Syndiant Inc. This would give a resolution of 1.76 are min/pixel (over the full 40 degree×22.5 degree FOV). Each grating provides approximately 10 degrees in air (equivalent to about 6.5 degrees in glass) of angle width for a single color. There is a slight bias of angular space due to the HBE rake angle (on side entry of IIN) which causes the fields to be slightly unequal e.g. 18 degrees and 22 degrees. Note that switching of gratings adjacent in angular space ensures cross coupling will not occur between adjacent gratings. Angles in each waveguide are minimized. Green is arranged close to TIR angle with a small tolerance margin (e.g. +0.5 to 1.0 degrees). Each waveguide is narrowband blue mirror coated to extend the waveguide angular range. The light output from each HBE into the DigiLens is: −20 to 0 degrees horizontal (approximately)×±11.25 degrees vertical; and 0 to +20 degrees g horizontal (approximately)×±11.25 degrees vertical. This gives a composite field is −20 to +20 degrees horizontal×±15 degrees (i.e., 40 degrees×22.5 degrees). The preferred material is polycarbonate (n=1.585), or equivalent. The substrate thickness is 0.5 mm. Each cell is 1.0 mm thick, so that each BIE waveguide is 2.0 mm thick. Both HBE waveguides are 4.0 mm thick with a small air or low index material gap. The HBEs would be multiplexed for color as discussed above. The HBE dimensions are: 70 mm in width×11 mm in height. Note that the height includes a 1 mm margin on the vertical edges. The IIN used in the embodiment of FIGS. 43-44 has a focal length of 1.3 mm. The microdisplay (LCoS) pixel pitch is 6.0 micron. The optics F-number is 4.6. By matching the Airy disc to LCoS pixel pitch, approximately 75% contrast at the Nyquist limit is obtained. The aperture of the IIN is 2.4 mm. The optical design of FIGS. 43-44 may need two DigiLens waveguides (i.e., two SBG layers separated by suitable substrates), each supporting 11.25 degrees vertical×40 degrees horizontal. The input DIGI-I elements would be switchable. The DIGI-O elements would be passive. Both input and output gratings would be multiplexed red and green-blue gratings as described earlier. The dimension of DigiLens substrate is 50 mm width×61 mm height. In one embodiment the input gratings are switchable, and not multiplexed, that is four switchable input gratings are used in this case, importantly, the input and output prescriptions are reciprocal. The input light must be P-polarized (since the DigiLens only diffracts P-polarized light). Each waveguide has a QW film down full length: This permits a 2× thinner waveguide. TIR reflections are rotated by a half wave (owing to the double pass through the QW film). Ray extraction from the waveguide thus occurs only at every other interaction with SBG. The output of the rear DigiLens (i.e., the one nearest the IIN as shown in FIGS. 43-44) experiences two QW film interactions, rotates to S and therefore does not interact with the forward DigiLens. Hence the output from the display is mixed P and S polarized light.

In one embodiment illustrated in FIGS. 45-52 there is provided a transparent display based on completely passive HBE and DigiLens waveguide components. As will be explained in the following description this embodiment uses a HBE-I configured for sampling the aperture and/or FOV of the image light from the IIN. This embodiment will now be described with reference to a 52 degree×30 degree FOV monochrome display such as may be used to provide a HMD. However, it should be apparent from the following description and drawings that this embodiment may with the benefit of the teachings presented herein be used to provide a wide range of different FOVs.

An Embodiment Using all Passive SBGS

Figure 45:
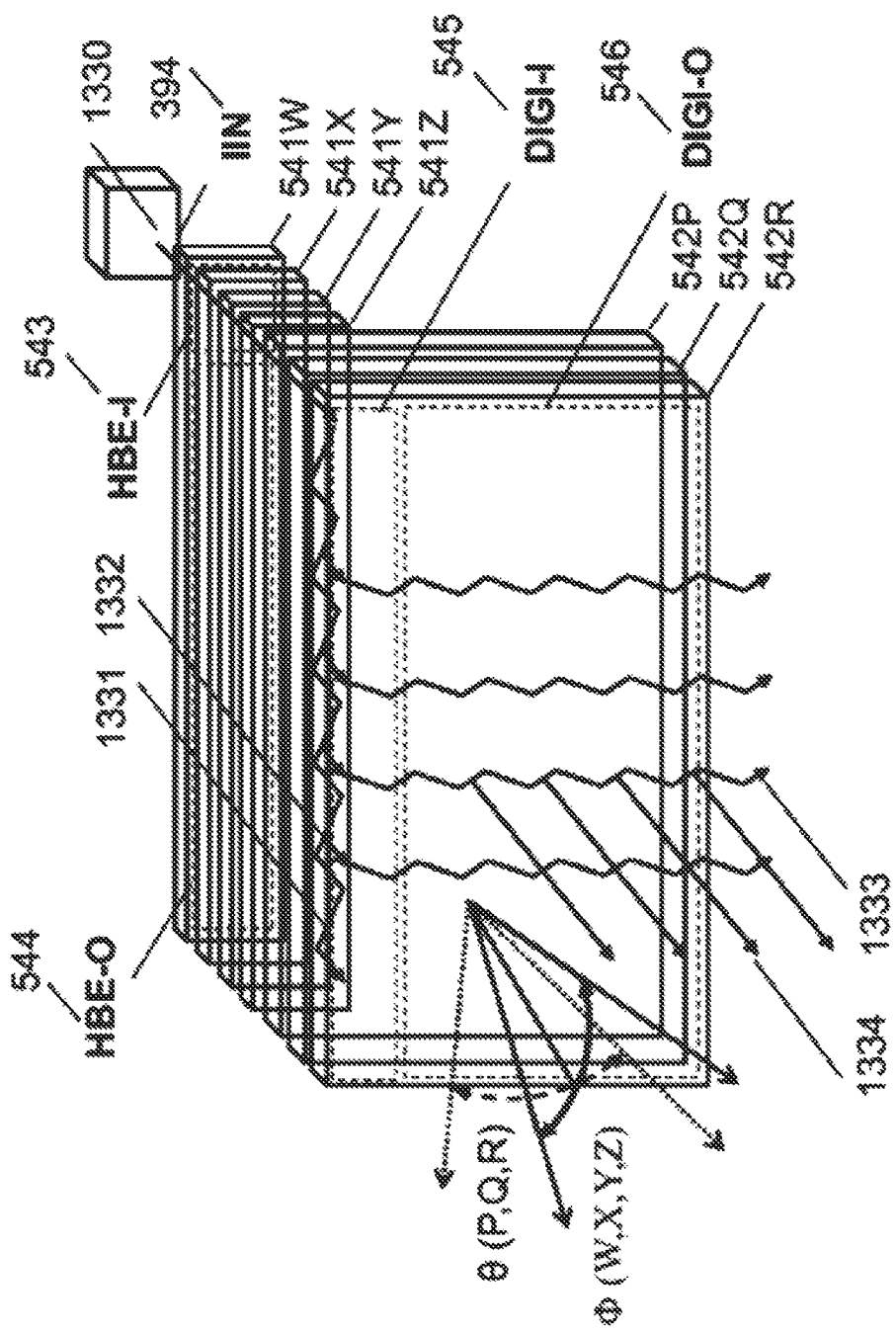
FIG. 45 is a three dimensional illustration of an embodiment of a display in one embodiment in which there are provided three HBE waveguides and three DigiLens waveguides.

FIG. 45 is a three dimensional illustration of an embodiment of a display in one embodiment in which there are provided three HBE waveguides and three DigiLens waveguides. The HBE waveguides are indicated by numerals 541 and the DigiLens waveguides by 542 with the HBE waveguides being labelled by symbols W-Z as before and the DigiLens waveguides by symbols P-R. Each HBE waveguides contains a HBE-I and HBE-O also referenced by 543,544 respectively and each DigiLens contains a DIGI-I and a DIGI-O also referenced by 545,546 respectively. The IIN is indicated by 394. A ray path from the IIN through the HBE waveguide 541Z and DigiLens waveguide 542R is shown using the rays 1330-1334. Note that the pupil; has been combined before the DIGI-I so that the full 52 degree horizontal×30 degrees vertical FOV exist at this stage.

Figure 46:
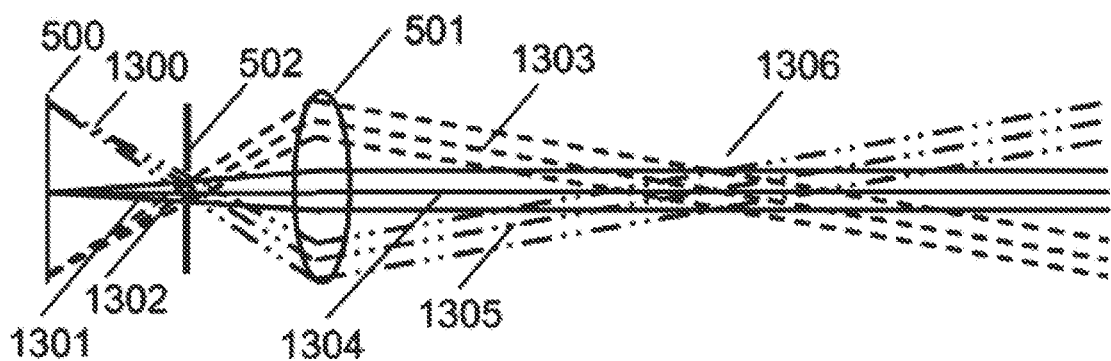
FIG. 46 is a schematic side elevation view showing the formation of a projected stop by the IIN.

One embodiment is related to a projected stop. FIG. 46 is a schematic side elevation view showing the formation of a projected stop by the IIN. Light from an image pixels at the center and edges of the image displayed on the microdisplay 500 passes through a stop 502 to provide the marginal beams 1300,1302 and the on axis beam 1301. The projection lens 501 collimates this light to provide the collimated beams 1303-1305 which overlap at the projected stop 1306. Light from other points in the input is similarly converged into the projected stop. Note that the projection optics has been simplified in FIG. 46 and in practice the projection lens will be a multi-element system as discussed earlier. As will also be appreciated by those skilled in the art of optical design the need for a physical stop 502 be minimized (or even eliminated) by limiting the numerical aperture (NA) at the microdisplay by suitable design of the illumination delivery optics. It should be noted that the distance from the lens to the projected stop is very large compared to the thickness of the HBE stack.

Figure 47:
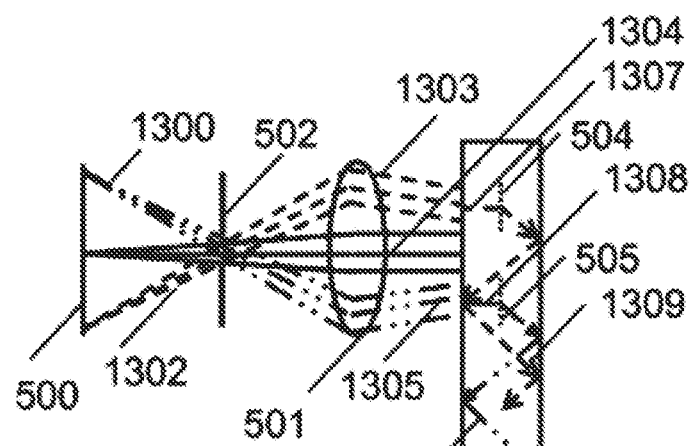
FIG. 47 is a schematic plan view illustrating the coupling of light from the IIN into the HBE waveguide.

FIG. 47 is a schematic plan view illustrating the coupling of light from the IIN into the HBE waveguide 503. The input grating or HBE-I comprises the two gratings 504,505 having a small separation along the waveguide propagation axis. Importantly, the two gratings have substantially non-overlapping DE versus angle characteristics. The HBE-O grating is located further down the waveguide as indicated by 506. In contrast to the input gratings the output grating multiplexed two different grating prescriptions as will be explained below. The advantage of this coupling scheme is that it enables mapping of the angular content of the input light to defined gratings areas 504,505 allowing the input gratings (HBE-I) of the HBE to be separated along the waveguide optical axis. This effect is accentuated by having small entrance pupil diameters. For simplicity illustrated herein are just two ray paths through the waveguide. In the first path an incident rays 1307 is diffracted into a first TIR path 1309 by the first grating element 504 of the HBE-I. In the second path incident ray 1308 is diffracted into a second TIR path 1308 by the second grating element 505.

Figure 48:
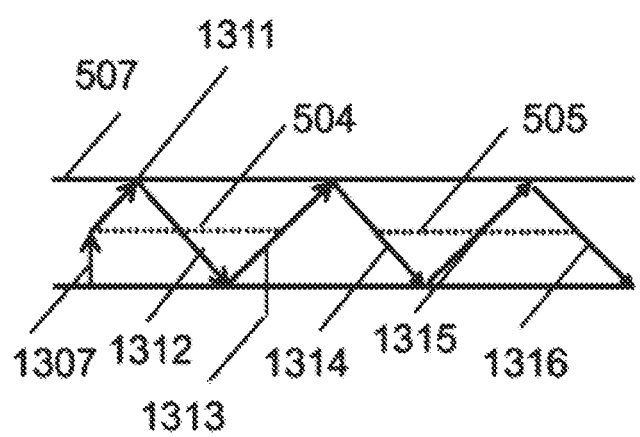
FIG. 48 shows a detail of the HBE waveguide of FIG. 47. The image input end illustrating the interaction of the beam with the gratings.

The interaction of the beam with the gratings is illustrated in more detail in FIG. 48 which shows a portion of the HBE waveguide containing the input gratings of FIG. 47. The incident ray 1307 is diffracted by the first grating 504 into the ray path 1311. After the first TIR reflection the reflected ray 1312 is off Bragg and therefore passes through the first grating without deviation. After the second reflection the ray just skirts the trailing edge of the first grating avoiding diffraction. TIR now proceeds to the next grating. After the third reflection the ray 1314 skirts the leading edge of the second grating. After the fourth reflection the resulting ray 1315 is off Bragg. Finally, after a fifth reflection the ray 1316 skirts the edge trailing of the second grating and proceeds to the HBE-O. Clearly this simplistic explanation only applies to the chief ray and does not adequately describe the behavior of a divergent beam which will result in unwanted diffractions of rays that intercept the gratings. However, the narrow beam angles within the waveguide will reduce the impact of unwanted beam-grating intersections.

Figures 49, 50:
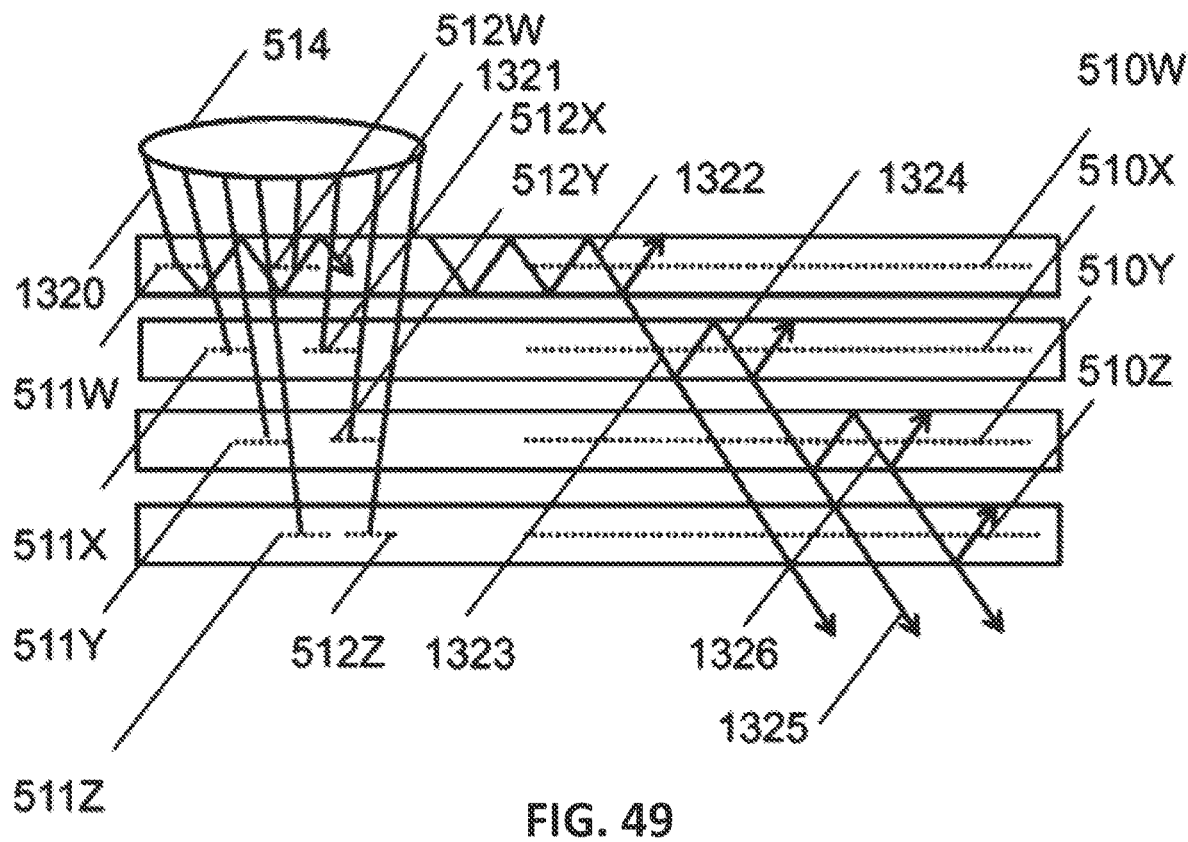
FIG. 49 is a schematic cross-sectional view of a four layer HBE in one embodiment.
FIG. 50 is a table showing the gratings used in the embodiment of FIG. 49.

FIG. 49 is a schematic cross-sectional view of the four layer HBE shown in FIG. 45. Following the above description each waveguide layer comprises a HBE-I gratings comprising two separate gratings and a HBE-O comprise a multiplexed grating. The waveguides may be separated by air gaps or preferably by thin layers of nanoporous low index material. The input gratings are labelled by the numerals 511,512 and the output grating by the numerals 510 with the waveguide layers being referenced by the symbols W, X, Y, and Z. The drawing shows input rays from the projection lens 514 interacting with each of the input gratings in each layer. Note that the output light from waveguide layer W may interact with one or more of layers X-Z. However, as already discussed the property of grating reciprocity maintains the beam angle for any such interactions. The result beam shifts resulting from such interlayer interactions may provide beamsplitter or homogenizer. For example, consider the input ray 1320. This ray is diffracted by the first grating 511W into a TIR path 1321 which propagates through the second grating 512W without deviation and continues its TIR path 1322. At the output grating 510W a portion of this light is diffracted into the ray 1323 in waveguide 510X. On entering the second waveguide a portion of this light is diffracted into the TIR path 1324 the remainder proceeding in the direction 1323. Further interactions with the grating 510Y are indicated by the rays 1325 and 1326.

Figure 51:
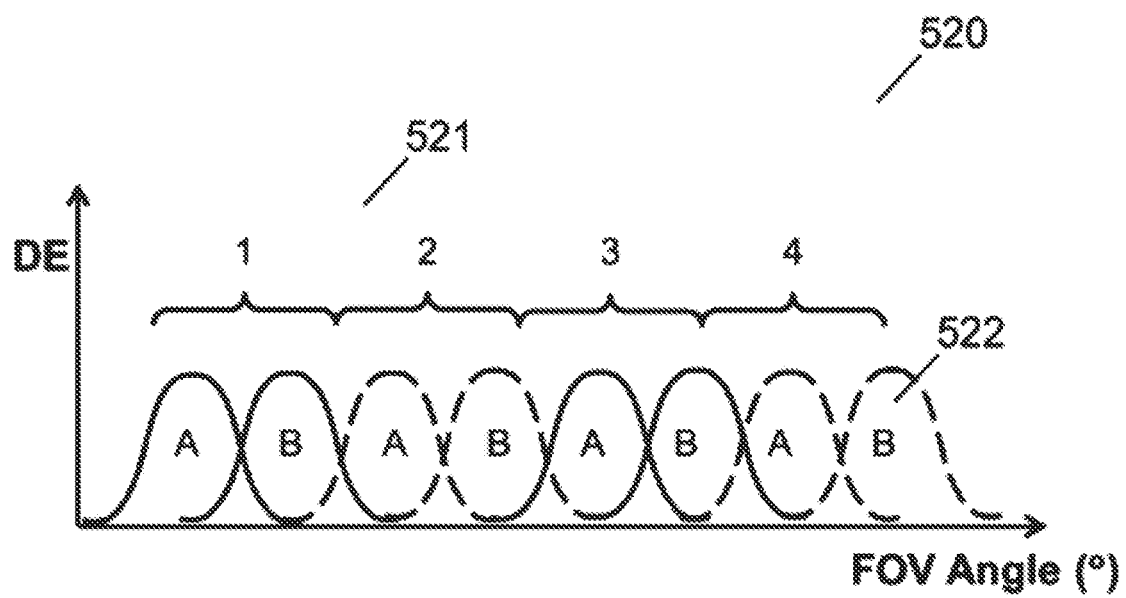
FIG. 51 is a chart showing overlapping DE versus angle profiles in the embodiment of FIG. 49.
Figure 52:
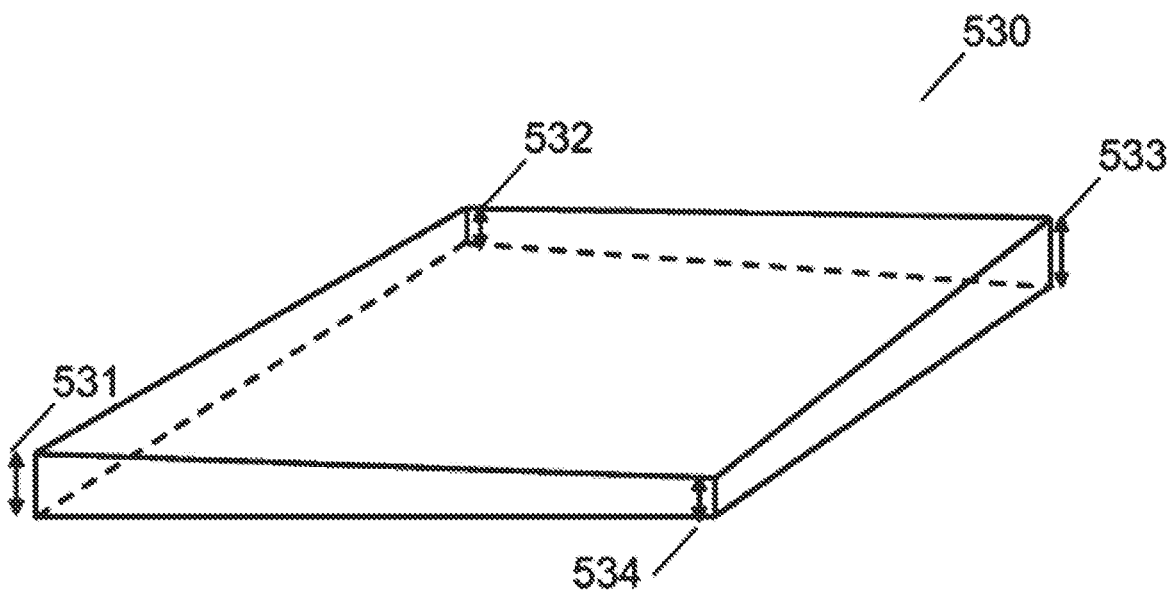
FIG. 52 is a three dimensional view of a wedge SBG grating in one embodiment.

FIG. 50 is a table showing the pairing oft multiplexed gratings used in each waveguide layer of the embodiment of FIG. 48. Each pair of gratings must have DE versus angle bandwidths with sufficient separation to avoid appreciable overlap. Since the gratings will be lossy thin gratings characterized by low DE peaks and wide angular bandwidths this separation needs to be quite large. FIG. 51 is a chart a chart showing one possible scheme for overlapping the DE versus angle profiles in the embodiment of FIG. 45. Each pair of gratings corresponds to a 26 degree chief ray angular separation. It is assumed that the total horizontal FOV is 52 degrees. For a thin (low peak DE, high ABW) grating the ABW is approximately 13 degrees. Assuming that the input HBE gratings have ABWs of 6.5 degrees referring to the angle ranges: −6.6 degrees to 0 degrees as A and the angle range: 0 degrees to 6.5 degrees as B. It is recognized that A and B should not be used in the same waveguide owing to: firstly. DE versus angle overlap and secondly, lack of reciprocity. The grating separations are based on the FWHM. However, other measures may provide better optimization of the overall illumination profile. For example the grating overlaps could be at the 30% of peak angles. Assuming FWHM this gives 8 gratings to span a FOV of 52 degrees (i.e., 8×65 degrees).

Achieving high illumination uniformity is an important issue in SGO design. The chief design parameters are thickness and index modulation. As discussed earlier, applying a small wedge angle to the grating layer allows the peak DE and angular bandwidth to be tuned along the waveguide. However, the light remaining in the waveguide at the end of the propagation path will tend to accumulate at larger angles leading to uneven output illumination. At present the inventors believe that this effect may not be very significant. A more sophisticated strategy in cases where very tight illumination control is needed is to shape the grating layer by applying tilt in two directions. As a further refinement the surfaces of the grating could be curved. Since the needed grating thickness variations are very tiny typically 1-2 microns across the waveguide the effect on collimation and MTF are negligible in most implementations. FIG. 51 is a three dimensional view of an SBG grating 530 characterized by two orthogonal slants. The four different corner heights with respect the plane of the waveguide resulting from the orthogonal slants are indicated by 531-532. However, preliminary ray-tracing analysis by the inventors has yielded some evidence that the optimal DE profile needed within the waveguide is a one dimensional function and is a function of the length of the waveguide not the number of bounces of the beam within the waveguide. The ray angle displacements (i.e., ±angles) around the chief ray) appear to need the same grating thickness profile as the chief ray (as a function of the length of the waveguide). This suggests that a 2D profile may not be needed for optimum uniformity. Note that to first order DE must scale as the reciprocal of the difference between the waveguide length and the distance traveled by the beam.

FIGS. 53A-53C are schematic illustrations of a three operational states of the HBE in one embodiment. A portion of the waveguide 551 and the projection of the IIN projection lens 550 is shown in each cased with three collimate beam portions indicated by 1341-1342. The shaded areas correspond to the HBE cross sections seen by each DigiLens waveguide for each of the three separate 10 degree vertical FOV bands coupled into one of the DigiLens waveguides to give the 30 degree total vertical FOV. The shaded areas in FIGS. 53A-53C also show the portion of the DIGI-I that accepts light from the HBE-O for the three vertical FOV regions. Only ⅓ of the aperture is collected by DIGI-I in each state. By keeping the effective aperture low in this way it is ensured that the DigiLens waveguides do not need a large thickness. It is estimated that the total thickness needed for the three DigiLens waveguides using the above aperture method (as well as the polarization management mentioned earlier in the description) will result in an overall thickness of 6 mm. This assumes a rectangular exit pupil. If a circular pupil is acceptable the need to achieve the extreme diagonal angles is removed resulting in a lower overall thickness.

Although all passive grating as described above is feasible in monochrome it is likely that switching will need to be introduced to provide full color to ensure that crosstalk is overcome.

It is important to note that a unique feature of the above embodiment is the way in which the HBE selectively samples portions of the input image each portion being characterized by either angular field or spatial field. This approach ensures that the waveguides in particular the DigiLens can be made very thin. This is a particularly important feature in HMDs and near eye. The process of sampling the input image described above should be distinguished from the process of switching the entire input image into the waveguides used in FOV tiling, as disclosed in earlier filings.

Exemplary Features

In one embodiment optical power may be provided in at least one of the gratings used in the HBE and DigiLens waveguides. The recording of lens prescriptions in diffractive optical elements is well known. In the present invention this offers potential for fine tuning the focus of the display without the need for auxiliary lenses. Such a lens could also be used for correcting aberrations. A switching hologram offers the potential for a solid state (no moving parts) solution for providing images at different ranges. This may need multiple layers. This would provide an attractive feature in HUD and HDD applications. Recording holographic lens of appreciable optical power may need careful attention to overcoming off-axis holographic aberrations. The construction optics are potentially more complicated but once a master hologram is made, the contact copy process is the same as any other hologram.

In one embodiment a multilayer thin film coating is applied to a reflection surface of the DigiLens waveguide is to enhance the waveguiding range beyond the TIR range. Glasses and plastics do not allow the range of TIR angles need for large field of view. For example Rays below 39° are not supported by polycarbonate TIR (refractive index at 532 nm=1,585). The problem boils down to achieving a minimum waveguide angle 30 degree angle which is well below critical angle for plastics and low cost glasses. The coating design problem is to achieve a reflectivity coating prescription that achieves the needed reflectivity, without image degradation or loss of see-through transmission. The coating may need optimizing for wavelength polarisation, angle, scatter, Loses from absorption. One benefit of applying dielectric films on the substrate significantly reduces the amount of diffractive power needed, thereby improving grating angular bandwidth. The dielectric coating has the following characteristics: a) high reflectivity for S&P light for angles of 30° (in glass) to 39° (TIR angle), b) high transmission for 0°±13° (in glass) for P-light; equates to 35°×20° corner fields in air; c) good angular control of reflectivity can be achieved due to narrow band nature of sources; and d) high see through for non-laser notch wavelengths on all layers.

In one embodiment the input gratings in at least one of the HBE or DigiLens, i.e., the gratings HBE-I and DIGI-I, comprises stacks of gratings of different k-vectors to provide DE versus angles characteristically distributed uniformly over the range of beam angles to be transmitted through the HBE and DigiLens. Typically the gratings will be separated by 200 micron (or even 100 micron) substrates to keep the stack as thin as possible. Ultimately, the inventors believe that the minimum practical grating stack thickness can be achieved using spin coating techniques.

In one embodiment an alternative scheme of multiplexed gratings of different k-vectors avoids the need for stacking.

Any of the above-described embodiments using laser illumination may incorporate a despeckler device for eliminating laser speckle disposed at any point in the illumination path from the laser path to the eyeglass. Advantageously, the despeckler is an electro-optic device. Desirably, the despeckler is based on a HPDLC device.

In one embodiment the display incorporates a homogenizer that combines beam shaping and despeckling. Desirably, the SBG array used to perform the above functions are themselves diffractive waveguide devices that can be implemented seamlessly as additional SBG layers within one or more of the waveguides or in the IIN. Despeckling is achieved by a combination of angular and phase diversity. Exemplary waveguide homogenizers are disclosed in U.S. Provisional Patent Application No. 61/796,795, entitled COMPACT LASER ILLUMINATOR INCORPORATING A DESPCKLER, with filing date of 20 Nov. 2012 and PCT Application No. US 2008/001909, with International Filing Date: 22 Jul. 2008, entitled LASER ILLUMINATION DEVICE. It should be apparent from consideration of the drawings and descriptions that the invention offers several opportunities for integrating such devices within the IIN and the waveguide components of the display.

The invention provides a transparent display based on a DigiLens which comprises one or more passive SBG waveguides, each one projecting a portion of the vertical field of view or a specific color. The invention is enabled by improvement in diffraction efficiency angular bandwidth obtained from using thinner SBGs and taking advantage of the intrinsically broad sagittal angular bandwidth of Bragg gratings. The invention can deliver a large field of view, for example 52° horizontal×30° vertical, without sacrificing any of the usual goals of high transparency, high resolution, ultra compact (thin) form factor, light weight and generous eyebox. The waveguide components and compact input image node are consistent with a small form factor, path to curved visor, and slim-line goals. With the benefit of expected improvements in angular bandwidth and optical efficiency, it is believed that the above FOV can be increased. The display modular design approach permits ready growth from monochrome to color with no major architecture redesign being needed. Reasonable imaging performance can be delivered out to 1.0 cyc/mr for both color and monochrome solutions. Optical performance in the monochrome will exceed the 1.4 cyc/mr display pixel resolution. The best resolution will be achieved in monochrome, but good performance can be achieved also for a color display. In a HMD the invention can provide a 25 mm wide eye box at 25 mm, eye relief. This will permit 90% of the population to be accommodated without any adjustment. Substrate guided diffractive optics are used everywhere except in the Input Image Node (IIN). However, the refractive components can be replaced by diffractive elements in future developments of the design to yield further form factor compression, and manufacturing benefits. The IIN may be mounted above or to the side of and at the front or rear of the DigiLens. This allows a range of ergonomic demands to be met while preserving core DigiLens functionality. The design may need no partitioning or tessellation of the near eye DigiLens, eliminating the problems of illumination ripple and discontinuities and scatter from electrodes. A transparent display according to the principles of the invention will also benefit from results from plastic SBG technology disclosed in United In one embodiment, a holographic brightness enhancing film, or other narrow band reflector, is affixed to one side of the display, the purpose of which is to reflect the display illumination wavelength light only; the see-through display can be made invisible (and hence secure) in the opposite direction of view. Here the reflected display illumination is effectively mirrored and therefore blocked in one direction, making it ideal for transparent desktop display applications in customer or personal interview settings, common in bank or financial services settings.

An important performance parameter in the present context is the see-through transmission of the display. The variables that have an impact on transmission are the ITO coating (0.995), the AR coatings (0.99), and the absorption of the substrates and holographic layers. There will also be Fresnel losses at the interfaces between the waveguides and the low-index bonding layers. The needed transmission for the color display is >70%, with an objective of >90%. Assuming three waveguides per display and two substrates per waveguide, the calculated transmission is 93%, meeting the stipulated objective. Note that it is our intent to implement this design using 100-micron glass substrates. With three waveguides and three substrates per waveguide (note: two holographic layers may need three substrates), the total thickness of the display of the color display is still less than 1 mm. The thicknesses of the holographic layers (including the coatings) are negligible; each contributes only 4-5 microns to the overall thickness. Since weight is always an issue, this is an extremely important feature of our approach. When plastic is employed, the weight may be reduced even further.

In the preferred embodiment, the SBGs operate in reverse mode such that they diffract when a voltage is applied and remain optically passive at all other times. The SBGs will be implemented as continuous SBG lamina separated by thin (as thin as 100 microns) substrate layers as shown. Ultimately the design goal is to use plastic substrates with transmissive conductive coatings (to replace ITO). Plastic SBG technology suitable for the present application is being developed in a parallel SBIR project. This is a planar monolithic design harnessing the full assets of narrow band laser illumination with monolithic holographic optics.

The present invention has a suite of advantages ideally suited for substrate guided optics. First, component costs are greatly reduced. The optical complexity is contained in the various holographic optical elements. Once the non-recurring engineering (NRE) associated with creating a set of masters is complete, the replication costs are relatively insignificant compared to the recurring material costs associated with discrete refractive components. Second, assembly time is greatly reduced. Not only is part count greatly reduced, but the assembly process is much faster. The planar structures can be cost-effectively laminated together with very high optical precision using alignment fiducials. The touch labor is greatly reduced compared to that of building a piece-part assembly to exacting standards. Third, the optical precision is much greater. One of the biggest challenges in designing a new optical design is controlling the roll-up of tolerances on the piece parts, the mechanical housings, and the assembly procedure. With holographic optical elements (HOEs), "gold standards" can be assembled by senior engineers and this level of quality captured in the HOE masters during the NRE phase. Besides the fact that optical alignment of the HOEs can be accomplished with great precision, the individual HOEs are more tolerant of variations in alignment. Thus, the overall yield of high quality devices is much higher. Lastly, size and weight are greatly reduced by this monolithic design, as is the ruggedness of the entire subsystem.

It will be clear that in any of the above embodiments the eye lens and retina may be replaced by any type of imaging lens and a screen. Any of the above described embodiments of the invention may be used in either directly viewed or virtual image displays. Possible applications range from miniature displays, such as those used in viewfinders, to large area public information displays. The above-described embodiments may be used in applications where a transparent display is needed. For example, the invention may be used in applications where the displayed imagery is superimposed on a background scene such as heads up displays and teleprompters. The invention may be used to provide a display device that is located at or near to an internal image plane of an optical system. For example, any of the above described embodiments may be used to provide a symbolic data display for a camera viewfinder in which symbol data is projected at an intermediate image plane and then magnified by a viewfinder eyepiece. It will be clear the invention may be applied in biocular or monocular displays. The invention may also be used in a stereoscopic wearable display. Any of the above described embodiments of the invention may be used in a rear projection television. The invention may be applied in avionic, industrial and medical displays. There are also applications in entertainment, simulation, virtual reality, training systems and sport.

The preferred light source for the display is a laser which is the ideal match to the diffractive optical elements and therefore unleashes the full power of our HMD, HUD and HDD designs. In terms of brightness, resolution and color gamut, the invention could also in some applications where optical performance is not very important to be applied using LEDs.

Currently, SBGs for use in one embodiment are manufactured using stand-off exposure. However, the processes can be readily converted to a contact-copy process. The IIN may be implemented as an assembly of discrete refractive components. However, it is highly desirable to convert the design to a laminated stack of planar holographic elements. With sufficient volume, such an implementation of the IIN would achieve a very attractive price point. Advantageously, the substrates used in the waveguide would be fabricated from ballistic-quality plastic substrates. Proof of feasibility has been established and process optimization activities are underway. Replacing refractive components with laminated plastic-based planar holographic elements will make displays based on the invention inherently more rugged.

Further Embodiments

The following embodiments are directed at a display that uses a single waveguide HBE. This particular embodiment is presently considered to be more suitable for lower field of view devices such as HUDs. However, recognizing that the size of the HBE is likely to be manageable, there is no reason in theory why the same embodiment could not be used for higher FOV applications such as HMDs. As will be discussed, the prerequisite is a non-projected pupil.

Figure 54A:
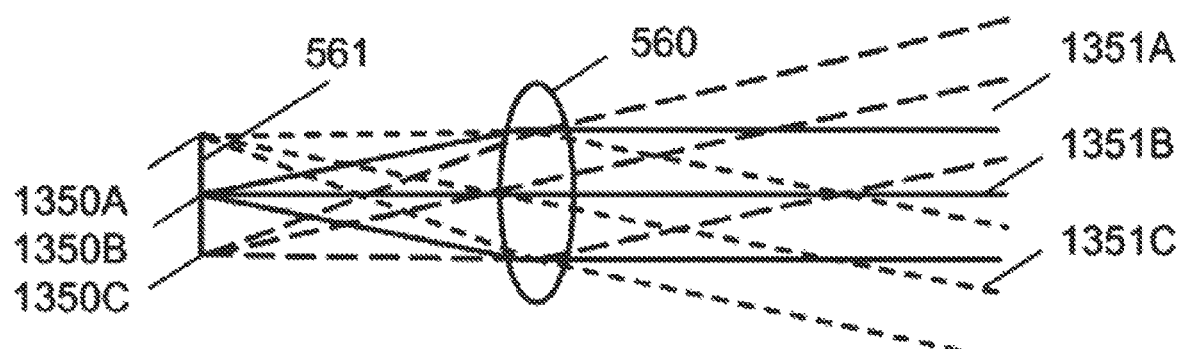
FIGS. 54A-54B illustrate projection schemes in one embodiment that do not result in a projected pupil of the type discussed earlier in the description; the pupil may be formed inside the projection lens (FIG. 54A) or before the projection lens using the aperture 562 (FIG. 54B).
Figure 54B:
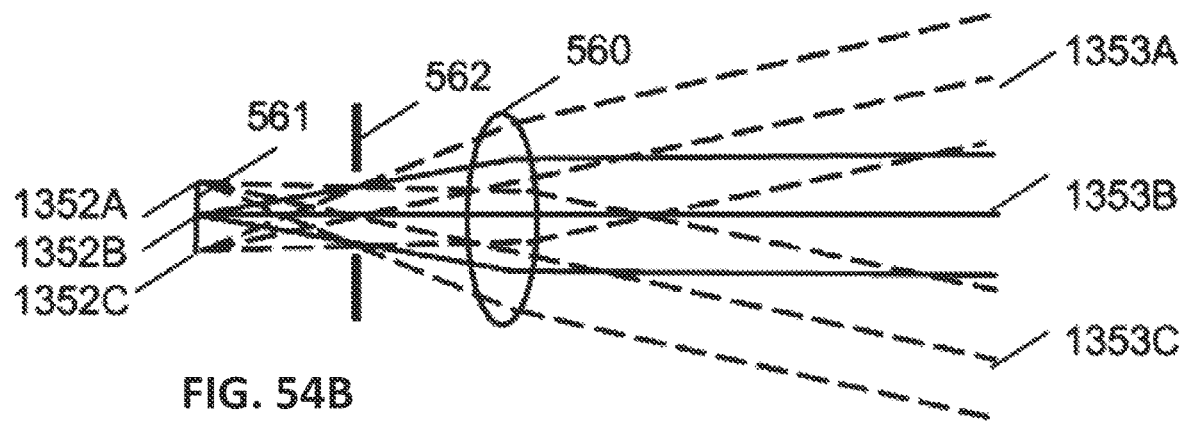

FIG. 54 illustrates projection schemes that do not result in a projected pupil of the type discussed earlier in the description. The pupil may be formed inside the projection lens, as shown in FIG. 54A, or before the projection lens using the aperture 562 as shown in FIG. 54B. Such projection schemes result in an angular diversity at some distance along the z axis or optical axis that is less than the full FOV. For example turning to FIG. 54A, if light from the source image points 1350A-1350C is considered, which is collimated by the lens 560 into the collimated ray bundles 1351A-1351C, overlap exits between the bundles 1351A,1351B and between the bundles 1351B,1351C. From basic geometry the angular diversity to first order is given by the projection lens exit pupil aperture D and the distance along the optical axis z.

Figure 55:
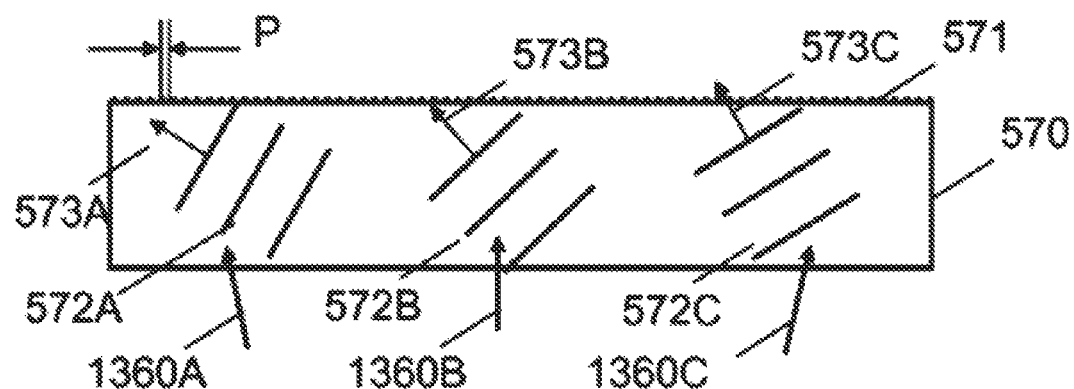
FIG. 55 shows a schematic illustration of the use of rolled k-vector gratings to maximize the peak DE of in-couple light in one embodiment.

FIG. 55 is a schematic illustration of the use of rolled k-vector gratings to maximize the peak DE of in-couple light, (for example in the HBE-I grating). The k-vector roll for the grating elements 572A-572C in the waveguide section 570 is indicated by the differing orientates of the k-vectors 573A-573C. The surface grating pitch P is constant along the length of the waveguide. The grating vectors are optimized to diffract the rays 1360A-1360, representing the chief rays and off-axis rays, with high diffraction efficiency. The use of rolled k-vectors enables high efficiency input coupling into a grating, and also allows the beam spread angle to be optimized to minimize the thickness of the waveguide; this may need balancing the waveguide thickness, the angular bandwidth of the input grating, and the spread of field angles at any given point on the input grating. The low angular response of gratings as the k-vector is rolled (and surface pitch maintained) prevents output coupling, allowing the waveguide thickness to be minimized.

Figure 56:
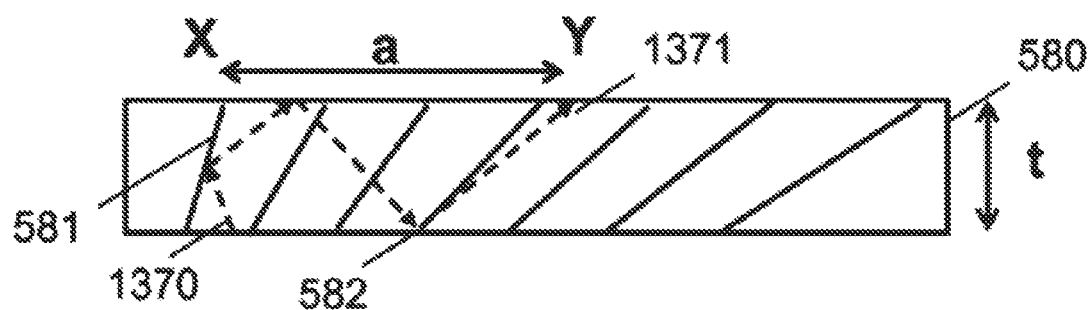
FIG. 56 shows a schematic illustration showing the propagation of a typical ray through a waveguide section 580 containing rolled k-vector gratings in one embodiment.

FIG. 56 is a schematic illustration showing the propagation of a typical ray through a waveguide section 580 containing rolled k-vector gratings. The dimension a separating the points X and Y is approximately twice the waveguide thickness t for a 45 degree TIR angle in the waveguide. The propagation path is indicated by the rays 1370-1371. The point X corresponds to the point at which the ray 1370 couples into the grating. The chief ray angle may be needed to change by an amount greater than or equal to the FWHM angular bandwidth of the grating. At point Y the ray angle is off Bragg. Hence, reciprocal output coupling at Y is not obtained. The design aim is to ensure maximum input coupling at X and at the same time to design the distance along z to minimize the angular diversity such that the grating thickness can be minimized without reciprocally out-coupling at position Y.

FIGS. 57-59 show perspective view of an embodiment that uses k-vector rolling to provide exit pupil expansion in orthogonal directions. FIG. 57 is a plan view showing the HBE 590 and the VBE 591. FIG. 58 is a schematic side elevation view of the HBE and the VBE. FIG. 59 is an unfolded view of the HBE showing the beam propagation inside the waveguide. A Cartesian XYZ coordinate system is provided for reference. The lossy output grating of the HBE is indicated by 592. The input grating is indicated by 593. The input and output gratings have common surface grating pitch. At Z=0 and Z=L along the HBE, it may be desired to have high input coupling within the VBE. As the angular diversity diminishes as the limit Z=L is approached (angular diversity scales as 1/L), the grating thickness can be increased. This is beneficial as the beam fill W at Z=L is much greater than at Z=0 so that light in-coupled to the VBE with thickness t will experience more grating interactions in waveguide following in-coupling. A thicker grating reduces out-coupling. The angular diversity can be used to fine-tune the thickness of the VBE.

Figure 60:
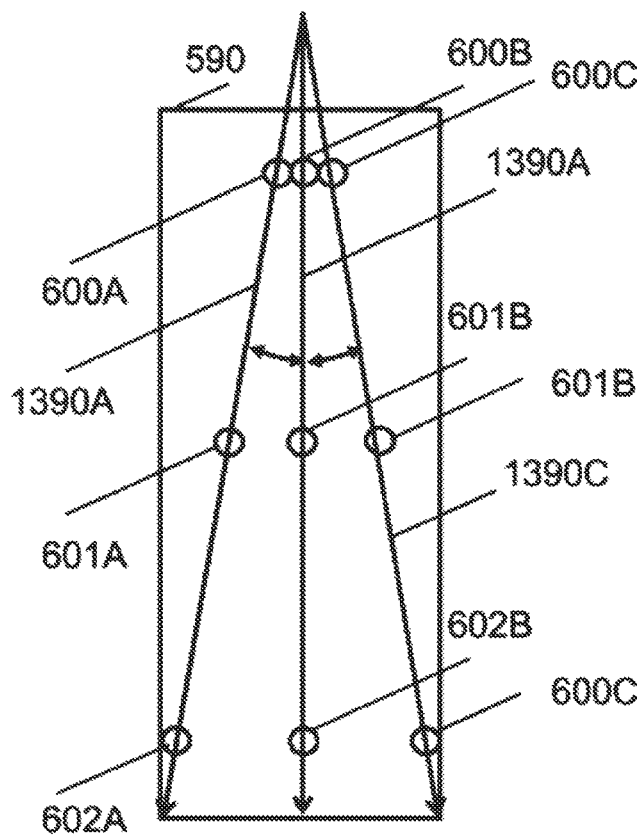
FIG. 60 illustrates an apparatus for fabricating the HBE using a contact copying process in one embodiment.
Figure 61A:
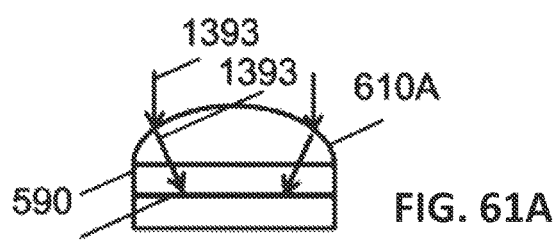
FIGS. 61A-61C, respectively, show a cross section of the Z=L end of the HBE 590 with the wider end of a cone shaped lens overlaid, a plan view of the lens, and the Z=0 end of the HBE with the narrower end of the lens overlaid in one embodiment.
Figure 61B:
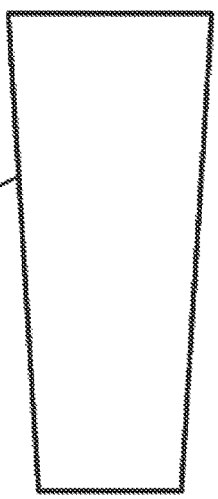
Figure 61C:
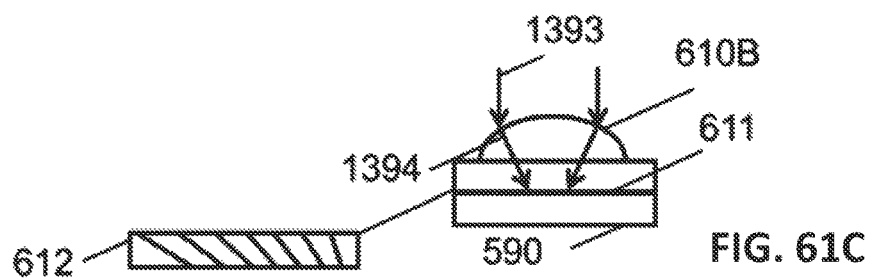

FIGS. 60-62 illustrate an apparatus for fabrication the waveguide illustrated in FIGS. 57-59. Referring to FIG. 60, all points along the ray 1390A such as 600A-602C must have identical surface grating pitches and parallel k-vectors. The k-vectors are rolled in planes orthogonal to the z axis. FIG. 60 illustrates an apparatus for fabricating the HBE using a contact copying process. FIG. 61A shows a cross section of the Z=L end of the HBE 590 with the wider end of a cone shaped lens overlaid. FIG. 61B shows a plan view of the lens and FIG. 61C shows the Z=0 end of the HBE with the narrower end of the lens overlaid. The grating layer is indicated by 611 and the rolled grating is indicated by the detail 612. The paths of the collimated recording beam incident on the lens are indicated by 1391,1393. The convergent rays that are used to form the rolled grating are indicated by 1392,1394. The lens is illustrated as a refractive element. In one embodiment a diffractive lens of equivalent prescription may be used. The cone-shaped lens contact copying set-up may need careful attention to overcome holographic off-axis aberrations, which may need to be compensated at the recording stage.

Figures 62A, 62B:
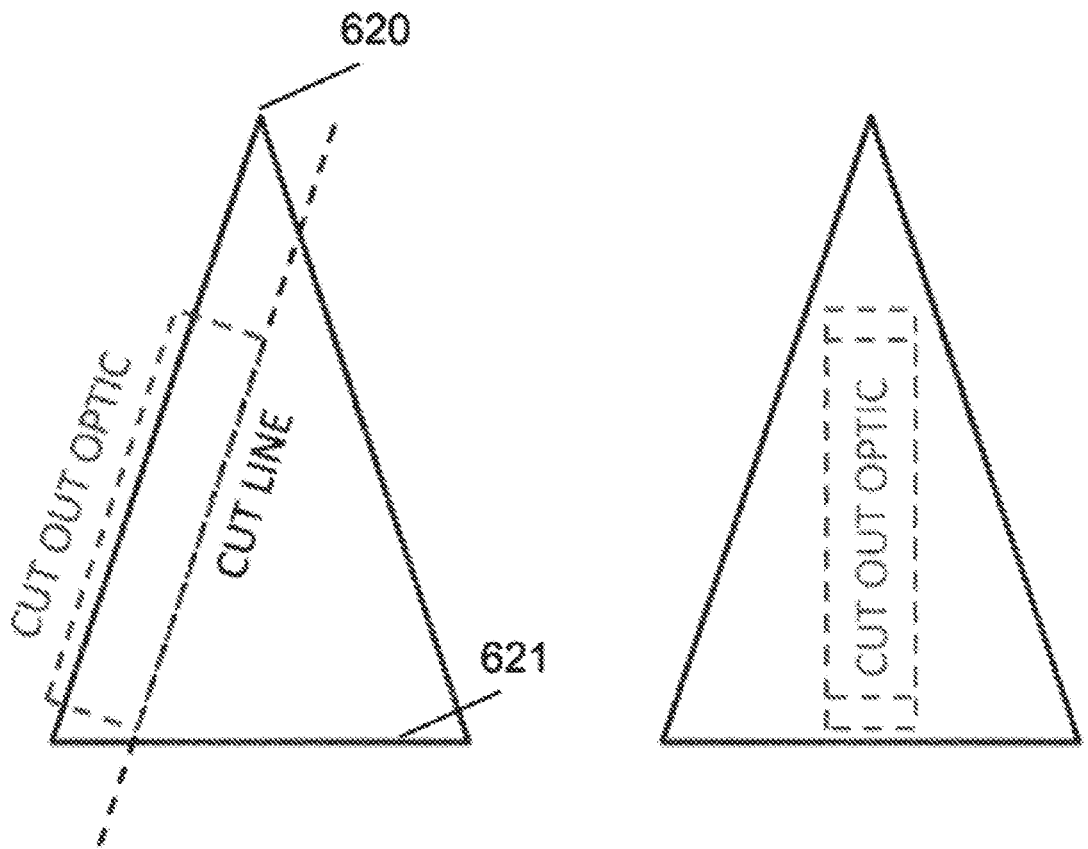
FIGS. 62A-62C illustrate the generation of the conic section from a cone of tip 620 and base 621; the cone is shown in side view in FIG. 62A and in-front view in FIG. 62B; a view of the cut out optics projected from the base along the cut line is shown in FIG. 62C.
Figure 62C:

FIG. 62 illustrates the generation of the conic section from a cone of tip 620 and base 621. The cone is shown in side view in FIG. 62A which indicates the cut out optic and the cut line and in-front view in FIG. 62B, which again indicates the cut out optic. A view of the cut out optics projected from the base along the cut line is shown in FIG. 62C. The conic section is obtained by cutting parallel to cone edge. Rays parallel to the z-axis then remain non-deflected (i.e., with no refracted component) in the y-axis. The amount of deflection (refraction) in the x-axis is a function of the position the ray strikes the y-axis.

Figure 63:
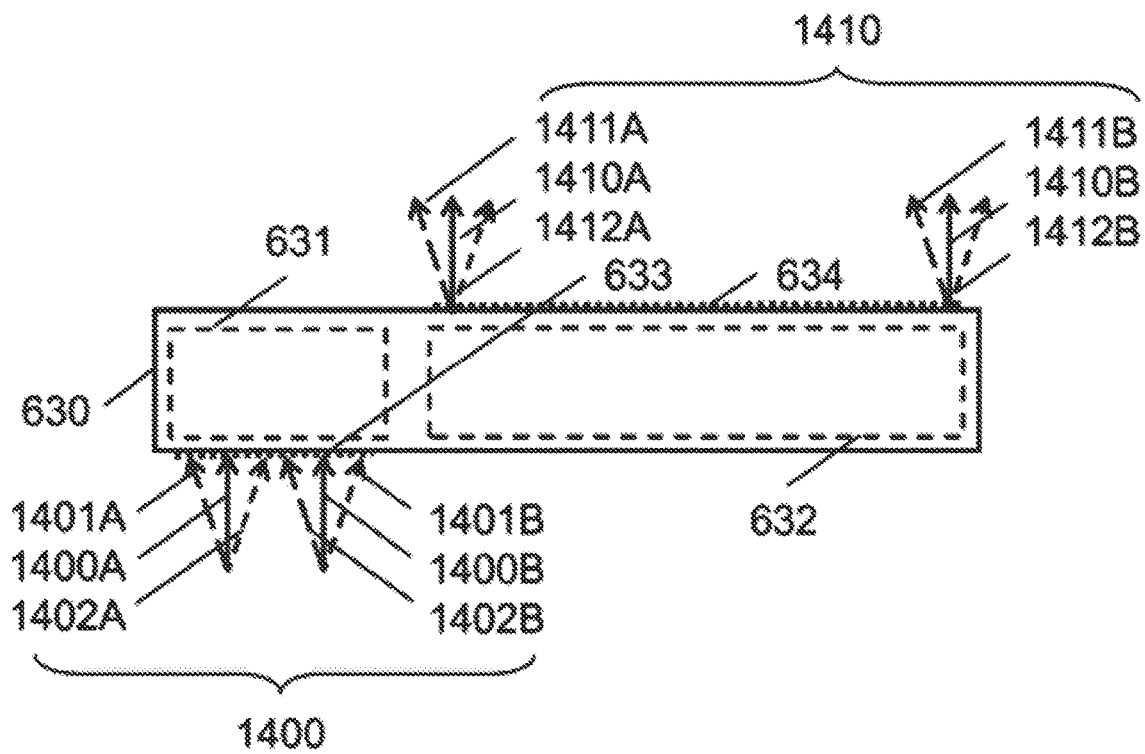
FIG. 63 shows the basic architecture of a waveguide in one embodiment.
Figure 64:
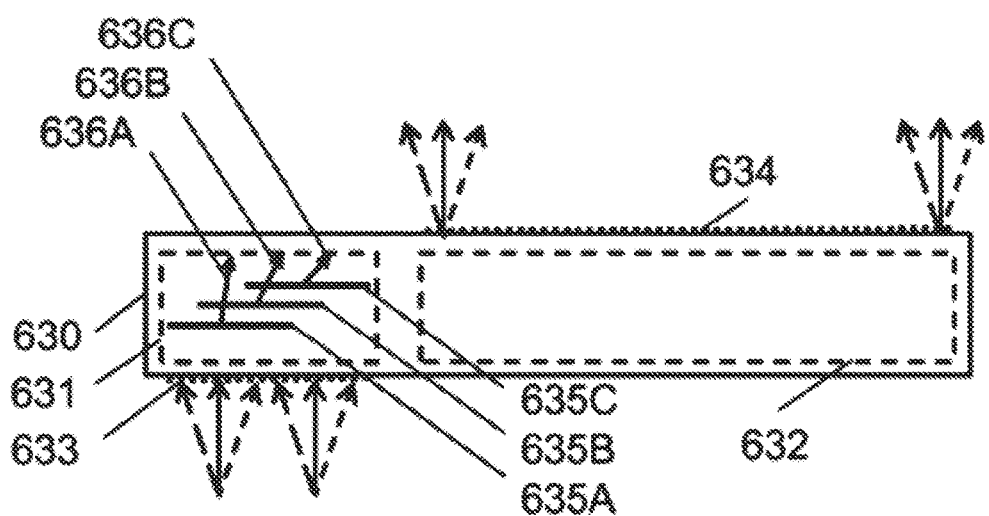
FIG. 64 is an illustration of a waveguide in which the input gratings 635A-635C are stacked. Each grating has a unique k-vector 636A-636C in one embodiment.

FIGS. 63-66 illustrate the principles of k-vector rolling, FIG. 63 shows the basic architecture of a waveguide according to the principle of the invention. The waveguide 630 comprises a multiplicity of grating lamina which can be grouped into input gratings 631 and output gratings 632. In each case associated with each Bragg grating there will be a surface grating as indicated by 633,634. Input image light is represented by the collimated beams 1400-1402 where characters A, B indicate the extreme rays of each beam. The corresponding output image light is represented by three collimated beams 1410-1412 with characters A, B again indicating the extreme rays. The output beam has a greatly expanded pupil owing to the extraction of light along the waveguide as discussed above. Typically the output gratings will be much longer, extending over most of the length of the waveguide. The DIGI-I, HBE-I gratings discussed in relation to certain embodiments are examples of input gratings while DIG-O, HBE-O gratings are examples of output gratings, in each group multiple gratings may be stacked or disposed in a layer adjacent each other. FIG. 64 is an illustration of a waveguide in which the input gratings 635A-635C are stacked. Each grating has a unique k-vector 636A-636C. The k-vector 636A is designed to give high diffraction efficiency for a field of view centered on the beam direction 1401. The k-vectors 6361, 636C are optimized for high diffraction efficiency around the incident beam directions 1400, 1402, respectively. Thus the input image is sampled into a plurality of angular intervals. Each angular interval is associated with an effective exit pupil that is a fraction of the full pupil.

Figure 65:
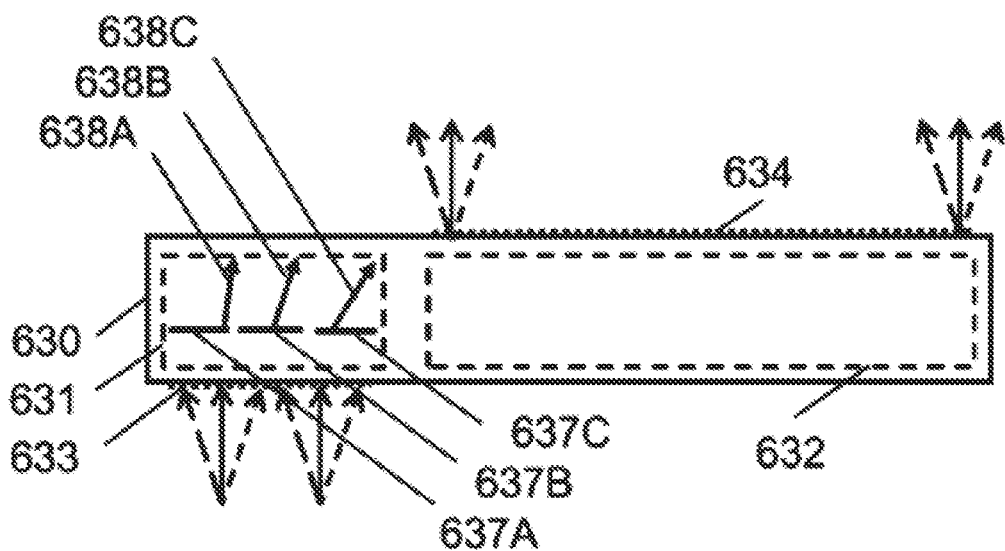
FIG. 65 shows that the input gratings are disposed adjacent to each other along the waveguide propagation direction in one embodiment.

In the embodiment as shown in FIG. 65, the input gratings are disposed adjacent to each other along the waveguide propagation direction. The waveguides are indicated by 637A-637C and the k-vectors by 638A-638C. The inventors have coined the term "rolled k-vector" to describe the varying orientation of the k-vectors along the waveguide propagation direction.

Figure 66:
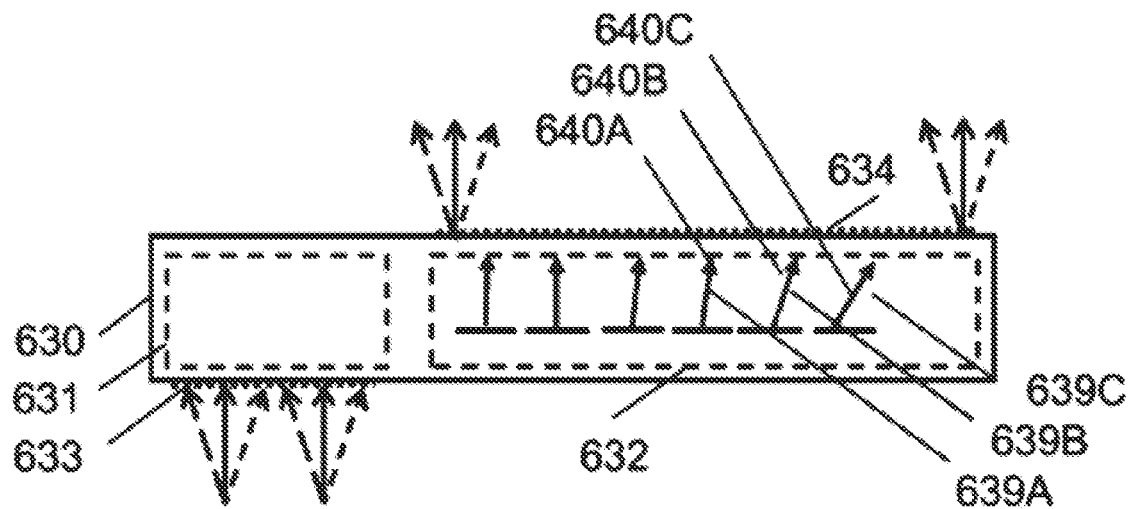
FIG. 66 illustrates that the principles illustrated in FIGS. 64-65 may also be applied in the output grating in one embodiment.

The principles illustrated in FIGS. 64-65 may also be applied in the output grating as illustrated in FIG. 66. Here the output grating comprises a multiplicity of adjacently disposed gratings such as 639A-639C with k-vectors 640A-640C. In alternative embodiments of the invention the output grating may be comprised of stacked gratings based on the principles of FIG. 64.

Figure 67:
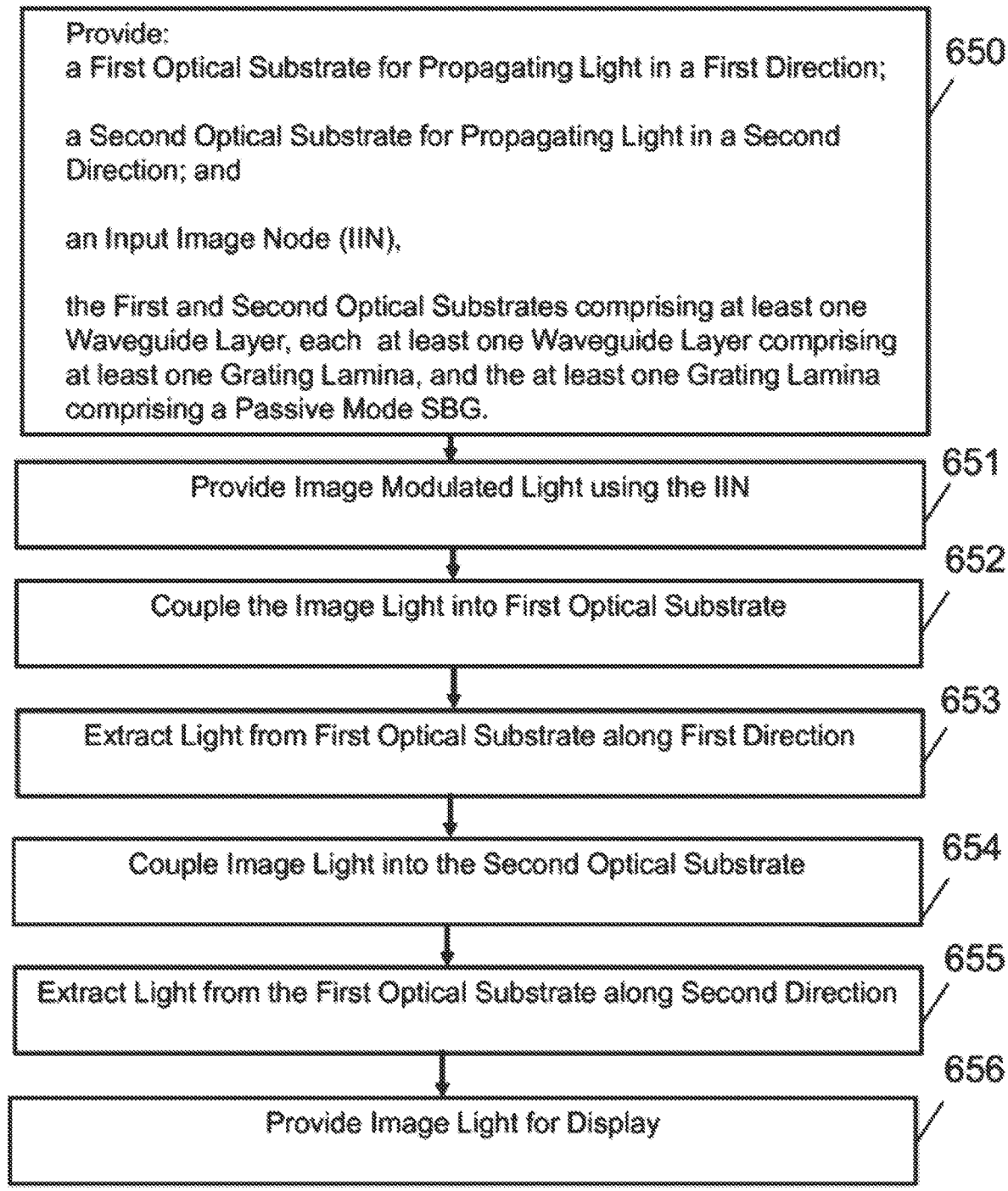
FIG. 67 shows a flowchart describing a process of one embodiment.

A method of displaying an image is one embodiment of the invention in accordance with the basic principles of the invention is shown in the flow diagram in FIG. 67. Referring to the flow diagram, the method may comprise the following steps:

At step 650 providing: a first optical substrate for propagating light in a first direction; a second optical substrate for propagating light in a second direction; and an Input Image Node (IIN), the first and second optical substrates comprising at least one waveguide layer, each at last one waveguide layer comprising at least one grating lamina, and the at least one grating lamina comprising a passive mode SBG.

At step 651 providing image modulated light using the IIN.

At step 652 coupling the image light into the First Optical Substrate;

At step 653 extracting light from first optical substrate along the first direction;

At step 654 coupling image light into the second optical substrate;

At step 655 extracting light from the first optical Substrate along the second direction;

At step 656 providing image light for display.

Summary of Some Embodiments

At least some embodiments provided herein use separate vertical and horizontal beam expansion waveguides to provide an enlarged exit pupil (or eye box). Each waveguide contains input and output Bragg gratings. Each of the waveguides may comprise more than one waveguide layer. In color embodiments a separate monochromatic waveguide may be used for each primary color. Another option for providing color is to record multiplexed gratings, in which holograms with different color prescriptions are superimposed, into a waveguide.

Collimated image light is fed into the horizontal beam expansion waveguide with a Field of View (FOV) defined by the microdisplay and collimating optics. The invention allows the input or "coupling" optics to be configured in many different ways ranging from classical optical lens-mirror designs to more compact designs based entirely on diffractive (holographic) optics.

The horizontal beam expansion waveguide is lossy, that is, it is designed to extract light out of the waveguide uniformly along its length. The extracted light is then coupled into the vertical expansion waveguide.

The vertical expansion waveguide, which is also lossy, completes the beam expansion to provide a vertically and horizontally expanded exit pupil.

A unique feature of the invention is that all of the above can be accomplished using passive gratings (although the use of switchable gratings is still an option for some applications). Conventional passive gratings would not work. The chief benefit of using passive SBGs is that the refractive index modulation of the grating can be tuned from very low to very high values with a correspondingly broad range of diffraction efficiencies. The high index modulation of SBGs results from the alternating bands of polymer-rich and LC-rich regions that form the Bragg fringes.

While lossy gratings are known in the prior art, the present invention is unique in achieving efficient and uniform extraction from the waveguide by varying the thickness (and modulation) across the grating. In its simplest case this entails creating a wedged grating (by inclining the cell walls) such that the hologram thickness increases in the direction of propagation. Typically, the grating thickness may vary from 1.0-1.2 micron up to 2.8-3.0 micron, the lower thickness producing the lowest efficiency (and largest angular bandwidth). The invention allows more sophisticated control of extraction by varying the thickness in orthogonal directions, using two wedge angles, or in a more general fashion by applying curvature to one or both faces of the grating.

A further unique feature of the beam expansion gratings is that they can be made very thin (well below 3 microns) which results in very broad diffraction efficiency angular bandwidth which, in turn, results in a wide FOV. By optimizing thickness and refractive index modulation it is possible to meet all of the needed grating characteristics needed in the display, i.e., very high efficiency for coupling into gratings and large dynamic range for the efficient, uniform extraction needed for beam expansion.

An extremely important feature of the invention that has implications for image transfer inefficiency and form factor is the use of image sampling. Coupling wide FOV image light into a waveguide would normally result in some loss of image angular content owing to the limited range of angles that can be efficiently propagated down a waveguide. Some of this light may couple out of the waveguide. The invention overcomes this problem by sampling the input image into multiple angular intervals, each of which has an effective exit pupil that is a fraction of the size of the full pupil, the thickness of the waveguide being reduced correspondingly.

Uniquely, the invention combines fixed frequency surface gratings at the input and output of each waveguide with rolled k-vectors along the waveguide. The surface grating is the intersection of the Bragg fringes with the substrate edge and accounts (approximately) for the basic ray optics of the waveguide. The k-vector is the direction normal to the Bragg grating and accounts for the diffraction efficiency vs. angle characteristics of the grating. By varying the k-vector direction along the waveguide propagation direction (k-vector rolling) it is possible to, firstly, provide efficient coupling of image light into the waveguide and, secondly, ensure that once coupled-in, all of the needed angular content is transmitted down the waveguide with high efficiency. The k-vector rolling would desirably be augmented by grating thickness control as discussed above. To our knowledge this principle has not been applied in the prior art.

With regard to color imaging, making the input and output gratings in each waveguide have the same surface gratings frequencies as discussed above allows colors to be implemented in separate waveguides that are free from cross talk. This is believed to be a unique feature of the invention.

In general, the propagate of angular content down the waveguide can be optimized by fine tuning of one or more of the following: grating thickness; refractive index modulation; k-vector rolling; surface grating period; and the hologram-substrate index difference.

The apparatuses and methods described herein may be applied to HMD, HUD and HDD.

Exemplary Embodiments

The various aspects of the apparatus, systems, and methods described herein may be further described in the various embodiments provided below:

In one embodiment the first optical substrate selectively samples portions of the image modulated light, each portion being characterized by either angular field or spatial field.

In one embodiment at least one grating lamina in each optical substrate comprises an input grating operative to diffract light coupled into said substrate into a TIR path and an output grating operative to diffract light from said TIR path out of said substrate.

In one embodiment extraction from said second substrate takes place through a face of the waveguiding layer.

In one embodiment extraction from second substrate takes place through a wave guiding layer edge.

In one embodiment the grating vectors of grating lamina in the first substrate lie in a plane substantially orthogonal to the faces of the first substrate.

In one embodiment the grating vectors of grating lamina in the first substrate lie in a plane substantially parallel to the faces of the first substrate.

In one embodiment the waveguide layers are transparent dielectrics.

In one embodiment the waveguiding layers propagate monochromatic light.

In one embodiment first, second and third waveguiding layers are provided in at least one of the first or second substrates for the purpose of propagating red, green and blue light.

In one embodiment first and second waveguiding layers are provided in at least one of the first or second substrates for the purpose of propagating red light and mixed blue and green light.

In one embodiment waveguiding layers in at least one of the first or second substrates sandwich a half wave film.

In one embodiment waveguiding layers in at least one of the first or second substrates sandwich an air space.

In one embodiment grating lamina in at least one of the first or second substrates multiplex gratings of at least two different monochromatic prescriptions.

In one embodiment grating lamina in at least one of said first or second substrates multiplex gratings of at least two different colors.

In one embodiment the first substrate provides pupil expansion along the first direction and the second substrate provides pupil expansion along the second direction.

In one embodiment light extracted from the first and second substrates provides uniform illumination in any field of view direction.

In one embodiment each grating in at least one of the first substrate or second substrates has first and second diffracting state. The first diffracting state is characterized by high diffraction efficiency and the second diffraction state is characterized by low diffraction efficiency.

In one embodiment the diffracting state occurs when an electric field is applied across the grating and a non-diffracting state exists when no electric field is applied.

In one embodiment the non diffracting state occurs when an electric field is applied across the grating and a diffracting state exists when no electric field is applied.

In one embodiment the first and second propagation directions are orthogonal.

In one embodiment at least one of the substrates is curved in at least one orthogonal plane.

In one embodiment at least one of the waveguiding layers includes a beam splitter lamina.

In one embodiment quarter wavelength film is applied to at least one face of the waveguiding layer in either the first substrate or the second substrate.

In one embodiment a reflective thin film coating is applied to at least one face of the waveguiding layer in either the first substrate or the second substrate.

In one embodiment the first coupling means comprises at least one grating lamina substantially overlapping a portion of the first substrate.

In one embodiment the first coupling means comprises at least one grating lamina disposed within the waveguiding layer.

In one embodiment the first coupling means comprises at least one grating lamina. Each grating lamina comprises at least two multiplexed gratings of different prescriptions. Each grating lamina substantially overlaps a portion of the first substrate.

In one embodiment the second coupling means comprises at least one grating lamina substantially overlapping the first substrate.

In one embodiment the second coupling means comprises at least one grating lamina. Each grating lamina comprises at least two multiplexed gratings of two different prescriptions. Each grating lamina substantially overlaps the first substrate.

In one embodiment the second coupling means is disposed within the second substrate.

In one embodiment grating vectors of grating lamina in the first substrate lie in a plane substantially parallel to the faces of the substrate and the first substrate grating provides the second coupling means.

The invention may be used to provide one eye piece of a HMD, a HMD or a HUD.

In one embodiment at least one grating in the first or second substrates encodes optical power.

In one embodiment the second substrate is embedded within a windscreen.

Grating pitches covering the range of interest for practical displays may be achieved without difficulty; in fact, in one embodiment the material may sustain pitches as low as 0.2 microns and as high as 15 microns. In electro-optical terms, POLICRYPS may be similar to conventional HPDLC. In some instances, the switching speed of POLICRYPS may be higher than HPDLC and the switching voltage is at least equal to or lower than that of HPDLC. In one embodiment, like HPDLC gratings POLICRYPS grating may be utilized both in transmission and in reflection and may be implemented in waveguides. The holographic recording process in POLICRYPS may be the same as that in HPDLC and may involve standard commercially-available monomers and LCs. In one embodiment, one challenge of POLICRYPS is that a high temperature process may be needed. In this embodiment, the temperature should be high enough to maintain isotropic mixture and to prevent isotropic-to-nematic transition during exposure.

POLYICRYPS was developed at LICRYL (Liquid Crystals Laboratory, IPCF-CNR), Center of Excellence and Department of Physics, University of Calabria, Italy). An example of POLICRYPS is described in Caputo, R. et al., *Journal of Display Technology*, Vol. 2, No. 1, March 2006, pp. 38-50, which is incorporated by reference in its entirety. Further details of POLICRYIPS may be found in U.S. Patent Application No. 2007/0019152 by Caputo. R.; et al., entitled "Holographic Diffraction Grating, Process for its Preparation and Opto-Electronic Device Incorporating It"; published in Jan. 25, 2007, which is incorporated by reference in its entirety Another uniform morphology grating technology that may be employed is POlymer LIquid Crystal Polymer Holograms Electrically Manageable ("POLIPHEM"), which was developed by the Fraunhoffer Institute for Applied Polymer Research, Potsdam (Germany). In one embodiment, POLIPHEM is similar to POLICRYPS in basic morphological and electro-optical terms. One advantage of using POLIPHEM over POLICRYPS is that former may avoid the high temperature processing needed in POLICRYPS in some instances by optimizing the properties and proportions of LC and monomer in the material recipe. Details of materials and methods for fabricating POLIPHEM gratings may be found in the international patent publication No.: WO2006002870 (PCT/EP2005/006950) by Stumpe, J. et al., entitled "Method for the Preparation of High Efficient, Tunable and Switchable Optical Elements Based on Polymer-Liquid Crystal Composites", published January 2006, which is incorporated by reference in its entirety.

In one embodiment, it may be desirable for the gratings described here to provide both high diffraction efficiency and wide angular bandwidth. However, in one embodiment these two goals conflict in that wide angular bandwidth dictates that the gratings should be thin, while thin gratings may suffer from progressively diminishing diffraction efficiency as the thickness is reduced. One solution is to stack a multiplicity of thin gratings, such that each grating may diffract the 0-order light from the grating beneath it, so that most of the input light eventually may get diffracted. In some embodiments, the grating layers may be separated by spacers. Such a stratified grating structure may be considered to be equivalent to diffraction by a thick or volume (i.e., Bragg) grating with at least one benefit of a much wider bandwidth resulting from using thin gratings as a basic building block.

In one embodiment, the thin gratings may desirably operate in the Bragg regime (rather than thin gratings according to the Raman Nath regime) to avoid higher order diffraction. In one embodiment, when the thin gratings operate in the Raman-Nath regime, careful optimization of the thickness and pitch may be employed to ensure that the relative phasing of the diffraction orders as they propagate from layer to layer give rise to a unique notched diffraction response of the +1 order (for the case of Bragg incidence). In another embodiments, Bragg gratings may be recorded in a stratified grating structure known as a Stratified Volume Holographic Element (SVHOE). An example of SVHOE is described in Nordin, G., et al., *J. Opt. Soc. Am. A.*, Vol. 9, NO. 12, December 1992, pp. 2206-2217, which is incorporated by reference in its entirety.

A more complete understanding of the invention can be obtained by considering the following detailed description in conjunction with the accompanying drawings, wherein like index numerals indicate like parts. For purposes of clarity, details relating to technical material that is known in the technical fields related to the invention have not been described in detail.

Additional Embodiments

The following embodiments are taken from the claims of the provisional application Ser. No. 61/849,853, filed Feb. 4, 2013, which is incorporated by reference in its entirety.

1. An apparatus for displaying an image comprising:
   an input image node for providing image modulated light;
   a first optical substrate comprising at least one waveguiding layer, each said waveguiding layer propagating light in a first direction, each said waveguiding layer comprising at least one grating lamina operative to extract light from said first substrate along said first direction;
   a second optical substrate comprising at least one waveguiding layer, each said waveguiding layer propagating light in a second direction, each said waveguiding layer containing at least one grating lamina operative to extract light for display from said second substrate along said second direction;
   a first optical means for coupling said image modulated light into said first substrate; and
   a second optical means for coupling light extracted from said first substrate into said second substrate.
2. The apparatus of embodiment 1 wherein said first optical substrate selectively samples portions of said image modulated light, each said portion being characterized by either angular field or spatial field.
3. The apparatus of embodiment 1 wherein said at least one grating lamina in each said optical substrate comprises an input grating operative to diffract light coupled into said substrate into a TIR path and an output grating operative to diffract light from said TIR path out of said substrate.
4. The apparatus of embodiment 1 wherein said extraction from said second substrate takes place through a waveguiding layer face.

5. The apparatus of embodiment 1 wherein said extraction is carried out from second substrate through a waveguiding layer edge.
6. The apparatus of embodiment 1 wherein grating vectors of grating lamina in said first substrate lie in a plane substantially orthogonal to the faces of said substrate.
7. The apparatus of embodiment 1 wherein grating vectors of grating lamina in said first substrate lie in a plane substantially parallel to the faces of said substrate.
8. The apparatus of embodiment 1 wherein said waveguide layers are transparent dielectric.
9. The apparatus of embodiment 1 wherein said waveguiding layers propagate monochromatic light.
10. The apparatus of embodiment 1 wherein first, second and third waveguiding layers are provided in at least one of said substrates for propagating red, green and blue.
11. The apparatus of embodiment 1 wherein first and second waveguiding layers are provided in at least one of said substrates for propagating red light and mixed blue and green light.
12. The apparatus of embodiment 1 wherein waveguiding layers in at least one of said first or second substrates sandwich a half wave film.
13. The apparatus of embodiment 1 wherein waveguiding layers in at least one of said first or second substrates sandwiches an air space.
14. The apparatus of embodiment 1 wherein grating lamina in at least one of said first and second substrates comprises multiplex gratings of at least two different monochromatic prescriptions.
15. The apparatus of embodiment 1 wherein grating lamina in at least one of said first and second substrates comprise multiplex gratings of at least two different colors.
16. The apparatus of embodiment 1 wherein said first substrate provides pupil expansion along said first direction and said second substrate provides pupil expansion along said second direction.
17. The apparatus of embodiment 1 wherein said light extracted from said first and second substrates provides uniform illumination in any field of view direction.
18. The apparatus of embodiment 1 wherein each said grating in at least one of said first substrate or second substrate has a first diffracting state wherein said first diffracting state is characterized by a high diffraction efficiency and said second diffraction state is characterized by a low diffraction efficiency.
19. The apparatus of embodiment 17 wherein said diffracting state occurs when an electric field is applied across said grating and a non diffracting state exists when no electric field is applied.
20. The apparatus of embodiment 17 wherein said non diffracting state occurs when an electric field is applied across said grating and a diffracting state exists when no electric field is applied.
21. The apparatus of embodiment 1 wherein said first and second propagation directions are orthogonal.
22. The apparatus of embodiment 1 wherein at least one of said substrates is curved in at least one orthogonal plane.
23. The apparatus of embodiment 1 wherein at least one of said waveguiding layers includes a beam splitter lamina.
24. The apparatus of embodiment 1 wherein quarter wavelength film is applied to at least one face of said waveguiding layer in either said first substrate or said second substrate.
25. The apparatus of embodiment 1 wherein a reflective thin film coating is applied to at least one face of said waveguiding layer in either said first substrate or said second substrate.
26. The apparatus of embodiment 1 wherein said first coupling means comprises at least one grating lamina substantially overlapping a portion of said first substrate.
27. The apparatus of embodiment 1 wherein said first coupling means comprises at least one grating lamina disposed within said waveguiding layer.
28. The apparatus of embodiment 1 wherein said first coupling means comprises at least one grating lamina, each said grating lamina comprising at least two multiplexed gratings of two different prescriptions, each said grating lamina substantially overlapping a portion of said first substrate.
29. The apparatus of embodiment 1 wherein said second coupling means comprises at least one grating lamina substantially overlapping said first substrate.
30. The apparatus of embodiment 1 wherein said second coupling means comprises at least one grating lamina, each said grating lamina comprises at least two multiplexed gratings of two different prescriptions, each said grating lamina substantially overlapping said first substrate.
31. The apparatus of embodiment 1 wherein said second coupling means is disposed within said second substrate.
32. The apparatus of embodiment 1 wherein grating vectors of grating lamina in said first substrate lie in a plane substantially parallel to the faces of said substrate, wherein said first substrate grating provides said second coupling means.
33. The apparatus of embodiment 1 wherein said apparatus provides one eye piece of a HMD, a HHD or a HUD.
34. The apparatus of embodiment 1 wherein at least one grating in said substrates encodes optical power.
35. The apparatus of embodiment 1 wherein said second substrate is embedded within a windscreen.
36. The apparatus of embodiment 1 wherein said wave guiding layers have at least one face in contact with a nanoporous film.
37. The apparatus of embodiment 1 further comprising an eye tracker.
38. The apparatus of embodiment 1 which further comprises a beam homogenizer.
39. The apparatus of embodiment 1 wherein said input image node comprises a microdisplay, laser and collimating optics.
40. The apparatus of embodiment 1 wherein said grating lamina in at least one of said first or second substrates is an SBG.
41. The apparatus of embodiment 1 wherein said grating lamina in at least one of said first or second substrates are non-switching Bragg gratings recorded in HPDLC material.
42. The apparatus of embodiment 1 wherein said grating lamina in at least one of said first or second substrates are SBGs recorded in a reverse mode material.

REFERENCES

The following patent applications are incorporated by reference herein in their entireties:
U.S. Provisional Patent Application No. 61/687,436 with filing date 25 April 12 by the present inventors entitled WIDE ANGLE COLOUR HEAD MOUNTED DISPLAY;
U.S. Provisional Patent Application No. 61/689,907 with filing date 25 April 12 by the present inventors entitled HOLOGRAPHIC HEAD MOUNTED DISPLAY WITH IMPROVED IMAGE UNIFORMITY;
PCT Application No. US 2008/001909, with International Filing Date: 22 Jul. 2008, entitled LASER ILLUMINATION DEVICE;
PCT Application No.: US 2006/043938, entitled METHOD AND APPARATUS FOR PROVIDING A TRANSPARENT DISPLAY;
PCT Application No.: PCT/GB2010/001982 entitled COMPACT EDGE ILLUMINATED EYEGLASS DISPLAY;
U.S. Provisional Patent Application No. 61/573,066 with tiling date 24 August 12 by the present inventors entitled IMPROVEMENTS TO HOLOGRAPHIC POLYMER DISPERSED LIQUID CRYSTAL MATERIALS AND DEVICES;
PCT Application No.: PCT/GB2010/002023 filed on 2 Nov. 2010 by the present inventors entitled APPARATUS FOR REDUCING LASER SPECKLE;
PCT Application No.: PCT/GB2010/000835 with International Filing Date: 26 Apr. 2010 entitled COMPACT HOLOGRAPHIC EDGE ILLUMINATED EYEGLASS DISPLAY ;
U.S. Pat. No. 6,115,152 entitled HOLOGRAPHIC ILLUMINATION SYSTEM, issued 5 Sep. 2000; and
U.S. Provisional Patent Application No. 61/796,795 entitled COMPACT LASER ILLUMINATOR INCORPORATING A DESPCKLER with filing date 20 Nov. 2012.

Additional Example

Figure 68:
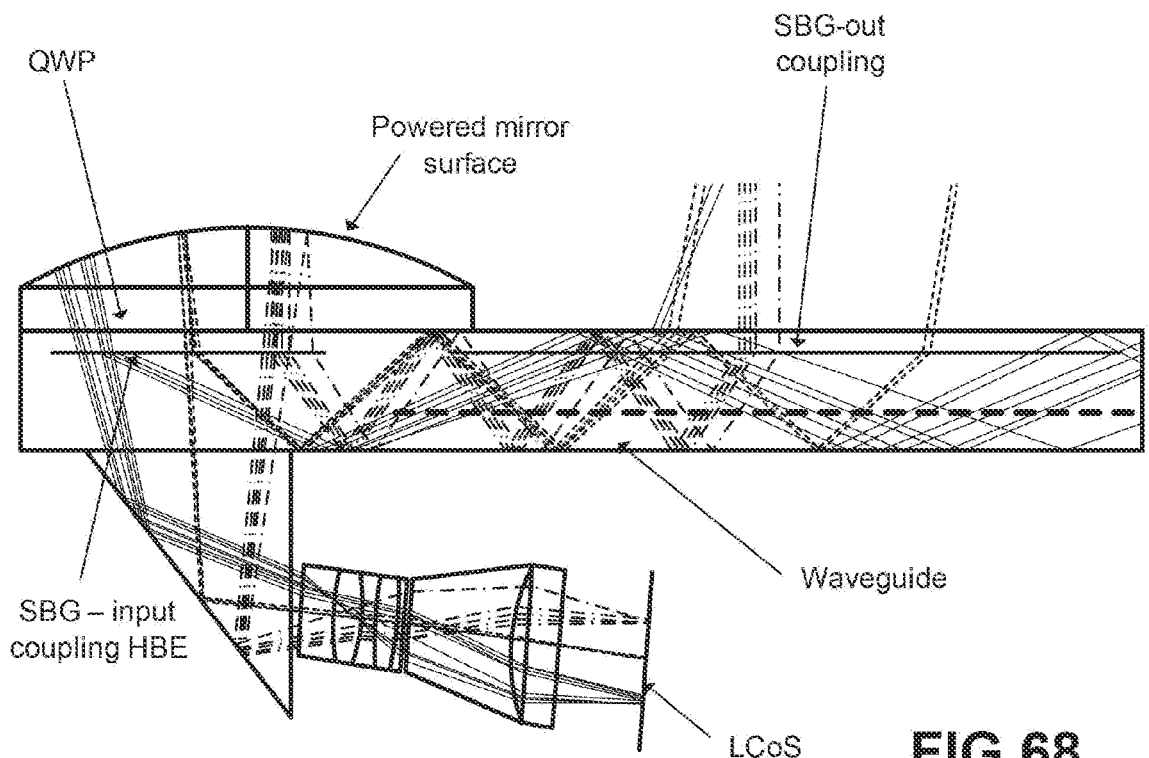
FIG. 68 shows a ray trace of a monochromatic version of the design in one embodiment.
Figure 69:
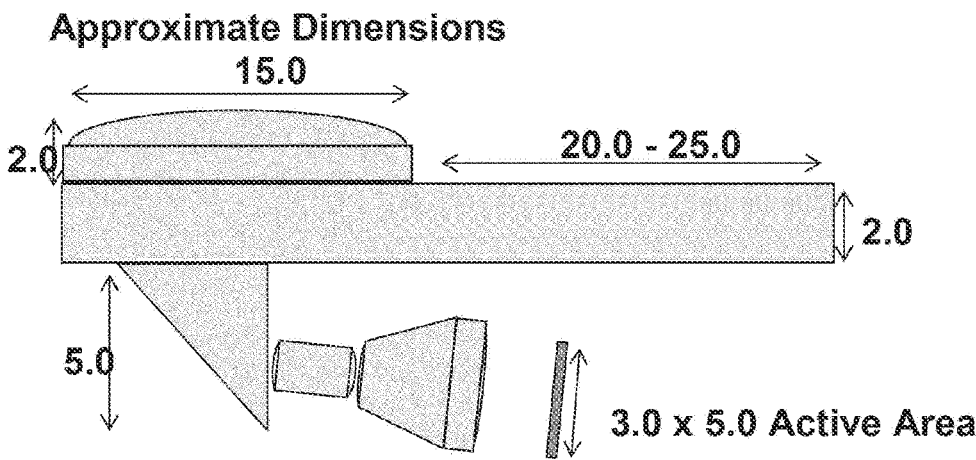
FIG. 69 shows the approximate dimensions of the IIN of FIG. 63 in one embodiment.
Figure 70:
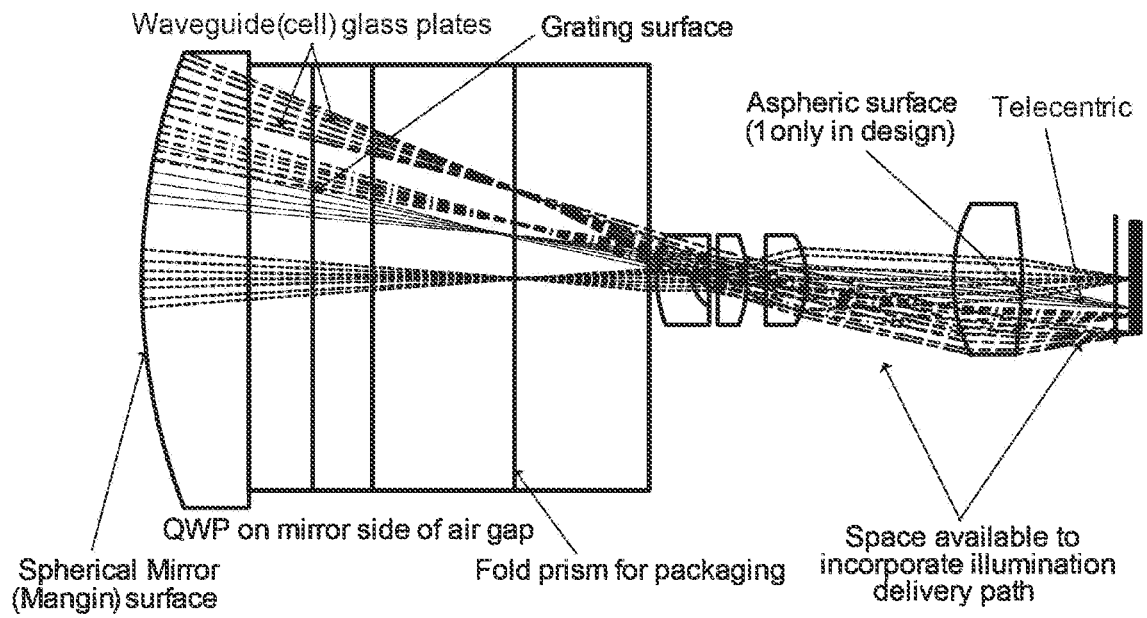
FIG. 70 provides unfolded views of the optical layout of FIG. 64 in one embodiment.

FIG. 68 is a ray trace of a monochromatic version of the design. FIG. 69 shows the approximate dimensions of the IIN of FIG. 68. FIG. 70 provides unfolded views of the optical layout of FIG. 69.

Figure 71A:
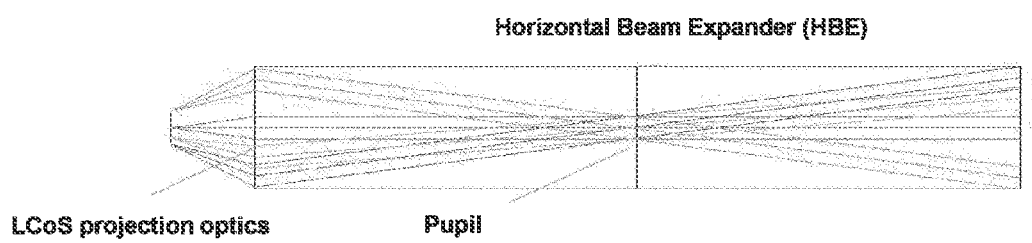
FIGS. 71A and 71B illustrate the formation of a projected stop inside the HBE in one embodiment using a simplified thin lens representation of the microdisplay projection optics.
Figure 71B:
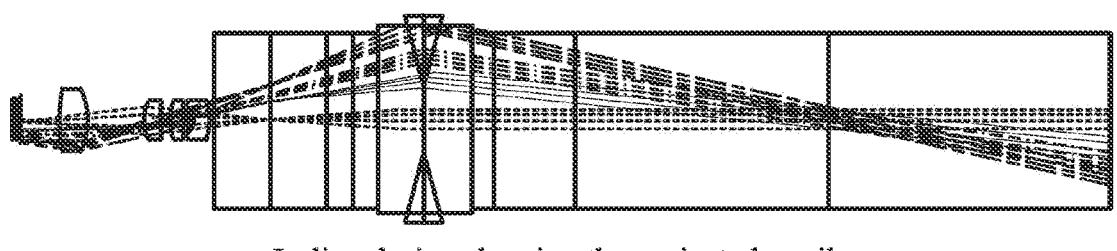

The IIN stop is formed by controlling profile of input illumination. There is currently no hard physical stop in the projection optics. The benefits of a projected stop are decreased waveguide thicknesses. A stop is projected midway up the HBE to minimize aperture diameter within the VBE, and hence minimizing the aperture width of the VBE to DigiLens waveguide coupler, i.e., reducing the width of the $1^{st}$ axis expander limits the thickness of the $2^{nd}$ axis expansion optic. FIGS. 71A and 71B illustrate the formation of a projected stop inside the HBE using a simplified thin lens representation of the microdisplay projection optics.

In one embodiment a graduated reflection profile underneath SBG layer is used to control (or assist) with grating DE variation along length (normally achieved in SBG grating using index modulation). This may be useful in cases such as the HBE, where a low percentage of light is out coupled in $1^{st}$ bounce, but a high percentage is coupled out at the other end of the expander.

An Embodiment Using a Striped HBE

Figure 72:
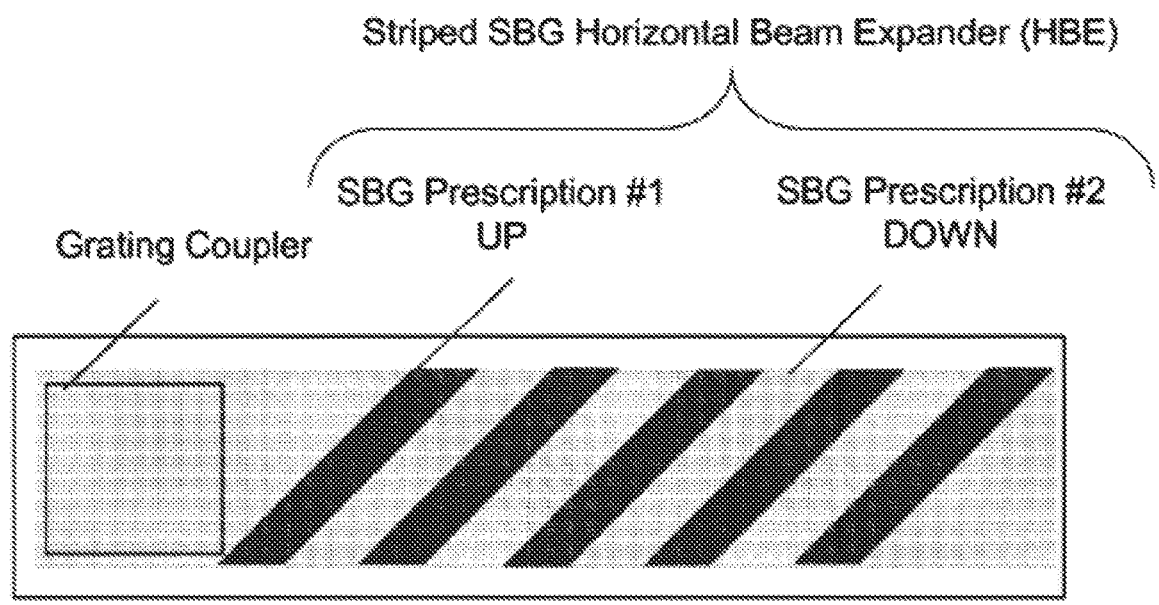
FIG. 72 illustrates one embodiment, in which the HBE that comprises a coupling grating at its input end and alternating SBG stripes of two different prescription, is inclined at 45 degrees.
Figure 73:
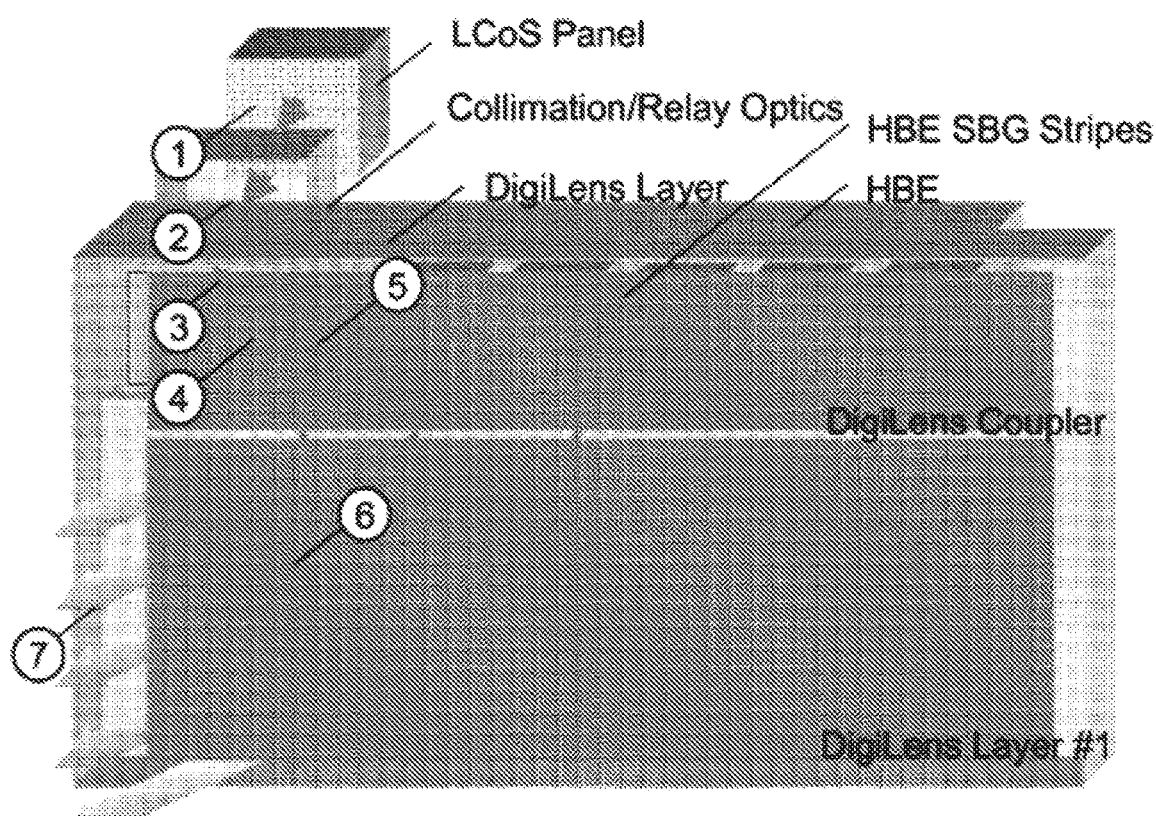
FIG. 73 illustrates beam propagation from the IIN through a single layer of the DigiLens showing the four changes in direction that occur along the path to the exit pupil in one embodiment.

In one embodiment the HBE comprises a coupling grating at its input end and alternating SBG stripes of two different prescriptions are inclined at 45 degrees within the plane as shown in FIG. 72. Although the stripes are shown as equi-spaced, their size and spacing may be varied for better illumination and image sampling control. However the stripes should not be made too narrow as this may impact the MTF. In general, the stripe geometry may need careful optimization as there are, for example, rays from extremities of a stipe that may result in a phase difference in the pupil. The input SBGs need a large angular bandwidth and a high efficiency while the DigiLens passive grating is lossy. Although the angular bandwidths of the gratings have pronounced center-to-edge variations, the extraction from the passive gratings is found to result in more light being diffracted from the center of a beam extracted, creating an effective inversion of the illumination profile at the end of the waveguide. This effect can be used to advantage in balancing the overall illumination profile. FIG. 73 illustrates beam propagation from the IIN through a single layer of the DigiLens showing the four changes in direction that occur along the path to the exit pupil. The optical path is labelled by numerals 1-7.

FOV, Eyebox and Eye Relief Geometry

Figure 74:
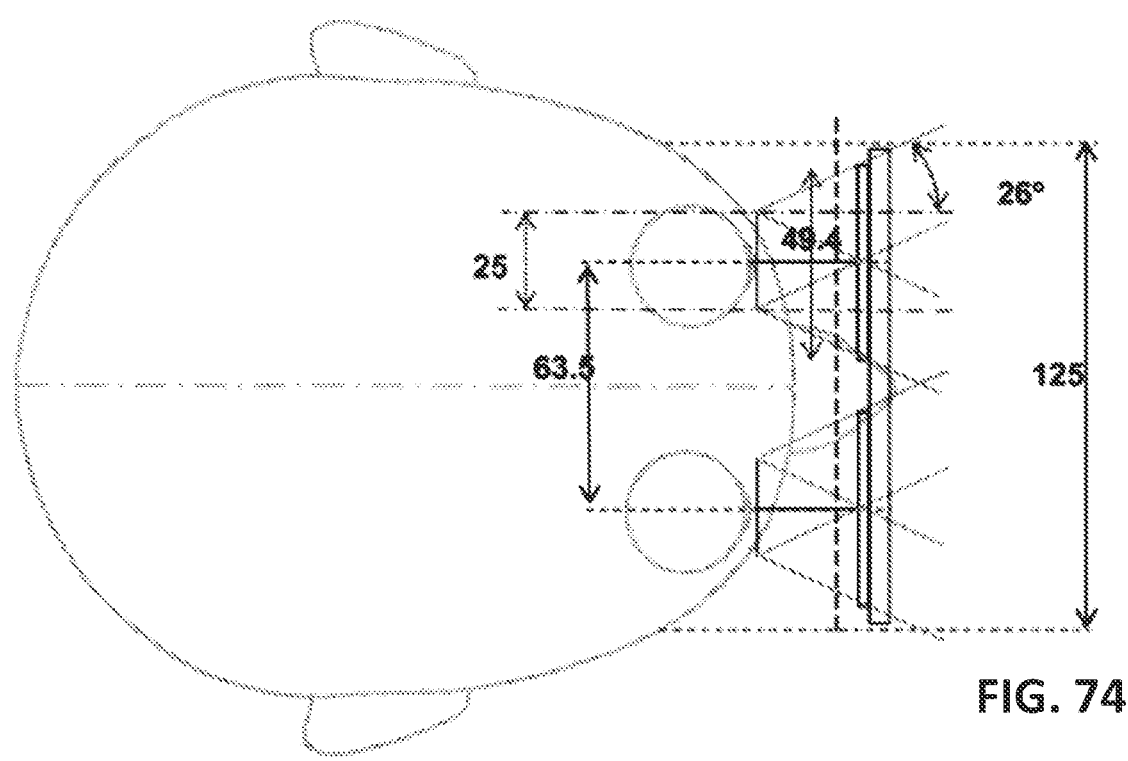
FIG. 74 shows plan view of the near eye geometry of the proposed helmet mounted display in one embodiment.
Figure 75:
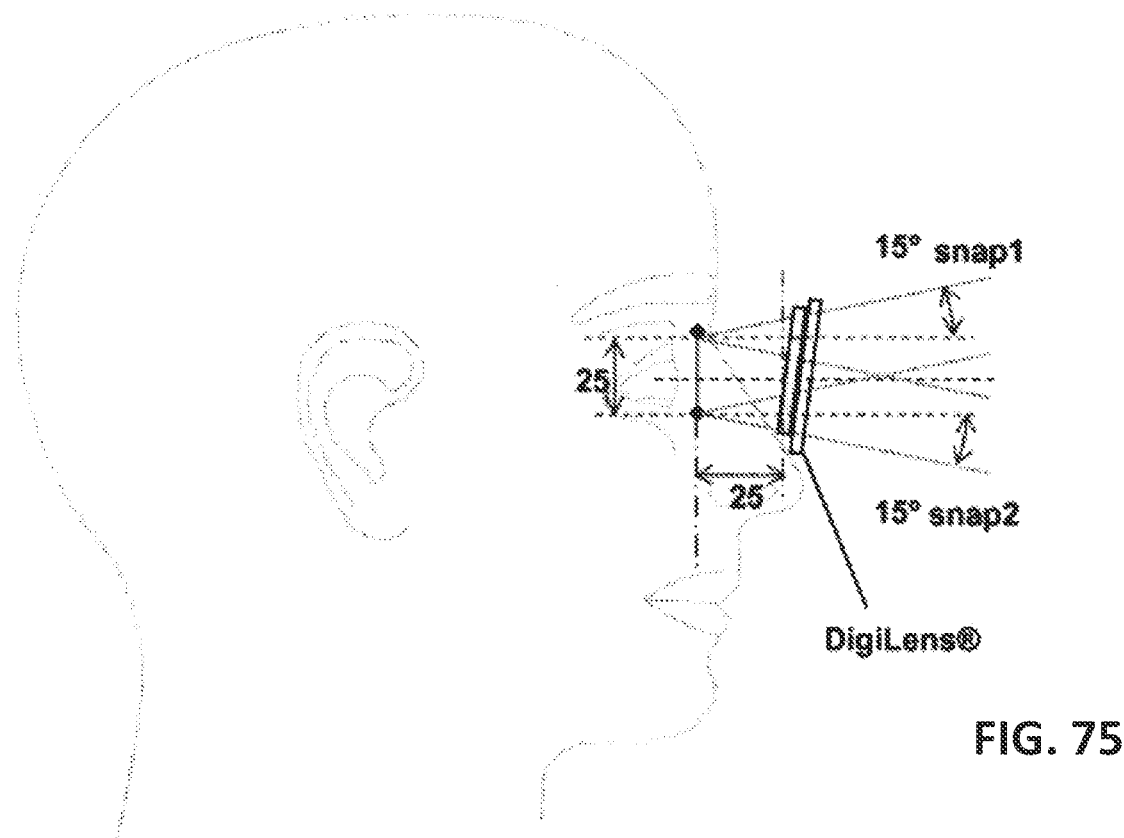
FIG. 75 shows side view of the near eye geometry of the proposed helmet mounted display in one embodiment.
Figures 76, 77:
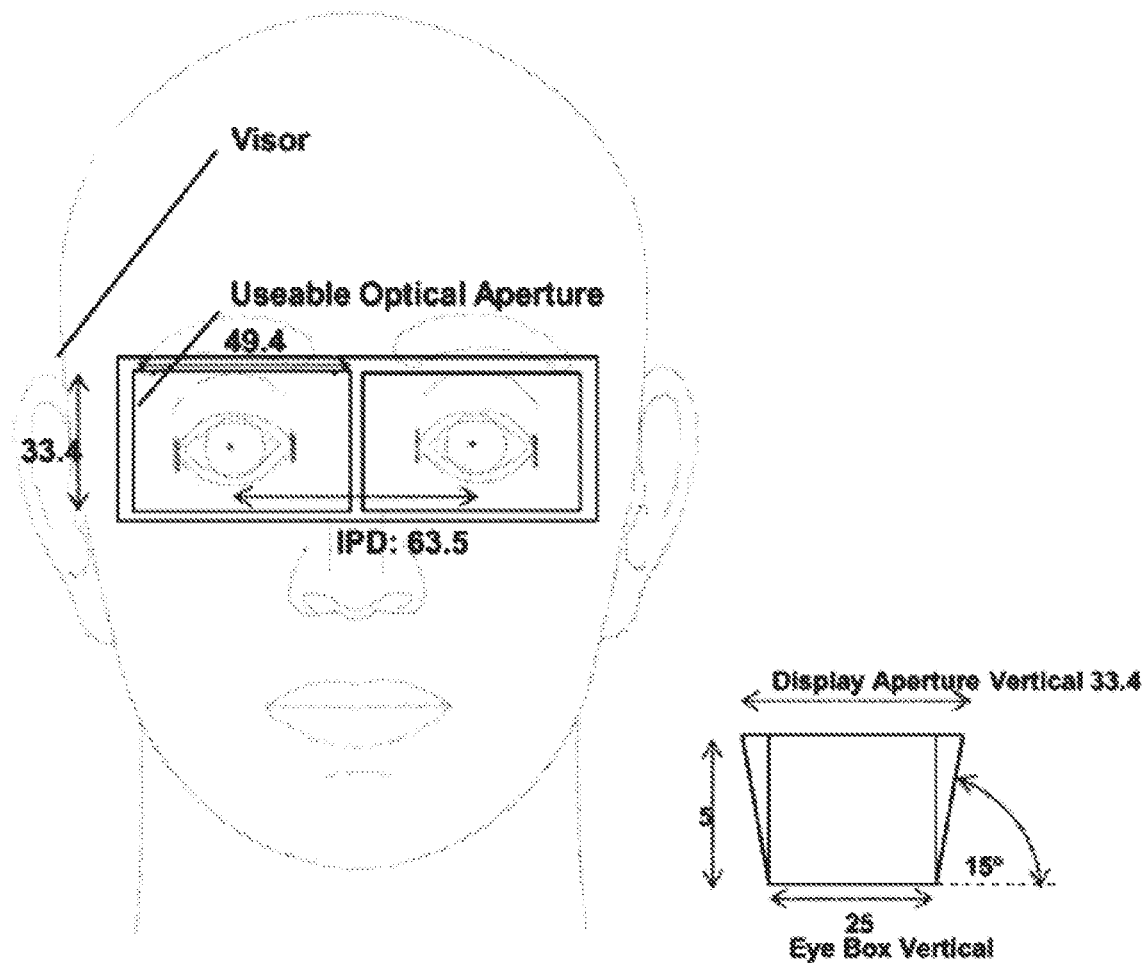
FIG. 76 shows front view of the near eye geometry of the proposed helmet mounted display in one embodiment.
FIG. 77 shows the relationship of the DigiLens® aperture to the FOV, eye relief and eye box in one embodiment.

The near eye geometry of the proposed helmet mounted display is shown in plan view in FIG. 74, in side view in FIG. 75, and in front view in FIG. 76. The relationship of the DigiLens® aperture to the FOV, eye relief and eye box is also shown in FIG. 77. Note that the DigiLens® aperture will scale with eye relief.

Binocular Overlap

Figure 78:
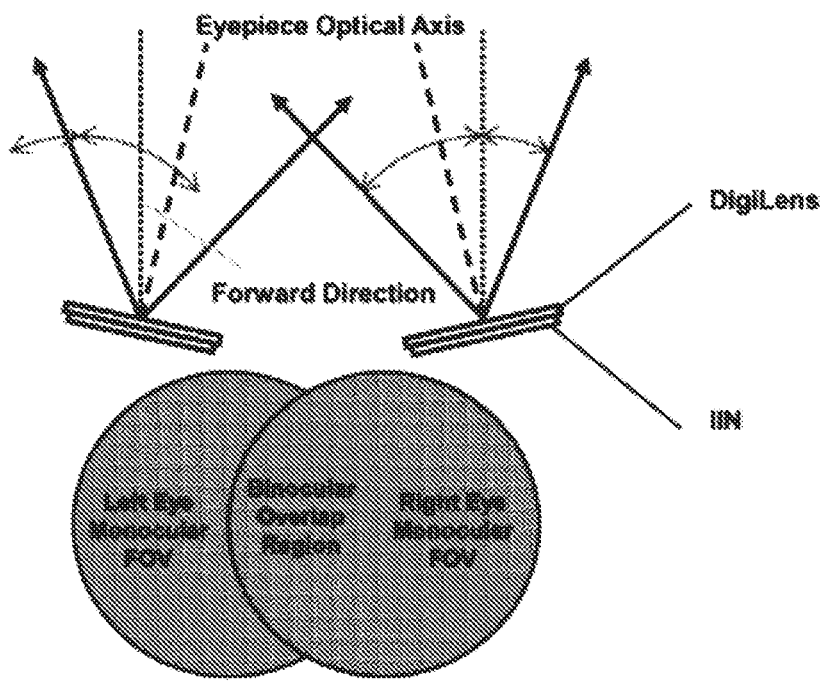
FIG. 78 shows partial binocular overlap in one embodiment.
Figure 79:
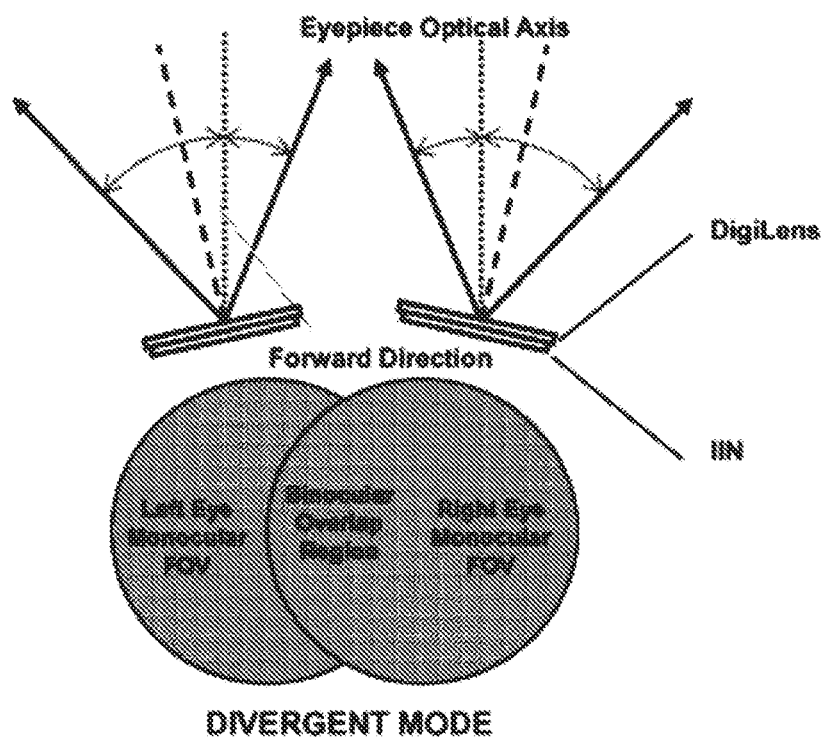
FIG. 79 shows partial binocular overlap in another embodiment.

As shown in FIG. 78 and FIG. 79, partial binocular overlap can be provided using convergent or divergent optics. In either case binocular overlap can provide up to 1.4×contrast improvement. Convergent overlap may be better for avoiding binocular rivalry. As a very tough guide, mostly distance work may need only low overlap, while mostly close-up work (typically at arms length) may need higher overlap. In general, published data on FOV vs. task performance is often anecdotal or limited to small and specialized samples. Extrapolating data from one application domain to another can be risky. There is no research that examines the FOV vs. task performance tradeoffs for a particular type of display. Consequently, the effects of eyebox, geometric distortion, form factor etc., are not fully reflected in the literature. The eyes tend to stay in the saccadic eye movement range (from 0° up to approximately ±10° to ±15°). Outside this range the head will tend to move to re-center the image. If no head tracker is provided all important information must lie with the saccadic region. Some applications need a balance between adequate peripheral cue presentation and central image quality. Some research suggests that if the binocular overlap falls below around 20° binocular rivalry leading to effects such as luning (shadowing around the edges of the overlap regions) will start to become a problem for a significant number of users. The HWD overlap, in the range 20-25, has been chosen to maximize the overall horizontal field of view while minimizing the risk of binocular rivalry.

Inter Pupillary Distance (IPD)

The Inter-Pupillary Distance (IPD) target is to have no interpupillary distance adjustment for the majority of the adult population (90%). More than 90% of the adult population has IPDs in the range of 57 mm to 70 mm (+/−6.5 mm range). The pupil position change due to eye roll +/−20° is +/−4.5 mm. The tolerance of helmet placement/visor slip (budget) is +/−6.4 mm. Alignment may be estimated using the formula: Alignment=$\sqrt{[(IPD90\%+Eye\ Roll)2+Slip2]}$=$\sqrt{[(6.3\ mm+4.5\ mm)^2+6.4\ mm^3]}$=$\sqrt{+/-12.5}$=25.0 mm wide eye box. Note that for the 10% of the population with IPDs outside of the range, full field of view vision is provided. For optimal alignment only one side of the field of view will be lost for one eye only. The other eye will still see the other side of the field, i.e., 90% of the population get 100% overlap. The remaining 10% of the population (within 52 mm to 75 mm IPD) will get 100% of the field of view with some overlap dependent on IPD and display alignment. In conclusion, a 25 mm wide eye box will permit 90% of the population to be accommodated without any adjustment, assuming the above alignment parameters, improved alignment tolerances of the visor/head gear to the eye will enable a reduction in the eye box dimensions if needed. This can be later traded off against system brightness.

Low Index Materials

Efficient waveguiding needs the TIR beams to be confined between low index media. Air gaps are difficult to fabricate and maintain while the refractive indices of currently available low index materials such as Magnesium Fluoride (1.46) and Silicon Dioxide (1.39) are much too high to meet the light TIR angle constraints needed in full color implementations of the HMD. The proposed solution is to use nanoporous (Mesoporous Silicon) materials. Nanoporous materials (e.g., mesoporous Silicon) are currently being used in many optical applications including anti reflection coatings and planar optical waveguides. Their high porosity enables the fabrication of high-quality low-dielectric constant thin films. Nanoporous materials can be fabricated in thin layers in a single coating step. To achieve very low, near unity, index the porosities need to be very high, approaching 95%. High transparency and low index can be achieved simultaneously with these films. Since they are highly efficient at absorbing water, they must be carefully sealed against moisture. The best approach may be to seal the passive gratings, HWP and material together. SBG Labs is also investigating the potential role of nanoporous materials as high refractive index media. This would increase the range of TIR angles that can be sustained in our waveguides with potential for increasing the horizontal POV from 40° to around 45°. Nanoporous materials are currently being used in many optical applications including anti reflection coatings and planar optical waveguides. It is reasonable to assume therefore that the technology will be accessible for our project. The manufacturing process should be translatable to manufacturing needs. Nanoporous materials can be fabricated in single coating step. Alternatively, graded index multilayer architectures can be used. SBG Labs is also investigating the potential role of nanoporous materials as high refractive index media. This would increase the range of TIR angles that can be sustained in our waveguides.

CONCLUSION

All literature and similar material cited in this application, including, but not limited to, patents, patent applications, articles, books, treatises, and web pages, regardless of the format of such literature and similar materials, are expressly incorporated by reference in their entirely. In the event that one or more of the incorporated literature and similar materials differs from or contradicts this application, including but not limited to defined terms, term usage, described techniques, or the like, this application controls.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, the technology described herein may be embodied as a method, of which at least one example has been provided. The acts performed as par of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one." Any ranges cited herein are inclusive.

The terms "substantially" and "about" used throughout this Specification are used to describe and account for small fluctuations. For example, they can refer to less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B" when used in conjunction with open-ended language such as "comprising" can refer, in one embodiment, to A only (optionally including elements other than B); in another embodiment, to B only (optionally including elements other than A); in yet another embodiment, to both A and a (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The claims should not be read as limited to the described order or elements unless stated to that effect. It should be understood that various changes in form and detail may be made by one of ordinary skill in the art without departing from the spirit and scope of the appended claims. All embodiments that come within the spirit and scope of the following claims and equivalents thereto are claimed.

What is claimed:

1. An apparatus for displaying an image comprising:
    an input image node providing image modulated light, the image modulated light including image content associated with at least a portion of a display field of view;
    a beam expander comprising:
        an expander optical substrate;
        one or more first expander input Bragg gratings to couple the image modulated light into one or more waveguide layers of the expander optical substrate for propagation along a first direction; and
        one or more expander output Bragg gratings in the one or more waveguide layers of the expander optical substrate, wherein the one or more expander output Bragg gratings extend along the first direction to progressively extract portions of the image modulated light out of an output face of the expander optical substrate, wherein the one or more expander output Bragg gratings have increasing diffraction efficiency along the first direction to provide uniform extraction of the image modulated light out of the output face of the first expander optical substrate along the first direction;
    a display substrate comprising:
        a display optical substrate;
        one or more display input Bragg gratings in the display optical substrate configured to couple the image modulated light from the beam expander into one or more waveguide layers of the display optical substrate and to propagate the image modulated light along a third direction perpendicular to the first and second directions; and
        one or more display output passive-mode switchable Bragg gratings in the one or more waveguide layers of the display optical substrate, wherein the one or more display output passive-mode switchable Bragg gratings extend along the third direction to progressively extract portions of the image modulated light along the third direction out of an output face of the display optical substrate, wherein the one or more display output passive-mode switchable Bragg gratings have increasing diffraction efficiency along the third direction to provide uniform extraction of the input light out of the output face of the display optical substrate along the third direction, wherein the one or more display output passive-mode switchable Bragg gratings direct the image modulated light along angles associated with the at least a portion of the display field of view, wherein the image modulated light from the one or more display output passive-mode switchable Bragg gratings is linearly polarized.

2. The apparatus of claim 1, wherein the one or more expander output Bragg gratings include alternating stripes of Bragg gratings with different prescriptions.

3. The apparatus of claim 2, wherein the alternating stripes of Bragg gratings are angled at 45 degrees relative to the first or the second directions.

4. The apparatus of claim 1, wherein at least one of the one or more expander output Bragg gratings or the one or more display output passive-mode switchable Bragg gratings have varying thickness along the respective direction of light propagation to provide for uniform extraction.

5. The apparatus of claim 4, wherein at least one of the one or more expander input Bragg gratings or the one or more expander output Bragg gratings include an active switchable Bragg grating.

6. The apparatus of claim 1, wherein the first direction is opposite to the second direction.

7. The apparatus of claim 1, wherein the first direction the same as the second direction.

8. The apparatus of claim 1, wherein at least one of the one or more expander input Bragg gratings or the one or more expander output Bragg gratings include switchable Bragg gratings.

9. The apparatus of claim 8, wherein the one or more expander input Bragg gratings and the one or more expander output Bragg gratings include passive-mode switchable Bragg gratings.

10. The apparatus of claim 9, wherein the one or more expander input Bragg gratings and the one or more expander output Bragg gratings include non-switching Bragg gratings recorded in a holographic polymer-dispersed liquid crystal (HPDLC) material in at least one of forward or reverse mode.

11. The apparatus of claim 1, wherein the image modulated light comprises monochrome light.

12. The apparatus of claim 1, wherein the first image modulated light comprises multi-wavelength light.

13. The apparatus of claim 1, wherein the one or more expander input Bragg gratings and the one or more expander output Bragg gratings are complementary, wherein the one or more display input Bragg gratings and the one or more display output passive-mode switchable Bragg gratings are complementary.

14. The apparatus of claim 1, wherein each of the one or more waveguide layers of at least one of the beam expander or the display substrate is configured to propagate at least one of red, green, blue, blue/green mixed light, and one of a multiplicity of sub field of Views (FOVs).

15. The apparatus of claim 1, wherein at least one of the one or more waveguide layers of at least one of the beam expander or the display substrate comprises holograms with superimposed different color prescriptions.

16. The apparatus of claim 1, wherein at least one of the one or more waveguide layers of at least one of the beam expander or the display substrate is lossy.

17. The apparatus of claim 1, wherein of the one or more waveguide layers of at least one of the beam expander or the display substrate has a varying thickness along the respective direction of light propagation.

18. The apparatus of claim 1, wherein at least one of the beam expander or the display substrate is curved.

19. The apparatus of claim 1, wherein the image modulated light from the one or more display output passive-mode switchable Bragg gratings is uniform across the at least a portion of the display field of view.

20. A device comprising the apparatus of claim 1, wherein the device is a part of at least one of a Helmet Mounted Display (HMD) or a head up display (HUD).

* * * * *